United States Patent
Ono et al.

[11] Patent Number: 6,122,585
[45] Date of Patent: Sep. 19, 2000

[54] ANTI-LOCK BRAKING SYSTEM BASED ON AN ESTIMATED GRADIENT OF FRICTION TORQUE, METHOD OF DETERMINING A STARTING POINT FOR ANTI-LOCK BRAKE CONTROL, AND WHEEL-BEHAVIOR-QUANTITY SERVO CONTROL MEANS EQUIPPED WITH LIMIT DETERMINATION MEANS

[75] Inventors: Eiichi Ono; Katsuhiro Asano; Takaji Umeno; Hiroyuki Yamaguchi; Masaru Sugai, all of Aichi-ken, Japan

[73] Assignee: Kabushiki Kaisha Toyota Chuo Kenkyusho, Aichi-gun, Japan

[21] Appl. No.: 08/910,898

[22] Filed: Aug. 13, 1997

[30] Foreign Application Priority Data

| Aug. 20, 1996 | [JP] | Japan | 8-218828 |
| Aug. 30, 1996 | [JP] | Japan | 8-231075 |
| Nov. 26, 1996 | [JP] | Japan | 8-315282 |
| Jun. 20, 1997 | [JP] | Japan | 9-164800 |
| Jul. 7, 1997 | [JP] | Japan | 9-181606 |

[51] Int. Cl.[7] .................. G06F 7/00; G06F 17/00
[52] U.S. Cl. .................. 701/71; 701/74; 701/80; 701/90; 180/197; 303/149; 303/163; 303/166
[58] Field of Search .................. 701/71, 74, 73, 701/70, 80–83, 89, 90; 180/195, 197; 303/149, 163, 166, 194

[56] References Cited

U.S. PATENT DOCUMENTS

| 4,794,538 | 12/1988 | Cao et al. . |
| 4,962,824 | 10/1990 | Hagiya et al. .................. 180/197 |
| 5,119,303 | 6/1992 | Struck et al. . |
| 5,513,907 | 5/1996 | Kienke et al. . |
| 5,588,721 | 12/1996 | Asano et al. .................. 303/163 |

FOREIGN PATENT DOCUMENTS

| 0 699 568 | 3/1996 | European Pat. Off. . |
| 37 35 673 | 5/1989 | Germany . |

*Primary Examiner*—William A. Cuchlinski, Jr.
*Assistant Examiner*—Gertrude Arthur
*Attorney, Agent, or Firm*—Oblon, Spivak, McClelland, Maier & Neustadt, P.C.

[57] ABSTRACT

An anti-lock braking system includes a friction torque gradient estimating unit for estimating, from a small number of parameters, the gradient of friction torque with respect to a slip speed, and controls a braking force acting on wheels on the basis of the friction torque gradient estimated by the friction torque gradient estimating unit. The friction torque gradient estimating unit may employ several types of estimating methods; e.g., a method of estimating the gradient of friction torque from only time-series data concerning a wheel speed; a method of estimating the friction torque gradient from time-series data concerning wheel deceleration as well as from braking torque or time-series data concerning physical quantities associated with the braking torque; or a method of estimating the friction torque gradient from micro-gains which are obtained when brake pressure is excited in a very small amount at the resonance frequency of a vibration system comprising a vehicle, wheels, and a road surface and which represent the characteristics of the vibration system. Further, there is also disclosed a method of determining, from the thus-estimated friction torque gradient, the limit of the characteristics of friction torque developed between the wheels and the road surface.

16 Claims, 54 Drawing Sheets

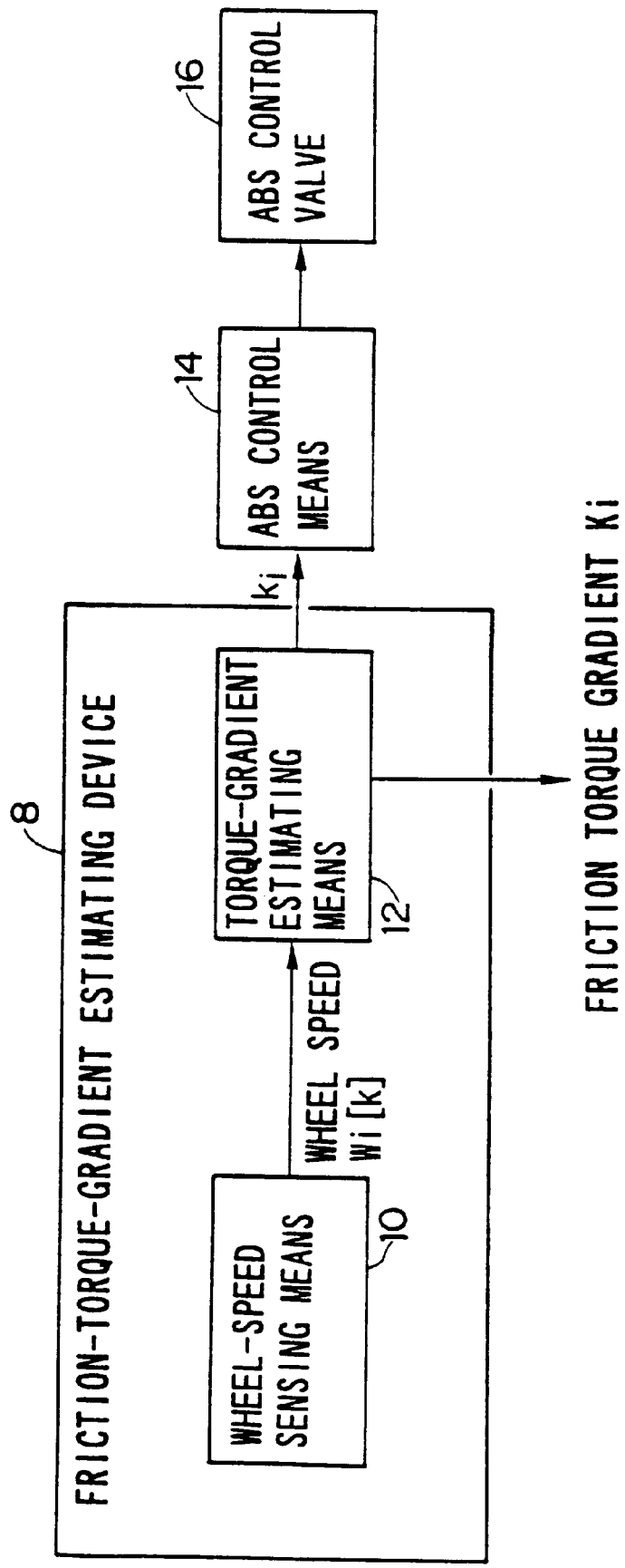

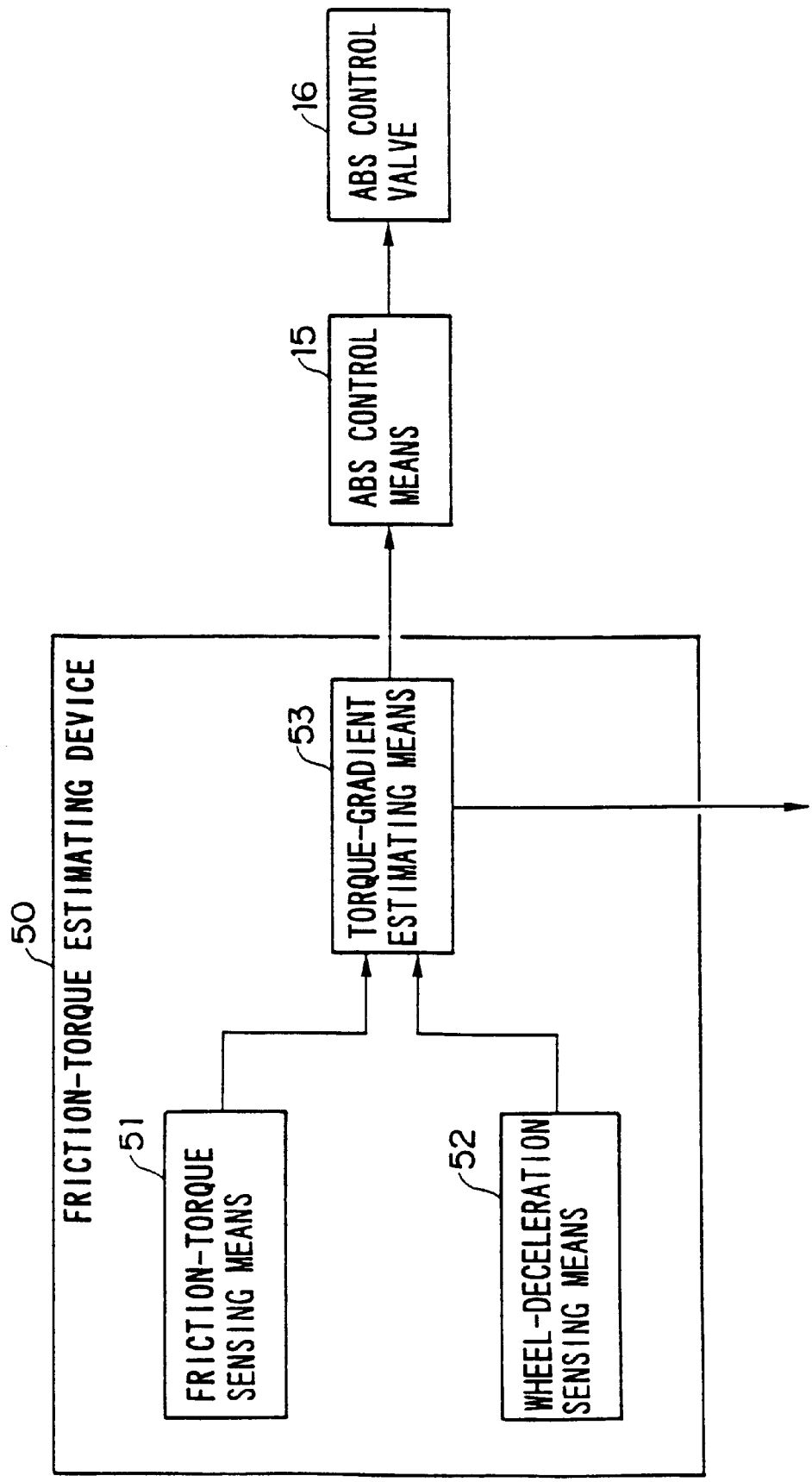

F I G. 3
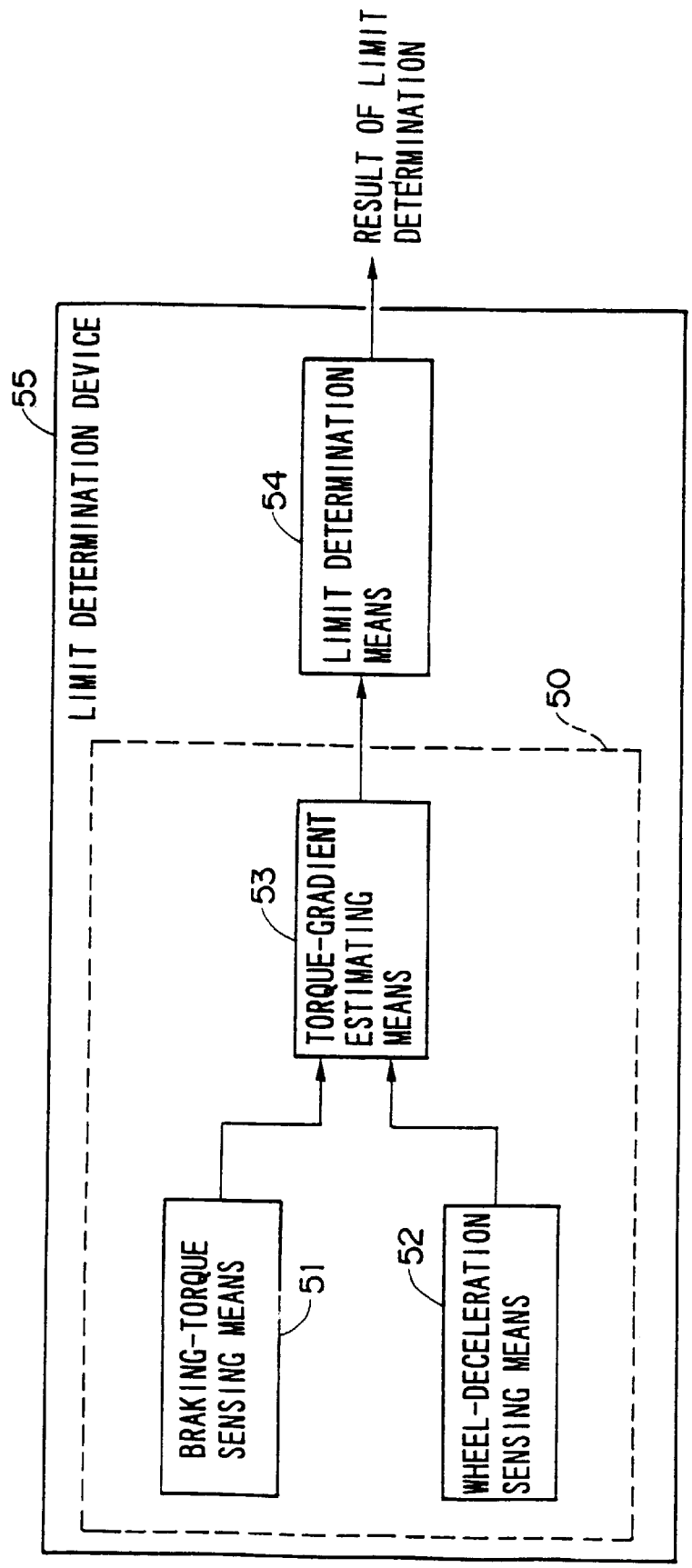

F I G. 7A
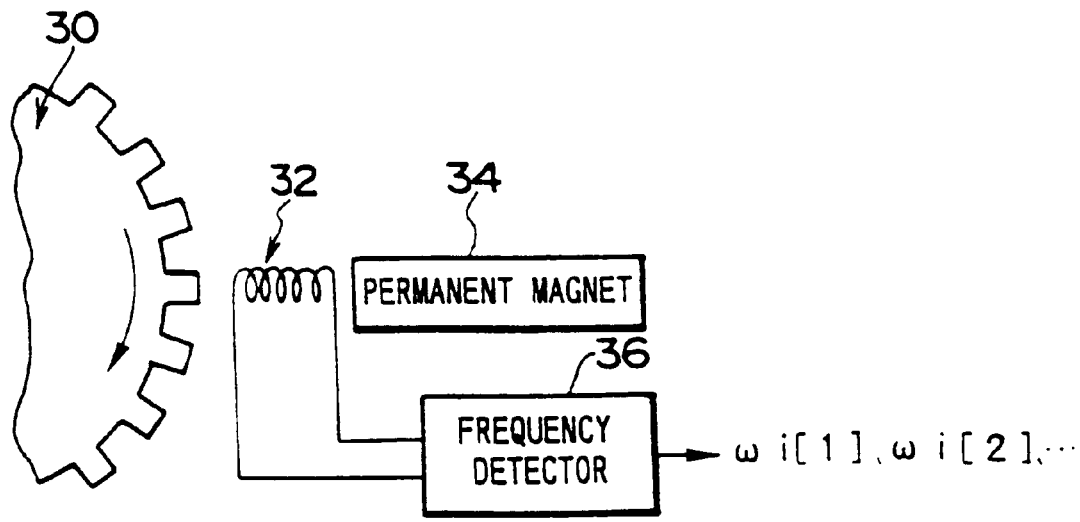
F I G. 7B
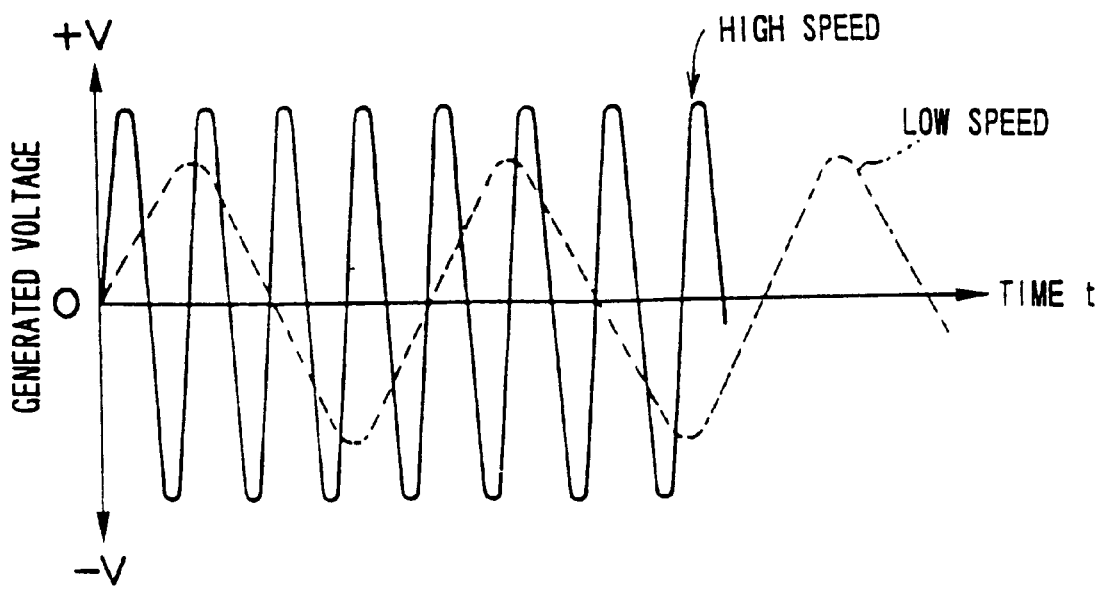

F I G. 1 1
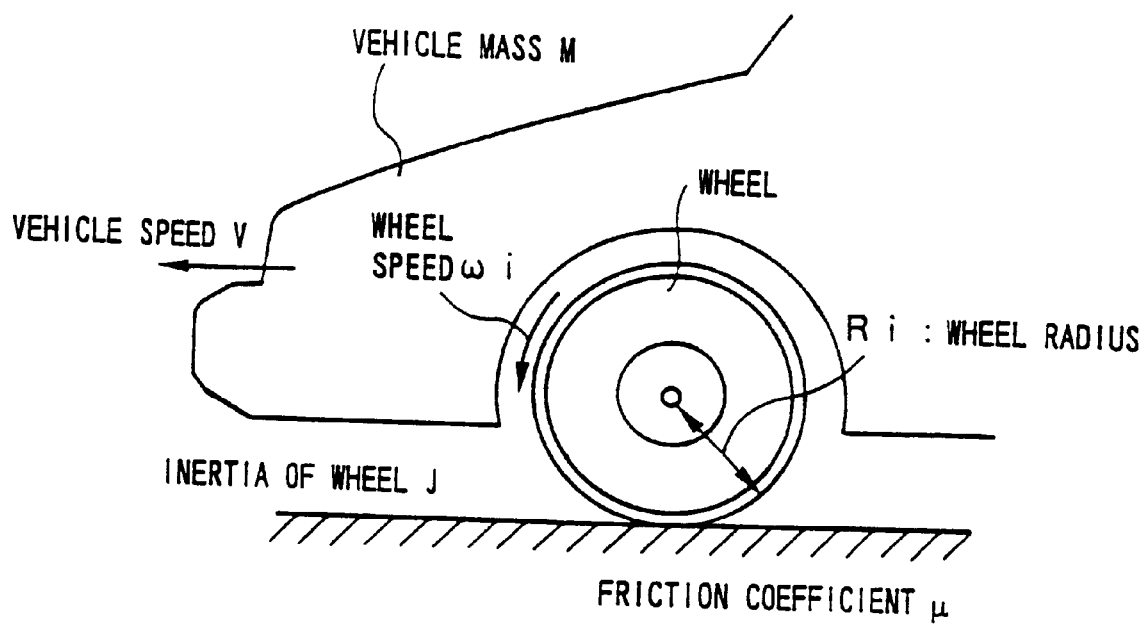

F I G. 1 7
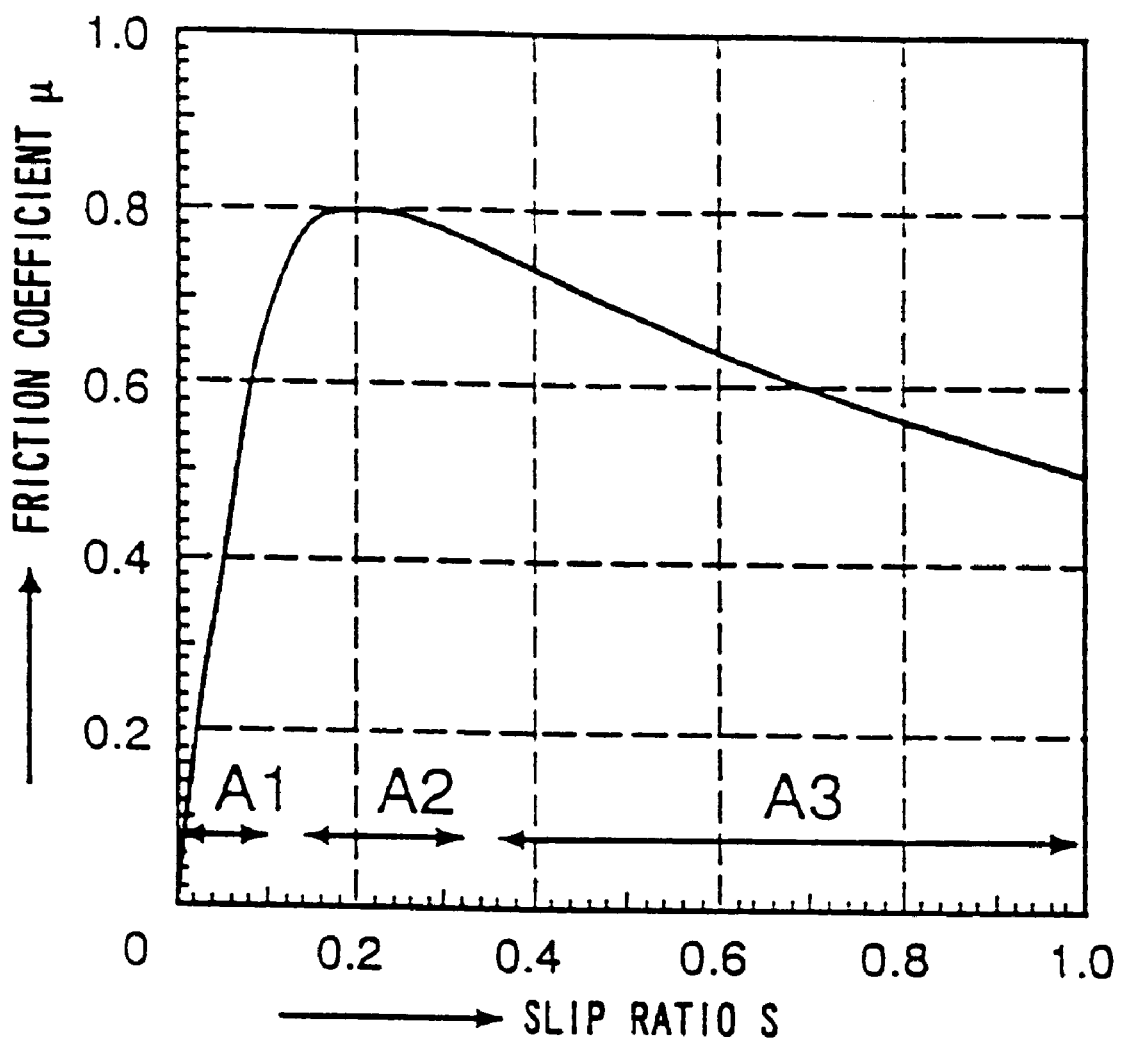

GENTLE BRAKING (LOCK DOES NOT OCCUR)

HARSH BRAKING (LOCK DOES NOT OCCUR)

HARSH BRAKING (LOCK OCCURS)

PROGRESSIVE BRAKING (LOCK OCCURS)

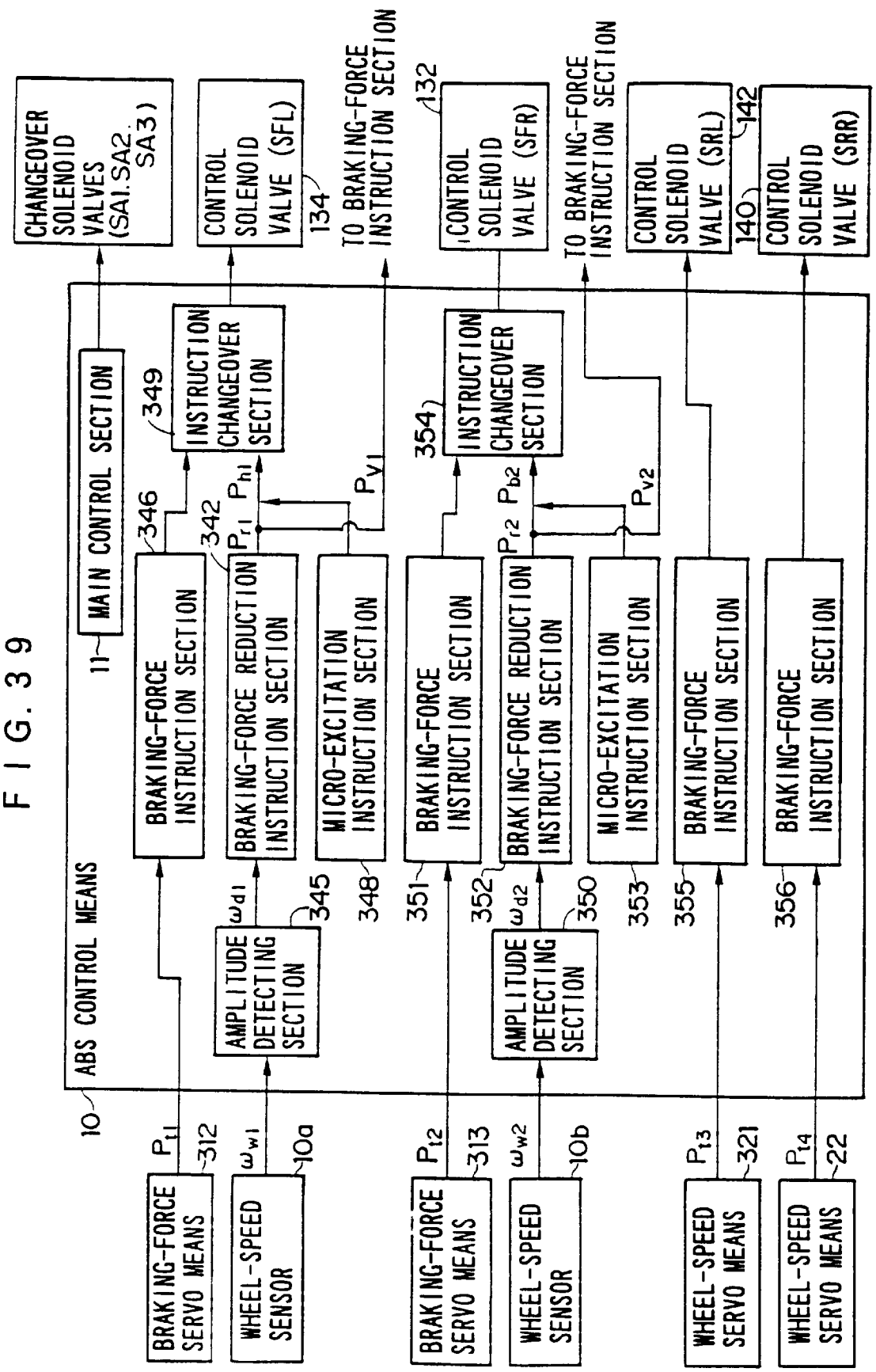
F I G. 3 9

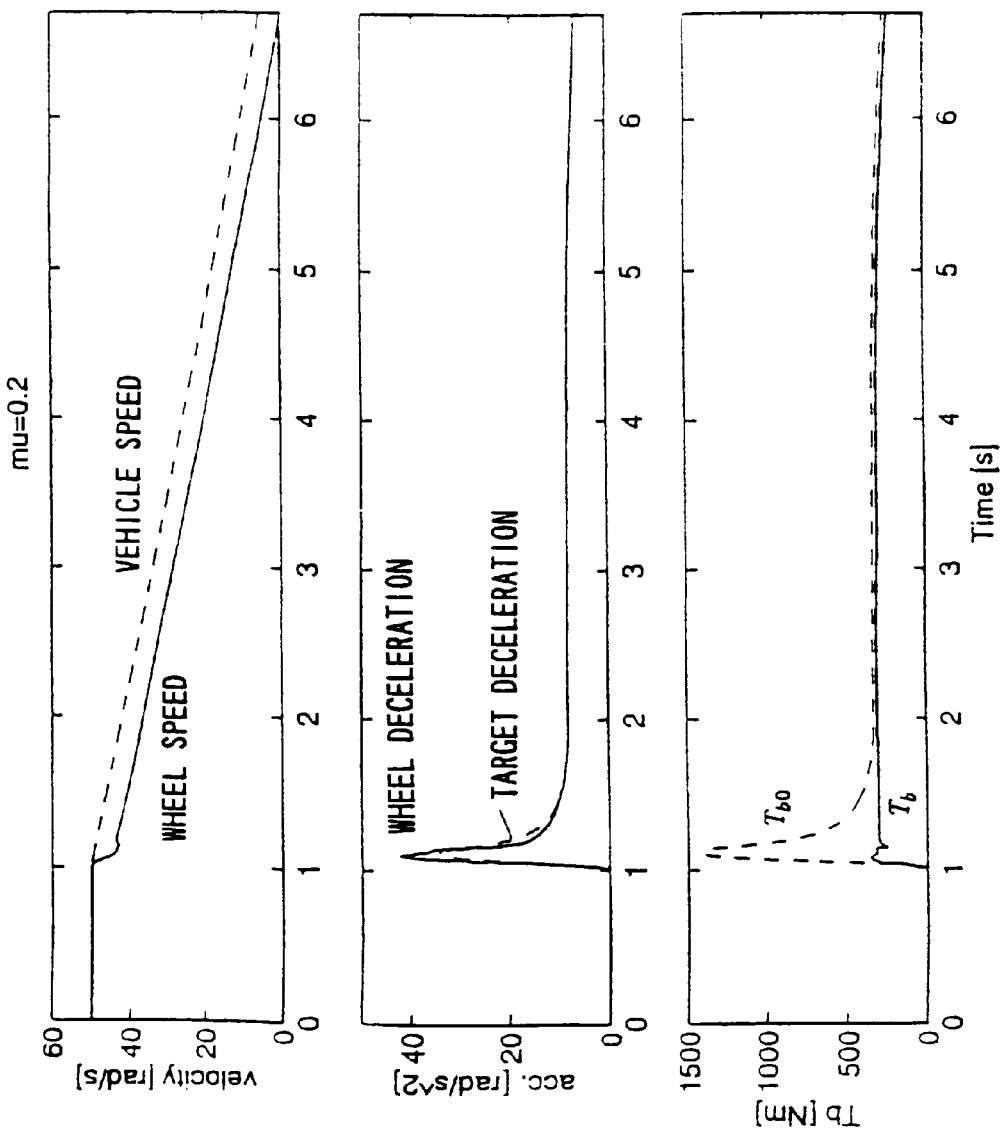

FIRST EXAMPLE
RESULT OF SIMULATION FOR HARSH BRAKING ON HIGH-$\mu$ ROAD)
F I G. 5 2 A
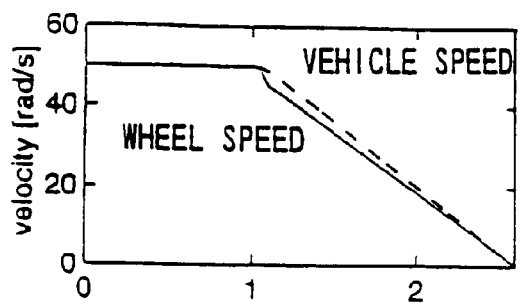
F I G. 5 2 B
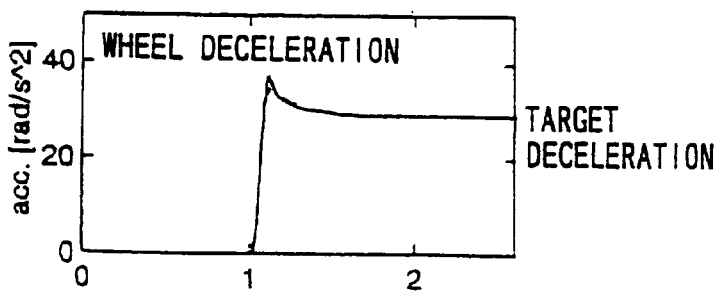
F I G. 5 2 C
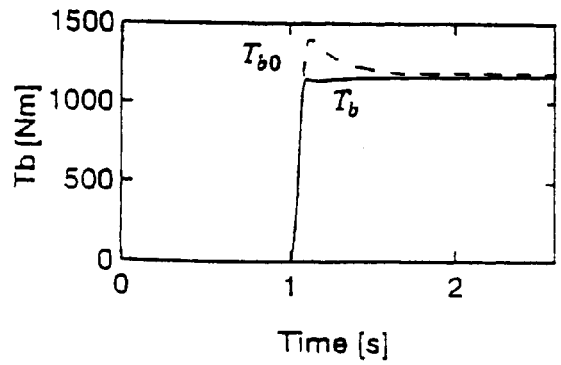

FIRST EXAMPLE
RESULT OF SIMULATION FOR HARSH BRAKING ON HIGH-μ ROAD)

ANTI-LOCK BRAKING SYSTEM BASED ON AN ESTIMATED GRADIENT OF FRICTION TORQUE, METHOD OF DETERMINING A STARTING POINT FOR ANTI-LOCK BRAKE CONTROL, AND WHEEL-BEHAVIOR-QUANTITY SERVO CONTROL MEANS EQUIPPED WITH LIMIT DETERMINATION MEANS

BACKGROUND OF THE INVENTION

The present invention relates to an anti-lock braking system (hereinafter referred to as an ABS) which comprises means for estimating, from a small number of parameters, the gradient of friction torque that wheels of a vehicle receive from the road surface(hereinafter referred to as a friction torque gradient) with respect to a slip speed, and which controls a braking force acting on wheels on the basis of the friction torque gradient estimated by the friction torque gradient estimating means.

More specifically, the friction torque gradient estimating means may employ several types of estimating methods; e.g., a method of estimating the friction torque gradient from only time-series data concerning a wheel speed; a method of estimating the friction torque gradient from time-series data concerning wheel deceleration as well as time-series data concerning the braking torque or physical quantities associated with the braking torque; or a method of estimating the friction torque gradient from micro-gains which are obtained when brake pressure is excited in a very small amount at the resonance frequency of a vibration system comprised of a vehicle body, wheels, and a road surface and which represent the characteristics of the vibration system.

Further, there is also a method available for determining, from the thus-estimated friction torque gradient, the limit of the characteristics of friction torque developed between the wheels and the road surface. As a result of the limit determination means determining the limit by this determination method, the starting point for anti-lock brake control and other various control operations can be accurately obtained.

The ABS control method based on the estimated gradient of friction torque is divided into two methods: namely, a servo control method by which the quantity of behavior of the wheel, or a physical quantity associated with the motion of the wheel, is controlled so as to follow a target value; and a method by which an estimated gradient of friction torque is controlled so as to match a reference value.

In the servo control method when the limit of the friction torque characteristics is determined by the limit determination means, arithmetic operations are executed in order to correct a preset target quantity of behavior of the wheel. As a result, stable anti-lock braking operation can be ensured on a road surface where the gradient of friction torque drastically changes in the vicinity of the peak friction coefficient ($\mu$).

According to anti-lock brake control in which the gradient of friction torque is controlled so as to match a reference value, the accuracy of estimation is significantly improved by estimating the friction torque gradient through use of a small number of parameters, whereby more accurate anti-lock brake control is implemented. More particularly, in a case where a micro-gain (which is one type of representation of the friction torque gradient) is controlled so as to follow a reference value, the brake pressure of only the reference wheel is excited in a very small amount. In order to prevent interference between wheels due to the small vibration of the brake pressure, the other wheels are subject to at least either wheel-speed follow-up servo control or braking-force follow-up servo control.

DESCRIPTION OF THE RELATED ART

In a conventional anti-lock braking system, a vehicle speed signal, a vehicle acceleration/deceleration signal, and a signal regarding a speed analogous to the vehicle speed are produced from a signal output from a wheel speed sensor. Anti-lock braking operation is effected by comparing these signals with each other and controlling a braking force according to the result of such comparison.

Japanese Patent Application Laid-open No. 61-196853 discloses an anti-lock brake controller, wherein the risk of wheel locking is determined by comparison between an estimated vehicle speed and a reference speed calculated from the wheel speed or the like. If the risk of wheel locking exists, the braking force is reduced. In this anti-lock brake controller, as shown in FIG. 16, an estimated vehicle speed $V_V$ is determined by connecting, at a given slope, the valleys of speed $V_W$ calculated from the wheel speed. It is understood that there can be a difference between the estimated vehicle speed Vv and an actual vehicle speed Vv*.

In this anti-lock brake controller, in order to prevent the estimated vehicle speed Vv from becoming greater than the actual vehicle speed Vv* due to variations in the wheel ground-contact load at the time of traveling on a bad road, the rate of increase in the estimated vehicle speed is suppressed in a case where the wheel speed changes to a value greater than the estimated vehicle speed.

If brakes are applied to the vehicle which is traveling at a certain speed, slip occurs between the wheels and the road surface. It is known that the friction coefficient $\mu$ between the wheel and the road surface changes with respect to a slip rate S expressed by the following Equation and in the manner as shown in FIG. 17.

$$S=(Vv^*-Vw)/Vv^* \tag{1}$$

where Vv* is the actual vehicle speed, and Vw is the wheel speed.

According to these $\mu$-S characteristics, the friction coefficient $\mu$ reaches a peak value at a certain slip rate (corresponding to a region A2 in FIG. 17). If the slip rate at which the friction coefficient $\mu$ reaches the peak value is known in advance, the slip rate can be controlled by determining the slip rate from the vehicle speed and the wheel speed.

For this reason, in an anti-lock brake controller disclosed in Japanese Patent Application Laid-open No. 1-249559, the slip rate is calculated from an approximate value of the vehicle speed and the wheel speed or the like, and the braking force is controlled on the basis of the comparison between the calculated slip rate and a preset slip rate. In order to prevent the vehicle from being maintained in the state of no brake for a long period of time due to a difference between the estimated vehicle speed Vv and the actual vehicle speed Vv*, the anti-lock brake controller is designed to prevent the brake pressure from being maintained at lowered pressure for a period longer than required.

As shown in FIG. 18, the conventional anti-lock brake controller is comprised of a vehicle-speed estimating section 2 for estimating the estimated vehicle speed Vv from a wheel speed $\omega_w$ and a vehicle acceleration $dv_v/dt$; and a braking-force control section 3 which detects a locked state of the wheel from the wheel speed $\omega_w$ and the estimated vehicle speed Vv and which controls a braking force Pb to be supplied to a driving system 1 of the vehicle. Specifically, the braking-force control section 3 controls the braking force applied to the four wheels at one time or independently of each other through so-called PID control operation.

However, the previously-described conventional anti-lock brake controller presents the following problems:

Namely, in order to allow the vehicle-speed estimating section to estimate a vehicle speed, the braking force must be returned until a speed Vw determined from the wheel speed and the actual vehicle speed Vv* match or become approximately equal to each other, as shown in FIG. 16. Therefore, the braking force applied to the wheels must be repeatedly increased or decreased at a comparatively low frequency. Further, since the vehicle speed to be compared with a reference speed is an approximate value determined from the wheel speed or the vehicle acceleration/deceleration, the estimated vehicle speed sometimes substantially differs from the actual vehicle speed. In some cases, the wheels lapse into a locked state for a long period of time, or the braking force is reduced drastically in order to return the vehicle to an unlocked state. As a result, the behavior of the vehicle is considerably affected, resulting in an increase in the braking distance or unpleasant vibration.

For the case of the anti-lock brake controller which controls the braking force according to a slip rate, the slip rate at which the friction coefficient becomes maximum can be readily anticipated to change depending on the state of road surface on which the vehicle travels. Accordingly, it has been necessary to detect and estimate the states of road surface and to prepare a plurality of reference slip rates corresponding to the states of road surface or to change the reference slip rate in accordance with the state of road surface.

U.S. Pat. No. 4,794,538 (Dec. 27, 1988) discloses a method by which the friction coefficient $\mu$ between the wheel and the road surface is estimated from the wheel cylinder pressure and the wheel speed, and the braking force acting on the wheel is controlled in accordance with the thus-obtained friction coefficient $\mu$. In this technique, through use of an online identification method in accordance with a mathematical model for the wheel and the vehicle speed, three parameters ($p_2$, $p_1$, $c_1$) are identified by time-series data of the wheel cylinder pressure and the wheel speed. The gradient of friction coefficient $\mu$ on the road surface is calculated from the thus-identified parameter $p_2$, and the friction coefficient $\mu$ is calculated from the gradient. This technique allows the friction coefficient $\mu$ or the gradient of friction coefficient $\mu$ to be obtained for each road surface even without estimating vehicle speed. As a result, some of the foregoing problems can be solved.

In general, use of the system identification method requires a number of computations proportional to the square of the number of parameters to be identified. Further, the accuracy of identification becomes worse with an increase in the number of parameters. This conventional method requires identification of three parameters at one time and involves a large number of computations, and suffers a problem associated with the accuracy of identification.

Any one of the aforementioned anti-lock brake control systems has nonlinear characteristics strongly affected by the characteristics of the tire. Since the anti-lock brake control means controls the braking force Pb applied to the four wheels, at one time or independently of each other through PID control operation, without consideration of the interference among the four wheels, fine anti-lock brake control cannot be effected.

The present invention has been conceived in order to solve the previously-described drawbacks in the background art. In accordance with a first aspect of the present invention, the object of the present invention is to provide an anti-lock brake controller which estimates the gradient of friction torque with respect to the slip speed through use of a small number of parameters and with a high degree of accuracy rather than by detecting the locked state of the wheel from a comparison between the wheel speed and the vehicle speed or a comparison between slip rates; and which, regardless of the state of road surface, is capable of stably and comfortably effecting anti-lock braking operation in accordance with the gradient of friction torque. Another object of the first aspect of the present invention is to provide an anti-lock brake controller capable of effecting a fine anti-lock brake control operation in consideration of the interference among the four wheels. Still another object of the present invention is to provide a friction torque gradient estimating device capable of estimating the gradient of friction torque with respect to the slip speed through use of a small number of parameters and with a high degree of accuracy.

With regard to the anti-lock brake control operation, there is a conventional technique of determining the starting point for anti-lock brake control to bring the wheel into a predetermined moving state. In this technique, the wheel speed Virus differentiated with regard to time, so that wheel deceleration $dV_R/dt$ is obtained. When the wheel deceleration $dV_R/dt$ becomes smaller than a given value $-a_0$ (preset wheel deceleration), the brake pressure is reduced in order to prevent wheel locking ("Studies on an ABS of a Vehicle," Japan ABS Co., Ltd., pp. 47 to 51).

However, the above-described method of determining the starting point for anti-lock brake control has a problem that if brake is gently applied to the drive wheel on the road having a small friction coefficient $\mu$ to such an extent that the wheel deceleration does not reach the given value $-a_0$, the commencement of anti-lock brake control is not determined, thereby resulting in wheel locking. In short, if the road surface on which the vehicle travels has a small friction coefficient $\mu$, a small degree of braking torque develops, so that a small extent of wheel locking is caused even by gentle application of brakes.

This problem is encountered not only in ABS but also in the technique of controlling the wheel so as to enter into a predetermined state of motion such as traction control (TRC); e.g., the technique of holding the wheel in the state of motion immediately before wheel locking so as to follow the peak friction coefficient $\mu$ or the technique of maintaining the wheel in the region of a predetermined slip rate. This problem is principally ascribed to the fact that the dynamic characteristics of the motion of the wheel change depending on the friction coefficient $\mu$ of the surface of the road on which the vehicle travels.

The present invention has been conceived in order to solve the foregoing problems. In accordance with a second aspect of the present invention, the object of the present invention is to provide a control start determination method capable of accurately and stably determining the starting point for control to bring the wheel into a predetermined state of motion regardless of the friction coefficient $\mu$ of road surface and the mildness/hardness of brakes.

As described above, the anti-lock brake system that controls the braking force according to a slip rate must control the braking force in accordance with the state of road surface. To this end, there has been proposed an anti-lock brake controller (Japanese Patent Application No. 7-220920). In this controller, rather than detecting the locked state of the wheel by a comparison between slip rates, the braking force acting on the wheel is excited in a very small amount at a resonance frequency $f_1$ of a wheel vibration system which is comprised of the road surface and the wheel (in a state in which the wheel holds the road). The state of the wheel when a sharp reduction arises in the resonance frequency component of the wheel speed due to the shift of the resonance frequency of the vibration system is deemed as the state of the wheel immediately before it becomes locked, and braking forces are reduced.

In the anti-lock brake controller that excites the braking force in a very small amount, braking forces acting on all the wheels must be excited in a very small amount in order to prevent all the wheels from becoming locked. To this end, each wheel must be provided with an actuator for the purpose of minute excitation.

In a case where the right and left wheels are excited in a very small amount at the same time so as to follow the peak friction coefficient $\mu$ on a so-called split road whose surfaces afford differing coefficients of friction $\mu$, the wheels receive differing frictional forces (i.e., braking forces) from the left and right road surfaces in the traveling direction of the wheel and in the opposite direction because of the difference in the coefficients of friction $\mu$ between the right and left road surfaces, resulting in vehicle instability.

Further, if either one of the right and left drive wheel connected to a drive shaft is excited in a very small amount, vibrations having an excitation frequency are transmitted to the other drive wheel by way of the drive shaft, resulting in an interference between the right and left drive wheels.

The present invention has been conceived in order to solve the foregoing problems. In accordance with a third aspect of the present invention, the object of the present invention is to provide an anti-lock brake controller which excites braking forces in a very small amount, wherein the minimum required number of wheels are excited in a very small amount, and instable traveling of the vehicle on the split road surface which affords differing coefficients of friction at the right and left road portions and interference between the right and left drive wheels are prevented.

SUMMARY OF THE INVENTION

To accomplish the foregoing objects, in accordance with the first aspect of the present invention, there is provided an anti-lock brake controller including: wheel-speed sensing means which senses a wheel speed at given sampling intervals; torque-gradient estimating means which estimates the gradient of friction torque with respect to a slip speed in accordance with the time-series data concerning the wheel speed detected by the wheel-speed sensing means; and control means which controls braking forces acting on the wheels in such a way that the gradient of friction torque estimated by the torque-gradient estimating means falls within a predetermined range including a reference value.

Preferably, the torque-gradient estimating means further includes first computation means which calculates a physical quantity related to a variation in the wheel speed and a physical quantity related to a change of the variation in the wheel speed in accordance with the time-series data concerning the wheel speed; and second computation means which calculates a physical quantity representing both a time history of the physical quantity related to the variation in the wheel speed and a time history of the physical quantity related to the change of variation in the wheel speed, in accordance with the physical quantity related to a variation in the wheel speed and the physical quantity related to the change of variation in the wheel speed calculated by the first computation means, and which estimates the gradient of friction torque in accordance with the thus-calculated physical quantity.

Preferably, the second computation means approximates the state of motion of the wheel obtained when the friction torque and the braking forces are exerted on the wheel, using gradient model in which the friction torque changes linearly in accordance with the gradient of friction torque with respect to the slip speed; previously converts the thus-approximated state of motion into the relationship between the gradient of friction torque with respect to the slip speed, which is a parameter to be identified, the physical quantity which is related to the variation in the wheel speed and the physical quantity which is related to the change of the variation in the wheel speed; and estimates the gradient of friction torque with respect to the slip speed by applying an on-line system identification method to data obtained by having sequentially applied to the above-described relationship the time-series data concerning the detected wheel speed.

Preferably, the first computation means calculates the physical quantity related to the variation in the wheel speed according to the following Equation:

$$\phi_i[k] = \begin{bmatrix} \tau\{\omega_i[k-1] - \omega_i[k-2]\}/J \\ 1 \end{bmatrix}$$

where $\omega_i[k]$ represents time-series data concerning the speed of an i-th wheel detected at a sampling point in time k (k=1, 2, ...), $\tau$ represents a sampling interval, and J is the inertia of the wheel.

Then, the first computation means also calculates the physical quantity related to the change of variation in the wheel speed according to the following Equation:

$$y_i[k] = -\omega_i[k] + 2\omega_i[k-1] - \omega_i[k-2].$$

Further, the second computation means preferably estimates, from the following recurrence formula, the physical quantity $\theta_i$ representing the time history of the physical quantity related to the variation in the wheel speed and the time history of the physical quantity related to the change of variation in the wheel speed:

$$\hat{\theta}_i[k] = \hat{\theta}_i[k-1] + L_i[k](y_i[k] - \phi_i[k]^T \cdot \hat{\theta}_i[k-1])$$

$$L_i[k] = \frac{P_i[k-1]\phi_i[k]}{\lambda + \phi_i[k]^T P_i[k-1]\phi_i[k]}$$

$$P_i[k] = \frac{1}{\lambda}\left[P_i[k-1] - \frac{P_i[k-1]\phi_i[k]\phi_i[k]^T P_i[k-1]}{\lambda + \phi_i[k]^T P_i[k-1]\phi_i[k]}\right]$$

where $\lambda$ is an oblivion coefficient, and "$T$" is the transposition of a matrix, and obtains the first element of the matrix of estimated value $\hat{\theta}_i$ as the gradient of friction torque with respect to the slip speed.

In accordance with the first aspect of the present invention, there is provided an anti-lock brake controller which includes wheel deceleration sensing means for sensing a wheel deceleration; braking torque sensing means for sensing a braking torque; torque-gradient estimating means which estimates the gradient of friction torque with respect to a slip speed in accordance with time-series data concerning wheel deceleration detected at given sampling intervals, and braking torque detected at given sampling intervals or time-series data concerning a physical quantity related to the braking torque; and control means which controls braking forces acting on the wheels in such a way that the gradient of friction torque estimated by the torque-gradient estimating means falls within a predetermined range including a reference value, wherein the state of motion of the wheel obtained when the friction torque and the braking torque are exerted on the wheel is approximated by a gradient model in which the friction torque changes linearly in accordance with the gradient of friction torque with respect to the slip speed; the thus-approximated state of motion is previously converted into the relationship between the gradient of friction torque with respect to the slip speed, which is a parameter to be identified, the physical quantity which is related to the variation in the friction torque and the physical quantity which is related to the variation in the slip speed, which are both represented by the braking torque and the wheel deceleration, and the gradient of friction torque with respect to the slip speed is estimated by applying an on-line system identification method to data obtained by having sequentially applied to the above-described relationship the time-series data concerning detected wheel deceleration and the time-series data concerning the detected braking torque or the physical quantity related to the braking torque.

Preferably, the torque-gradient estimating means estimates the gradient of friction torque of each wheel as follows. More specifically, provided that "$y_i[j]$" represents time-series data concerning the wheel deceleration of the i-th wheel at a sampling point in time "j," "$T_{bi}[j]$" represents time-series data concerning braking torque, "$\tau$" represents the given sampling interval, "J" represents the inertia of the wheel, "$R_c$" represents the radius of the wheel, "M" represents the mass of the vehicle, "$T_b[j]$" represents a vector which includes as components the time-series data concerning the braking torque of each wheel, "y[j]" represents a vector which includes as components the time-series data concerning the deceleration of each wheel, "I" represents a unit matrix, and "A" represents a matrix which includes $\{(J/MR_c^2)+1\}$ as a diagonal element and $J/MR_c^2$ as a non-diagonal element, then the physical quantity "f" concerning the variation in the friction torque and the physical quantity $\phi$ concerning the variation in the slip speed are expressed by the following Formulae:

$$f = -J(y[j+1] - y[j]) + T_b[j+1] - T_b[j]$$

$$\phi = \tau \cdot A \cdot y[j] + \frac{\tau}{J}(I-A)T_b[j].$$

Provided that "K" is a matrix which includes as a diagonal element the gradient of friction torque of each wheel (which is a parameter to be identified) and includes 0 as a nondiagonal component, the approximated state of motion is previously converted into the following Equation:

$$K \cdot \phi = f.$$

Data are obtained by sequentially applying to the previous Equation the time-series data $y_i[j]$ (j=1, 2, 3, ...) concerning detected wheel deceleration and the time-series data $Tb_i[j]$ (j=1, 2, 3 ...) concerning detected braking torque. The on-line system identification method is then applied to the thus-obtained data, whereby the gradient of friction torque of each wheel is estimated.

Preferably, the control means calculates the amount of application of braking force to each wheel and controls the braking force acting on each wheel in accordance with the thus-obtained amount of application of the braking force. More specifically, a slip speed at which the friction torque developed in each wheel becomes maximum is handled as an equilibrium point. The state of motion of each wheel obtained when the friction torque and the amount of application of a braking force which acts on the wheel in the vicinity of the equilibrium point are exerted on each wheel, and the state of motion of the vehicle obtained when the friction torque developed in each wheel is exerted on the overall vehicle are used together with the first and second models. In a first model, a nonlinear variation in the friction torque of each wheel with respect to disturbance in the slip speed of each wheel in the vicinity of the equilibrium point is represented as a linear variation which changes within a first range with respect to disturbance in the slip speed of each wheel. In a second model, a nonlinear variation in the gradient of the friction torque of each wheel with respect to disturbance in the slip speed of each wheel in the vicinity of the equilibrium point is represented as a linear variation which changes within a second range with respect to the disturbance in the slip speed of each wheel. The above-described amount of application of the braking force to each wheel is determined such that the first and second ranges fall within a predetermined allowable range and that the gradient of friction torque determined by the second model which is designed in such a way that the second range falls within the predetermined allowable range matches the gradient of friction torque estimated by the torque-gradient estimating means. The braking force acting on each wheel is controlled in accordance with the thus-obtained amount of application of the braking force.

Preferably, the torque-gradient estimating means has micro-exciting means for exciting the brake pressure in a very small amount at a resonance frequency of a vibration system made up of a vehicle body, wheels, and road surface; micro-gain computation means for calculating a micro-gain which is a ratio between a very small amplitude of brake pressure obtained when the brake pressure is excited in a very small amount by the micro-exciting means and a very small amplitude of the resonance frequency component of the wheel speed; and output means which estimates the gradient of friction torque with respect to the slip speed in accordance with the micro gain calculated by the micro-gain computation means and which outputs the thus-estimated gradient of friction torque.

[The Principles of Anti-lock Brake Controllers in accordance with the First aspect of the Invention]

A braking force acts on the road surface via the surface of a tire tread which comes into contact with the road surface. In effect, this braking force acts on the vehicle body as a reaction (friction torque) from the road surface through the medium of a frictional force developed between the road surface and the wheel. If a braking force applied while the vehicle is traveling at a certain speed, slippage arises between the wheel and the road surface. At this time, the friction torque that acts on the wheel as a reaction from the road surface changes in the manner as shown in FIG. 5 with respect to a slip speed $\omega_s$ (converted to an angular velocity) expressed by the following Formula:

$$\omega_s = \omega_v - \omega_i$$

where $\omega_v$ is the vehicle speed (equivalently expressed in the form of an angular velocity), and $\omega_i$ a wheel speed of the i-th wheel converted into the angular velocity ("i" designates the number of wheel, i=1, 2, 3, . . . ).

As shown in FIG. 5, initially the friction torque increases with an increase in the slip speed. The friction torque reaches the maximum value $f_{i0}$ at a slip speed $\omega_0$ and decreases with an increase in the slip speed at slip speeds greater than $\omega_0$. Here, the slip speed $\omega_0$ corresponds to a slip speed obtained when the friction coefficient between the wheel and the road surface is at the maximum (a peak friction coefficient $\mu$ corresponding to the peak friction coefficient $\mu$ in FIG. 17).

As is obvious from FIG. 5, the friction torque gradient with respect to the slip speed (hereinafter referred to as the friction torque gradient) is positive (>0) when $\omega_s<\omega_0$, zero when $\omega_s=\omega_0$, and negative (<0) when $\omega_s>\omega_0$. When the friction torque gradient is positive, the wheel is in a gripping state. When the gradient of friction torque is zero, the friction coefficient $\mu$ is at the peak. When the friction torque gradient is negative, the wheel will be locked. In this way, the dynamic characteristics of the motion of the wheel changes in accordance with the friction torque gradient, and therefore the state of motion of the wheel can be estimated.

In the first aspect of the present invention, the friction torque gradient at the present in time is estimated from only the time-series data concerning the wheel speed without estimating the vehicle speed. The braking force acting on the wheel is controlled so that the thus-estimated friction torque gradient will fall within a given range of values including a reference value.

Alternatively, the friction torque gradient at the present time is estimated from the time-series data concerning the wheel deceleration and the time-series data concerning braking torque without estimating the vehicle speed. The braking force acting on the wheel is controlled so that the thus-estimated friction torque gradient will fall within a given range of values including a reference value. A physical quantity associated with the braking torque; e.g., a wheel cylinder pressure, can be used as a substitute for the braking torque.

In the present invention, therefore, the wheel can be maintained at the state of motion corresponding to the friction torque gradient in the predetermined range including a reference value. The friction torque gradient will inevitably become zero at the peak friction coefficient $\mu$ even if the slip speed at which the friction coefficient $\mu$ reaches its peak has changed in response to the state of road surface on which the vehicle travels, so long as the reference value is set to zero corresponding to the peak friction coefficient $\mu$. Therefore, the peak friction coefficient $\mu$ can be completely followed, so long as the friction torque gradient is controlled so as to become zero. Further, the need for a vehicle speed estimating section is eliminated, and hence the need for repetition of increases/decreases in the braking force is also eliminated. As a result, stable driving becomes feasible.

[The Principle of Estimation of the Friction Torque Gradient in accordance with the First Aspect of the Invention]

The motion of each wheel and the vehicle body is expressed as follows (The following descriptions will be based on the assumption that the number of wheels is four. However, the present invention will not be limited to this specific example.):

$$J\dot{\omega}_i = R_c F_i'(V/R_c - \omega_i) - T_{bi} \quad (1)$$

$$M\dot{v} = -\sum_{j=1}^{4} F_j'(V/R_c - \omega_j) \quad (2)$$

where $F_i'$ represents a braking force developed in the i-th wheel, "$T_{bi}$" the braking torque applied to the i-th wheel in response to a stepping-on force, "M" the mass of the vehicle, "Rc" the effective radius of the wheel, "J" the inertia of the wheel, and "v" the vehicle speed (see FIG. 11). In the above Equation, reference symbol · denotes differential with respect to time. In Eqs. (1) and (2), $F_i'$ is indicated as a function of the slip speed ($v/R_c-\omega_i$).

The vehicle speed is equivalently represented as an angular velocity $\omega_v$, and the friction torque $R_c F_i'$ is expressed as the linear function of the slip speed (gradient $k_i$, and intercept $T_i$ on the y-axis).

$$V = R_c \omega_v \quad (3)$$

$$R_c F_i'(\omega_v - \omega_i) = k_i \times (\omega_v - \omega_i) + T_i \quad (4)$$

Further, when Eqs. (3) and (4) are substituted into Eqs. (1) and (2) and the wheel speed $\omega_i$ and the vehicle speed $\omega_v$ are represented as time-series data $\omega_i[k]$ and $\omega_v[k]$ which are wheel speed $\omega_i$ and the vehicle speed $\omega_v$ sampled at sampling intervals $\tau$ (where "k" is a sampling point in time; k=1, 2, . . . which are separated from each other by the sampling interval $\tau$), whereby the following Equations are obtained.

$$J\frac{\omega_i[k] - \omega_i[k-1]}{\tau} = k_i(\omega_v[k-1] - \omega_i[k-1]) + T_i - T_{bi} \quad (5)$$

$$R_c^2 M \frac{\omega_v[k] - \omega_v[k-1]}{\tau} = -\sum_{j=1}^{4} k_j \cdot \omega_v[k-1] + \sum_{j=1}^{4} (k_j \omega_j[k-1]) - \sum_{j=1}^{4} T_j \quad (6)$$

Eqs. (5) and (6) are combined together so as to eliminate the equivalent angular velocity $\omega_v$ of the vehicle, yielding $$\omega_i[k] - \left(2 - \frac{\tau}{J}k_i - \frac{\tau}{R_c^2 M}\sum_{j=1}^{4} k_j\right)\omega_i[k-1] + \left(1 - \frac{\tau}{R_c^2 M}\sum_{j=1}^{4} k_j\right)\left(1 - \frac{\tau}{J}k_i\right)\omega_i[k-2] - k_i \frac{\tau^2}{JR_c^2 M}\sum_{j=1}^{4} (k_j \omega_j[k-2]) = -k_i \frac{\tau^2}{JR_c^2 M}\sum_{j=1}^{4} T_j + \frac{\tau^2}{JR_c^2 M}\sum_{j=1}^{4} k_j(T_i - T_{bi}). \quad (7)$$

If the maximum friction torque of $R_c Mg/4$ ("g" represents a gravitational acceleration) occurs on condition that the slip speed is 3 rad/s, we have $$\max(k_i) = \frac{RcMg/4}{3}.$$

When we consider a specific example in which $\tau$=0.005 (sec.), $R_c$=0.3 (m), and M=1000 (kg), we have max ($k_i$)=245. Accordingly, $$\max\left(\frac{\tau}{R_c^2 M}\sum_{j=1}^{4}k_j\right) \approx 0.054 << 1$$

Equation (7) can be approximated as follows:

$$k_i\frac{\tau}{J}\{\omega_i[k-1]-\omega_i[k-2]\}+f_i=-\omega_i[k]+2\omega_i[k-1]-\omega_i[k-2] \quad (8)$$

where $$f_i=k_i\frac{\tau^2}{JR_c^2 M}\sum_{j=1}^{4}T_j-\frac{\tau^2}{JR_c^2 M}\sum_{j=1}^{4}k_j(T_i-T_{bi})$$

As a result, Equation (8) can be described in a linear form with regard to unknown coefficients $k_i$ and $f_i$. The friction torque gradient $k_i$ with respect to the slip speed can be estimated by application of the on-line parameter identification method to Equation (8).

More specifically, the time-series data concerning the friction torque gradient can be estimated from the time-series data $\omega_i[k]$ of detected wheel speed through repetition of steps 1 and 2 to be given hereinbelow.
Step 1

$$\phi_i[k]=\begin{bmatrix}\tau\{\omega_i[k-1]-\omega_i[k-2]\}/J \\ 1\end{bmatrix} \quad (9)$$

$$y_1[k]=-\omega_i[k]+2\omega_i[k-1]-\omega_i[k-2] \quad (10)$$

The first element of the matrix $\phi_i[k]$ of Equation (9) denotes a physical quantity concerning a variation in the wheel speed during one sampling period, and Equation (10) shows a physical quantity concerning the per-sampling-period change in the degree of the per-sampling-period variation in the wheel speed. This means that Equation (8) is an equation of motion representing motion (deceleration) of a wheel. From Equation (8), it is understood that the friction torque gradient is proportional to a characteristic root that represents the dynamic characteristics of the wheel deceleration. That is, the identification of the braking torque gradient can be considered to be equivalent to the identification of the a characteristic root of the wheel motion (deceleration).
Step 2

$$\hat{\theta}_i[k]=\hat{\theta}_i[k-1]+L_i[k](y_i[k]-\phi_i[k]^T\cdot\hat{\theta}_i[k-1]) \quad (11)$$

$$L_i[k]=\frac{P_i[k-1]\phi_i[k]}{\lambda+\phi_i[k]^T P_i[k-1]\phi_i[k]}$$

$$P_i[k]=\frac{1}{\lambda}\left[P_i[k-1]-\frac{P_i[k-1]\phi_i[k]\phi_i[k]^T P_i[k-1]}{\lambda+\phi_i[k]^T P_i[k-1]\phi_i[k]}\right]$$

$\theta_i$ is calculated by the above recurrence formula, and the first element of the matrix of $\theta_i$ is extracted as the estimated friction torque gradient. In Equation (11), $\lambda$ denotes a forgetting factor (e.g., $\lambda=0.98$) showing the extent to which data of the past is eliminated, and "$T$" denotes the transposition of the matrix.

The left-side side of Equation (11) shows a physical quantity which represents the time history of the physical quantity related to the variation in the wheel speed and the time history of the physical quantity related to the change with regard to the variation in the wheel speed.
[The Principle of Estimation of Friction torque gradient in accordance with the First Aspect of the Invention]

Equations (1) and (2) are expressed as follows through use of friction torque $F_i(=F_i'R_c)$ and the vehicle speed transformed to angular speed $\omega_v$ $(=v/R_c)$.

$$J\dot{\omega}_i=F_i(\omega_v-\omega_i)-T_{bi} \quad (12)$$

$$MR_c^2\dot{\omega}_v=-\sum_{j=1}^{4}F_j(\omega_v-\omega_j) \quad (13)$$

Further, from Equation (12), the wheel deceleration of the I-th wheel $y_i(=-d\,\omega_i/dt)$ is expressed as $$y_i=-\frac{1}{J}F_i(\omega_v-\omega_i)+\frac{1}{J}T_{bi}. \quad (14)$$

Equations (12) to (14) are reduced to the following Equations by substitution of the slip speed $(\omega_v-\omega_i)$ with $x_i$.

$$\dot{x}_i=-\frac{1}{MR_c^2}\sum_{j=1}^{4}F_j(x_j)-\frac{1}{J}F_i(x_i)+\frac{1}{J}T_{bi} \quad (15)$$

$$y_i=-\frac{1}{J}F_i(x_i)+\frac{1}{J}T_{bi} \quad (16)$$

Based on the assumption that the friction torque $F_i$ of the i-th wheel is a non-linear function of the slip speed (see FIG. 5), the braking torque $F(x_i)$ in the vicinity of a certain slip speed $X_i$ is approximated as a linear gradient as shown in the following Equation. More specifically, there is employed a gradient model in which the friction torque $F(x_i)$ changes linearly in accordance with the friction torque gradient $k_i$ with respect to the slip speed $x_1$.

$$F_i(x_i)=K_i x_i+\mu_i \quad (17)$$

At this time, with regard to the i-th wheel (i=1, 2, 3, 4), assuming that the time-series data regarding the slip speed is $x_i[j]$, the time-series data regarding the braking torque is $T_{bi}[j]$, and the time-series data regarding the wheel deceleration is $y_i[j]$ (j=0, 1, 2, . . . ). Here, each item of the time-series data is sampled at predetermined sampling intervals $\tau$.

An equation is obtained by substituting Equation (17) into Equations (15) and (16), and the thus-obtained equation is converted into discrete equation through use of the foregoing time-series data at the sampling intervals $\tau$.

$$\frac{x[j+1]-x[j]}{\tau}=-\frac{1}{J}A(Kx[j]+\mu)+\frac{1}{J}T_b[j] \quad (18)$$

-continued $$y[j] = -\frac{1}{J}(k_x[j] + \mu) + \frac{1}{J}T_b[j] \tag{19}$$

where $$K = \begin{bmatrix} k_1 & 0 & 0 & 0 \\ 0 & k_2 & 0 & 0 \\ 0 & 0 & k_3 & 0 \\ 0 & 0 & 0 & k_4 \end{bmatrix}, \mu = \begin{bmatrix} \mu_1 \\ \mu_2 \\ \mu_3 \\ \mu_4 \end{bmatrix}, x[j] = \begin{bmatrix} x_1[j] \\ x_2[j] \\ x_3[j] \\ x_4[j] \end{bmatrix},$$

$$y[j] = \begin{bmatrix} y_1[j] \\ y_2[j] \\ y_3[j] \\ y_4[j] \end{bmatrix}, T_b[j] = \begin{bmatrix} T_{b1}[j] \\ T_{b2}[j] \\ T_{b3}[j] \\ T_{b4}[j] \end{bmatrix}$$

$$A = \begin{bmatrix} \frac{J}{MR_c^2}+1 & \frac{J}{MR_c^2} & \frac{J}{MR_c^2} & \frac{J}{MR_c^2} \\ \frac{J}{MR_c^2} & \frac{J}{MR_c^2}+1 & \frac{J}{MR_c^2} & \frac{J}{MR_c^2} \\ \frac{J}{MR_c^2} & \frac{J}{MR_c^2} & \frac{J}{MR_c^2}+1 & \frac{J}{MR_c^2} \\ \frac{J}{MR_c^2} & \frac{J}{MR_c^2} & \frac{J}{MR_c^2} & \frac{J}{MR_c^2}+1 \end{bmatrix}.$$

More specifically, x[j], y[j], Tb[j] respectively represent vectors comprising the slip speed, the wheel deceleration, and the braking torque for each wheel.

From Equation (19), wheel deceleration y[j+1] obtained at the next sample time is expressed as $$y[j+1] = -\frac{1}{J}(Kx[j+1] + \mu) + \frac{1}{J}T_b[j+1]. \tag{20}$$

From Equations (19) and (20), we have $$K \cdot (x[j+1]-x[j]) = -J(y[j+1]-y[j]) + T_b[j+1]-T_b[j]. \tag{21}$$

Assuming $$\phi = x[j+1]-x[j] \tag{22}$$

$$f = -J(y[j+1]-y[j]) + T_b[j+1]-T_b[j], \tag{23}$$

then Equation (21) can be reduced to $$K\phi = f. \tag{24}$$

Here, it is seen that ø shows a difference in slip speed between adjacent samples; namely, the physical quantity concerning a variation in the slip speed.

Equations (18) and (19) are combined together to eliminate a term (Kx[j]+μ), whereby Equation (22) gives $$\phi = \tau A y[j] + \frac{\tau}{J}(I-A)T_b[j]. \tag{25}$$

Assuming that the time-series data regarding friction torque is F[j] (a vector which includes as a component the time-series data $F_i$[j] regarding the friction torque of the i-th wheel), Equation (14) is converted into a discrete equation and is reduced as follows:

$$F[j] = -Jy[j] + T_b[j]. \tag{26}$$

Equation (26) is applied to Equation (23), whereby we have $$f = F[j+1]-F[j]. \tag{27}$$

From Equation (27), it is seen that "f" denotes the difference in friction torque between the adjacent samples; namely, the physical quantity related to the variation in the friction torque.

It has been proven that the state of motion of the wheel represented by Equations (12) to (14) can be approximated to Equations (18) and (19) through use of the gradient model represented by Equation (17), and that the thus-approximated state of motion can be converted into the relationship represented by Equation (24). More specifically, the state of motion of the wheel can yield the relationship between the friction torque gradient with respect to the slip speed, the physical quantity which is related to the variation in the friction torque and is represented by the braking torque and the wheel deceleration (expressed by Eqs. 23, 25), and the physical quantity which is related to the variation in the slip speed and is represented by the braking torque and the wheel deceleration (expressed by Eq. 25), all of which are parameters to be identified.

As a result, the parameters to be identified can be grouped into one. As compared with the conventional technique that employs three parameters to be identified, the present invention contributes to considerable improvements in the accuracy of computation, and the calculation time can be also reduced.

With regard to the i-th wheel, Equation (24) gives $$K_i \phi_i = f_i. \tag{28}$$

In this case, "f" and "ø" of Equation (24) are defined as $$f = [f_1, f_2, f_3, f_4]^T$$

$$\phi = [\phi_1, \phi_2, \phi_3, \phi_4]^T.$$

In the present invention, $f_i$ and $\phi_i$ are calculated by Equations (23) and (25) in accordance with the time-series data $y_i$[j] regarding the deceleration of the i-th wheel and the time-series data $T_{bi}$[j] regarding the braking torque of the i-th wheel. Data are then obtained by substituting the thus-obtained $f_i$ and $\phi_i$ into Equation (28), and the friction torque gradient $k_i$ regarding the i-th wheel can be estimated and calculated by application of the on-line system identification method to the thus-obtained data.

[The Principle of Anti-lock Brake Control of the Invention]

The above-described first anti-lock brake control is effected in such a way that the thus-estimated friction torque gradient with respect to the slip speed follows a certain reference value (which is zero if the wheel completely follows the peak friction coefficient μ). Although a control system which controls the friction torque gradient through feedback may be designed for each wheel in accordance with PID control, it may also be systematically designed in the form of a system for integration of four wheels by adoption of a modern control theory. In this case, the control system is designed in consideration of the interference between the four wheels, which enables more elaborate control.

The ABS controller has nonlinear characteristics strongly affected by the characteristics of the tire. Therefore, the modern control theory cannot be simply applied to this system. In the present invention, the nonlinear characteristics can be apparently deemed as equivalent plant variations. A control system which allows these plant variations is elaborately designed in consideration of the interference between the four wheels by adoption of a robust control theory, which is one of the modern control theories. The design of the control system will be described in detail hereinbelow.

In a case where braking torque $T_{bi}'$ corresponding to the stepping-on force obtained when a brake pedal is depressed immediately before wheel locking occurs, and where the braking torque (i.e., the operation amount) $u_{bi}$ acts on the wheel so as to follow the peak friction coefficient $\mu$ without locking the wheel, the motion of each wheel and the motion of the vehicle body can be expressed as follows from Equations (12) and (13).

$$J\omega_i = F_i(\omega_v - \omega_i) \cdot T'_{bi} + \mu_{bi} \tag{29}$$

$$MR_c^2 \omega_v = -\sum_{j=1}^{4} F_j(\omega_v - \omega_i) \tag{30}$$

$$k_i = G_i(\omega_v - \omega_i)$$

Equation (31) is an output equation which shows the friction torque gradient $k_i$ of each wheel is a function of the slip speed.

As shown in FIG. 6A, $F_i$ represents a nonlinear function of the slip speed and reaches its peak at $\omega_0$. In contrast, as shown in FIG. 6B, $G_i$ represents a nonlinear function of the slip speed and becomes zero at $\omega_0$. These nonlinear functions can be represented by combination of solid lines 20, 23 and associated variations within predetermined ranges. Provided that disturbance in the slip speed with reference to $\omega_0$ is $x_i$, $F_i$ and $G_i$ can be represented by $$F_i = (f_i + W_{fi} \Delta_{fi}) x_i + f_{i0} \tag{32}$$

$$G_i = (g_i + W_{gi} \Delta_{gi}) x_i \tag{33}$$

In Equations (32) and (33), $f_i$ denotes the slope of the line 20 in FIG. 6A, and $g_i$ denotes the slope of the line 23 in FIG. 6B. Further, $W_{fi}$ and $W_{gi}$ are weighting coefficients employed to standardize nonlinear variations. Broken lines 21 and 22 in FIG. 6A and broken lines 24 and 25 in FIG. 6B represent the upper and lower limits of nonlinear variations. In short, they correspond to the limitation of extent of $\Delta_{fi}$ and $\Delta_{gi}$ to ±1, respectively.

Equation (32) shows a linear model which represents nonlinear variations in the friction torque of each wheel with respect to the disturbance $x_i$ in the vicinity of the equilibrium point $\omega_0$ in the form of variations arising in the range which includes the line 20 in FIG. 6A and extends from the broken line 21 to the broken line 22. Equation (33) shows a linear model which represents nonlinear variations in the friction torque gradient of each wheel with respect to the disturbance $x_i$ in the vicinity of the equilibrium point $\omega_0$ in the form of variations arising in the range which includes the line 23 in FIG. 6B and extends from the broken line 24 to the broken line 25.

Substitution of Equations (32) and (33) into Equations (29), (30) and (31) yields the following equations of state of the vicinity of the equilibrium point ($\omega_0$).

$$x = Ax + B_1 \Delta C_1 x + B_2 \mu \tag{34}$$

$$y = C_2 x + D_{21} \Delta C_1 x \tag{35}$$

where $$A = -\frac{1}{MR_c^2} \begin{bmatrix} f_1 & f_2 & f_3 & f_4 \\ f_1 & f_2 & f_3 & f_4 \\ f_1 & f_2 & f_3 & f_4 \\ f_1 & f_2 & f_3 & f_4 \end{bmatrix} - \frac{1}{J} \begin{bmatrix} f_1 & 0 & 0 & 0 \\ 0 & f_2 & 0 & 0 \\ 0 & 0 & f_3 & 0 \\ 0 & 0 & 0 & f_4 \end{bmatrix},$$

$$B = -\frac{1}{MR_c^2} \begin{bmatrix} W_{f1} & W_{f2} & W_{f3} & W_{f4} & 0 & 0 & 0 & 0 \\ W_{f1} & W_{f2} & W_{f3} & W_{f4} & 0 & 0 & 0 & 0 \\ W_{f1} & W_{f2} & W_{f3} & W_{f4} & 0 & 0 & 0 & 0 \\ W_{f1} & W_{f2} & W_{f3} & W_{f4} & 0 & 0 & 0 & 0 \end{bmatrix} -$$

$$\frac{1}{J} \begin{bmatrix} W_{f1} & 0 & 0 & 0 & 0 & 0 & 0 & 0 \\ 0 & W_{f2} & 0 & 0 & 0 & 0 & 0 & 0 \\ 0 & 0 & W_{f3} & 0 & 0 & 0 & 0 & 0 \\ 0 & 0 & 0 & W_{f4} & 0 & 0 & 0 & 0 \end{bmatrix}$$

$$B_2 = \frac{1}{J} \begin{bmatrix} 1 & 0 & 0 & 0 \\ 0 & 1 & 0 & 0 \\ 0 & 0 & 1 & 0 \\ 0 & 0 & 0 & 1 \end{bmatrix},$$

$$C_1 = \begin{bmatrix} 1 & 0 & 0 & 0 \\ 0 & 1 & 0 & 0 \\ 0 & 0 & 1 & 0 \\ 0 & 0 & 0 & 1 \\ 1 & 0 & 0 & 0 \\ 0 & 1 & 0 & 0 \\ 0 & 0 & 1 & 0 \\ 0 & 0 & 0 & 1 \end{bmatrix},$$

$$C_2 = \begin{bmatrix} g_1 & 0 & 0 & 0 \\ 0 & g_2 & 0 & 0 \\ 0 & 0 & g_3 & 0 \\ 0 & 0 & 0 & g_4 \end{bmatrix},$$

$$D_{21} = \begin{bmatrix} 0 & 0 & 0 & 0 & W_{g1} & 0 & 0 & 0 \\ 0 & 0 & 0 & 0 & 0 & W_{g2} & 0 & 0 \\ 0 & 0 & 0 & 0 & 0 & 0 & W_{g3} & 0 \\ 0 & 0 & 0 & 0 & 0 & 0 & 0 & W_{g4} \end{bmatrix},$$

Further, $$\Delta = \begin{bmatrix} \Delta_{f1} & 0 & 0 & 0 & 0 & 0 & 0 & 0 \\ 0 & \Delta_{f2} & 0 & 0 & 0 & 0 & 0 & 0 \\ 0 & 0 & \Delta_{f3} & 0 & 0 & 0 & 0 & 0 \\ 0 & 0 & 0 & \Delta_{f4} & 0 & 0 & 0 & 0 \\ 0 & 0 & 0 & 0 & \Delta_{g1} & 0 & 0 & 0 \\ 0 & 0 & 0 & 0 & 0 & \Delta_{g2} & 0 & 0 \\ 0 & 0 & 0 & 0 & 0 & 0 & \Delta_{g3} & 0 \\ 0 & 0 & 0 & 0 & 0 & 0 & 0 & \Delta_{g4} \end{bmatrix}, \tag{36}$$

$$x = [x_1 \; x_2 \; x_3 \; x_4]^T, \; y = [k_1 \; k_2 \; k_3 \; k_4]^T, \text{ and } u = [u_1 \; u_2 \; u_3 \; u_4]^T \tag{37}$$

where "x" is the disturbance in the slip speed of each wheel in the vicinity of $\omega_0$, "y" is the gradient of friction torque of each wheel in the vicinity of $\omega_0$, and u is the operation amount of each wheel (corresponding to $u_{bi}$ in Equation (29)) in the vicinity of $\omega_0$.

A control system which has the structure as represented by Equation (36) and allows arbitrary $\Delta$ ($-1 \leq \Delta_{fi}, \Delta_{gi} \leq 1$) is designed, and an anti-lock brake control system can be designed in consideration of the interference between the four wheels. This anti-lock brake control system can be easily designed by adoption of a $\mu$-design method, which is one of the robust control methods.

More specifically, a control system which has the structure as represented by Equation (36) and allows arbitrary Δ ($-1 \leq \Delta_{fi}$, $\Delta_{gi} \leq 1$) is designed through use of so-called μ-design method, whereby the following controller is led.

$$x_c = A_c x_c + B_c y \quad (38)$$

$$u = C_c x_c + D_c y \quad (39)$$

where $x_c$ denotes the state of the controller; $A_c$, $B_c$, $C_c$, and $D_c$ denote the matrix of coefficients of the designed controller; and "y" denotes the friction torque gradient of the designed control system. The operation amount u of the anti-lock brake control is obtained by substituting a status-value of the controller into $x_c$ in Equation (39), and substituting the value of the estimated friction torque gradient into in Equation (39).

[The Principle of the Invention]

In reference to a model shown in FIG. 12 in which the phenomenon of vibration of the wheel is equivalently modeled with reference to the rotary shaft of a vehicle, consideration is given of the phenomenon of vibration of a wheel when the vehicle having a vehicle body with weight $W_v$ travels at a velocity $\omega_v$; i.e., the phenomenon of vibration of a vibration system made up of the vehicle body, the wheel, and the road surface.

In the model shown in FIG. 12, the braking force acts on the road surface via the surface of a tire tread C coming into contact with the road surface. In effect, this braking force acts on the vehicle body as a reaction (or friction force) from the road surface. Consequently, an equivalent model E calculated in terms of the rotational axis of the weight of the vehicle body is coupled to an opposite side to a wheel A via a frictional element D (the friction coefficient μ of the road surface) provided between the tire tread C and the road surface. This is analogous to the fact that the weight of the vehicle body can be simulated by large inertia below the wheel; i.e., the mass on the side opposite to the wheel, as in the case of a chassis dynamometer.

In FIG. 12, provided that the inertia of the wheel A including the tire and the rim is $J_w$, a spring constant of a spring element B provided between the rim and the tread C is K, the radius of the wheel is R, the inertia of the tread C is $J_t$, the friction coefficient of the frictional element D provided between the tread C and the road surface is μ, and the inertia of the equivalent model E calculated in terms of the rotational axis of the weight $W_v$ of the vehicle body is Jv, then the characteristics of transmission from a braking torque $T_b'$ to a wheel speed $\omega_w$ caused by the wheel cylinder pressure are defined as below according to the equation of wheel motion.

$$\omega_w = \frac{\mu_o J_v KRW_v s - \{J_t J_v s^3 + \alpha (J_t + J_v) R^2 W_v s^2 + J_v Ks + \alpha KR^2 W_v\} T_b'}{s\{J_w J_t J_v s^3 + \alpha J_w (J_t + J_v) R^2 W_v s^2 + (J_w + J_t) J_v Ks + \alpha (J_w + J_t + J_v) KR^2 W_v\}} \quad (40)$$

where "s" is an operator used for Laplace transformation.

Assuming that the tread D and the equivalent model E of the vehicle body are directly coupled together when the tire is in a gripping state, oscillation develops between the inertia of the wheel A and the total of the inertia of the equivalent model E of the vehicle body and the tread D. More specifically, this oscillation system can be deemed as a wheel resonance system comprised of the wheel, the vehicle body, and the road surface. In this sense, in terms of the transmission characteristics represented by Equation (40), the resonance frequency $\omega^\infty$ of the wheel resonance system is given as $$\omega^\infty = \sqrt{\{(J_w + J_t + J_v) K / J_w (J_t + J_v)\}/2\pi} \, . \quad (41)$$

This state corresponds to a region A1 before the peak friction coefficient μ in FIG. 17.

In contrast, in a case where the friction coefficient μ of the tire approaches its peak value, the friction coefficient μ on the tire surface becomes difficult to change with respect to a slip rate, so that the component accompanying the vibration of the inertia of the tread C ceases to affect the equivalent model E of the vehicle body. In short, the tread C and the equivalent model E of the vehicle body are separated in terms of equivalency, so that the tread and the wheel cause oscillation. The wheel resonance system at this time can be deemed as being made up of the wheel and the road surface. The resonance frequency $\omega^{\infty\prime}$ of this wheel resonance system becomes equal to a solution obtained by substituting zero into the equivalent inertia of the vehicle body $J_v$ in Equation (41). Namely, $$\omega^{\infty\prime} = \sqrt{\{(J_w + J_t) K / J_w J_t\}/2\pi} \, . \quad (42)$$

This state corresponds to the region A2 in the vicinity of the peak friction coefficient μ in FIG. 17.

Assuming that the equivalent inertia of the vehicle body Jv is greater than the inertia of the wheel Jw and the inertia of the tread Jt as a result of a comparison between Equations (41) and (42), the resonance frequency $\omega^{\infty\prime}$ expressed by Equation (42) shifts toward the high-frequency-side with respect to the resonance frequency $\omega^{\infty\prime}$ expressed by Equation (41). Accordingly, the limit of the characteristics of the friction torque can be determined in accordance with the physical quantity which reflects variations in the resonance frequency of the wheel resonance system.

For these reasons, in the present invention, a micro-gain $G_d$ to be given below is introduced as the physical quantity that reflects variations in the resonance frequency, and this micro-gain $G_d$ serves as the amount of determination of the limit.

If micro-exciting means excites a brake pressure $P_b$ in a very small amount at the resonance frequency $\omega^\infty$ (Eq. 41) of the resonance system made up of the wheel and the vehicle body, the wheel speed $\omega_w$ is also excited in a very small amount in the vicinity of the mean wheel speed. The limit determination means of the present invention calculates the micro-gain $G_d$ as follows:

$$G_d = \omega_{wv}/P_v. \quad (43)$$

Where $P_v$ is the amplitude of small variation of the braking pressure $P_b$ at the resonance frequency $\omega^\infty$, and $\omega_{wv}$ is the amplitude of small variation of the wheel speed at the resonance frequency $\omega^\infty$.

The micro-gain $G_d$ is deemed as the vibration component of the ratio of the wheel speed $\omega_w$ to the braking pressure $P_b$ ($\omega_w/P_b$) at the resonance frequency and can be also expressed as follows:

$$G_d = ((\omega_w/P_b)|s=j\omega^\infty). \quad (44)$$

As represented by Equation (44), since the micro-gain $G_d$ is the vibration component of the ratio ($\omega_w/P_b$) at the resonance frequency $\omega^\infty$, the micro-gain $G_d$ suddenly decreases due to a shift of the resonance frequency $\omega^{\infty'}$ when the wheel motion has reached the limit region A2 of the friction torque characteristic. Accordingly, a reference gain Gs is set in advance as a value for the limit region A2, and is compared with the micro-gain $G_d$. As a result, when the micro-gain $G_d$ becomes smaller than the reference gain Gs, it can be determined that the friction characteristic reaches the limit.

An explanation will be given of the fact that the micro-gain $G_d$ is a physical quantity equivalent to the friction torque gradient.

As illustrated in FIG. 13, it is known that a functional relationship in which the friction coefficient $\mu$ reaches its peak value at a certain slip speed is established between a slip speed $\Delta\omega$ and the wheel-to-road surface friction coefficient $\mu$, as is the case of the relationship shown in FIG. 17. The frictional characteristics shown in FIG. 13 correspond to the friction torque characteristic shown in FIG. 5.

If the braking pressure is excited in a very small amount by the micro-exciting means, the wheel speed is also excited in a very small amount, which in turn excites the slip rate in a very small amount in the vicinity of a certain slip rate. Consideration is given of a variation in the friction coefficient $\mu$ with respect to the slip speed $\Delta\omega$ in the case where the slip rate is excited in the vicinity of a certain slip rate on the road surface having the characteristics shown in FIG. 13.

At this time, the friction coefficient $\mu$ of the road surface can be approximated to $$\mu = \mu_0 + \alpha R \Delta\omega. \tag{45}$$

In short, since the variation in the slip speed due to the very small amount of oscillation is small, the friction coefficient $\mu$ of the road surface can be approximated to a line with gradient $\alpha R$.

If Equation (45) is substituted into the friction torque $T_b = \mu W R$ caused by the friction coefficient $\mu$ between the tire and the road surface, $$T_b = \mu W R = \mu_0 W R + \alpha R^2 \Delta\omega W. \tag{46}$$

where W is the load of the wheel. When both sides of Equation (46) are subjected to differentiation once by $\Delta\omega$, we have $$\frac{dT_b}{d\Delta\omega} = \alpha R^2 W. \tag{47}$$

Therefore, it is demonstrated by Equation (47) that the friction torque gradient ($dT_b/\Delta\omega$) is equal to $\alpha R^2 W$.

In contrast, since the braking torque $T_b{}'$ is proportional to the brake pressure $P_b$, the micro-gain $G_d$ is also proportional to the vibration component of the ratio of the wheel speed $\omega_w$ to the braking torque $T_b{}'$ (i.e., $\omega_w/T_b{}'$) at the resonance frequency $\omega^\infty$. Accordingly, the micro-gain $G_d$ is expressed as below by means of the transmission characteristics represented by Equation (40).

$$G_d = \left.\frac{\omega_\omega}{P_b}\right|_{s=j\omega^\infty} \propto \left.\frac{\omega_\omega}{T_b'}\right|_{s=j\omega^\infty} \tag{48}$$

$$= \frac{jJ_v(J_BJ_t - J_vJ_\omega)K\sqrt{J_AJ_BJ_\omega K} + \alpha J_B^3 J_\omega KR^2 W}{J_A J_v^2 J_\omega^2 K^2}$$

$$= jA + \alpha B \quad (j \text{ is an imaginary unit}).$$

where $$J_A = J_t + J_v + J_\omega,\ J_B = J_t + J_v \tag{49}$$

$$A = \frac{J_v(J_BJ_t - J_vJ_\omega)K\sqrt{J_AJ_BJ_\omega K}}{J_A J_v^2 J_\omega^2 K^2},\ B = \frac{J_B^3 J_\omega KR^2 W}{J_A J_v^2 J_\omega^2 K^2}. \tag{50}$$

In general, Equation (50) gives $$|A| = 0.012 \ll |B| = 0.1. \tag{51}$$

Therefore, Equations (47) and (48) yield $$\frac{dT_b}{d\Delta\omega} \propto G_d. \tag{52}$$

More specifically, the friction torque gradient $T_b$ with respect to the slip speed $\Delta\omega$ is proportional to the micro-gain $G_d$.

As a result, it is shown that the micro-gain $G_d$ is the physical quantity equivalent to the friction torque gradient, and it is understood that the friction torque gradient can be estimated in accordance with the micro-gain $G_d$. This micro-gain $G_d$ is a parameter that responsively reflects the characteristics of the vibration which changes depending on the state of friction between the wheel and the road surface. Therefore, the friction torque gradient can be estimated with an extremely high degree of accuracy regardless of the state of road surface.

To achieve the object associated with the second aspect of the present invention, the present invention provides a control start determination method comprising: a wheel speed sensing step for sensing the speed of a wheel at predetermined sampling intervals; a torque-gradient estimating step for estimating the friction torque gradient with respect to a slip speed based on time-series data regarding the wheel speed sensed in the wheel speed sensing step; and a determination step for determining a starting point for the control to bring the wheel into a predetermined state of motion in accordance with the friction torque gradient estimated in the torque-gradient estimating step. In particular, the slip rate at which the friction coefficient $\mu$ reaches its peak value and the magnitude of friction torque may significantly differ according to the friction coefficient $\mu$ of the surface of the road on which the vehicle travels. However, the property of constantly becoming zero is always true for the friction torque gradient regardless of the road surface. Therefore, the starting point for anti-lock brake control can be stably and correctly determined.

Preferably, the first element of the matrix of the thus-determined value $\hat{\theta}_i$ is extracted as an estimated friction torque gradient, and this estimated friction torque gradient is compared with a reference value, whereby the starting point for anti-lock brake control is determined.

In accordance with the third aspect of the present invention, there is provided an anti-lock brake comprising: micro-exciting means which excites braking forces acting on either the front two reference wheels or the rear reference two wheels in a very small amount at a predetermined frequency; oscillation-characteristics sensing means which senses the vibration characteristics of the wheel speed of each of the two reference wheels; braking-force control means for controlling the braking forces acting on the two reference wheels in accordance with variations in the vibration characteristics of each of the two reference wheels in such a way that the friction coefficient between the two reference wheels and the road surface substantially reaches the peak value; and wheel speed control means for controlling the wheel speeds of the left-side wheel and the right-side wheel of the remaining two reference wheels so as to match the respective wheel speeds of the left-side wheel and the right-side wheel of the two reference wheels.

In the third aspect of the invention, the micro-exciting means excites in a very small amount the braking forces acting on either the front two reference wheels or the rear two reference wheels (i.e., two reference wheels) at a predetermined frequency. For example, the resonance frequency of the wheel vibration system in a case where the tire is in a gripping state is employed as the predetermined frequency. The oscillation-characteristics sensing means senses the vibration characteristics of the wheel speed of each of the two reference wheels. If the braking force is excited in a very small amount, the amplitude of the resonance frequency component of the wheel speed may be sensed as the vibration characteristics. As the friction coefficient $\mu$ between the wheel and the road surface approaches the peak value, the vibration characteristics of the wheel vibration system change. Therefore, the state in which the friction coefficient $\mu$ reaches the peak friction coefficient $\mu$ can be sensed by means of variations in the vibration characteristics. In accordance with the sensed variation in the vibration characteristics of each of the two reference wheels, the braking-force control means respectively controls braking forces acting on the two reference wheels in such a way that the friction coefficient between the two reference wheels and the road surface substantially reach the peak value. As a result, the two reference wheels excited in a very small amount are prevented from becoming locked.

Moreover, the wheel-speed control means controls the wheel speeds of the right-side wheel and the left-side wheel other than the two reference wheels so as to match the respective wheel speeds of the right-side and left-side anti-lock-controlled reference wheels. Since it is possible to consider that there is no substantial difference in frictional coefficient between the front and rear wheels at the left or right side and the road surface, the friction coefficient of the wheel which is not excited in a very small amount substantially follows the peak value, so long as the wheel speed of the non-excited wheel matches the wheel speed of the anti-lock-controlled wheel. As a result, all the wheels are prevented from becoming locked.

As described above, in the present invention, either the front two wheels or the rear two wheels are excited in a very small amount and are subjected to anti-lock brake control. Further, since the wheel speeds of the remaining two wheels are controlled so as to match the wheel speeds of the anti-lock-controlled two wheels, the number of wheels to be excited in a very small amount is reduced to two, which in turn contributes to a reduction in the number of micro-exciting means. Further, stable and correct brake control of all the wheels becomes feasible irrespective of the state of road surface. Further, if the anti-lock brake controller is constructed so as not to excite two drive wheel in a very small amount, the interference between the right-side and left-side drive wheel due to the transmission of very small amounts of vibration over the drive shaft can be prevented.

In the present invention, the wheel speeds of the remaining two wheels are subjected to follow-up control through direct use of the wheel speeds of the two reference wheels. Therefore, as compared with, for example, a case where the wheels are subjected to follow-up control through use of a slip rate calculated from the wheel speeds, the present invention can contribute to the omission of the time and memory required for calculation, as well as prevention of the deterioration of control performance of the anti-lock controller due to calculation errors.

In accordance with the third aspect of the present invention, there is further provided an anti-lock brake controller comprising: determination means for determining whether or not the difference in friction coefficient $\mu$ between a left-side road surface portion and a right-side road surface portion is in excess of a reference value; micro-exciting means which excites in a very small amount at a predetermined frequency only the braking force acting on the wheels in contact with the road surface portion having a low friction coefficient $\mu$ when the difference has been determined to be in excess of the reference value, and excites in a very small amount at a predetermined frequency the braking forces acting on the wheels on both sides when the difference has been determined not to be in excess of the reference value; vibration-characteristics sensing means for sensing the vibration characteristics of the speeds of the wheels whose braking forces are excited in a very small amount; braking-force control means for controlling the braking forces acting on the excited wheels so that the friction coefficient between the excited wheels and the road surface substantially reaches the peak value in accordance with variations in the vibration characteristics of the excited wheels; and friction-force control means for controlling the friction force acting on the wheels on the high-$\mu$ road surface so as to match the friction force acting on the wheels on the low-$\mu$ road surface when the difference is in excess of the reference value.

In the third aspect of the invention, the determination means determines whether or not the difference in friction coefficient between the left-side road surface portion and the right-side road surface portion is in excess of the reference value. To determine the difference, the slip rate of each of the wheels on either side is calculated from the sensed speeds of the wheels on either side and an estimated vehicle speed. The coefficients of friction $\mu$ of the left and right road surface portions corresponding to the slip rates of the left and right road surface portions are calculated from a predetermined relationship between the slip rate and the friction coefficient $\mu$. A difference in friction coefficient between the left and right road surface portions is calculated. The difference between the left and right road portions with regard to a physical quantity associated with the friction coefficient; e.g., slip rate, slip speed, or wheel deceleration, may be used as the difference of the friction coefficient.

When the difference has been determined to be in excess of the reference value, the micro-exciting means excites in a very small amount at a predetermined frequency only the braking force acting on the wheel on the low-$\mu$ road surface portion. In contrast, if the difference has been determined not to be in excess of the reference value, the micro-exciting means excites in a very small amount at a predetermined frequency the braking forces acting on the wheels on both sides.

The vibration-characteristics sensing means senses the vibration characteristics of the speeds of the wheels whose braking forces are excited in a very small amount at a predetermined frequency. In accordance with variations in the vibration characteristics of the excited wheels, the braking forces acting on the excited wheels are controlled in such a way that the friction coefficient between the excited wheels and the road surface substantially reaches its peak value. More specifically, when the difference has been determined to be in excess of the reference value, the excited wheels on the low-$\mu$ road surface portion is subjected to anti-lock brake control. In contrast, if the difference has been determined not to be in excess of the reference value, the wheels on both sides are excited and subjected to anti-lock brake control.

When the difference has been determined to be in excess of the reference value, the friction-force control means controls the friction force acting on the wheels on the high-$\mu$ road surface portion so as to match the friction force acting on the wheels on the low-$\mu$ road surface portion. At this time, since the braking forces acting on the excited wheels on the low-$\mu$ road surface portion are controlled in such a way that the friction coefficient substantially reaches the peak value, the wheels on the high-$\mu$ road surface portion which are controlled so as to follow the braking forces acting on the excited wheels are inevitably prevented from becoming locked because of the high friction coefficient $\mu$. Even in the case of a split road which affords differing coefficients of friction from at the right and left side portions, the friction forces acting on the wheels to either side match each other, enabling stable traveling of the vehicle.

In accordance with the dynamic model of the wheel, the friction force acting on the wheel from the road surface as a frictional force can be obtained in the following manner.

As shown in FIG. 44, braking torque $T_B$ acts on the wheel in the direction opposite the rotational direction of the wheel, and tire torque Tf originating from the friction force F acts on the wheel as a frictional force in the rotational direction of the wheel. The braking torque $T_B$ originates from the braking force which acts on a disc brake of the wheel so as to hinder the rotation of the wheel. Provided that the friction coefficient between the wheel and the road surface is $\mu_B$, the radius of the wheel is r, and the load exerted on the wheel is W, the friction force F and the tire torque $T_f$ are represented as follows.

$$F = \mu_B W \tag{53}$$

$$T_f = F \times r = \mu_B W r \tag{54}$$

Therefore, the equation of motion of the wheel is defined as $$I \frac{d\omega}{dt} = \mu_B W r - T_B = F r - T_B, \tag{55}$$

where I is the moment of inertia, and $\omega$ is the rotational speed of the wheel (i.e., a wheel speed).

So long as the wheel acceleration (d $\omega$/dt) is detected, the friction force F can be estimated by Equation (55), and the braking torque $T_B$ is calculated from the braking force applied to the brake disc.

If the braking force changes, the slip rate of the wheel also changes, in turn resulting in a variation in the friction of coefficient $\mu_B$. As a result, the friction force F ($=\mu_B W$) can be controlled by controlling the braking force.

In accordance with the third aspect of the present invention, there is provided an anti-lock brake controller comprising: determination means for determining whether or not the difference in friction coefficient between a left-side road surface portion and a right-side road surface portion is in excess of a reference value; micro-exciting means which excites in a very small amount at a predetermined frequency the braking force acting on a wheel among either a pair of front wheels or a pair of rear wheels, serving as reference wheels, on the road surface portion having a low friction coefficient $\mu$ when the difference has been determined to be in excess of the reference value, and excites in a very small amount at a predetermined frequency the braking forces acting on the pair of reference wheels when the difference has been determined not to be in excess of the reference value; vibration-characteristics sensing means for sensing the vibration characteristics of the speed of at least one wheel, whose braking force is excited in a very small amount at a predetermined frequency, among the pair of reference wheels; braking-force control means for controlling the braking force acting on the excited wheel so that the friction coefficient between the excited wheel and the road surface substantially reaches the peak value in accordance with variations in the vibration characteristics of the excited wheel; friction-force control means for controlling the friction force acting on the wheels on the high-$\mu$ road surface so as to match the friction force acting on the excited wheel on the low-$\mu$ road surface when the difference is in excess of the reference value; and wheel speed control means for controlling the speeds of the remaining pair of wheels other than the pair of reference wheels so as to match the respective speeds of the pair of reference wheels.

In the third aspect of the invention, the determination means determines whether or not the difference in friction coefficient between the left-side road surface portion and the right-side road surface portion is in excess of the reference value. When the difference has been determined to be in excess of the reference value, the micro-exciting means excites in a very small amount at a predetermined frequency only the braking force acting on the wheel of either a pair of front wheels or a pair of rear wheels, serving as reference wheels, on the low-$\mu$ road surface portion. In contrast, if the difference has been determined not to be in excess of the reference value, the micro-exciting means excites in a very small amount at a predetermined frequency the braking forces acting on the pair of reference wheels.

The vibration-characteristics sensing means senses the vibration characteristics of the speed of at least one wheel, whose braking force is excited in a very small amount at a predetermined frequency, among the pair of reference wheels. In accordance with variations in the vibration characteristics of the excited wheel, the braking-force control means controls the braking force acting on the excited wheel in such a way that the friction coefficient between the excited wheel and the road surface substantially reaches its peak value.

In contrast, when the difference has been determined to be in excess of the reference value, the friction-force control means controls the friction force acting on the wheels on the high-$\mu$ road surface portion so as to match the friction force acting on the excited wheel on the low-$\mu$ road surface portion. Further, the wheel-speed control means controls the speeds of the remaining pair of wheels other than the pair of reference wheels so as to match the respective speeds of the pair of reference wheels.

Consequently, the number of wheels to be excited in a very small amount can be reduced to the minimum required number, and instable traveling of the vehicle on the split road surface which affords differing coefficients of friction at the right-side and left-side portions and the interference between the right and left drive wheel can be prevented.

In the previously-described first aspect of the present invention, it has been explained that the braking force can follow the peak friction coefficient $\mu$ by causing the friction torque gradient to follow zero through feedback, and most efficient braking action can be effected.

In general, if brakes are applied such that the friction coefficient substantially exceeds the peak friction coefficient μ, the slip speed instantaneously shifts to a region A3 in FIG. 49A in which the friction torque gradient becomes negative, and hence the tire becomes locked. Accordingly, it is understood that a region A2 (i.e., the region of slip speed in the vicinity of the slip speed Sm) is the limit of the characteristics of friction torque, and brakes must be applied so as not to exceed this limit.

Since the conventional technique utilizes only the feedback of the friction torque gradient, it becomes difficult to properly control brakes on a road surface as shown in FIG. 49B in which the friction torque gradient drastically changes in the vicinity of the slip speed Sm at which the friction torque becomes maximum.

More specifically, in the case of the road surface shown in FIG. 49B, the friction torque gradient becomes large even at a slip speed which is slightly slower than the slip speed Sm. In contrast, the characteristics of friction torque become saturated in the region above the slip speed Sm. If the braking force is increased, the wheel deceleration increases abruptly, and therefore it becomes difficult to control brakes to within the region A2. If the worst comes, the slip speed may shift to the region A3, thereby resulting in the wheel locking.

The foregoing problem; namely, the difficulty in controlling the friction torque so as to follow the maximum value on the road in which the friction torque gradient drastically changes, arises in follow-up control of the friction torque gradient, as well as in a wheel-behavior-quantity servo control system which controls the quantity of behavior of the wheel, such as wheel deceleration, a slip rate, or a slip speed, so as to follow target values.

Therefore, in accordance with a fourth aspect of the present invention, the object of the present invention is to provide a wheel-behavior-quantity servo controller which has been slightly described in the first aspect and is capable of carrying out control so as to follow target values regardless of whether or not the road surface causes drastic change in the friction torque gradient; and a limit determination device which ensures proper control of the wheel-behavior-quantity servo controller by determining the limit of the characteristics of the friction torque.

To these ends, in accordance with the fourth aspect of the invention, there is provided a wheel-behavior-quantity servo controller comprising: wheel-behavior-quantity detecting means for detecting the quantity of behavior of a wheel which is a physical quantity associated with the motion of the wheel; limit determination means which calculates, as a quantity of limit determination, a friction torque gradient indicating the gradient of brake torque with respect to a slip speed or a physical quantity associated with the friction torque gradient via the wheel motion, and which determines the limit of the characteristics of the friction torque between the wheel and the road surface in accordance with the quantity of limit determination; target-behavior-quantity calculation means which calculates a target value of the quantity of wheel behavior used for controlling the quantity of limit determination to within the limit of friction torque characteristics in accordance with the result of limit determination of the limit determination means; and servo control means which controls the motion of the wheel so as to cause the quantity of wheel behavior detected by the wheel-behavior-quantity detecting means to follow the target value of the quantity of wheel behavior calculated by the target-behavior-quantity calculation means.

The quantity of wheel behavior represents, e.g., the wheel deceleration, the slip speed, or the slip rate. The present invention is intended toward the control in which the quantity of wheel behavior follows the target value. In accordance with the physical quantity associated with the motion of the wheel, the limit determination means calculates, as a quantity of limit determination, the friction torque gradient with respect to a slip speed or a physical quantity associated with the friction torque gradient via the wheel motion. The physical quantity which is associated with the friction torque gradient (see FIGS. 49A and 49B) via the motion of the wheel includes a physical quantity equivalent to the friction torque gradient, and various physical quantities which are related to the friction torque gradient by Equations of motion of the wheel.

In accordance with the calculated quantity of limit determination, the limit determination means determines the limit of the characteristics of the friction torque. In short, the limit determination means determines whether or not the current state of motion has reached the limit of the characteristics cf friction torque. As shown in FIGS. 49A and 49B, the characteristics of friction torque represent the characteristics of the change in the friction torque occurred between the wheel and the road surface in accordance with the slip speed. The limit of the characteristics of friction torque represent the limit of the current characteristics before they shift to other characteristics. For example, the limit of the characteristics of friction torque is the limit (i.e., the region where the friction torque substantially reaches the peak value) beyond which the wheel becomes locked. Therefore, a saturation region in which the characteristics of friction torque become saturated to thereby cause instable control is also included within this limit.

In this region of the limit, the friction torque gradient changes before and after the limit. Therefore, in accordance with the friction torque gradient or the quantity of limit determination related to the friction torque gradient, the limit can be determined with a considerably high degree of accuracy on any road surface shown in FIGS. 49A and 49B.

Next, in accordance with the result of limit determination of the limit determination means, the target-behavior-quantity calculation means calculates a target value of the quantity of wheel behavior used for controlling the quantity of limit determination to within the limit of friction torque characteristics.

In accordance with the fourth aspect of the present invention, the calculation of the target-behavior-quantity calculation means may be performed in the following manner. If it is determined that the characteristics of friction torque have not reached the limit, an ordinary target value of the quantity of vehicle behavior is calculated in accordance with the pressure in the master cylinder. Alternatively, a target value which causes the quantity of limit determination (i.e., the friction torque gradient) to agree with the reference value (i.e., zero if the friction torque follows the maximum value) is calculated for control safety.

In contrast, if the characteristics of the friction torque are determined to exceed the limit, calculation is performed to change the ordinary target value because of the need for returning the characteristics to within the limit immediately. For example, a target value is calculated by subtracting the difference between the quantity of limit determination and the reference value from the ordinary target value. Alternatively, a target value of the quantity of wheel behavior may be calculated in order to cause the quantity of limit determination to agree with the reference value in the vicinity of the limit (zero if the friction torque follows the maximum value).

The servo control means controls the motion of the wheel so as to cause the quantity of wheel behavior detected by the wheel-behavior-quantity detecting means to follow the target value of the quantity of wheel behavior calculated by the target-behavior-quantity calculation means. For example, the braking force acting on the wheel is controlled by controlling the time for increasing or reducing the pressure in the wheel cylinder, whereby the quantity of wheel behavior is controlled so as to follow the target value.

As described above, in comparison with the conventional technique that uses only the feedback of the friction torque gradient, the limit of the characteristics of friction torque is correctly determined from the quantity of limit determination associated with the friction torque gradient regardless of the state of the road surface. If the characteristics are determined to exceed the limit, calculation is performed to change the target value of the quantity of wheel behavior so as to prevent the quantity of limit determination from exceeding the limit. Therefore, stable control can be accomplished on a road surface in which the characteristics of friction torque significantly deviate from the limit region, enabling prevention of wheel locking.

Further, in accordance with the fourth aspect of the present invention, the wheel-behavior-quantity servo controller further comprises braking torque sensing means for sensing a braking torque, and the wheel-behavior-quantity detecting means calculates a wheel deceleration as the quantity of behavior of a wheel. In accordance with the detected braking torque or wheel deceleration, the limit determination means calculates, as a quantity of limit determination, either wheel deceleration or braking torque which will be obtained on the assumption that the slip speed is constant in the state of equilibrium of motion of the wheel. In accordance with the comparison between the quantity of limit determination and the actually detected wheel deceleration, or the comparison between the quantity of limit determination and the actually detected braking torque, the limit determination means determines the limit of the characteristics of friction torque between the wheel and the road surface.

With regard to the principle of determination of the limit determination means, although the means for estimating the friction torque gradient which is the quantity of determination has already been described in accordance with the first aspect of the invention, the principal portions related to the limit determination will be described in more detail. In the state of equilibrium in which the wheel deceleration of the i-th wheel actually obtained by Eq. (16) approaches wheel deceleration which will be a target (i.e., target deceleration), the slip speed of the i-th wheel is thought to become substantially constant. Therefore, the deceleration can be approximated as $$\dot{x}_i = 0. \quad (56)$$

Equation (56) is reduced by substitution of Equations (15) and (16), yielding the following Formulas in which I is the unit matrix.

$$A \cdot F_0 = T_{b0} \quad (57)$$

$$y_0 = \frac{1}{J}(I - A^{-1})T_{b0} \quad (58)$$

-continued $$T_{b0} = J(I - A^{-1})^{-1} y_0 \quad (59)$$

where $$A = \begin{bmatrix} \frac{J}{MR_c^2}+1 & \frac{J}{MR_c^2} & \frac{J}{MR_c^2} & \frac{J}{MR_c^2} \\ \frac{J}{MR_c^2} & \frac{J}{MR_c^2}+1 & \frac{J}{MR_c^2} & \frac{J}{MR_c^2} \\ \frac{J}{MR_c^2} & \frac{J}{MR_c^2} & \frac{J}{MR_c^2}+1 & \frac{J}{MR_c^2} \\ \frac{J}{MR_c^2} & \frac{J}{MR_c^2} & \frac{J}{MR_c^2} & \frac{J}{MR_c^2}+1 \end{bmatrix},$$

$$F_0 = \begin{bmatrix} F_1(x_{10}) \\ F_2(x_{20}) \\ F_3(x_{30}) \\ F_4(x_{40}) \end{bmatrix}, T_{b0} = \begin{bmatrix} T_{b10} \\ T_{b20} \\ T_{b30} \\ T_{b40} \end{bmatrix}, y_0 = \begin{bmatrix} y_{10} \\ y_{20} \\ y_{30} \\ y_{40} \end{bmatrix};$$

$x_{i0}$: slip speed in the state of equilibrium of the i-th wheel;
$F_i(x_{i0})$: friction torque in the state of equilibrium of the i-th wheel;
$Tb_{i0}$: friction torque in the state of equilibrium of the i-th wheel; and
$y_{i0}$: wheel deceleration in the state of equilibrium of the i-th wheel.

FIG. 50 shows the relationship between the wheel deceleration and the friction torque in the wheel-deceleration servo control. The limit points in FIGS. 49A and 49B at which the friction torque becomes maximum are represented as saturation points in FIG. 50. As shown in FIG. 50, there is a margin for the characteristics of the friction torque in the region of wheel deceleration less than the wheel deceleration at the saturation point. The wheel deceleration immediately approaches the target deceleration, thereby resulting in the state of equilibrium in which the slip speed is constant. Accordingly, it is understood that there is a relationship expressed by Equation (58) in which the stationary value of the wheel deceleration in this region increases at a constant rate (line L) with respect to the braking torque.

In the region of wheel deceleration in excess of the saturation point, the characteristics of friction torque become saturated, and hence Equation (58) does not hold. In comparison with the line L, the rate of increase is reduced (line L'). If the braking torque is slightly increased in this region, the wheel deceleration drastically increases, thereby resulting in instable control of the wheel deceleration. It is understood that there is the great risk of wheel locking.

The limit determination means of the present invention calculates, as the quantity of limit determination, wheel deceleration $y_0$ by substitution of actually detected braking torque $T_{b0}$ into Equation (58) which is obtained on the assumption that the slip rate is constant in the state of equilibrium of wheel motion. The limit determination means then determines whether or not the characteristics of friction torque reaches the limit (i.e., the saturation point) in accordance with the wheel deceleration $y_0$.

For example, it is determined whether or not the actually-detected wheel deceleration y is greater than the stationary value $y_0$ of the wheel deceleration by comparing the stationary value $y_0$ of the wheel deceleration with the wheel deceleration y. If the wheel deceleration y is greater than the stationary value $y_0$, Eq. (58) does not hold, and hence it is determined that the characteristics of friction torque exceeds the saturation point. In contrast, if the wheel deceleration y is smaller than the stationary value $y_0$, Eq. (58) holds, and hence it is determined that the characteristics of friction torque does not exceed the saturation point.

As described above, according to the present invention, it is possible to correctly determine whether or not the characteristics of friction torque exceed the limit (i.e., the saturation point) in accordance with the quantity of limit determination.

The method of determining whether or not Eq. (58) holds through use of the wheel deceleration can contribute to improvements in the response of the servo control system which causes the wheel deceleration to follow a target value. As in the case of Eq. (58), the stationary value $T_{b0}$ of the braking torque can be calculated, as the quantity of limit determination, by substitution of actually-detected wheel deceleration $y_0$ into Equation (59) which is obtained on the assumption that the slip speed is constant in the state of equilibrium. In this case, the stationary value $T_{b0}$ of the braking torque is compared with the actually-detected braking torque $T_b$, and it is determined whether or not the characteristics of braking torque exceed the saturation point in accordance with the result of such determination as to whether or not the braking torque $T_b$ is greater than the stationary value $T_{b0}$ of the braking torque.

The principle of computation of the target-behavior-quantity computation means according to the present invention will be described.

If the limit determination means determines that at least one of the four wheels exceeds the limit (the saturation point), the wheel deceleration and braking torque detected at the point in time when the determination is made are expressed as follows with "$T$" as the transposition of the matrix, $$y_{sat}=[y_{sat1}\ y_{sat2}\ y_{sat3}\ y_{sat4}]^T$$

$$T_{bsat}=[T_{bsat1}\ T_{bsat2}\ T_{bsat3}\ T_{bsat4}]^T$$

The friction torque ($F_{sat}=[F_{sat1}\ F_{sat2}\ F_{sat3}\ F_{sat4}]^T$) at this time is represented by $$F_{sat}=-J \cdot y_{sat}+T_{bsat}. \tag{60}$$

In order to maintain the state of equilibrium in which the slip speed is constant, the target-behavior-quantity computation means calculates a target quantity of behavior (i.e., target deceleration in the present invention) from the braking torque $F_{sat}$.

In order to maintain the state of equilibrium in which the slip speed is constant by the friction torque $F_{sat}$, the friction torque must satisfy the following Formula from Equation (57).

$$T_{bopt}=A \cdot F_{sat} \tag{61}$$

The target speed used for accomplishing the braking torque $Tb_{opt}$ is calculated as follows by substitution of the braking torque in Eq. (11) into the braking torque $T_0$ in Eq. (58).

$$y_{0opt} = \frac{1}{J}(A-1)F_{sat} \tag{62}$$

The servo control means controls the motion of the wheel so as to cause the detected wheel deceleration to follow the target deceleration $y_{0opt}$ calculated by the target-behavior-quantity calculation means through use of Eq. (62). As a result of this target-value follow-up control, the friction torque $F_{sat}$ is maintained.

The friction torque $F_{sat}$ is friction torque obtained immediately after the characteristics of the friction torque have been determined to exceed the saturation point. As shown in FIGS. 49A and 49B, since the friction torque gradient substantially matches zero in the region A2 of the limit which includes the peak point of the friction torque, the friction torque $F_{sat}$ can be substantially deemed as a peak value. Consequently, the friction torque can be controlled so as to follow the peak friction coefficient $\mu$ in accordance with the present invention, ensuring prevention of wheel locking.

In the case where the limit determination means calculates the friction torque gradient which is the quantity of limit determination from the time-series data concerning the friction torque and the time-series data concerning the wheel deceleration, and the limit of the characteristics of the friction torque is determined in accordance with the quantity of limit determination, the principle of computation of the friction torque gradient will be described.

Assuming that the friction torque of each wheel is a non-linear function of slip speed, friction torque $F(x_i)$ in the vicinity of a certain slip speed $x_i$ is linearly approximated by the following Formula.

$$F(x_i)=k_i x_i + \mu_i \tag{63}$$

where time-series data concerning the slip speed is $x_i[j]$, time-series data concerning braking torque is $T_b[j]$, and time-series data concerning the wheel deceleration y[j] (j=0, 1, 2, ...). The respective time-series data are sampled at given sampling intervals τ.

Equations (15) and (16) are subjected to discrete operations at sampling intervals τ, and the they are represented in the form of the time-series data.

$$\frac{x[j+1]-x[j]}{\tau} = -\frac{1}{J}A(Kx[j]+\mu) + \frac{1}{J}T_b[j] \tag{18}$$

$$y[j] = -\frac{1}{J}(Kx[j]+\mu) + \frac{1}{J}T_b[j] \tag{19}$$

where $$K = \begin{bmatrix} k_1 & 0 & 0 & 0 \\ 0 & k_2 & 0 & 0 \\ 0 & 0 & k_3 & 0 \\ 0 & 0 & 0 & k_4 \end{bmatrix}, \mu = \begin{bmatrix} \mu_1 \\ \mu_2 \\ \mu_3 \\ \mu_4 \end{bmatrix},$$

$$x[j] = \begin{bmatrix} x_1[j] \\ x_2[j] \\ x_3[j] \\ x_4[j] \end{bmatrix}, y[j] = \begin{bmatrix} y_1[j] \\ y_2[j] \\ y_3[j] \\ y_4[j] \end{bmatrix}, T_b[j] = \begin{bmatrix} T_{b1}[j] \\ T_{b2}[j] \\ T_{b3}[j] \\ T_{b4}[j] \end{bmatrix}.$$

Equations (18) and (19) are reduced to $$K \cdot \phi = f \tag{24}$$

where $$f = -J(y[j+1]-y[j]) + T_b[j+1] - T_b[j] \tag{23}$$

$$\phi = \tau \cdot A \cdot y[j] + \frac{\tau}{J}(I-A)T_b[j]. \tag{25}$$

where "f" represents a physical quantity associated with variations with time in the friction torque, and ø represents a physical quantity associated with variations with time in the slip speed.

Equation (24) can be represented for each wheel as $$K_i \cdot \phi_i = f_i \tag{28}$$

where $f=[f_1, f_2, f_3, f_4]^T$, $\phi=[\phi_1, \phi_2, \phi_3, \phi_4]^T$.

In the present invention, $f_i$ and $\phi_i$ are calculated from the time-series data $y_i[j]$ regarding the deceleration of the i-th wheel and the time-series data $T_{bi}[j]$ regarding the braking torque of the i-th wheel. Data are then obtained by substituting the thus-obtained $f_i$ and $ø_i$ into Equation (28), and the friction torque gradient $k_i$ regarding the i-th wheel can be estimated and calculated by application of the on-line system identification method to the thus-obtained data.

For example, in accordance with the thus-estimated and calculated friction torque gradient, the limit determination means determines the limit of the characteristics of the friction torque as follows. Specifically, if the friction torque gradient is smaller than a certain reference value, the characteristics of the friction torque are determined to reach the limit. In contrast, if the friction torque gradient exceeds the reference value, the characteristics of the friction torque are determined not to reach the limit. Since the friction torque gradient becomes small in the vicinity of the limit of the characteristics of the friction torque, the limit determination method of the present invention makes it possible to correctly determined the limit.

In the case where the limit determination means calculates the friction torque gradient which is the quantity of limit determination from the time-series data concerning the wheel speed, and the limit of the characteristics of the friction torque is determined in accordance with the quantity of limit determination, the principle of computation of the friction torque gradient is the same as the principle of estimation of the friction torque gradient in the first aspect, and therefore its explanation will be omitted.

In accordance with the fourth aspect of the present invention, the limit determination means is comprised of micro-exciting means for exciting the brake pressure in a very small amount at a resonance frequency of a vibration system made up of a vehicle body, wheels, and road surface. The limit determination means calculates, as the quantity of limit determination, a micro-gain which is a ratio between a very small amplitude of brake pressure obtained when the brake pressure is excited in a very small amount by the micro-exciting means and a very small amplitude of the resonance frequency component of the wheel speed. In accordance with the quantity of limit determination, the limit determination means determines the limit of the characteristics of the friction torque. The computation of the micro-gain has already described, and hence its explanation will be omitted.

BRIEF DESCRIPTION OF THE DRAWINGS

FIG. 1 is a block diagram showing the configuration of an anti-lock brake controller and a friction torque gradient estimating device of a first embodiment in accordance with a first aspect of the invention;

FIG. 2 is a block diagram showing the configuration of an anti-lock brake controller and a friction torque gradient estimating device of a second embodiment in accordance with the first aspect of the invention;

FIG. 3 is a block diagram showing the configuration of a limit-determination device of the second embodiment in accordance with the first aspect of the invention;

FIGS. 6A and 6B are graphs showing variations in friction torque $F_i$ and the friction torque gradient $G_i$ as a function of the slip speed, wherein FIG. 6A shows the upper and lower limits of variations in the friction torque $F_i$, and FIG. 6B shows the upper and lower limits of variations in the friction torque gradient $G_i$;

FIGS. 7A and 7B are schematic representations for explaining the structure of wheel-speed sensing means in accordance with the first aspect of the invention, wherein FIG. 7A is a schematic representation of the wheel-speed sensing means, and FIG. 7B is a diagram showing variations with time in an AC voltage developed in a pick-up coil;

FIG. 11 is a diagrammatic representation showing the dynamic model of a vehicle which employs the ABS controller in accordance with the first aspect of the invention;

FIG. 17 is a graph showing the relationship of characteristics between the slip rate and the friction coefficient $\mu$ between the tire and the road surface;

FIGS. 30A and 30B are graphs showing variations in the braking force with time, wherein FIG. 30A shows variations with time in the braking force excited in a very small amount by the ABS of the second embodiment in accordance with the second aspect of the invention, and FIG. 30B shows variations with time in the braking force excited in a very small amount by a conventional ABS;

FIGS. 31A to 31C are graphs showing variations with time in physical quantities associated with the wheel when the wheel is gently braked to such an extent that it does not become locked, wherein FIG. 31A shows variations with time in the wheel speed and the vehicle speed, FIG. 31B shows variations with time in the slip rate, and FIG. 31C shows variations with time in the friction torque gradient;

FIGS. 32A to 32C are graphs showing variations with time in physical quantities associated with the wheel when the wheel is harshly braked to such an extent that it does not become locked, wherein FIG. 32A shows variations with time in the wheel speed and the vehicle speed, FIG. 32B shows variations with time in the slip rate, and FIG. 32C shows variations with time in the friction torque gradient;

FIGS. 33A to 33C are graphs showing variations with time in physical quantities associated with the wheel when the wheel is harshly braked to such an extent that it becomes locked, wherein FIG. 33A shows variations with time in the wheel speed and the vehicle speed, FIG. 33B shows variations with time in the slip rate, and FIG. 33C shows variations with time in the friction torque gradient;

FIGS. 34A to 34C are graphs showing variations with time in physical quantities associated with the wheel when the wheel is braked progressively to such an extent that it becomes locked, wherein FIG. 34A shows variations with time in the wheel speed and the vehicle speed, FIG. 34B shows variations with time in the slip rate, and FIG. 34C shows variations with time in the friction torque gradient;

FIGS. 35A and 35B are graphs showing the behavior of the front wheels when braking torque Tb =400 Nm is applied stepwise to the wheels on a low-$\mu$ road surface, wherein FIG. 35A shows variations with time in the wheel speed and the vehicle speed, and FIG. 35B shows variations with time in the friction torque gradient and the wheel deceleration;

FIGS. 36A and 36B are graphs showing the behavior of the rear wheels when braking torque Tb=200 Nm is applied stepwise to the wheels on a low-$\mu$ road surface, wherein FIG. 36A shows variations with time in the wheel speed and the vehicle speed.

FIGS. 37A and 37B are graphs showing the behavior of the front wheels when braking torque Tb=700 Nm is applied stepwise to the wheels on a medium-$\mu$ road surface, wherein FIG. 37A shows variations with time in the wheel speed and the vehicle speed.

FIG. 39 is a block diagram showing the detailed configuration of ABS control means according to the embodiment of the third aspect of the invention;

FIGS. 49A and 49B are graphs showing the characteristics of variations in the friction torque with respect to the slip speed (i.e., friction torque characteristic), wherein FIG. 49A shows the friction torque characteristics of the road surface in which the friction torque gradient gently changes in the vicinity of the peak friction coefficient $\mu$, and FIG. 49B shows the friction torque characteristics of the road surface in which the friction torque gradient sharply changes in the vicinity of the peak friction coefficient $\mu$;

FIGS. 51A to 51C are graphs showing the results of the simulation of the wheel deceleration servo controller of the first embodiment in accordance with the fourth aspect of the invention in which harsh braking on a low-$\mu$ road is simulated;

FIGS. 52A to 52C are graphs showing the results of the simulation of the wheel deceleration servo controller of the first embodiment in accordance with the fourth aspect of the invention in which harsh braking on a high-$\mu$ road is simulated;

DETAILED DESCRIPTION OF THE PREFERRED EMBODIMENTS

First Aspect of the Invention

Figure 4:
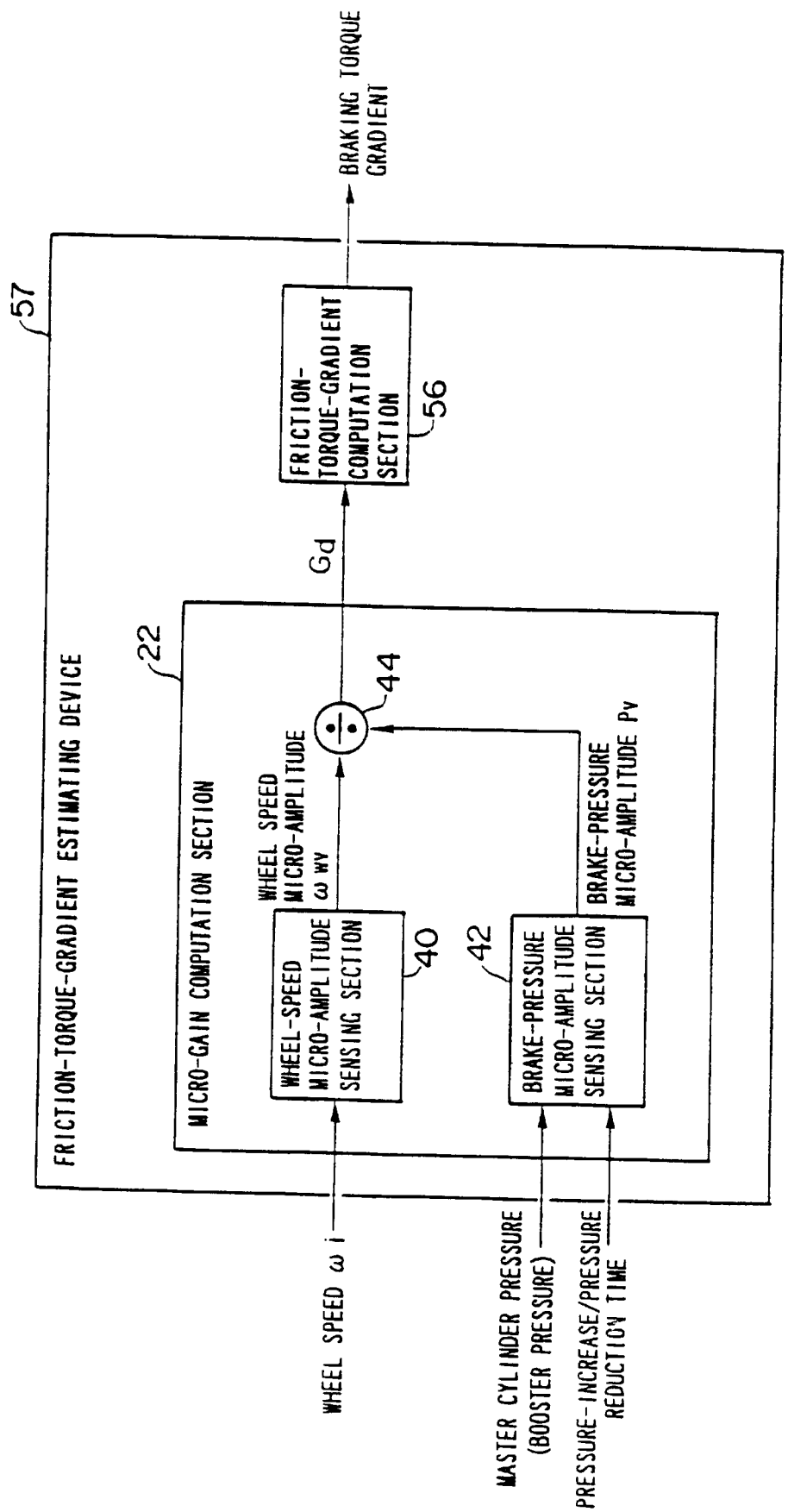
FIG. 4 is a block diagram showing the configuration of a friction torque gradient estimating device of a third embodiment in accordance with the first aspect of the invention.

With reference to the accompanying drawings, preferred embodiments of an ABS controller according to the first aspect of the present invention will be described in detail.

[First Embodiment of the First Aspect]

FIG. 1 shows the configuration of an ABS controller according to a first embodiment of the first aspect of the present invention.

As shown in FIG. 1, an ABS controller of the first embodiment is comprised of wheel-speed sensing means 10 for sensing a wheel speed at predetermined sampling intervals $\tau$; torque-gradient estimating means 12 for estimating the friction torque gradient from time-series data concerning the wheel speed sensed by the wheel-speed sensing means 10; ABS control means 14 for calculating an ABS-control operation signal for each wheel in accordance with the friction torque gradient estimated by the torque-gradient estimating means 12; and an ABS control valve 16 which effects ABS control by actuating the brake pressure for each wheel in accordance with the operation signal calculated by the ABS control means 14. Of these constituent elements, the wheel-speed sensing means 10 and the torque-gradient estimating means 12 constitute a friction torque gradient estimating device 8 which outputs a value regarding the estimated friction torque gradient.

For example, the wheel-speed sensing means 10 in FIG. 1 can be implemented in the configuration shown in FIG. 7A. As shown in FIG. 7A, the wheel-speed sensing means 10 is comprised of a signal rotor 30 which has a predetermined number of teeth provided thereon at uniform pitches and is attached so as to rotate together with a wheel; a pick-up coil 32 fitted to the vehicle body; a permanent magnet 34 arranged in such a way that a magnetic flux passes through the inside of the pick-up coil 32; and a frequency detector 36 which is connected to the pick-up coil 32 and detects and outputs the frequency of an AC voltage developed in the pick-up coil 32 at the sampling intervals $\tau$.

When the signal rotor 30 rotates with the wheel, the air gap between the signal rotor 30 and the pick-up coil 32 changes with periodicity corresponding to the rotational speed of the signal rotor 32. As a result, the magnetic flux of the permanent magnet 34 passing through the pick-up coil 32 is also changed, thereby developing an AC voltage in the pick-up coil 32. FIG. 7B shows variations with time in the AC voltage developed in the pick-up coil 32.

As shown in FIG. 7B, the AC voltage developed in the pick-up coil 32 has a lower frequency when the signal rotor 30 rotates at a low speed but has a higher frequency when the signal rotor 30 rotates at a high speed. The frequency of the AC voltage is proportional to the rotational speed of the signal rotor 30; namely, the wheel speed. Consequently, a signal output from the frequency detector 36 is proportional to the wheel speed at the sampling intervals $\tau$.

The wheel-speed sensing means 10 in FIG. 7A is attached to each of the first to fourth wheels. For each wheel, time-series data $\omega_i[k]$ (k is a sampling point in time; k=1, 2, . . . ) concerning the wheel speed of the i-th wheel ("i" is a wheel number, and i=1, 2, 3, 4) is detected through use of the signal output from the frequency detector 36.

The configuration of the ABS control valve 16 is described with reference to FIG. 8.

Figure 8:
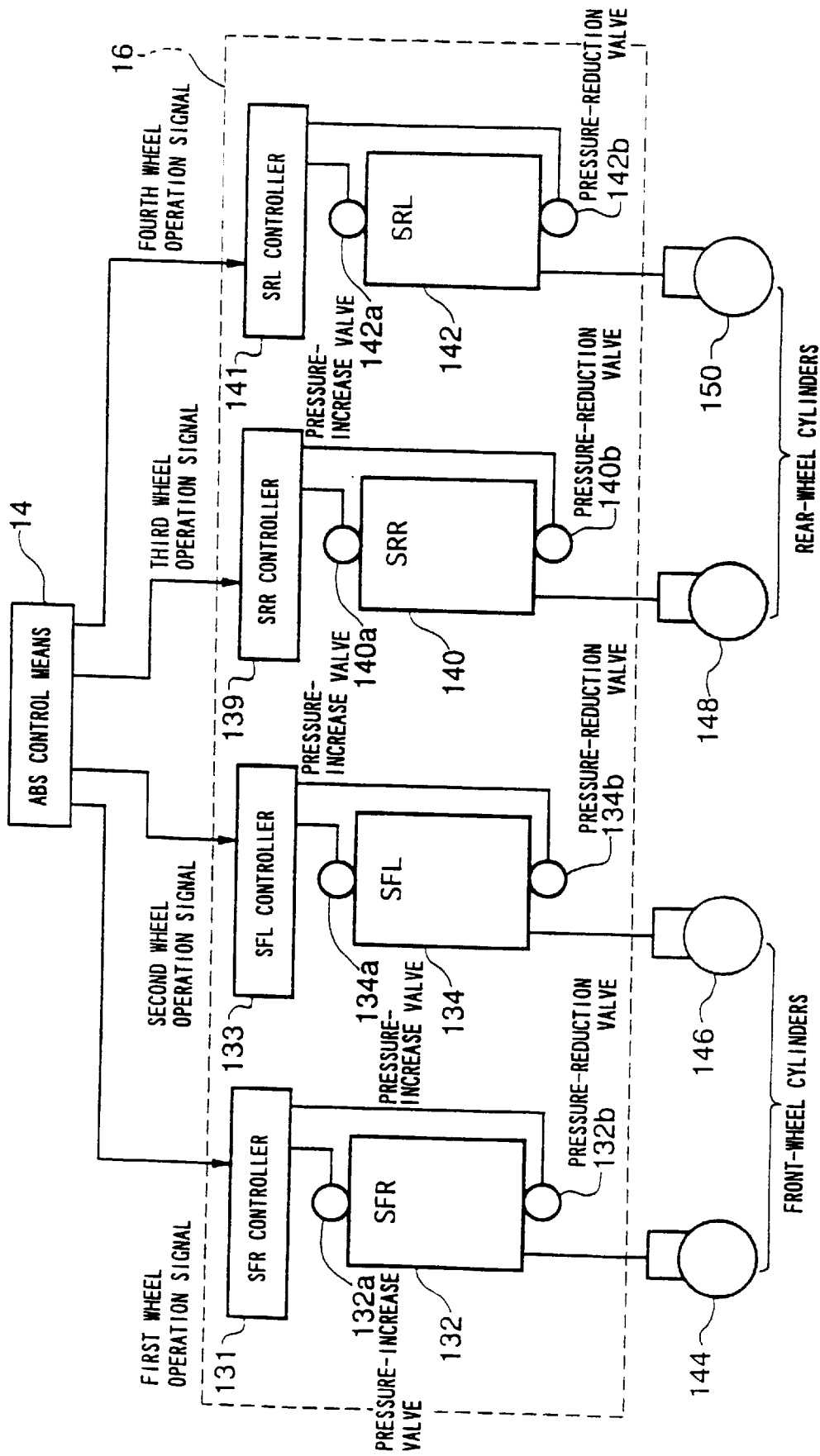
FIG. 8 is a block diagram showing the configuration of an ABS control valve of the embodiments in accordance with the first aspect of the invention.

As shown in FIG. 8, the ABS control valve 16 is comprised of a control solenoid valve 132 for use with the front-right wheel (hereinafter referred to as a valve SFR), a control solenoid valve 134 for use with the front-left wheel (hereinafter referred to as a valve SFL), a control solenoid valve 140 for use with the rear-right wheel (hereinafter referred to as a valve SRR), and a control solenoid valve 142 for use with the rear-left wheel (hereinafter referred to as a valve SRL).

The valves SFR 132, SFL 134, SRR 140, SRL 142 are provided with pressure-increase valves 132a, 134a, 140a, 142a and pressure-reduction valves 132b, 134b, 140b, 142b, respectively. The valves SFR, SFL, SRR, SRL are connected to front-wheel cylinders 144 and 146 and rear-wheel cylinders 148 and 150, respectively.

The pressure-increase valves 132a, 134a, 140a, 142a and the pressure-reduction valves 132b, 134b, 140b, 142b are respectively connected to a SFR controller 131, a SFL controller 133, a SRR controller 139, a SRL controller 141 which control the opening and closing actions of the valves.

The SFR controller 131, the SFL controller 133, the SRR controller 139, or the SRL controller 141 controls the opening and closing actions of the pressure-increase valve and the pressure-reduction valve of corresponding control solenoid valve in accordance with an operation signal received from the ABS control means 14 for each wheel.

The configuration of system hydraulic circuitry including the ABS control valve 16 will be described in detail with reference to FIG. 9.

Figure 9:
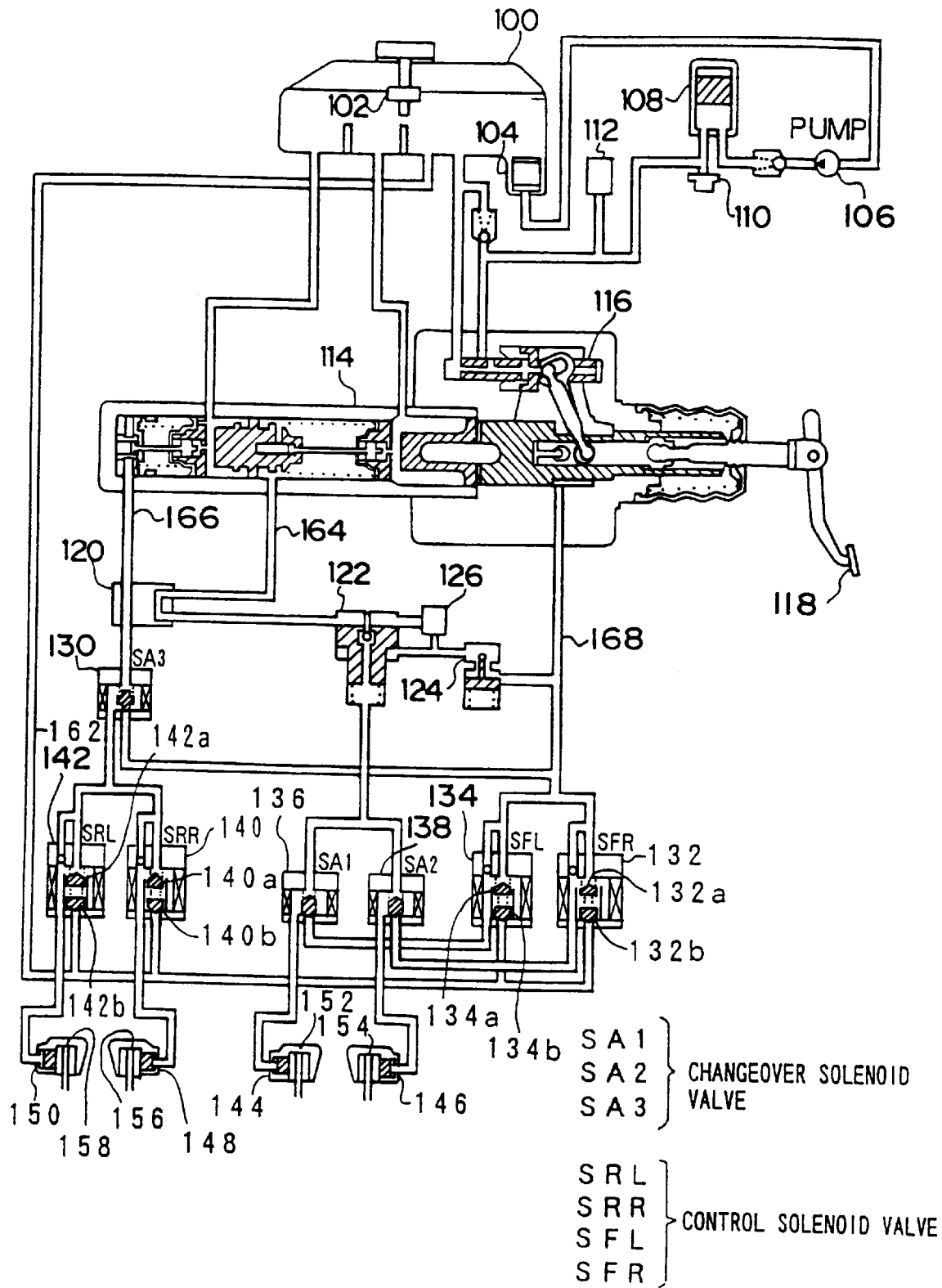
FIG. 9 is a block diagram showing the configuration of system hydraulic circuitry including the ABS control valve of the embodiments in accordance with the first aspect of the invention.

As shown in FIG. 9, the system hydraulic circuitry is provided with a reservoir 100 for storing brake fluid used for a master cylinder system and a power-supply system. This reservoir 100 has a level-warning switch 102 for sensing a reduction in the level of brake fluid stored in the reservoir 100, and a relief valve 104 which lets the brake fluid escape to the reservoir 100 in the event of abnormally high pressure builds up in the power supply system.

A line connected to the relief valve 104 of the reservoir 100 is provided with a pump 106 for pumping the brake fluid from the reservoir 100 and discharging it at high pressure. Further, an accumulator 108 which stores oil pressure (used for the power supply system) generated by the pump 106 and a pressure sensor 110 for sensing the oil pressure in the accumulator 108 are provided in the line in the vicinity of an outlet port side of the pump 106. The pressure sensor 110 outputs a control signal to the pump 106 in accordance with the pressure in the accumulator 108 and outputs a warning signal (e.g., a signal for inhibiting ABS and TRC control) when the pressure in the accumulator 108 decreases.

A pressure switch 112 is provided in the line connected to a high-pressure-side output port of the accumulator 108. This switch 112 outputs a control signal to the pump 106 and a warning signal (e.g., the signal for inhibiting ABS and TRC control) when there is a reduction in the pressure of the accumulator 108.

Another line extended from the reservoir 100 is connected to a master cylinder 114 which produces oil pressure corresponding to a stepping-on force applied to a brake pedal 118. A brake booster 116 is interposed between the master cylinder 114 and the brake pedal 118 and produces a hydraulic assisting force corresponding to the stepping-on force by introducing the high-pressure brake fluid from the accumulator 108.

A line directly connected to the reservoir 100 and the line connected to the high-pressure outlet port of the accumulator 108 are connected to this brake booster 116. If the amount of movement of the brake pedal 118 is smaller than a given amount, fluid having a normal pressure is introduced into the brake booster 116 from the reservoir 100. In contrast, if the amount of movement exceeds the given amount, fluid having a high pressure is introduced from the accumulator 108.

A front master-pressure line 164 and a rear master-pressure line 166 are connected to the master cylinder 114 in order to deliver the oil pressure in the master cylinder (i.e., the master pressure) to each of the front and rear wheels. A P&B valve 120 is interposed between the front master-pressure line 164 and the rear master-pressure line 166 in order to regulate the pressure of the brake fluid to be delivered to the rear-wheel system so as to effect appropriate distribution of the braking force among the front and rear wheels. This P&B valve 120 stops the regulation of the pressure of the brake oil to be delivered to the rear-wheel system in the event of the trouble with the front-wheel system.

A booster 122 is connected to the front master-pressure line 164 extended from the P&B valve 120 in order to ensure a high braking force by increasing the pressure in the front-wheel cylinders in the event of a reduction in the pressure in the power supply system. This booster 122 is connected to a booster line 168 connected to a booster chamber of the brake booster 116. A pressure limiter 124 and a differential pressure switch 126 are interposed between the booster 122 and the booster line 168.

When the pressure limiter 124 receives a pressure greater than the limit of the assisting force of the brake booster 116 in a normal condition, the pressure limiter 124 closes a line connected to the booster chamber so as to prevent the actuation of the booster 122 and the differential pressure switch 126. The differential pressure switch 126 senses the pressure difference between the master cylinder 114 and the booster chamber.

The booster line 168 is connected to the pressure-increase valve 132a of the valve SFR and the pressure-increase valve 134a of the valve SFL. A low-pressure line 162 directly connected to the reservoir 100 is connected to the pressure-reduction valve 132b of the valve SFR and the pressure-reduction valve 134b of the valve SFL.

A changeover solenoid valve 136 (hereinafter referred to as a valve SA1) and a changeover solenoid valve 138 (hereinafter referred to as a valve SA2) are connected to the pressure-supply pipes of the valve SFR and the valve SFL. The valve SA1 and the valve SA2 are further connected to a pipe for receiving increased pressure from the booster 122. A power-supply pipe of the valve SA1 is connected to a front-wheel cylinder 144 which applies brake pressure to a front-left wheel disk brake 152. A power-supply pipe of the valve SA2 is connected to a front-wheel cylinder 146 which applies brake pressure to a front-right wheel disk brake 154.

In a normal brake mode, the valve SA1 and the valve SA2 switch the valves so that the pressure from the booster 122 is applied to each of the front-wheel cylinders 144 and 146. In an ABS control mode, the valves are switched so that the pressure from the valve SFR and the valve SFL is applied to each of the front-wheel cylinders 144 and 146. In short, the front wheels can be switched independently of each other between the normal brake mode and the ABS control mode.

A pressure-increase valve 140a of a rear-right control solenoid valve 140 (hereinafter referred to as a valve SRR) and a pressure-increase valve 142a of a rear-left control solenoid valve 142 (hereinafter referred to as a valve SRL) are connected to the booster line 168 via a changeover solenoid valve 130 (hereinafter referred to as SA3). Further, a pressure-reduction valve 140b of the valve SRR and a pressure-reduction valve 142b of the valve SRL are connected to a low-pressure line 162 directly extended from the reservoir 100.

A pressure-supply pipe of the valve SRR is connected to a rear-wheel cylinder 148 which applies brake pressure to a rear-right brake disk 156, and a pressure-supply pipe of the valve SRL is connected to a rear-wheel cylinder 150 which applies brake pressure to a rear-left brake disk 158.

In the normal brake mode, the valve SA3 switches the valve so that the master pressure can be applied to the valves SRL and SRR from the rear master-pressure line 166. In the ABS control mode, the valve is switched so that high pressure in the booster line 168 can be applied to the valves SRL and SRR. In short, the right and left rear wheels are switched between the normal brake mode and the ABS control mode while they are grouped together.

The outline of the operation of the ABS controller in accordance with the first aspect of the invention will be described. In the ABS mode, the valves SA1 and SA2 shown in FIG. 9 close the valve connected to the booster 122 and opens the valves connected to the valves SFR and SFL. Further, the valve SA3 closes the valve connected to the rear master-pressure line 166 and opens the valve connected to the booster line 168.

The wheel-speed sensor 10 senses the speed of each of the first to fourth wheels at the sampling intervals $\tau$ and outputs time-series data $\omega_i[k]$ regarding the thus-sensed wheel speeds.

The torque-gradient estimating means 12 performs arithmetic operations by aforementioned Equations (9) and (10) through use of $\omega_i[k]$ in step 1. In step 2, the friction torque gradient is estimated by the recurrence formula represented by Equation (11), which is obtained from a method of least square that is one of on-line system identification methods. Time-series data regarding the estimated friction torque gradient are obtained by repeating the steps 1 and 2 in order.

Figure 10:
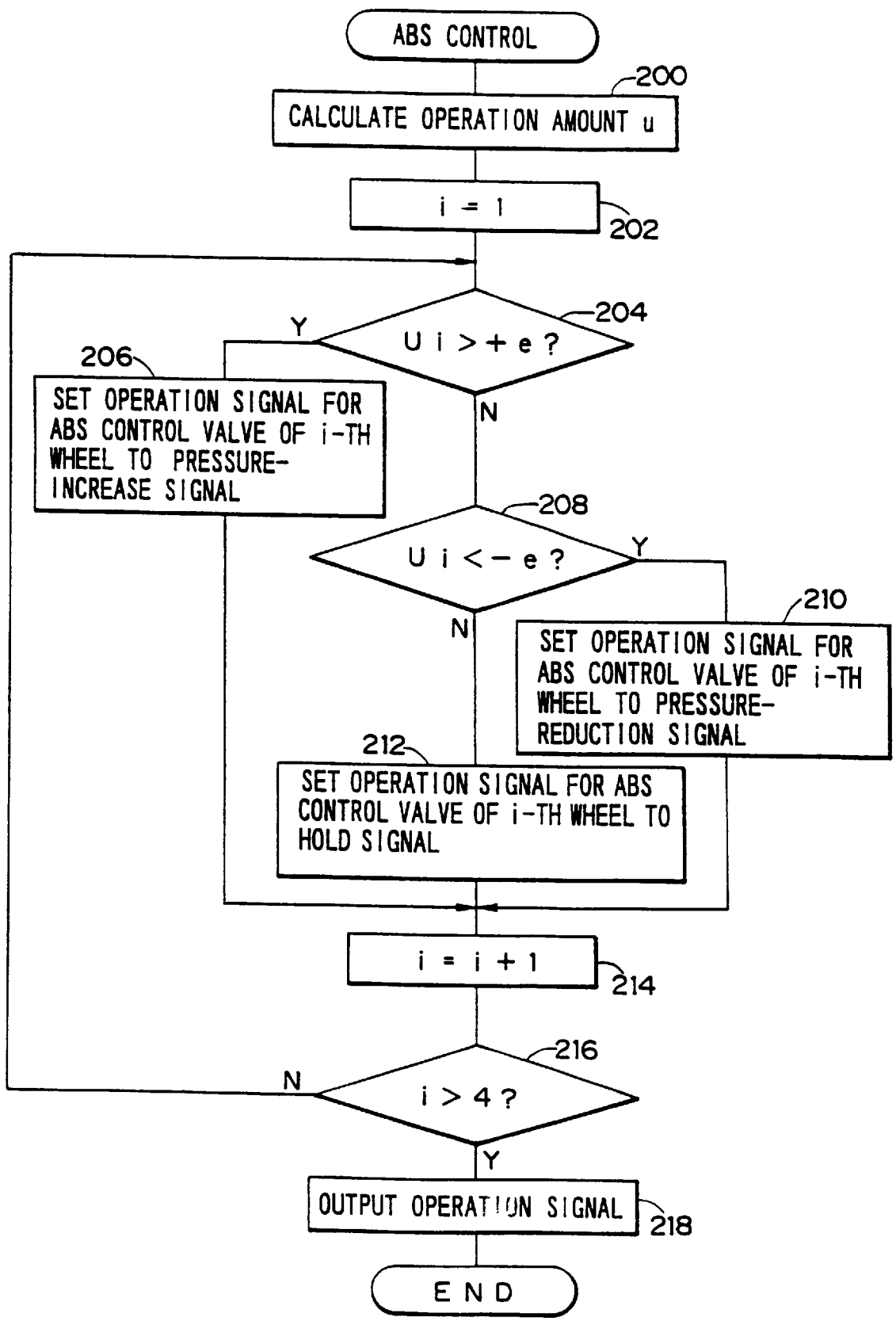
FIG. 10 is a flowchart showing the flow of ABS control in the first embodiment in accordance with the first aspect of the invention.

The ABS control means 14 executes processing along the flowchart shown in FIG. 10.

As shown in FIG. 10, the ABS control means 14 calculates the operation amount u ($u_i$: i=1, 2, 3, 4) for each wheel at each sampling point in time through use of the friction torque gradient estimated by the torque-gradient estimating means 12 at each sampling point in time (step 200).

More specifically, the equation of state; namely, Equations (34) and (35), are derived from aforementioned Equations (29) to (33), and a control system which allows arbitrary $\Delta(-1 \leq \Delta_{fi}, \Delta_{gi} \leq 1)$ to be defined by Equation (36) given by Equations (34) and (35) is designed through use of a so-called $\mu$-design method, whereby a controller defined by Equations (38) and (39) are derived. A status vale of the controller is substituted into $x_c$ of Equation (39), and a value representing the friction torque gradient estimated by the torque-gradient estimating means 12 is substituted into "y" of Equation (39), whereby the operation amount u of the ABS control valve is obtained.

The wheel number i is set to 1 (step 202), and it is determined whether or not the operation amount $u_i$ of the i-th wheel is greater than a positive reference value +e (step 204). If the operation amount $u_i$ is greater than the positive reference value +e (YES in step 204), the operation signal to be sent to the ABS control valve of the i-th wheel is set to a pressure-increase signal (step 206). In contrast, if the operation amount $u_i$ is not greater than the positive reference value +e (NO in step 204), it is further determined whether or not the operation amount $u_i$ is smaller than a negative reference value −e (step 208). If the operation amount $u_i$ is smaller than the negative reference value −e (YES in step 208), the operation signal to be sent to the ABS control valve of the i-th wheel is set to a pressure-reduction signal (step 210). In contrast, if the operation amount $u_i$ is not smaller than the negative reference value −e (NO in step 208); namely, if the operation amount $u_i$ is greater than the negative reference value −e but smaller than the positive reference value +e, the operation signal to be sent to the ABS control valve of the i-th wheel is set to a hold signal (step 212).

When the operation signal related to the operation amount $u_i$ of the first wheel is set, the wheel number i is incremented by only one (step 214). Subsequently, it is determined whether or not "i" is in excess of four (step 216). If "i" is not in excess of four (NO in step 216), the processing then returns to step 204. Similarly, the operation signal is set for the operation amount $u_i$ of the incremented wheel number "i".

If the wheel number "i" exceeds four (YES in step 216); namely, if the operations signals to be sent to all the ABS control valves of the first to fourth wheels are set, the thus-set operation signals are sent to the ABS control valve 16 (step 218). The setting of the operation signals and the transmission of the operation signals as described above are executed in each sampling point in time.

As a result of transmission of the operation signals to the respective wheels, the SFR controller 131, the SFL controller 133, the SRR controller 139, the SRL controller 141 shown in FIG. 8 control the opening/closing actions of the valve SFR, the valve SFL, the valve SRR, the valve SRL within the ABS control valve 16 in accordance with the operation signals.

Specifically, if the operation signals are pressure-increase signals, the pressure-increase valves are opened, and the pressure-reduction valves are closed. As a result, the high pressure in the booster line 168 shown in FIG. 9 is applied to the corresponding wheel cylinders, whereby the braking force is increased. In contrast, if the operation signals are pressure-reduction signals, the pressure-increase valves are closed, and the pressure-reduction valves are opened. As a result, the low pressure in the low-pressure line 162 shown in FIG. 9 is applied to the corresponding wheel cylinders, whereby the braking force is reduced. Further, if the operation signals are hold signals, the pressure-increase valves and the pressure-reduction valves are both closed. As a result, the pressure applied to the corresponding wheel cylinders is retained, so that the braking force is maintained.

As described above, in accordance with the present embodiment, the friction torque gradient is estimated from only the time-series data regarding the wheel speed, and ABS control is effected so that the friction torque gradient becomes zero. As a result, if the slip speed at which the peak friction coefficient $\mu$ reaches the peak value is changed depending on the state of the road on which the vehicle travels, ABS control can be stably effected.

Further, in the present embodiment, it is required to identify merely two parameters; namely, the time history of the physical quantity related to variations in the wheel speed, and the time history of the physical quantity related to the change regarding the variations in the wheel speed. Therefore, in comparison with the conventional techniques (as disclosed in US Patent) which requires identification of three parameters, the ABS controller of the present invention can contribute to a reduction in operation time and improvements on the accuracy of arithmetic operation. Consequently, anti-lock brake control with a high degree of accuracy can be effected.

The conventional techniques further require the detection of the pressure of the wheel cylinder in addition to the wheel speed. In contrast, in the present embodiment, it is only required to sense the wheel speed without use of expensive pressure sensors. Therefore, an inexpensive and simple ABS controller can be implemented.

In the present embodiment, it is not necessary to estimate the vehicle speed. Therefore, problems inherent to the conventional techniques can be prevented; for example, the problem that in order to estimate the vehicle speed, the braking force must be increased and decreased at a comparatively low frequency until a speed $V_w$ calculated from the wheel speed matches or becomes approximately equal to the actual vehicle speed $V_{v*}$; and the problem that the wheels are locked for a long period of time or the braking forces are extremely reduced in order to return to its unlocked state in case where there is a significant difference between the vehicle speed to be compared with a reference speed and the actual vehicle speed. As a result, comfortable ABS control can be implemented.

In the present embodiment, the modern control theory is not simply applied to the anti-lock braking system having nonlinear characteristics strongly affected by the characteristics of tires. Since the nonlinear characteristics can be apparently deemed as equivalent plant variations, an ABS control system which allows these plant variations is designed by application of the robust control theory, and hence elaborate ABS control can be effected in consideration of the interference between the four wheels.

In addition to the ABS control system, the friction torque estimating device 8 can be also applied to, e.g., a warning device which issues a warning sign related to brake to the driver in accordance with a value representing the estimated friction torque gradient. Moreover, the friction torque estimating device 8 can be also applied to a driving force controller. In this case, the friction torque estimating device 8 estimates a driving torque gradation.

[Second Embodiment of the First Aspect]

With reference to FIG. 2, the ABS controller according to a second embodiment of the first aspect of the invention will be described. The elements which are the same as those in the first embodiment will be assigned the same reference numerals, and their detailed explanations will be omitted here for brevity.

As shown in FIG. 2, the ABS controller according to the second embodiment is comprised of braking torque sensing means 51 for sensing braking torque $T_b$ at predetermined sampling intervals τ, wheel deceleration sensing means 52 for sensing a wheel deceleration "y" at predetermined sampling intervals τ, torque-gradient estimating means 53 which estimates the friction torque gradient from the thus-sensed time-series data $T_{bi}[j]$ (j=1, 2, 3, . . . ) and time-series data y[j] (j=1, 2, 3, . . . ), ABS control means 15 which calculates for each wheel an operation signal used for ABS control from the estimated friction torque gradient, and an ABS control valve which effects ABS control by actuating brake pressure for each wheel in accordance with the operation signal calculated by the ABS control means 15. Of these elements, the braking torque sensing means 51, the wheel deceleration sensing means 52, and the torque-gradient estimating means 53 constitute a friction torque estimating device 50 which outputs a value representing the estimated friction torque gradient.

The braking torque sensing means 51 is made up of a pressure sensor for sensing the cylinder pressure of each wheel, and a multiplier for calculating and outputting braking torque for each wheel by multiplying the wheel cylinder pressure sensed by the pressure sensor by a predetermined constant.

The wheel deceleration sensing means 52 can be implemented as a filter for deriving the wheel deceleration $y_i$ of the i-th wheel (i=1, 2, 3, 4) by subjecting to the processing represented by the following equation a wheel speed signal $\omega_i$ of the i-th wheel sensed by a wheel-speed sensor (wheel-speed sensing means) fitted to each wheel.

$$y_i = -\frac{s}{1 - 0.1s}\omega_i$$

where "s" is an operator for Laplace transformation. Further, the wheel deceleration sensing means 52 may be formed from a wheel deceleration sensor for directly sensing wheel deceleration without sensing the wheel speed.

The torque-gradient estimating means 53 may be formed into a calculator which calculates $f_i$ and $\phi_i$ of the i-th wheel from the time-series data $y_i[j]$ regarding the deceleration of the i-th wheel and the time-series data $T_{bi}[j]$ regarding the braking torque of the i-th wheel by Equations (23) and (25), and which estimates and calculates the friction torque gradient $k_i$ of the i-th wheel by application of, e.g. the on-line system identification method, to the data obtained by substituting the thus-calculated $f_i$ and $\phi_i$ to Equation (28).

The operation of the ABS controller of the second embodiment of the first aspect of the invention will be described.

In accordance with the time-series data $T_{bi}[j]$ (j=1, 2, 3, . . . ) regarding the sensed braking torque of the i-th wheel and the time-series data $y_i[j]$ (j=1, 2, 3, . . . ) regarding the sensed deceleration of the i-th wheel, the torque-gradient estimating means 53 estimates the friction torque gradient of the i-th wheel for each wheel.

The ABS control means 15 calculates and outputs an operation signal for the i-th wheel so as to prevent the friction torque gradient of the i-th wheel from becoming smaller than a reference value. The ABS control valve 16 then controls the brake pressure of each wheel in accordance with this operation signal.

For example, in a case where the calculated friction torque gradient becomes smaller than the reference value, the ABS control means 15 immediately outputs a brake-pressure-reduction instruction signal to the ABS control valve 16. For example, if the reference value is set to a positive value in the vicinity of zero, the friction torque gradient is zero in the region where the friction coefficient $\mu$ reaches the peak value. Therefore, if the brake is effected so as to exceed the peak friction coefficient $\mu$, the brake pressure is immediately reduced, thereby preventing tire locking.

In contrast, if the calculated friction torque gradient becomes greater than the reference value, the ABS control means 15 may immediately output a brake-pressure-increase instruction signal to the ABS control valve 16. As in the case of the previous operation, in a case where the reference value is set to a positive value in the vicinity of zero, if the friction torque gradient enters the region where the friction coefficient $\mu$ is smaller than the peak value, the braking force is immediately increased so that the friction coefficient $\mu$ is returned to the vicinity of the peak value. As a result, the most effective braking becomes feasible, and hence the stopping distance can be reduced.

As described above, in accordance with the second embodiment, the ABS control is effected in accordance with the friction braking torque gradient calculated from the wheel deceleration and the braking torque. Therefore, as in the case of the first embodiment, the estimation of wheel speed becomes unnecessary, and comfortable anti-lock brake control can be constantly effected regardless of the state of the road surface.

Further, in accordance with the second embodiment, there is adopted a method in which only one parameter called the friction torque gradient is directly identified. Therefore, in comparison with the conventional techniques (as disclosed in U.S. Patent) which requires identification of three parameters, the ABS controller of the present invention can contribute to a considerable reduction in operation time and significant improvements on the accuracy of arithmetic operation. Consequently, anti-lock brake control with a higher degree of accuracy can be effected.

Even in the second embodiment, the ABS control means 14 in accordance with the first embodiment can be employed in place of the ABS control means 15. Specifically, it is possible to execute the processing which is defined in the flowchart in FIG. 10 and takes into consideration interference between the four wheels. As a result, elaborate ABS control can be effected.

In addition to the ABS control system, the friction torque gradient estimating device 50 can be also applied to, e.g., a warning device which issues a warning sign related to brake to the driver in accordance with a value representing the estimated friction torque gradient.

Further, as shown in FIG. 3, this friction torque gradient estimating device 50 can be also used as a limit-determination device 55 for determining the limit of the characteristics of the friction torque. This limit determination device 55 is comprised of the friction torque gradient estimating device 50 in FIG. 2, and limit determination means 54 which is connected to the output terminal of the friction torque gradient estimating device 50 and determines, from a calculated value representing the friction torque gradient, the limit of the characteristics of the friction torque.

Figure 5:
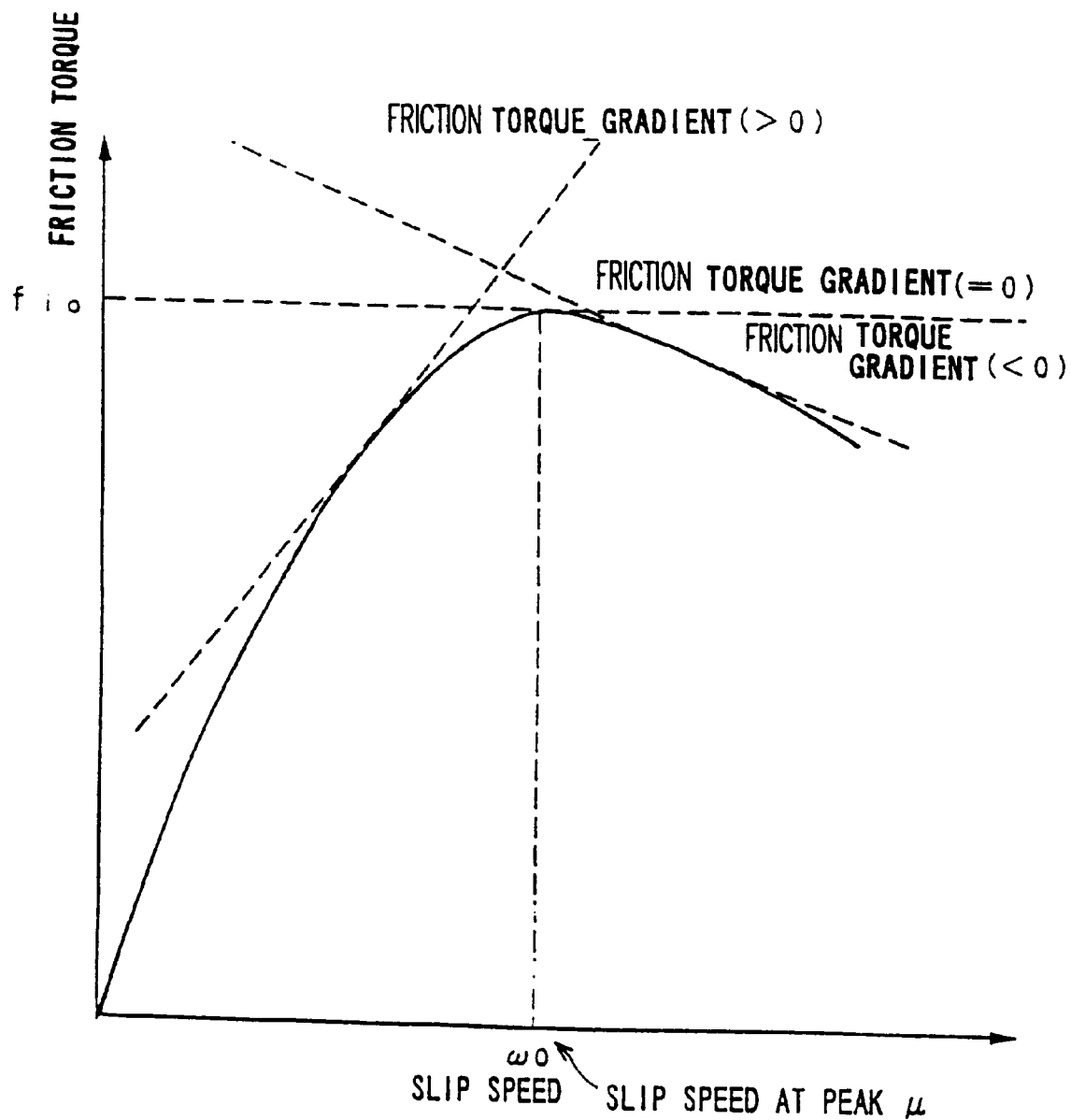
FIG. 5 is a graph showing the relationship between a slip speed, friction torque, and the friction torque gradient.
Figure 6A:
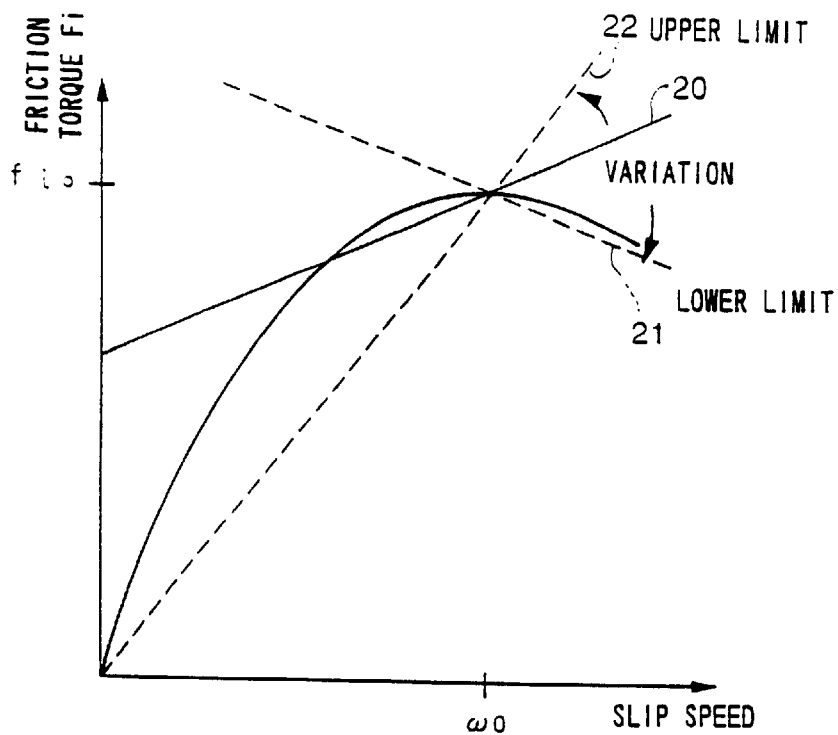
Figure 6B:
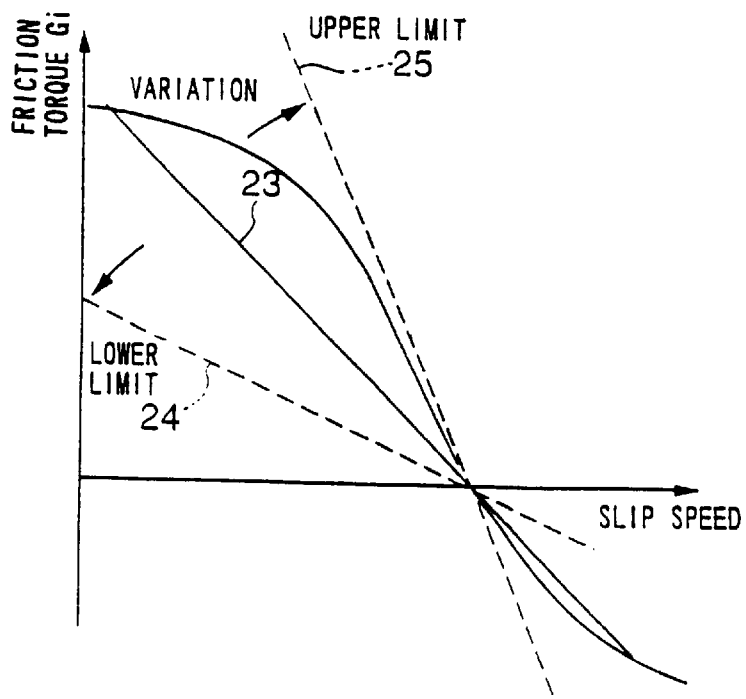

The characteristics of friction torque used herein represent the characteristics of the change in the friction torque with respect to the slip speed (see FIG. 5). The limit of the friction torque characteristics used herein represents the boundary across which the characteristics of the change in the friction torque shift from a certain condition to another condition. An example of this boundary is a boundary (i.e., the point at which the friction torque gradient nearly approaches to zero) in FIG. 5 across which the change in the friction torque shifts from a region of a slip speed (in which the friction coefficient $\mu$ is smaller than its peak) to another region of the slip speed (in which the friction coefficient $\mu$ approaches to the vicinity of zero). To detect this limit, the limit determination means 54 stores a value close to zero as a reference value in advance. If the calculated friction torque gradient is greater than this reference value, the gradient is determined to be within the limit. In contrast, if the friction torque gradient is smaller than the reference value, the gradient is determined to be outside the limit. The result of such determination of the limit is output as an electrical signal.

The limit determination device 55 may be arranged in such a way that an output signal of the limit determination device 55 is input to the ABS control means 15 in FIG. 2. In this case, if the characteristics of friction torque are determined to reach the limit, tire locking is prevented by outputting a brake-pressure-reduction instruction signal to the ABS control valve 16.

If the vehicle travels on the road surface in which the gradient of control torque drastically changes in the vicinity of the peak friction coefficient $\mu$, servo control intended to cause the braking action to follow a certain target value may not function correctly. To prevent this trouble, the limit determination device 55 may be designed so as to determine the limit outside of which the friction torque gradient drastically changes and control the target value of the control system in accordance with the result of such determination. As a result, superior control performance can be accomplished.

[Third Embodiment of the First Aspect]

In reference to FIG. 4, a friction torque gradient estimating device in accordance with a third embodiment of the first aspect of the invention will be described. The elements which are the same as those in the first and second embodiments will be assigned the same reference numerals, and their detailed explanations will be omitted here.

As shown in FIG. 4, a friction torque gradient estimating device 57 in accordance with the third embodiment comprises a micro-gain computation section 22 for calculating micro-gains $G_d$, and a friction torque gradient computation section 56 for performing arithmetic operations in order to convert the thus-calculated micro-gains $G_d$ into the friction torque gradient.

The micro-gain computation section 22 comprises a wheel-speed micro-amplitude sensing section 40 which senses minute vibration of the wheel-speed signal $\omega_i$ (i.e., a wheel-speed micro-amplitude $\omega_{wv}$) obtained when the brake pressure is excited in a very small amount in the vicinity of mean brake pressure at a resonance frequency $\omega^\infty$ (Eq. 41) of the vibration system comprised of the vehicle body, the wheel, and the road surface; a brake-pressure micro-amplitude sensing section 42 which senses a micro-amplitude $P_v$ of the brake pressure excited at the resonance frequency $\omega^\infty$; and an analog divider 44 which outputs the micro-gain $G_d$ by dividing the detected wheel-speed micro-amplitude $\omega_{wv}$ by the micro-amplitude $P_v$. The means for exciting brake pressure in a very small amount will be described later.

Figure 14:
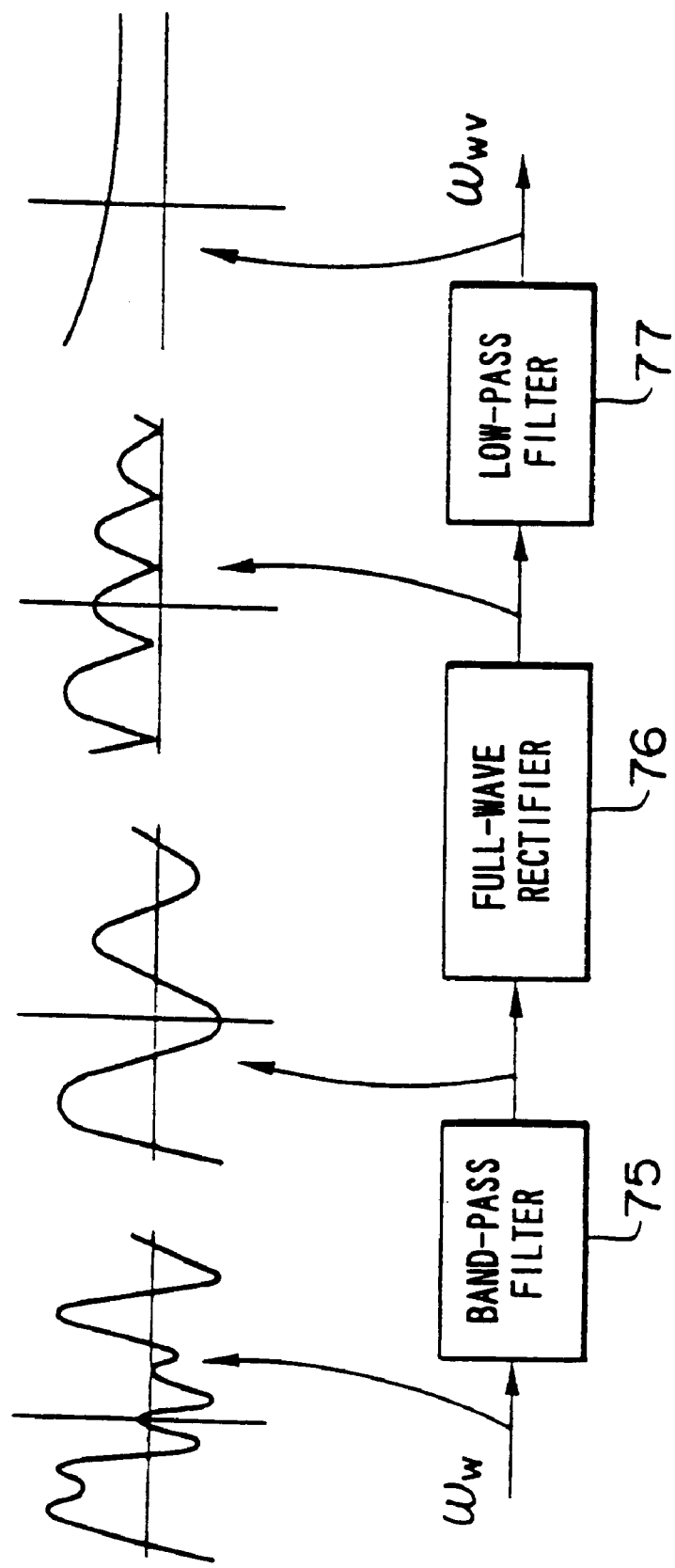
FIG. 14 is a block diagram showing the configuration of a wheel-speed micro-amplitude sensing section of a micro-gain computation section of the third embodiment in accordance with the first aspect of the invention.

The wheel-speed micro-amplitude sensing section 40 can be implemented as a computation section as shown in FIG. 14 which performs filtering operations for extracting vibration components of the resonance frequency $\omega^\infty$. For example, provided that the resonance frequency $\omega^\infty$ of the vibration system is about 40 Hz, one cycle is set to 24 ms or about 41.7 Hz in consideration of controllability. A band-pass filter 75 centered at this frequency is provided. This band-pass filter 75 permits the passage of only the frequency components in the vicinity of about 41.7 Hz of the wheel-speed signal $\omega_i$. The output of this band-pass filter 75 is subjected to full-wave rectification at a full-wave rectifier 26 and is smoothed into a DC voltage. A low-pass filter 77 permits the passage of only a low frequency component of the smoothed DC signal, whereby the wheel-speed micro-amplitude $\omega_{wv}$ is output.

Alternatively, the wheel-speed micro-amplitude sensing section 40 can be also implemented by consecutively acquiring time-series data over a period corresponding to an integral multiple of the cycle; e.g., time-series data concerning one cycle of 24 ms or time-series data concerning two cycles of 48 ms, and by determining the correlation between a unit sinusoidal waveform and a unit cosine waveform of 41.7 Hz.

As previously described, desired braking forces can be implemented by controlling the time for increasing or decreasing the pressure in each control solenoid valve (i.e., the valve SFR, the valve SFL, the valve SRR, and the valve SRL) in accordance with the pressure in the master cylinder (i.e., the booster pressure). The brake pressure can be excited in a very small amount by controlling the increase or decrease in the pressure in the control solenoid valve with a cycle corresponding to the resonance frequency concurrent with the increase or decrease in the pressure in the control solenoid valve intended to implement means braking force.

Figure 15:
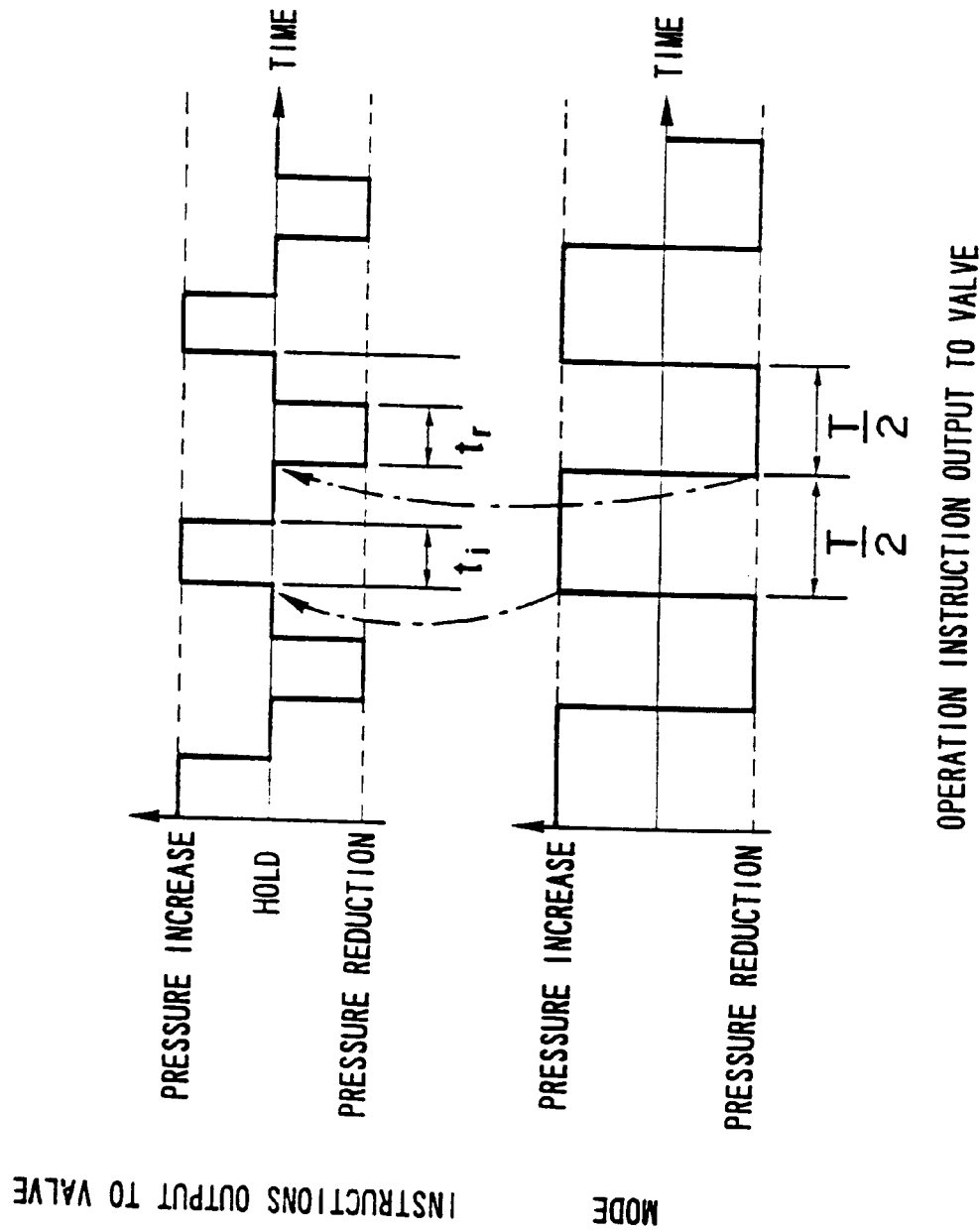
FIG. 15 is a timing chart for issuing an instruction to a control solenoid valve when very minute excitation of friction pressure and control of a mean braking force are carried out simultaneously.
Figure 16:
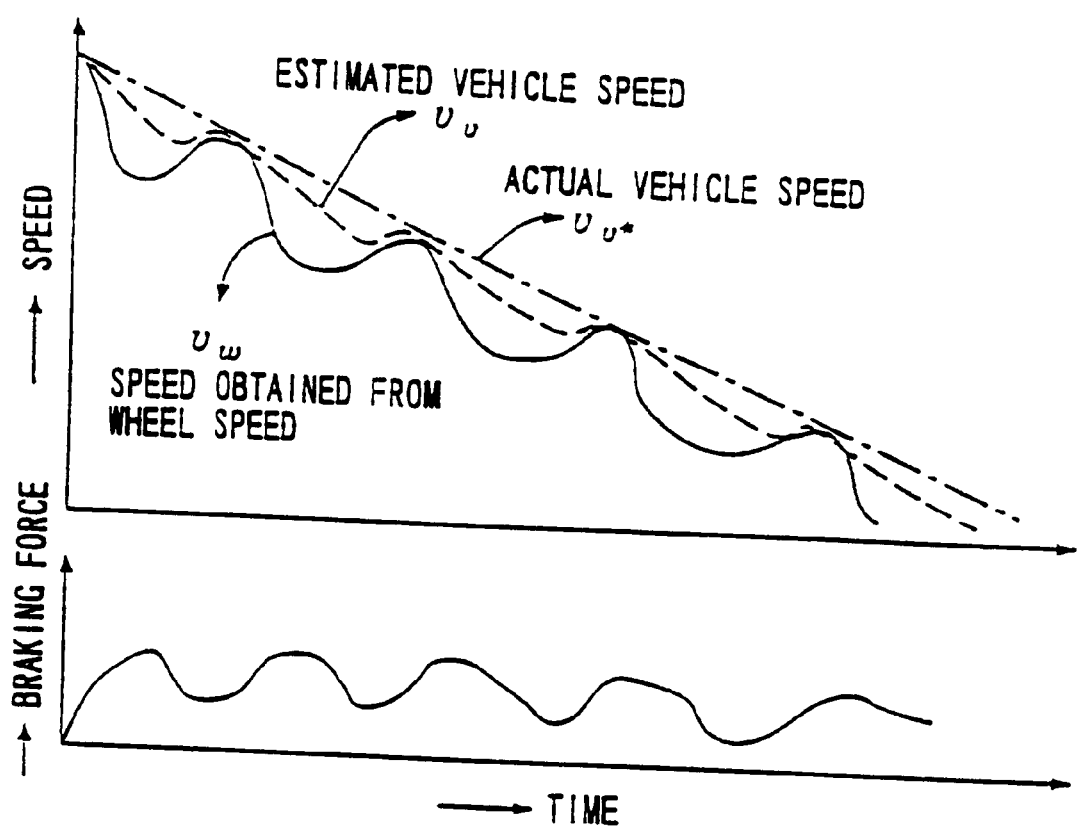
FIG. 16 is a plot showing the outline of a vehicle-speed estimation method used in a conventional anti-lock brake controller.
Figure 18:
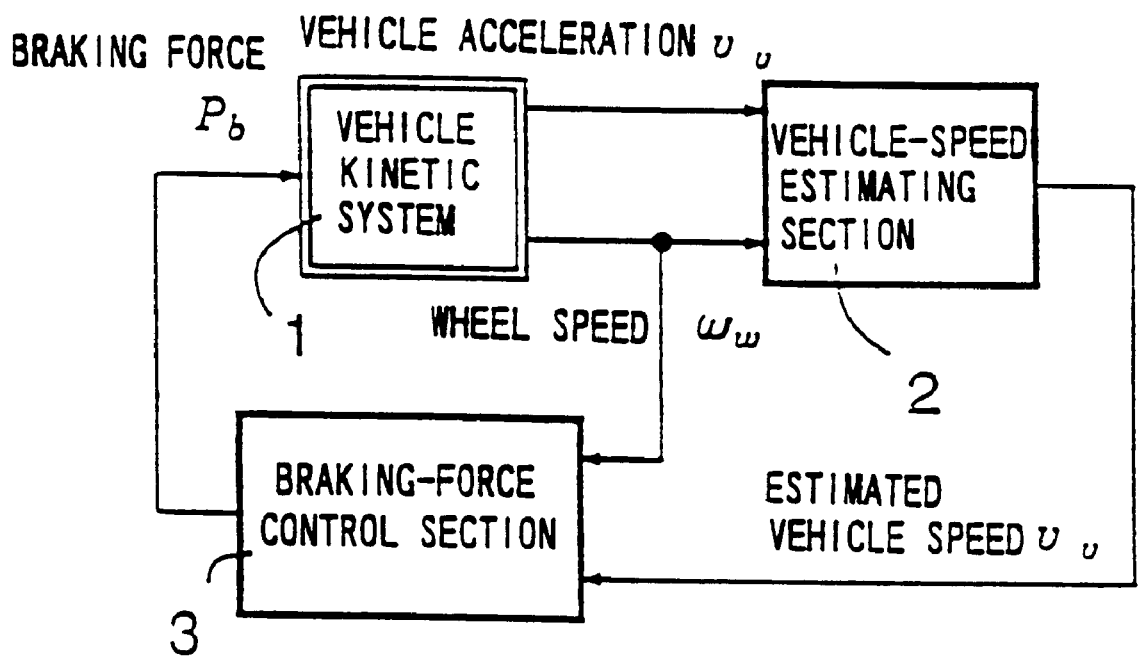
FIG. 18 is a block diagram of an ABS controller which employs a conventional vehicle-speed estimating section.

More specifically, as shown in FIG. 15, the switching between a pressure-increase mode and a pressure-reduction mode is carried out every T/2 which is half the cycle of the minute excitation (e.g., 24 ms). At the instant of switching of the mode, a pressure-increase instruction signal is output to the valve during the period of pressure-increase time $t_i$, and a pressure-reduction instruction signal is output to the valve during the period of pressure-reduction time $t_r$. During the period of the remaining time, a hold instruction signal is output. The mean braking force is determined by ratio of the pressure-increase time $t_i$ to the pressure-reduction time $t_r$ corresponding to the pressure in the master cylinder (i.e., the booster pressure). Very small vibration is applied to the vicinity of the mean braking force by switching between the pressure-increase mode and the pressure-reduction mode at every one-half cycle T/2 corresponding to the resonance frequency.

The brake-pressure micro-amplitude $P_v$ is determined by the predetermined relationship between the pressure in the master cylinder (i.e., the booster pressure), the length of pressure-increase time $t_i$, and the length of the pressure-reduction time $t_r$ shown in FIG. 15. Therefore, the brake-pressure micro-amplitude sensing section 42 shown in FIG. 4 can be constituted in the form of a table for producing the brake-pressure micro-amplitude $P_v$ from the pressure in the master cylinder (i.e., the booster pressure), the pressure-increase time $t_i$, and the pressure-reduction time $t_r$.

As has been previously described, the micro-gain $G_d$ and the friction torque gradient is substantially proportional to each other. Therefore, the friction torque gradient computation section 56 in FIG. 4 can be formed as a multiplier which produces an appropriate proportional coefficient by multiplication of the computed micro-gain $G_d$. The micro-gain Gd has a tendency to increase with a reduction in the wheel speed. The friction torque gradient can be correctly calculated at all times independently of the wheel speed by changing the proportional coefficient responsive to the wheel speed.

The operation of the friction torque estimating device in accordance with the third embodiment of the first aspect of the invention will be described.

If the braking pressure is excited in a very small amount at the resonance frequency $\omega^\infty$, the micro-gain computation section 22 calculates the micro-gain $G_d$, and the friction torque gradient computation section 56 converts the micro-gain $G_d$ into the friction torque gradient and outputs this braking torque gradient.

As described above, the friction torque gradient which exactly represents the dynamic characteristics of the wheel motion can be readily calculated in the third embodiment. Therefore, this technique can be applied to various techniques in which various kinds of control are carried out in accordance with the state of friction.

For example, if the ABS control means 14 in FIG. 1 or the ABS control means 15 in FIG. 2 is arranged so as to utilize the result of computation of the torque-gradient estimating section 56, the same effects as those yielded by the ABS controllers of the first and second embodiments can be obtained.

In addition to the ABS control system, the friction torque gradient estimating section 56 can be also applied to, e.g., a warning device which issues a brake-related warning sign to the driver in accordance with the value of the estimated friction torque gradient.

Although the present invention has been described with reference to the illustrative examples of the embodiments, the present invention is not limited to these embodiments. Various modifications of the embodiments can be contrived without departing from the principle of the invention.

For example, although the ABS controller of the previous embodiment is designed to carry out peak-$\mu$ control so that the friction torque gradient becomes zero or approximately close to zero, it may also be designed to carry out control so that the friction torque gradient becomes a reference value other than zero.

The limit determination device 55 of the second embodiment can be also used when determining the limit in accordance with the friction torque gradient estimated by the gradient-torque estimating device 8 of the first embodiment or the gradient-torque estimating device 57 of the third embodiment.

Although the micro-excitation means is implemented by the switching between the pressure-increase mode and the pressure-reduction mode of the control solenoid valves, very small excitation may be directly imparted to the brake disc through use of a piezoelectric actuator which causes expansion and contraction corresponding to an excitation signal.

Second Aspect of the Invention

With reference to the accompanying drawings, a control start determination device in accordance with a second aspect of the present invention will be described in detail hereinbelow.

[First Embodiment of the Second Aspect]

Figure 19:
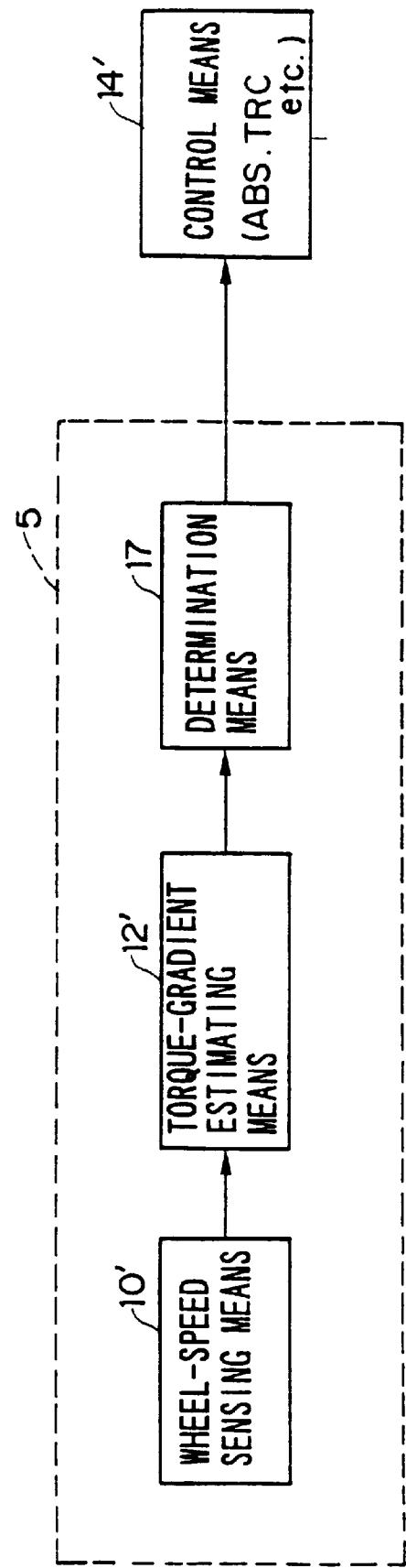
FIG. 19 is a block diagram showing the configuration of a control start determination device of a first embodiment in accordance with a second aspect of the present invention.

FIG. 19 shows the configuration of the control start determination device according to the first embodiment of the second aspect of the invention.

As shown in FIG. 19, a control start determination device 5 of the first embodiment is comprised of wheel-speed sensing means 10' for sensing the wheel speed at predetermined sampling intervals $\tau$; torque-gradient estimating means 12' which estimates the friction torque gradient from time-series data concerning the wheel speed sensed by the wheel-speed sensing means 10'; and determination means 17 which determines the starting or end point for control of control means 14' (including e.g., an anti-lock brake controller and a traction controller which will be described later) by a comparison between an estimated friction torque gradient and a reference value.

The torque-gradient estimating means 12' calculates a physical quantity concerning the change in the wheel speed during one period of sampling time by Equation (9) through use of the time-series data regarding the sensed wheel speed, and also calculates a physical quantity concerning the change occurred during one period of sampling time with regard to the variation occurred in the wheel speed during one period of sampling time by Equation (10) [Step 1]. Further, physical quantities representing the time history of the physical quantity regarding the variations in the wheel speed and the time history of the physical quantity regarding the change in the variations in the wheel speed by Equation (11) are calculated through use of the physical quantities calculated in step 1 [step 2], whereby the friction torque gradient is estimated from the physical quantities.

Figure 20:
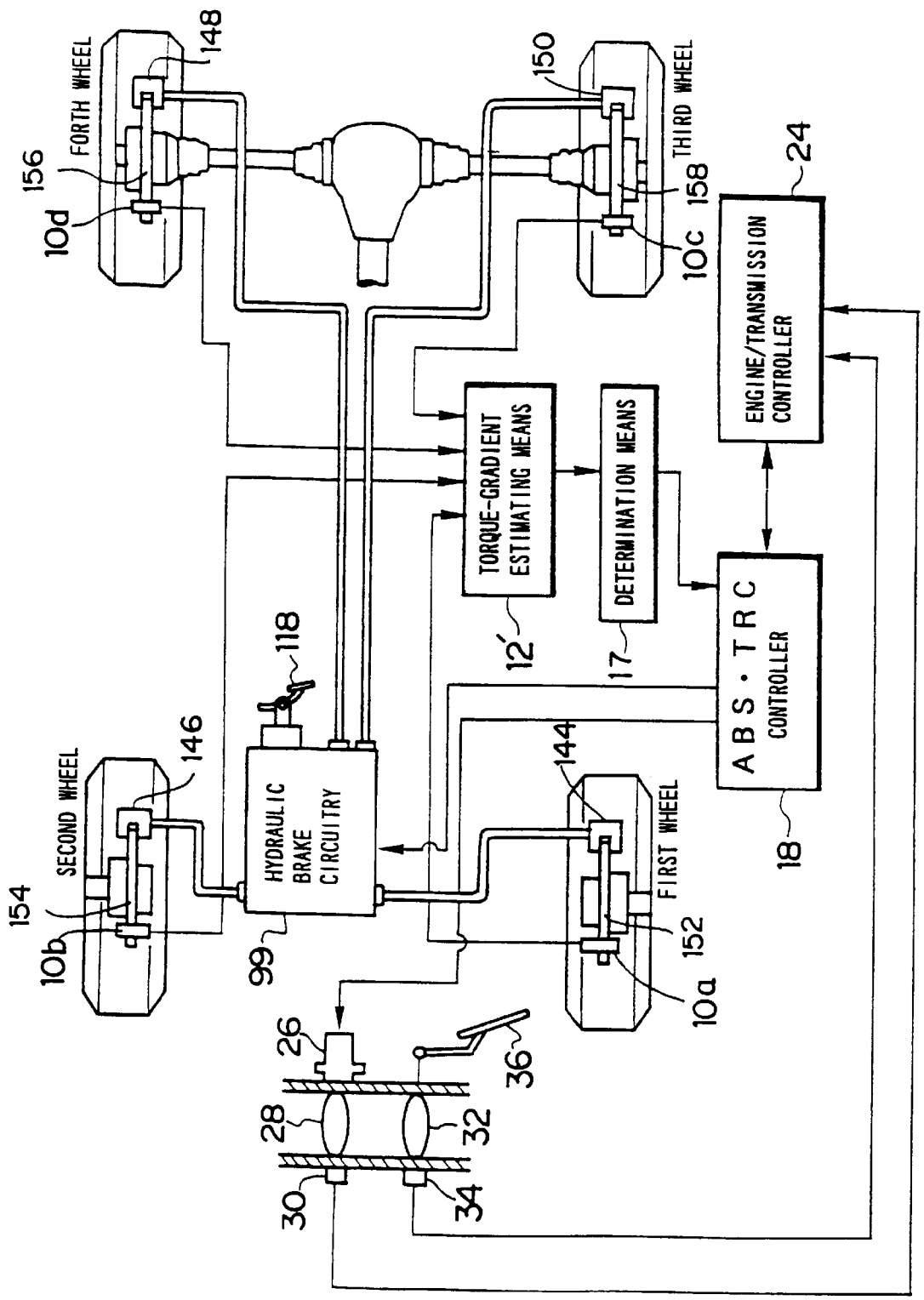
FIG. 20 a schematic representation of a vehicle equipped with the control start determination device of the first embodiment in accordance with the second aspect of the present invention, wherein the result of determination of the control starting point is applied to anti-lock brake control or traction control.

FIG. 20 shows a vehicle equipped with the control start determination device having the previously-described construction, wherein the result of determination of the control starting point is applied to anti-lock brake control or traction control.

The first through fourth wheels of the vehicle body shown in FIG. 20 are respectively equipped with the brake disks 152, 154, 158, 156; the front-wheel cylinders 144 and 146; the rear-wheel cylinders 148 and 150; and the wheel-speed sensors 10a, 10b, 10c, 10d as the wheel-speed sensing means 10'. The wheel-speed sensor 10a, 10b, 10c, or 10d senses time-series data $\omega_i[k]$ (k is a sampling point in time; k=1, 2, ...) regarding the speed of the i-th wheel (i denotes a wheel number, and i=1, 2, 3, 4) fitted to the vehicle body.

Brake fluid pipes for supplying brake pressure are connected to the front-wheel cylinders 144 and 146 and the rear-wheel cylinders 150 and 148 and are connected to hydraulic brake circuitry 99. In short, the wheel cylinders apply to the respective brake disks the brake pressure corresponding to the oil pressure received from the hydraulic brake circuitry 99.

The wheel-speed sensors 10a, 10b, 10c, 10d are connected to the torque-gradient estimating means 12' which is connected to the determination means 17.

An ABS/TRC controller 18 for outputting control signals used for effecting anti-lock brake control or TRC (traction) control is connected to the determination means 17. The hydraulic brake circuitry 99 is connected to the ABS/TRC controller 18.

The hydraulic brake circuitry 99 supplies to the respective wheel cylinders the pressure corresponding to the stepping-on force applied to the brake pedal 118. When traction control or anti-lock brake control is performed, the hydraulic brake circuitry 99 switches the hydraulic circuitry in order to control the pressure to be supplied to the wheel cylinders in accordance with the control signal received from the ABS/TRC controller 18.

The engine of the vehicle body shown in FIG. 20 is provided with a main throttle valve 32 for controlling the amount of air taken into the engine in association with an accelerator pedal 36. A sub-throttle valve 28 is provided upstream of the main throttle valve 32. This sub-throttle valve 28 is opened or closed by actuation of a sub-throttle actuator 26 connected to the ABS/TRC controller 18.

The sub-throttle valve 28 is set in a full load state by a return spring (not shown) at the time of non-traction control. The degree of opening/closing action of the sub-throttle valve 28 is controlled at the time of traction control in accordance with the control signal received from the ABS/TRC controller 18.

The main throttle valve 32 and the sub throttle valve 28 are each provided with a main throttle valve position sensor 34 and a sub throttle valve position sensor 30 for sensing the open or closed positions of the valves. The main throttle valve position sensor 34 and the sub throttle valve position sensor 30 are connected to an engine transmission controller 24 which controls the engine and the transmission. The engine transmission controller 24 and the ABS/TRC controller 18 are bidirectionally coupled together, and the engine transmission controller 24 controls the engine of the vehicle body via the ABS/TRC controller 18 in accordance with the degree of opening/closing action of the valve.

Figure 21:
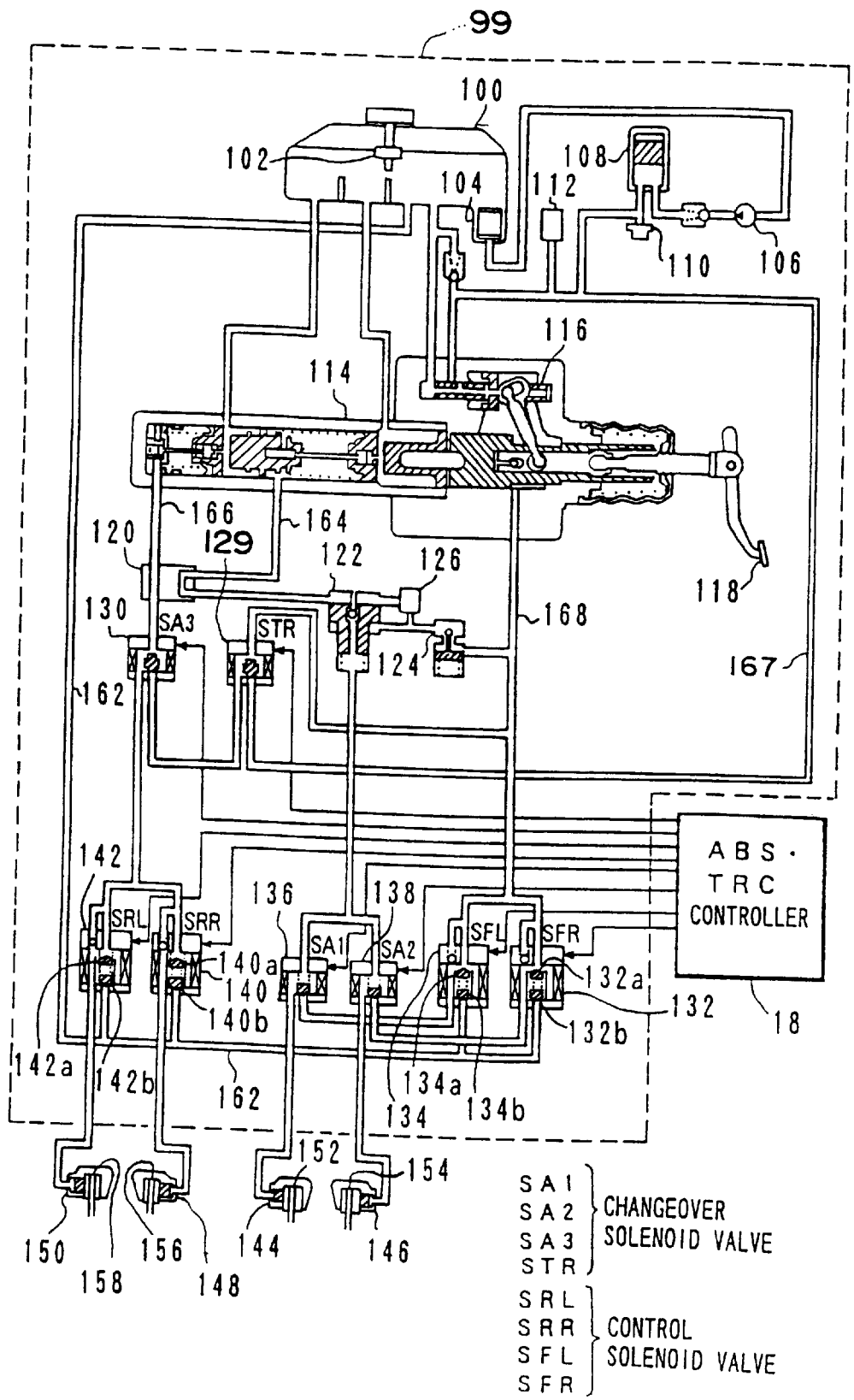
FIG. 21 is a schematic representation showing the details of the construction of hydraulic brake circuitry used in the first embodiment in accordance with the second aspect of the present invention.

With reference to FIG. 21, the configuration of the system hydraulic circuitry in accordance with the second aspect of the invention will be described in detail hereinbelow.

This circuitry is only different from the corresponding circuitry in accordance with the first aspect in that it is provided with a high-pressure line STR 129 extended from the accumulator 108. Therefore, only the difference will be described, and explanations for the other portions of the circuitry will be omitted.

As shown in FIG. 21, in accordance with the second aspect of the invention, the system hydraulic circuitry includes the valve STR 129, and a high-pressure line 167 connected to the accumulator 108 is connected to this valve STR 129. In the ABS mode, the valve STR 129 switches the valve in such a way that the high pressure in the booster line 168 is applied to the valve SA3. In the TRC mode, the valve STR 129 switches the valve in such a way that the high pressure is applied to the valve SA3 regardless of the stepping-on force exerted on the high-pressure line 167. As a result, in the TRC mode, the high pressure can be applied to each of the rear-wheel cylinders even when the driver does not depress the brake pedal 118.

In a normal brake mode, the valve SA3 switches the valve in such a way that the master pressure in the rear master-pressure line 166 is applied to the valve SRL and the valve SRR. In the ABS (or TRC) mode, the valve SA3 switches the valve in such a way that the pressure (i.e., the pressure in the booster line 168 in the ABS mode, and the pressure in the high-pressure line 167 in the TRC mode) received via the valve STR is applied to the valve SRL and the valve SRR. In short, the rear wheels are switched between the normal brake mode and the ABS (or TRC) mode while they are grouped together.

The changeover solenoid valves SA1, SA2, SA3, STR and the control solenoid valves SRL, SRR, SFL, SFR are connected to the ABS/TRC controller 18. In accordance with the control signal received from the ABS/TRC controller 18, the opening/closing action or the positions of the valves are switched.

In reference to a flowchart shown in FIG. 23, an explanation will be given of the first example of control in which ABS control is effected through use of the vehicle body in accordance with the second aspect of the invention shown in FIG. 20. In the region in which ABS control is effected, the wheel acceleration ($\omega_i[k]-\omega_i[k-1]/\tau$) is negative, and this logic is executed when the wheel acceleration is negative.

Figure 22:
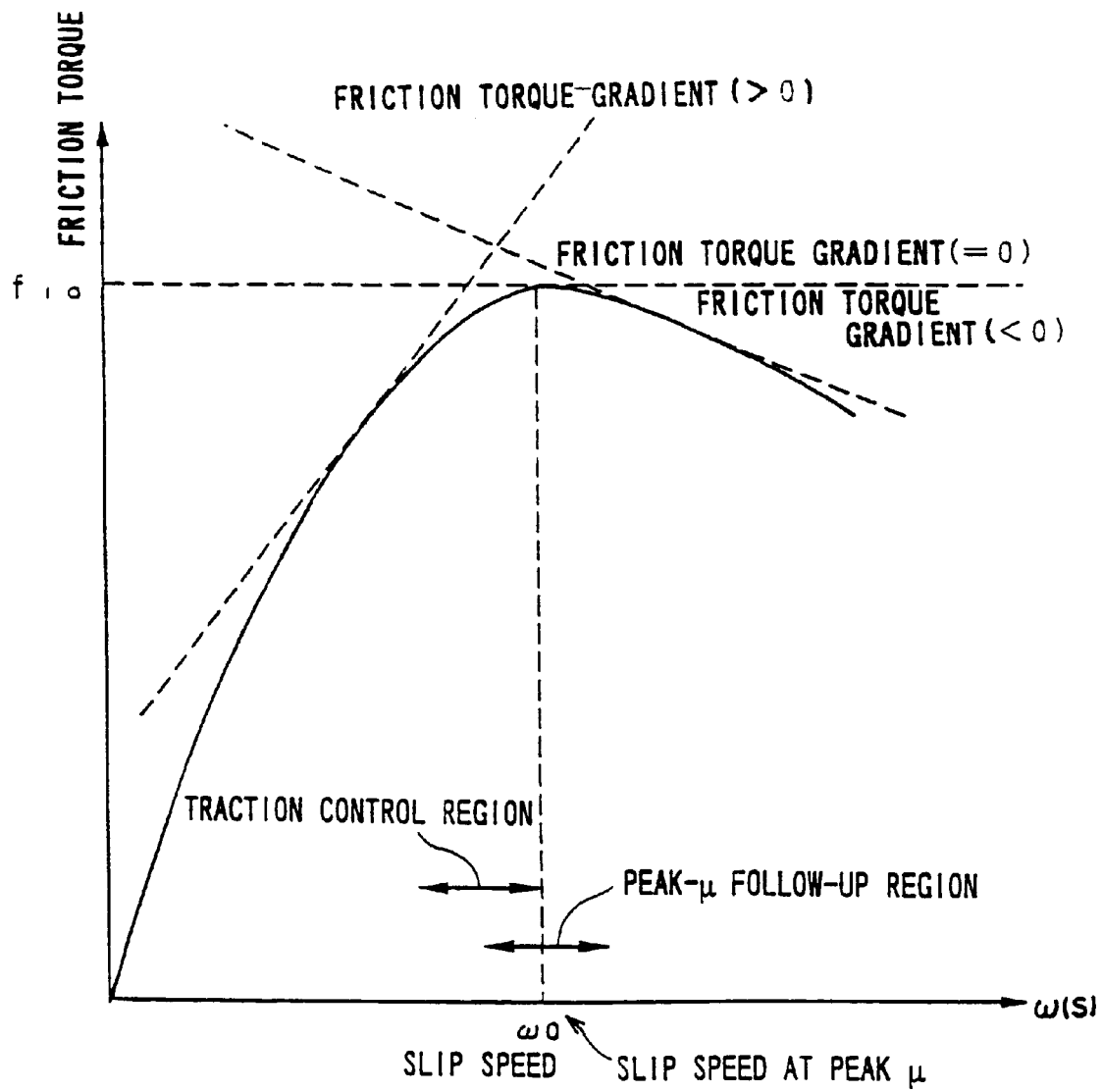
FIG. 22 is a graph showing variations in friction torque with respect to the slip rate and in the friction torque gradient.
Figure 23:
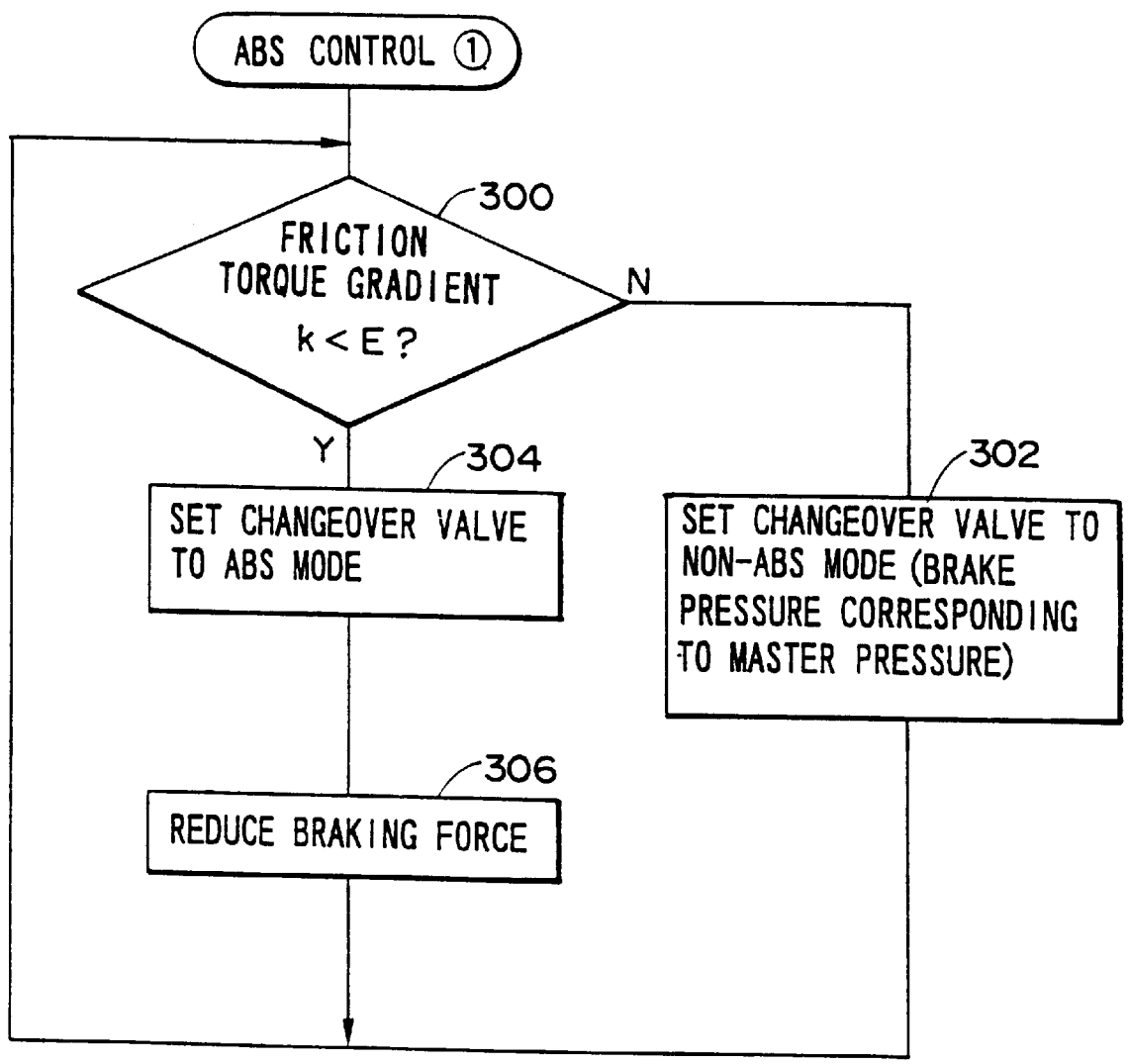
FIG. 23 is a flowchart showing first ABS control in a case where the commencement of ABS control is determined through use of the control start determination device of the first embodiment in accordance with the second aspect of the invention.

As shown in FIG. 23, the determination means 14 in FIG. 20 determines whether or not the friction torque gradient k estimated by the torque-gradient estimating means 12 is smaller than a reference value E (>0) (step 300). This reference value E corresponds to the value representing the friction torque gradient with respect to the lower limit value of the slip speed in the ABS control region in which the braking action follows the peak friction coefficient $\mu$ shown in FIG. 22.

If the friction torque gradient k is determined to be greater than the reference value E (NO in step 300); namely, if the friction torque gradient is in the slip speed region smaller than the lower limit value of the region in which the braking action follows the peak friction coefficient $\mu$, the changeover valves (SA1, SA2, SA3 in FIG. 21) are set to the non-ABS mode (step 302). In this case, the braking forces corresponding to the master pressure are applied to the wheel cylinders.

In contrast, if the friction torque gradient k is determined to be smaller than the reference value E (YES in step 300); namely, if the friction torque gradient is in the slip speed region in which the braking action follows the peak friction coefficient $\mu$, the changeover valves are set to the ABS mode (step 304), and the braking force is reduced (step 306) When the braking force is reduced, the pressure-increase valves 132a, 134a, 140a, 142a of the valves SFL, SFR, SRL, SRR in FIG. 3 are closed, whereas the pressure-reduction valves 132b, 134b, 140b, 142b of the same valves are opened. As a result, the oil pressure in the low-pressure line 162 is applied to each of the wheel cylinders, thereby resulting in a reduction in the braking torque.

In the ABS shown in FIG. 23, when the friction torque gradient k is greater than the reference value E, the friction coefficient is deemed to be distant from the peak friction coefficient $\mu$, so that the ABS is not activated. In contrast, when the friction torque gradient k is smaller than the reference value E, it is considered that the braking force is applied to such an extent that the friction coefficient becomes close to or exceeds the peak friction coefficient $\mu$, the mode is switched to the ABS mode. The braking force is then reduced. Consequently, the braking action which follows the peak friction coefficient $\mu$ can be implemented, and the tire locking can be prevented.

In reference to a flowchart in FIG. 24, an explanation will be given of the second example of control in which the ABS control is effected through use of the vehicle body shown in FIG. 20.

Figure 24:
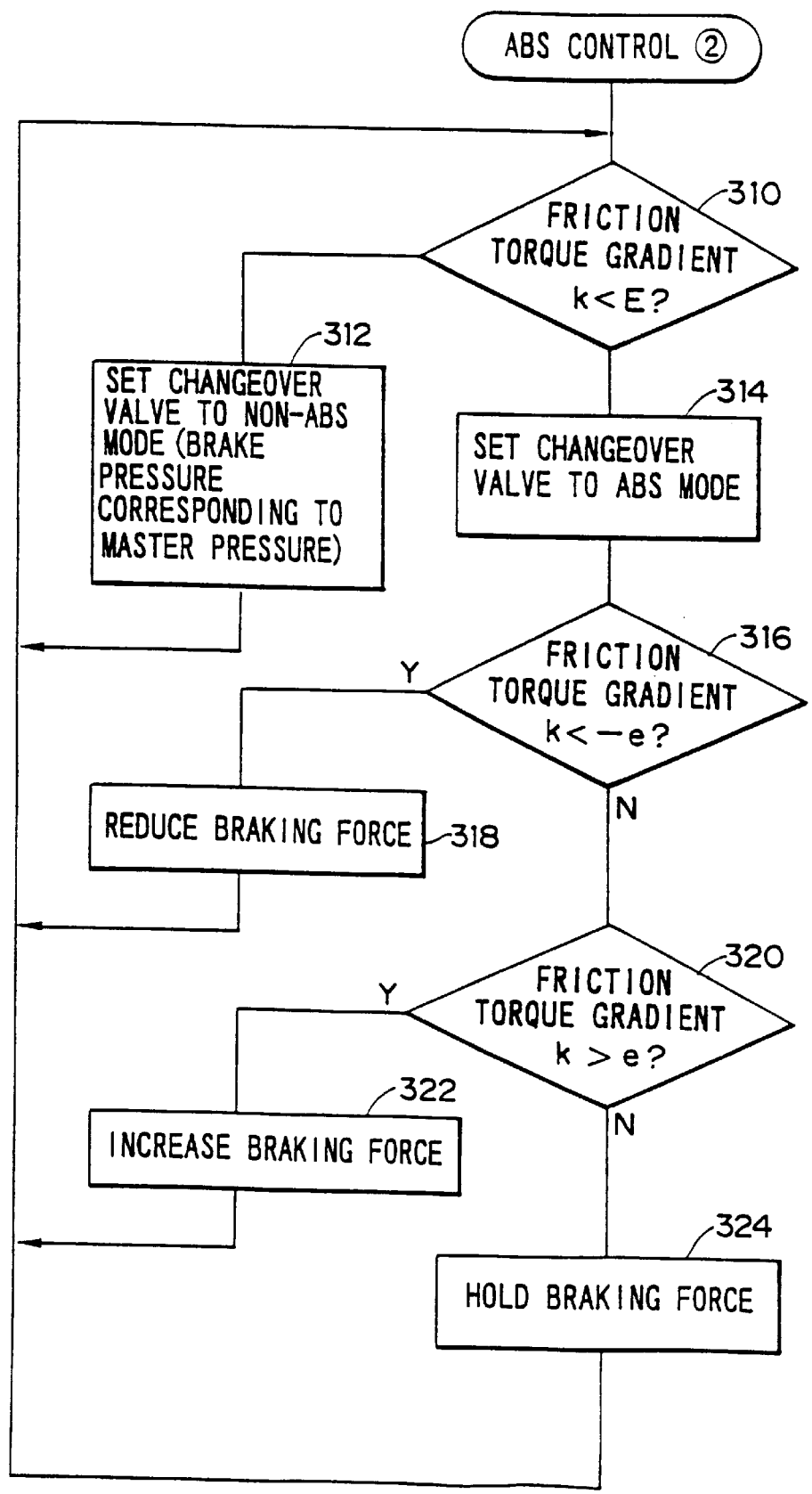
FIG. 24 is a flowchart showing second ABS control in a case where the commencement of ABS control is determined through use of the control start determination device of the first embodiment in accordance with the second aspect of the invention.

As shown in FIG. 24, the determination means 17 in FIG. 20 determines whether or not the friction torque gradient k estimated by the torque-gradient estimating means 12 is smaller than the reference value E (>0) (step 210).

If the friction torque gradient k is determined to be greater than the reference value E (NO in step 310), the changeover valves (SA1, SA2, SA3 in FIG. 21) are set to the non-ABS mode (step 312). In this case, the braking forces corresponding to the master pressure are applied to the wheel cylinders.

In contrast, if the friction torque gradient k is determined to be smaller than the reference value E (YES in step 310); namely, if the friction torque gradient is in the region in which ABS control is commenced, the changeover valves are set to the ABS mode (step 314). Further, it is determined whether or not the friction torque gradient k is smaller than another reference value −e (<0, e<E) (step 316).

If the friction torque gradient k is determined to be smaller than the reference value −e (YES in step 316); namely, the braking forces are determined to be applied to such an extent that the friction coefficient exceeds the peak friction coefficient $\mu$, the braking forces are reduced (step 318). The processing then returns to step 310, and the similar processing will be executed.

In contrast, if the friction torque gradient is determined to be greater than the reference value −e (NO in step 316), it is determined whether or not the friction torque gradient is in excess of still another reference value e (>0) (step 320).

If the friction torque gradient is determined to be greater than the reference value e (YES in step 320); namely, it is determined that the friction coefficient is slightly distant from the peak friction coefficient $\mu$, the braking forces are increased (step 322). The processing then returns to step 310, and the similar processing will be executed. When the braking forces are increased, the pressure-reduction valves 132b, 134b, 140b, 142b of the valves SFL, SFR, SRL, SRR in FIG. 21 are closed, whereas the pressure-increase valves 132a, 134a, 140a, 142a of the same valves are opened. As a result, the oil pressure in the high-pressure booster line 168 is applied to each of the wheel cylinders, whereby the braking forces are increased.

If the friction torque gradient is determined to be smaller than the reference value e (NO in step 320); namely, the friction torque gradient is within the region of the peak friction coefficient $\mu$ (i.e., the range from −e to e) which includes zero, the current braking forces are retained (step 324). The processing returns to step 210 again, and the similar processing will be executed. When the braking forces are retained, the pressure-reduction valves 132b, 134b, 140b, 142b and the pressure-increase valves 132a, 134a, 140a, 142a of the valves SFL, SFR, SRL, SRR in FIG. 21 are closed. As a result, the oil pressure applied to each of the wheel cylinders is retained.

As previously described, the ABS shown in FIG. 24 commences ABS control when the friction torque gradient becomes smaller than the reference value E, and also determines the starting point for ABS control to reduce, maintain, or increase the braking forces in such a way that the friction torque gradient is retained in the region of the peak friction coefficient $\mu$ including zero. Consequently, braking actions which are more elaborate than those controlled by the ABS shown in FIG. 23 and follow the peak friction coefficient $\mu$ can be implemented, and stable braking operations within the minimum braking distance can be effected.

In reference to a flowchart shown in FIG. 25, an explanation will be given of an example of control in which TRC is effected through use of the vehicle body in FIG. 20 in accordance with the second aspect of the invention. In the region where TRC is effected, the wheel acceleration is positive, and this logic is executed when the wheel acceleration is positive.

Figure 25:
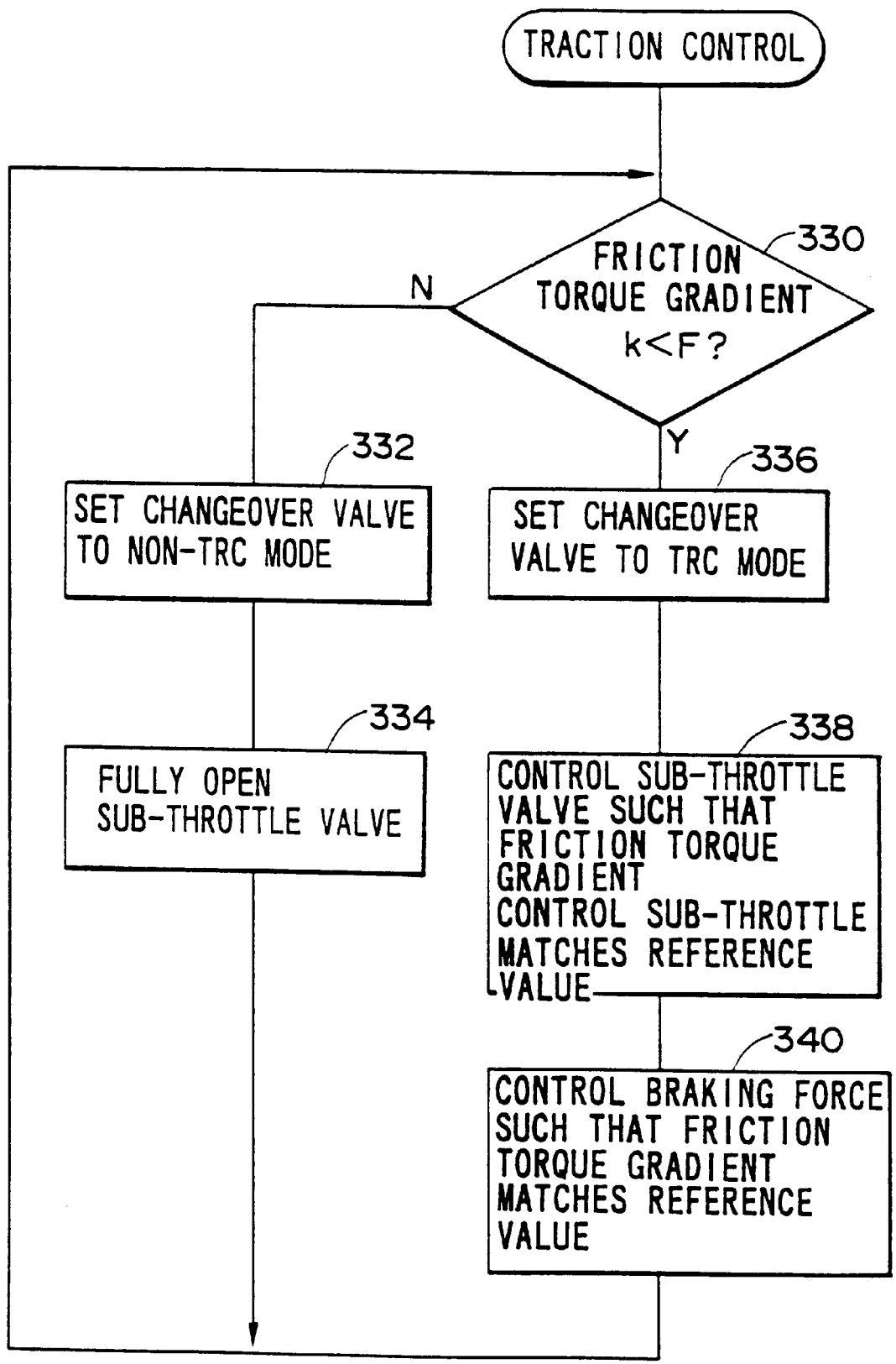
FIG. 25 is a flowchart showing TRC control in a case where the commencement of TRC control is determined through use of the control start determination device of the first embodiment in accordance with the second aspect of the invention.

As shown in FIG. 25, the determination means 17 in FIG. 20 determines whether or not the friction torque gradient k estimated by the torque-gradient estimating means 12 is smaller than a reference value F (>0) (step 330). This reference value F is determined as the upper limit value of the friction torque gradient when TRC is effected while the friction torque gradient is maintained within a predetermined range (see a traction-control region in FIG. 22).

If the friction torque gradient k is determined to be greater than the reference value F (NO in step 330), the changeover valves (SA1, SA2, SA3 in FIG. 21) are set to the non-TRC mode (step 332), and the sub-throttle valve 28 in FIG. 20 is in a fully-opened state (step 334). As a result, in a non-TRC mode, the vehicle enters a normal traveling condition in which the braking forces corresponding to the master pressure are applied to the wheel cylinders, and in which the amount of air depending on solely the degree of opening/closing of the main throttle valve 32 in FIG. 20 is supplied to the engine.

In contrast, if the friction torque gradient k is determined to be smaller than the reference value F (YES in step 330); namely, if the braking torque gradient is in the region in which TRC control is commenced, the changeover valves are set to a TRC mode (step 336).

The ABS/TRC controller 18 in FIG. 20 controls the degree of opening of the sub-throttle valve 28 so that the estimated friction torque gradient matches the reference value (step 338), as well as regulating the braking forces by controlling the control solenoid valves so that the estimated friction torque gradient matches the reference value (step 340). In this case, the braking forces are applied as required even when the driver does not depress the brake pedal 118.

Even in the control operation specified in steps 338 to 340, the determination means 17 compares the friction torque gradient with the reference value and determines the timing (i.e., the starting point for control) at which the ABS/TRC controller 18 increases/decreases the braking forces or regulates the degree of opening of the sub-throttle valve 28 in accordance with the result of such comparison.

As described above, the TRC in FIG. 7 is effected in accordance with the friction torque gradient so as to prevent the wheels from moving to such an extent as to exceed the peak friction coefficient $\mu$, and hence stable vehicle attitude can be maintained.

As has been described above, in the first embodiment in accordance with the second aspect of the invention, the friction torque gradient is estimated from only the time-series data concerning the wheel speed. In accordance with the value representing the friction torque gradient, determination is made as to the starting point for ABS or TRC control, as well as to the starting point for increase/decrease in the braking force or regulation of the degree of opening of the sub-throttle valve. As a result, even if the slip speed at which the friction coefficient $\mu$ becomes maximum changes depending on the state of road surface on which the vehicle travels, the fact that the friction torque gradient becomes zero at the peak friction coefficient $\mu$ still remains unchanged. Therefore, stable ABS or TRC control can be effected.

Further, according to the present embodiment, there is no need for estimation of the vehicle speed. Therefore, problems inherent to the conventional techniques can be prevented; for example, the problem that in order to estimate the vehicle speed, the braking force must be increased and decreased at a comparatively low frequency until a speed $V_w$ calculated from the wheel speed matches or becomes approximately equal to the actual vehicle speed $V_v*$; and the problem that the wheels are locked for a long period of time or the braking forces are extremely reduced in order to return to its unlocked state in case where there is a significant difference between the vehicle speed to be compared with a reference speed is significantly different from the actual vehicle speed. As a result, comfortable ABS control can be implemented.

[Second Embodiment of the Second Aspect]

The second embodiment is directed to the application of the control start determination device of the first embodiment to an ABS which controls the braking force so as to follow the peak friction coefficient $\mu$ in accordance with the vibration characteristics of the wheel speed when the braking force is excited.

Figure 26:
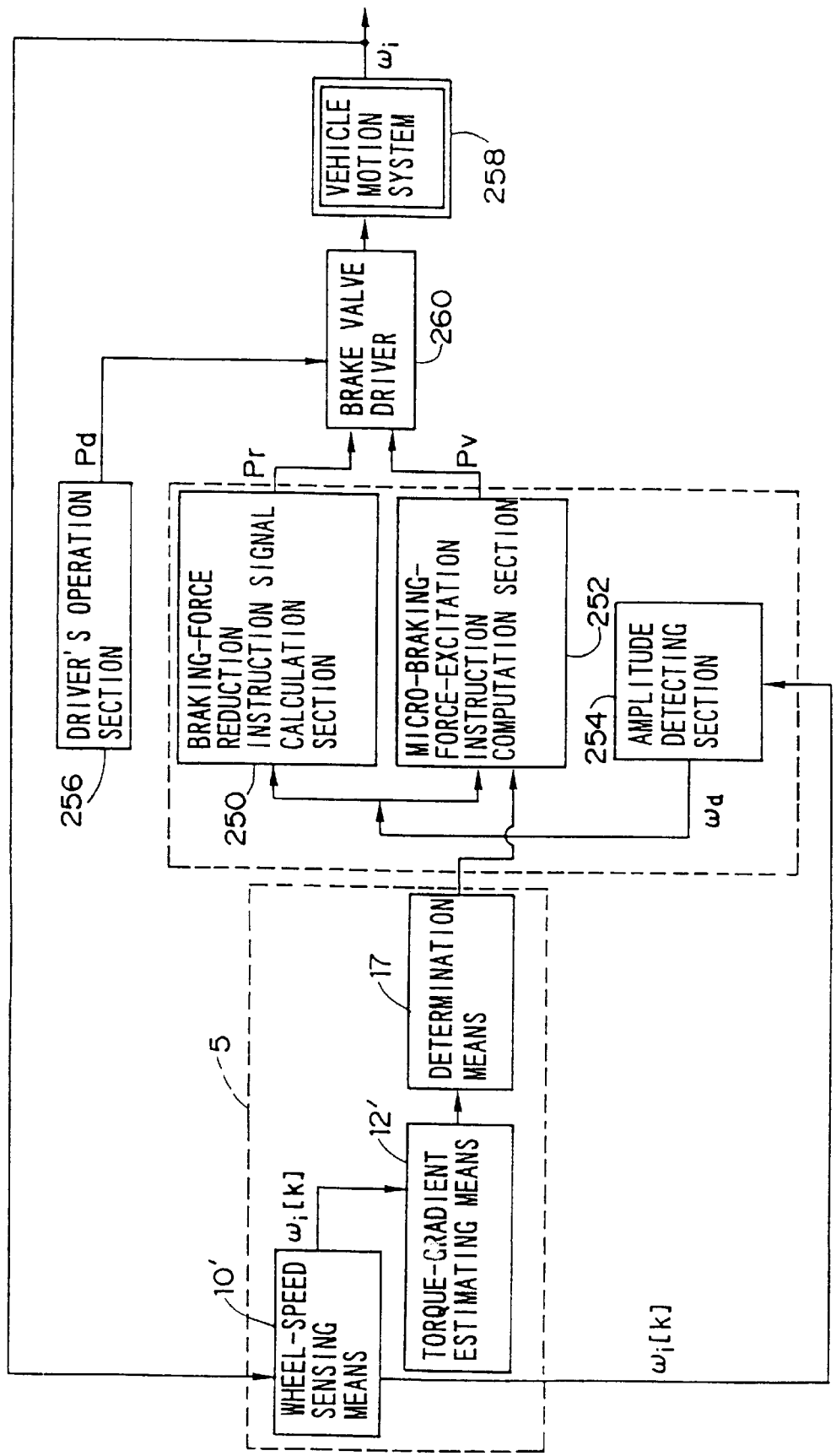
FIG. 26 is a block diagram of the vehicle in a case where the starting point for control determined by the control start determination device of a second embodiment in accordance with the second aspect of the invention is applied to an ABS employing very-minute excitation of a braking force.

FIG. 26 shows the configuration of the ABS to which a control start determination device 5 according to the second embodiment is applied. The elements which are the same as those used in the first embodiment are assigned the same reference numerals, and their explanations will be omitted.

As shown in FIG. 26, the vehicle body according to the second embodiment is comprised of; a micro-braking-force excitation instruction computation section 252 for calculating a micro-braking-force-excitation amplitude instruction signal $P_v$ used for imparting, to the braking force given by the driver, very small vibration having the same frequency as a resonance frequency $f_1$ of the wheel speed occurring when the tire is actively gripping, an amplitude detecting section 254 for detecting the amplitude $\omega_{wv}$ of the resonance frequency $f_1$ component of the detected wheel speed; and a braking-force reduction instruction signal calculation section 250 for calculating a braking-force reduction instruction signal $P_r$ from a detected value $\omega_d$ and the micro-braking-force-excitation amplitude command $P_v$.

In accordance with the braking-force reduction instruction signal $P_r$ received from the braking-force reduction instruction computation section 250, a braking force $P_d$ produced by a driver's operation section 256, and the micro-braking-force-excitation amplitude instruction signal $P_v$ received from the micro-braking-force-excitation instruction computation section 252, the braking-force reduction instruction computation section 250 and the micro-braking-force-excitation instruction section 252 generate a braking-force instruction signal which is an input to a vehicle motion system 258 to be controlled and are connected to a brake valve driver 260 which applies the thus-generated braking-force instruction signal to the vehicle motion system 258.

The micro-braking-force excitation instruction computation section 252 is connected to determination means 17 of the control start determination device 5 and issues an instruction signal regarding the starting/stopping of excitation of the braking force to the brake valve driver 260 in accordance with the determination of the starting point for control of the determination means 17.

In the second embodiment, the micro-braking-force excitation instruction computation section 252 calculates a micro-braking-force-excitation amplitude instruction signal $P_v$ used for imparting, to the braking force given by the driver, very small vibration having the same frequency as a resonance frequency $f_1$ of the wheel speed occurring when the tire is gripping, and imparts the braking force given by the driver very small excitation having the same frequency as a resonance frequency $f_1$ of the wheel speed occurring when the tire actively gripping. As a result, variations in the resonance frequency f1 are detected from the amplification characteristics of the braking force.

Figure 28:
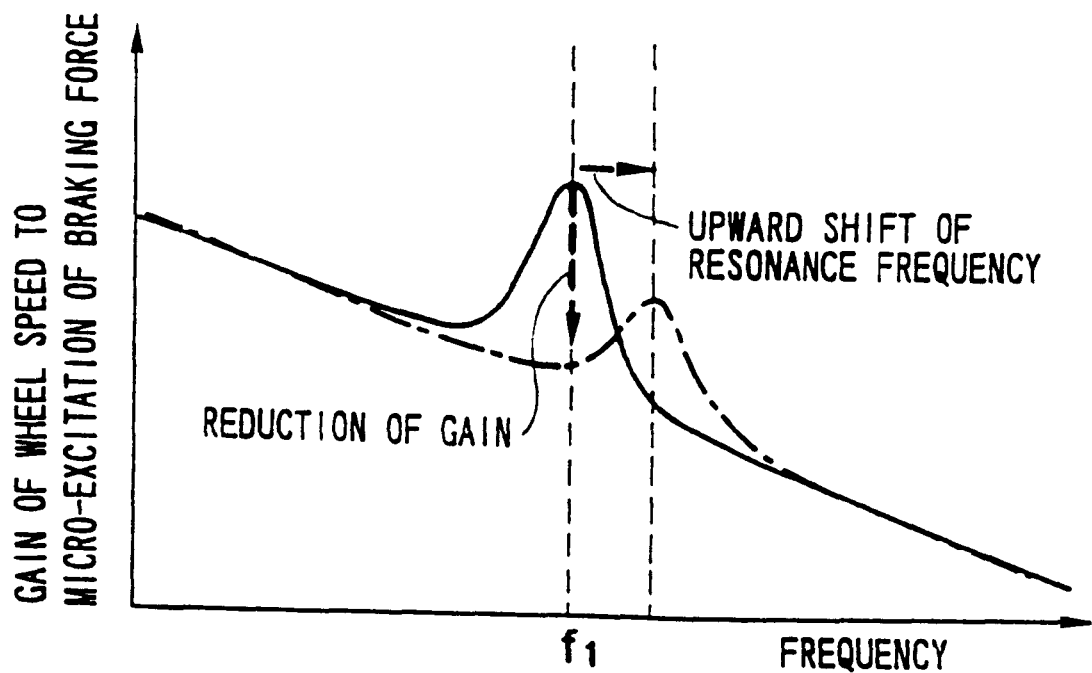
FIG. 28 is a graph showing the relationship between the resonance frequency and the gain of the wheel speed in a case where the braking force is excited in a very small amount in the vehicle of the second embodiment in accordance with the second aspect of the invention.

As shown in FIG. 28, with regard to the frequency characteristics of the wheel resonance system, as the friction coefficient $\mu$ approaches its peak value, the peak of the gain of the wheel speed at the resonance frequency becomes low. Further, if the friction coefficient $\mu$ exceeds the peak value, the resonance frequency shifts toward the higher-frequency side with respect to the resonance frequency $f_1$ occurring when the tire is gripping. In the case of the resonance frequency $f_1$ component occurring when the tire is gripping, as the friction coefficient $\mu$ approaches its peak value, the amplitude of the resonance frequency $f_1$ component reduces. Therefore, from the gain of the very small vibration component of the resonance frequency $f_1$ which appears in the wheel speed, it is possible to detect that the friction coefficient $\mu$ is approaching its peak value.

As shown in FIG. 14, the amplitude detecting section 254 is comprised of a band-pass filter 75 whose pass band is set to a predetermined range including the resonant frequency $f_1$ of the wheel speed occurring when the tire is gripping, a full-wave rectifier 76 for rectifying an output from the band-pass filter 75, and a low-pass filter 77 for smoothing an output from the full-wave rectifier 76 and converting an AC signal into a DC signal. Since the amplitude detecting section 254 detects only the resonant frequency $f_1$ component of the wheel speed occurring when the tire is gripping and outputs the thus-detected resonance frequency $f_1$ component of the wheel speed in the form of a DC signal, the detected value $\omega_{wv}$ corresponds to the amplitude of the resonance frequency $f_1$ component.

Figure 29:
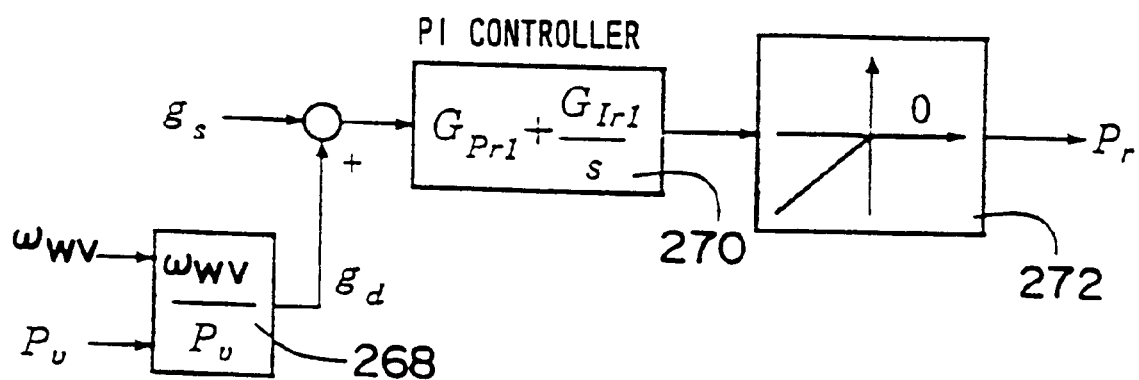
FIG. 29 is a schematic representation showing the configuration of a braking-force-reduction-instruction computation section of the vehicle according to the second embodiment in accordance with the second aspect of the invention.

As shown in FIG. 29, the braking-force reduction instruction computation section 250 is comprised of a computation section 268 for calculating a micro-gain $g_d$ which represents the ratio of the detected value $\omega_{wv}$ to the micro-braking-force-excitation amplitude instruction $P_v$, a PI controller 270 for calculating a reduced braking force by proportional-integral control through use of a difference, $g_d-g_s$, between the micro-gain $g_d$ and a reference value $g_s$, proportional gain $G_{Pri}$ and integral gain $G_{Iri}$, and positive-value-eliminating section 272 which adopts only negative values by eliminating positive values in order to prevent the braking force from being applied to such an extent as to exceed the braking force $P_d$ given by the driver and outputs the negative values in the form of a braking-force reduction instruction signal $P_r$.

In reference to a flowchart shown in FIG. 27, the flow of control according to the second embodiment of the second aspect of the invention will be described.

Figure 27:
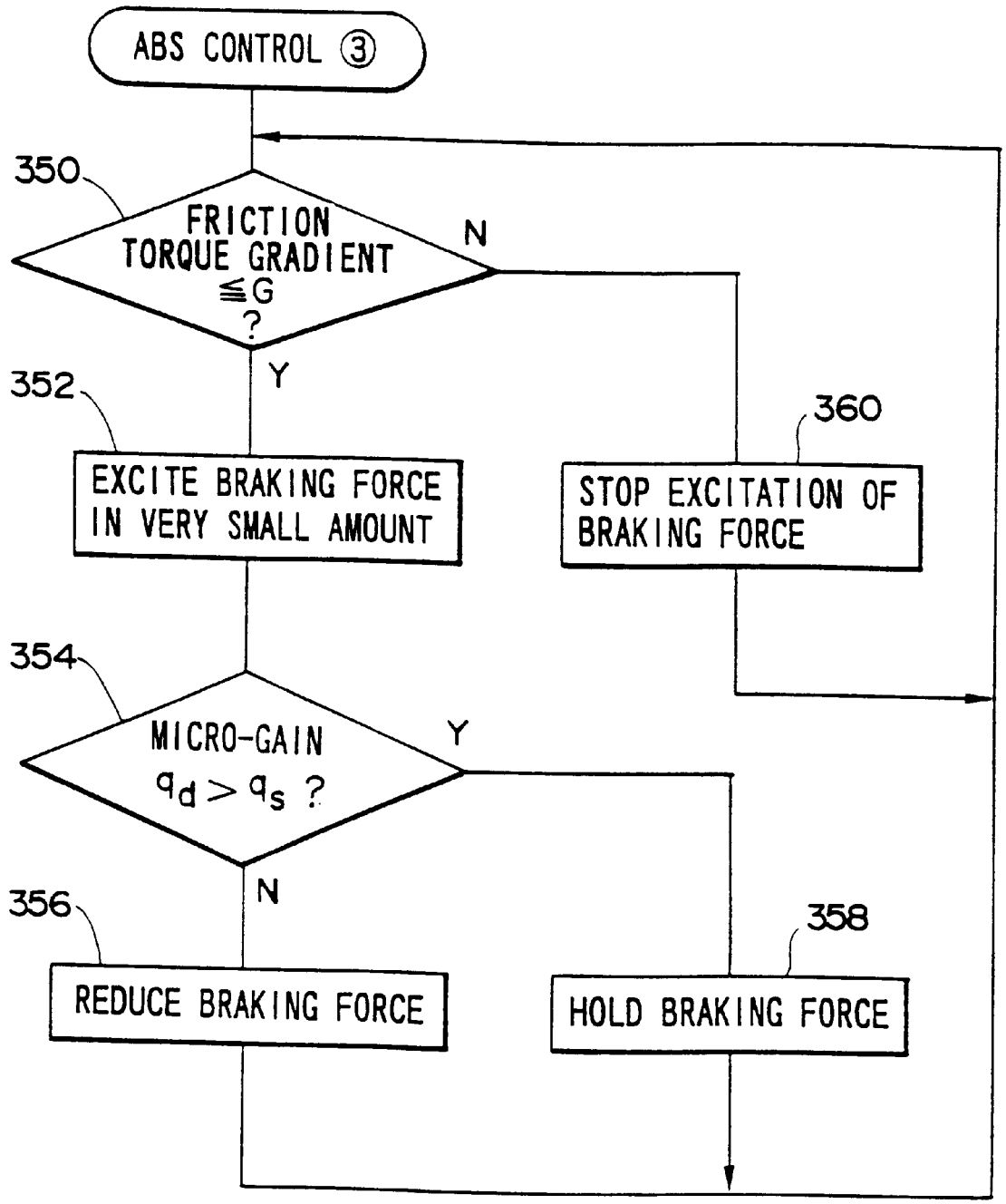
FIG. 27 is a flowchart showing the ABS control in a case where the commencement of minute excitation of a braking force is determined by the control start determination device of the second embodiment in accordance with the second aspect of the invention.

As shown in FIG. 27, the determination means 17 in FIG. 26 determines whether or not the friction torque gradient estimated by the torque-gradient estimating means 12 is smaller than a reference value G (step 350). This reference value G is determined from a value representing the friction torque gradient with respect to the slip speed which is decided to be suitable for use in commencing the excitation of the braking force.

If the friction torque gradient is smaller than the reference value G (YES in step 350), the micro-braking-force excitation instruction computation section 252 issues an instruction for excitation. Upon receipt of this instruction, the brake valve driver 260 excites the braking force in a very small amount at the resonance frequency $f_1$ of the wheel speed (step 352).

If the micro-gain $g_d$ is greater than the reference value $g_s$ (YES in step 354); namely, if the value $\omega_d$ detected when the braking force is excited by the micro-braking-force-excitation amplitude instruction signal $P_v$ is greater than a reference value $g_s P_v$ (where $\omega_d$ is a rotational speed and its unit is [rad/s], $P_v$ is pressure or torque and its unit is [Pa] or [Nm]), a mean braking force $P_m$ is maintained by assuming that the tire is gripping as explained in FIG. 28 (step 358). To the contrary, if the micro-gain $g_d$ is smaller than the reference value $g_s$ (NO in step 354); i.e., if the value $\omega_d$ detected when the braking force is excited by the micro-braking-force-excitation amplitude instruction signal $P_v$ is smaller than the reference value $g_s P_v$, it means that the friction coefficient $\mu$ is approaching its peak value, so the mean braking force $P_m$ is reduced (step 356).

In step 350, if the friction torque gradient is maintained at a value less than the reference value G, control is effected so that the braking force follows the peak friction coefficient $\mu$ while the micro-excitation of the braking force is maintained. However, if the friction torque gradient exceeds the reference value G (NO in step 350), it is deemed that the vehicle is gripping while the braking force is distant from the peak friction coefficient $\mu$, and the excitation of the braking force is stopped (step 360).

Figure 30A:
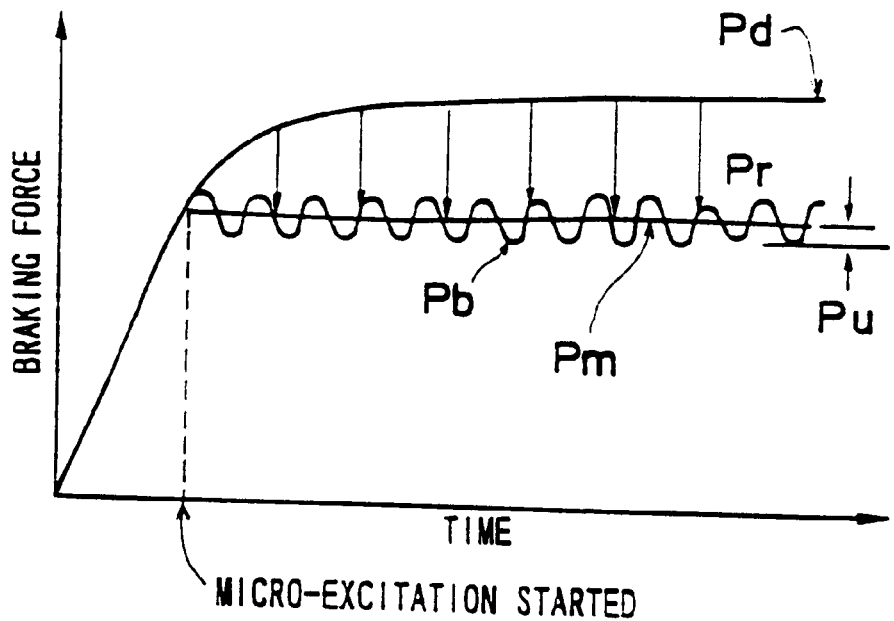

As shown in FIG. 30A, the mean braking force $P_m$ applied during the braking-force control operation shown in FIG. 27 is expressed by the following Formula:

$$P_m = P_d + P_r, \quad P_r \leq 0.$$

Since the braking-force reduction instruction $P_r$ is constantly negative, the mean braking force $P_m$ is not applied so as to exceed the braking force $P_d$ given by the driver. In this ABS control operation, if the friction coefficient $\mu$ reaches its peak value when the sum of the braking force given by the driver and the braking force vibrated in a very small amount is applied to the wheels, the mean braking force is reduced. Hence, the braking force is prevented from further increasing, thereby preventing tire locking.

Further, in the foregoing braking-force control operation, it is understood, as from FIG. 30A, that very small vibration components $P_v$ have already been superimposed on the braking force $P_b$ from the starting point for micro-excitation when YES in step 350.

Figure 30B:
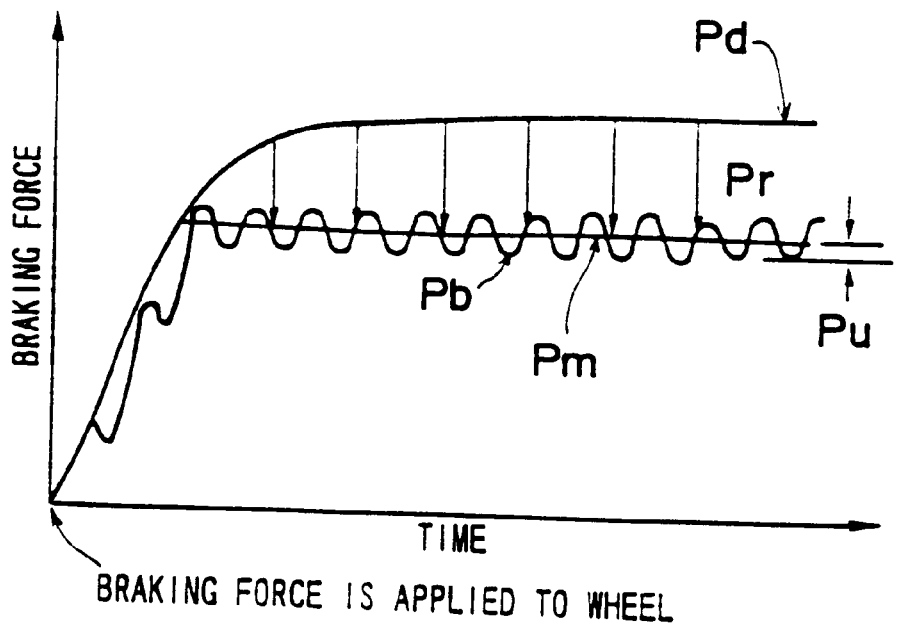

In contrast, as can be seen from the variations with time in the braking force of the ABS which employs the conventional micro-excitation method in FIG. 30B, the very small excitation components $P_v$ are superposed on the braking force $P_b$ from the point in time when the braking forces are applied to the wheels in response to the braking action of by the driver. If the braking force is excited in a very small amount immediately after the braking action as in the conventional ABS, the braking force needs to be excited for a comparatively longer period of time than in the second embodiment. In a case where ABS control is not needed even when the brake pedal is depressed, the micro-excitation of the braking force becomes useless.

In the second embodiment, since the braking force is excited in a very small amount from the starting point for control determined by the determination means 17 in accordance with the friction torque gradient, the braking force can be efficiently excited in a very small amount in a short period of time without deteriorating the accuracy of detection of the peak friction coefficient $\mu$.

The present invention is not limited to the foregoing illustrative embodiments. Although the present invention is applied to ABS and TRC as examples in the foregoing descriptions, the present invention can be applied to any fields other than ABS and TRC, in which motion of wheels is controlled so as to enter a predetermined state of motion.

Although the control start determination device of the present invention is applied, as an example, to the technique of effecting TRC utilizing the regulation of the degree of opening of the sub-throttle valve and the regulation of the braking force, the present invention can be also applied to the technique of effecting TRC utilizing either the regulation of the degree of opening of the sub-throttle or the regulation of the braking force.

Further, the aforementioned embodiments can be applied to trains as well as to vehicles.

Experimental Examples of the Second Aspect:

FIGS. 31A to 34C show the results of experiments performed with regard to the determination of the start of ABS control through use of the control start determination device 5 disclosed in the foregoing embodiments, with respect to loose braking, harsh braking, and progressive braking, provided that the initial wheel speed is 50 rad/s. In this experiment, the reference value for the friction torque gradient k is set to 50. That is, the point in time when k<50 is determined as the point in time when ABS control is commenced by reducing the braking force. Since the experiment is intended only for determination of the starting point for control, actual ABS control is not effected.

Figure 31A:
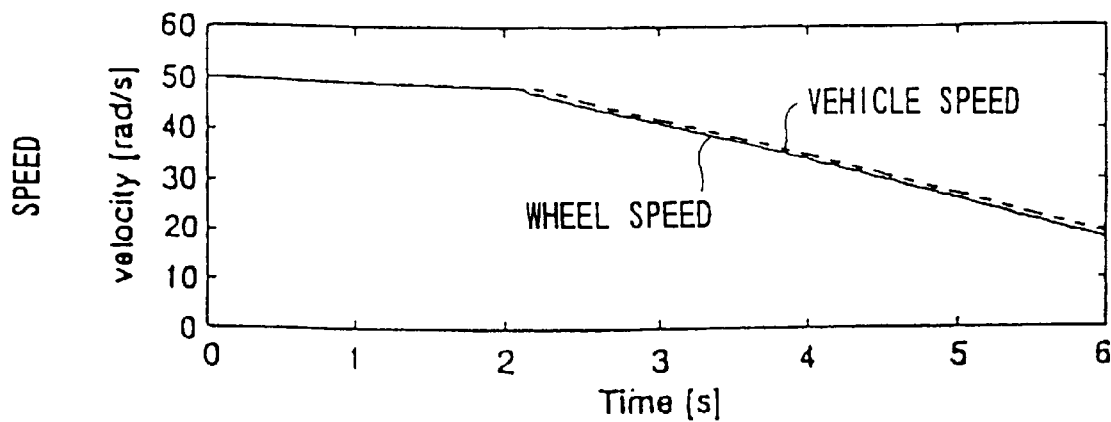
Figure 31B:
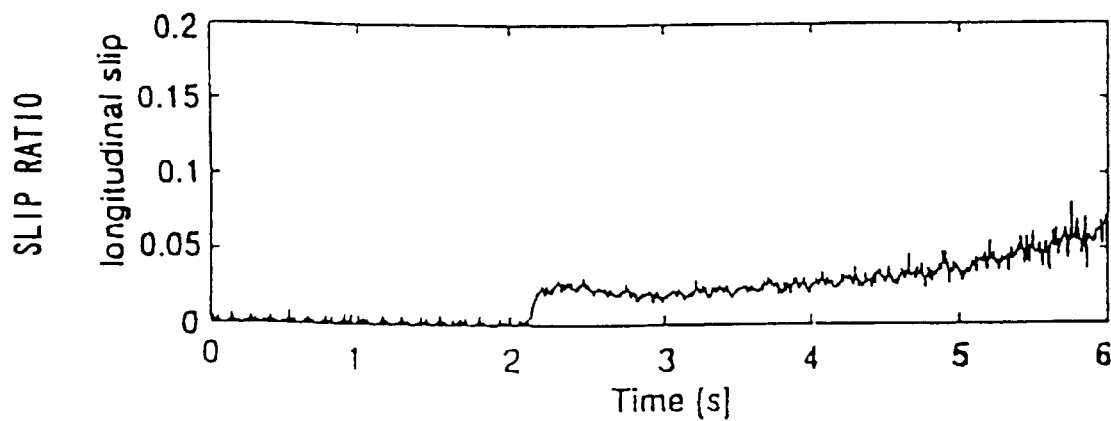
Figure 31C:
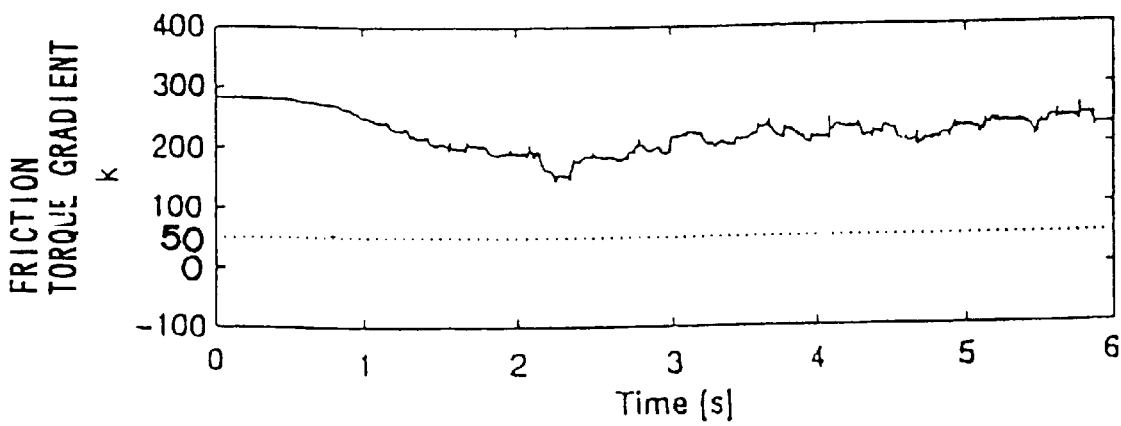

FIGS. 31A to 31C show variations with time in the wheel speed, the vehicle speed, the slip rate, and the friction torque gradient in the case where brakes are loosely applied such that wheel locking does not occur. In this case, even if there is a tendency for the slip rate to increase as a result of application of brakes after a lapse of 2 sec, the friction torque gradient reaches a minimum value of 150 in the vicinity of the point in time when brakes are applied and do not fall to a value less than the reference value of 50. Therefore, the start of ABS control is not determined in this case.

Figure 32A:
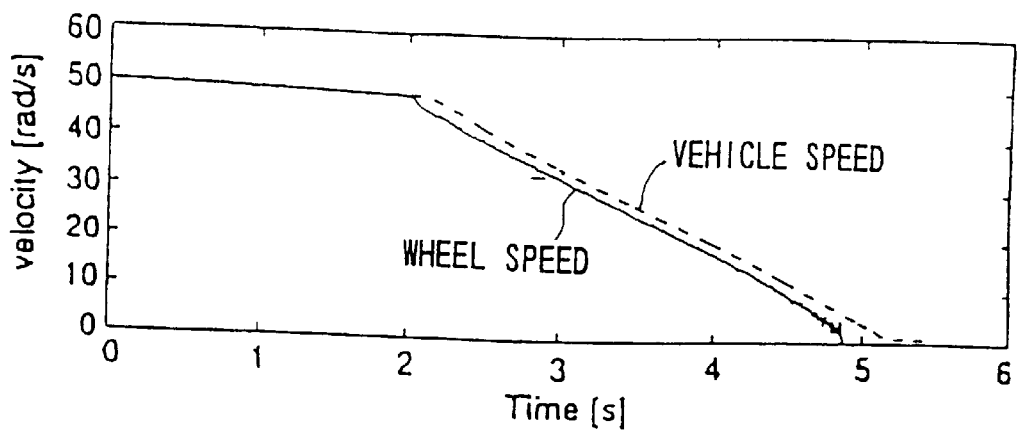
Figure 32B:
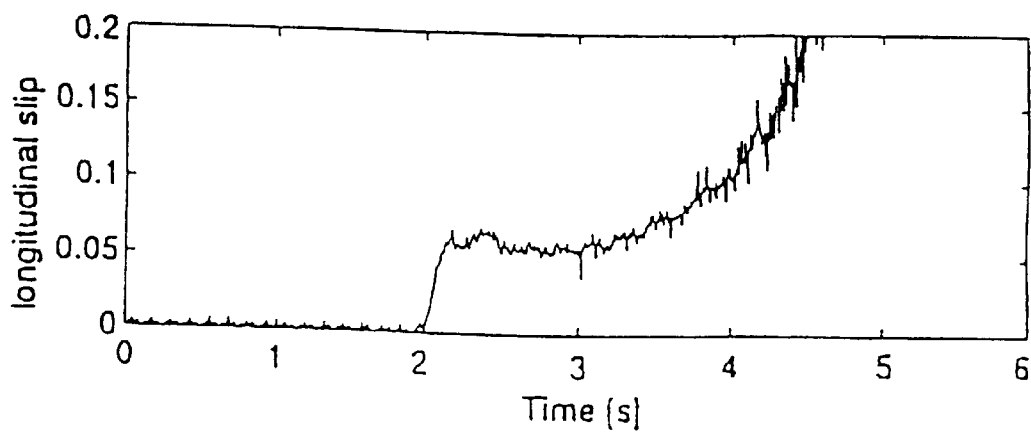
Figure 32C:
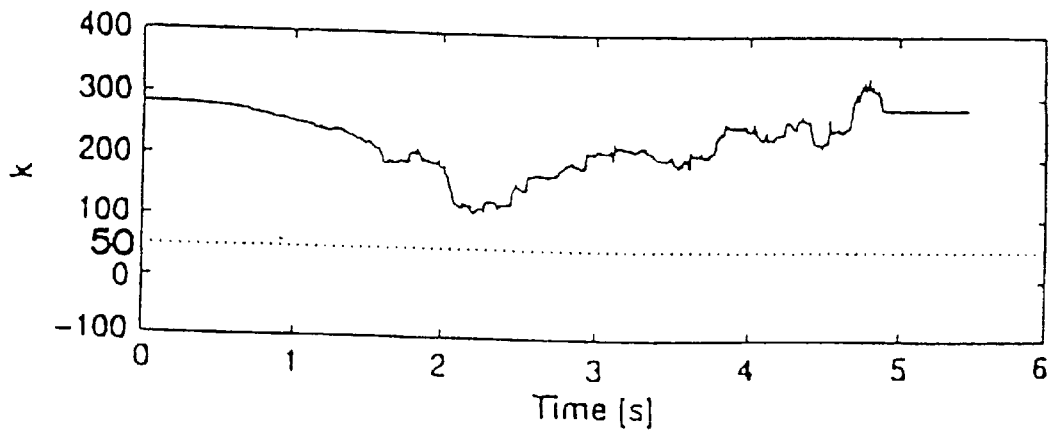

FIGS. 32A to 32C show variations with time in the wheel speed, the vehicle speed, the slip rate, and the braking torque gradient in the case where brakes are harshly applied such that wheel locking does not occur. In this case, even if there is a tendency for the slip rate to increase as a result of application of brakes which are harder than those in FIGS. 31A to 31C after a lapse of 2 sec, the friction torque gradient reaches a minimum value of about 110 in the vicinity of the point in time when brakes are applied and do not fall to a value less than the reference value of 50. Therefore, even in this case, the start of ABS control is not determined.

Figure 33A:
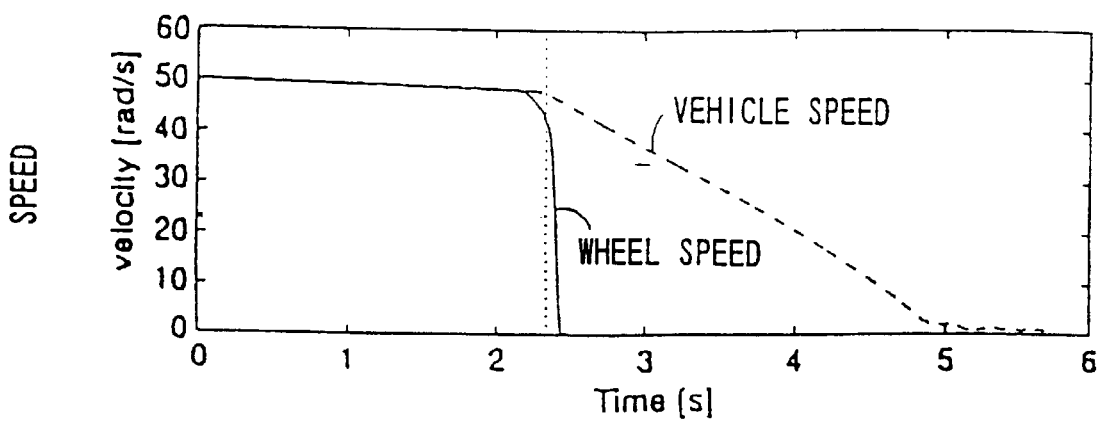
Figure 33B:
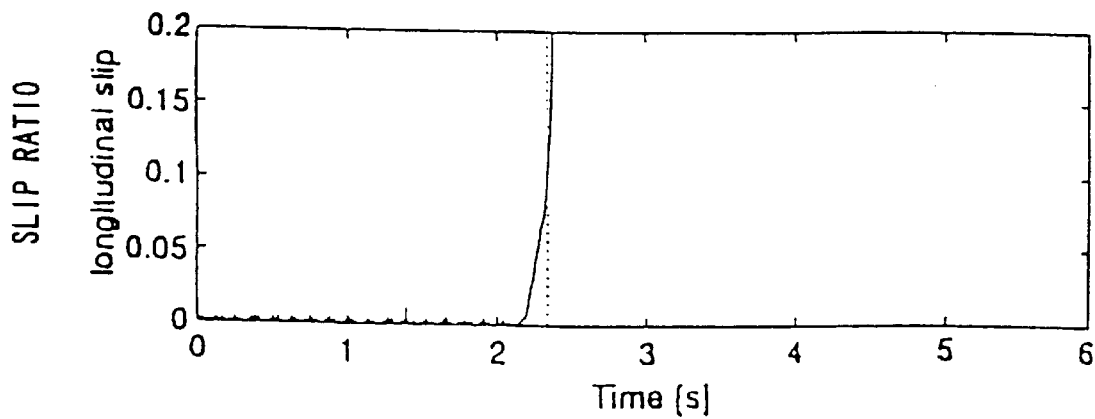
Figure 33C:
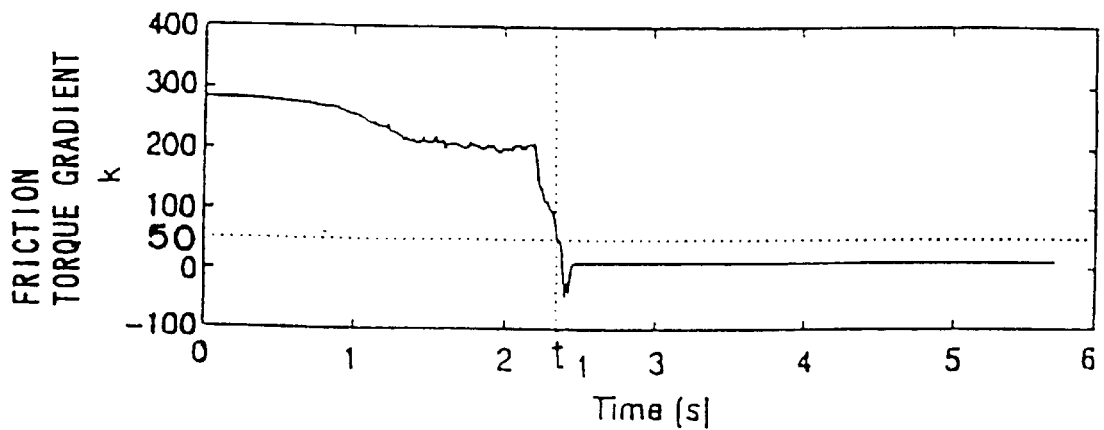

FIGS. 33A to 33C show variations with time in the wheel speed, the vehicle speed, the slip rate, and the friction torque gradient in the case where brakes are harshly applied such that wheel locking occurs. In this case, the difference between the wheel speed and the vehicle speed increases at time 2.2 sec at which harsh brakes are applied, and the slip rate sharply increases. The friction torque gradient abruptly drops from the point in time at which the slip rate sharply increases and falls to a value smaller than the reference value of 50 from time $t_1$. From FIGS. 33A to 33C, it is readily understood that wheel locking can be prevented even in a slip rate region where the wheels become locked, so long as, in practice, the braking forces are reduced from time $t_1$.

Figure 34A:
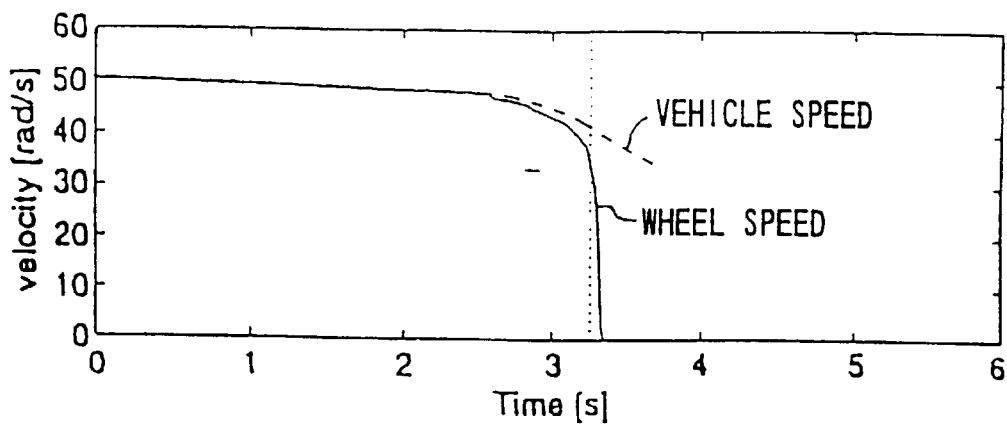
Figure 34B:
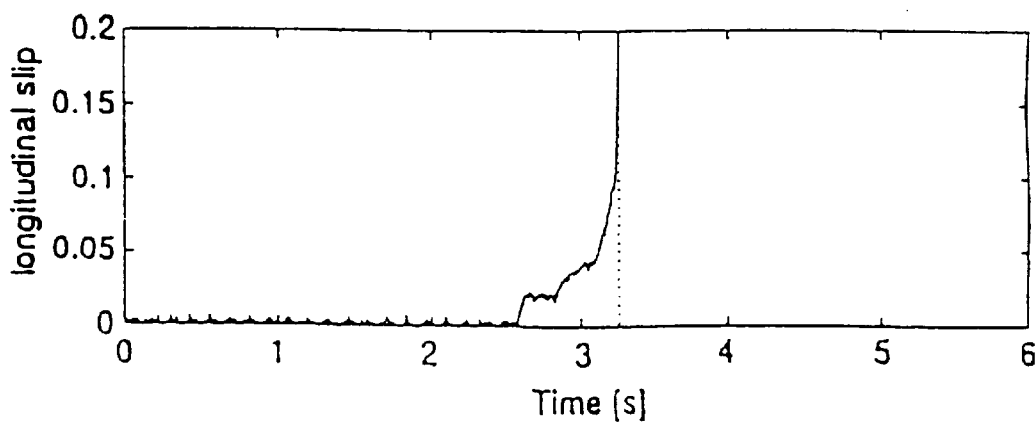
Figure 34C:
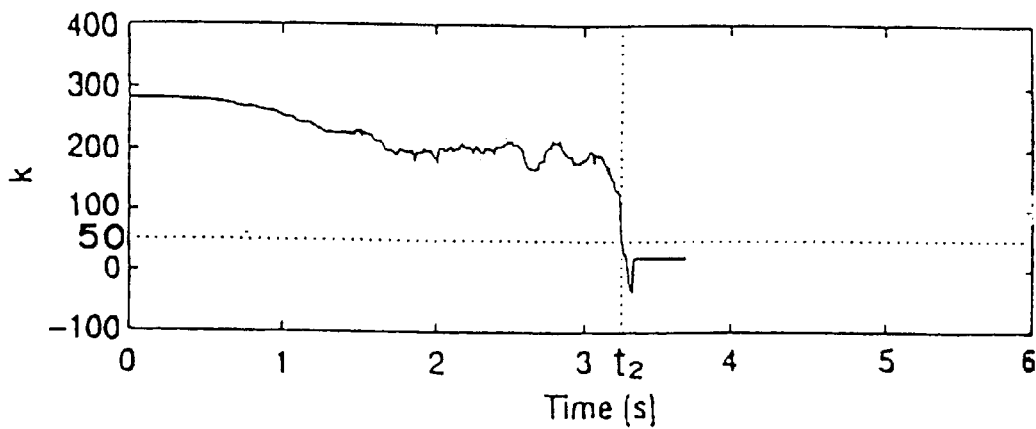

FIGS. 34A to 34C show variations with time in the wheel speed, the vehicle speed, the slip rate, and the friction torque gradient in the case where brakes are progressively applied so that wheel locking occurs. In this case, the slip rate gently increases after a lapse of 2.5 sec at which brakes are applied, and the slip rate sharply increases after a lapse of 3.2 sec. The friction torque gradient abruptly drops from the point in time at which the slip rate sharply increases and falls to a value smaller than the reference value of 50 from time $t_2$. From FIGS. 34A to 34C, it is readily understood that wheel locking can be prevented even in the slip rate region where the wheels become locked, so long as, in practice, the braking forces are reduced from time $t_2$.

The results of the experiments shown in FIGS. 31A to 34C show that the control start determination device 5 of the present embodiment correctly determines whether the wheel is locked or not by appropriately setting the reference value of the friction torque gradient, and correctly determines the starting point for ABS control immediately before wheel Locking.

FIGS. 35A to 37B show the results of the experiments performed on a road having a low friction coefficient $\mu$ and a road having a medium friction coefficient $\mu$ with regard to the comparison between the control start determination method of the control start determination device of the embodiment and the control start determination method which uses the conventional wheel deceleration method.

Figure 35A:
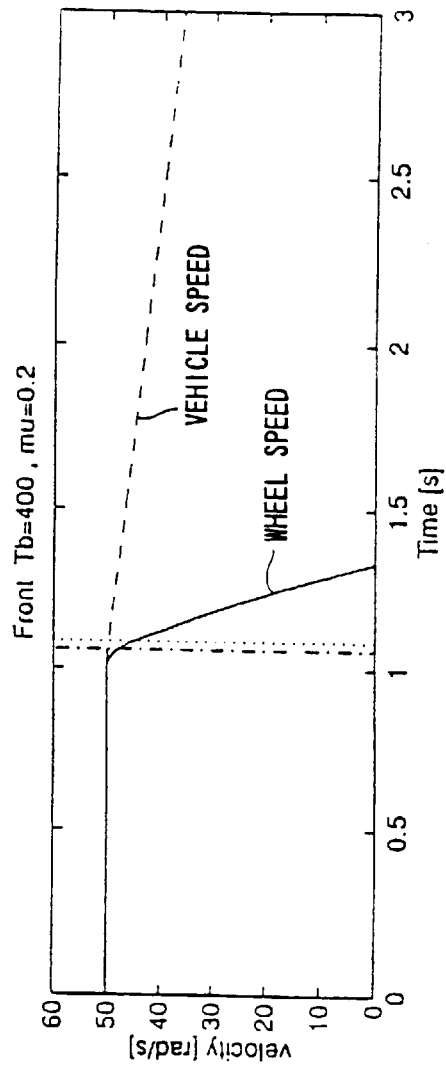
Figure 35B:
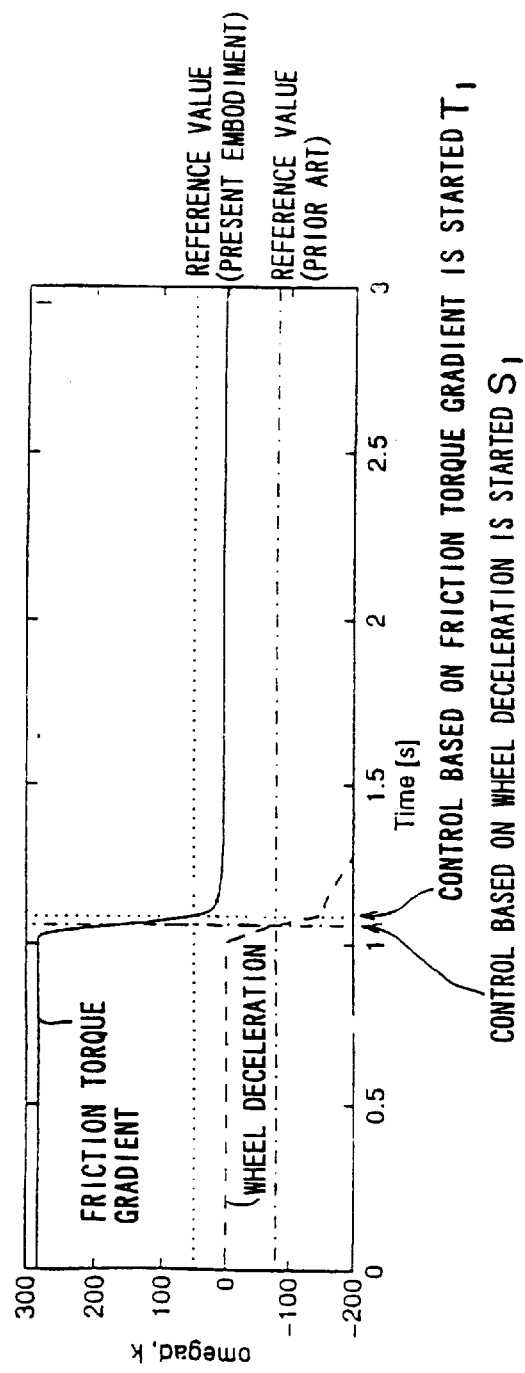

FIGS. 35A and 35B show the behavior of front wheels when a braking torque of $T_b$=400 Nm is applied stepwise on the road of low friction coefficient $\mu$. FIG. 35A shows variations with time in the wheel speed and the vehicle speed, and FIG. 35B shows variations with time in the friction torque gradient and the wheel deceleration.

As shown in FIG. 35A, the difference between the wheel speed and the vehicle speed (i.e., the slip speed) abruptly increases after a lapse of 1 sec. After this time, the wheel shifts to the region of slip speed where it may be locked. As the slip speed increases, the friction torque gradient and the wheel deceleration shown in FIG. 35B decrease. As shown in FIG. 35B, the friction torque gradient drops to a value smaller than the reference value (50) at time $T_1$, which lags behind time $S_1$ at which the wheel deceleration drops to a value smaller than the reference value. In the present embodiment, the ABS control is started at the time $T_1$. In the conventional technique, the ABS control is started at the time $S_1$.

As is evident from FIGS. 35A and 35B, the start of ABS is determined before the occurrence of wheel locking in the present embodiment and the conventional technique. However, it is understood that the starting point for deceleration of braking force is determined at an unnecessarily early point in time in the conventional method.

Figure 36A:
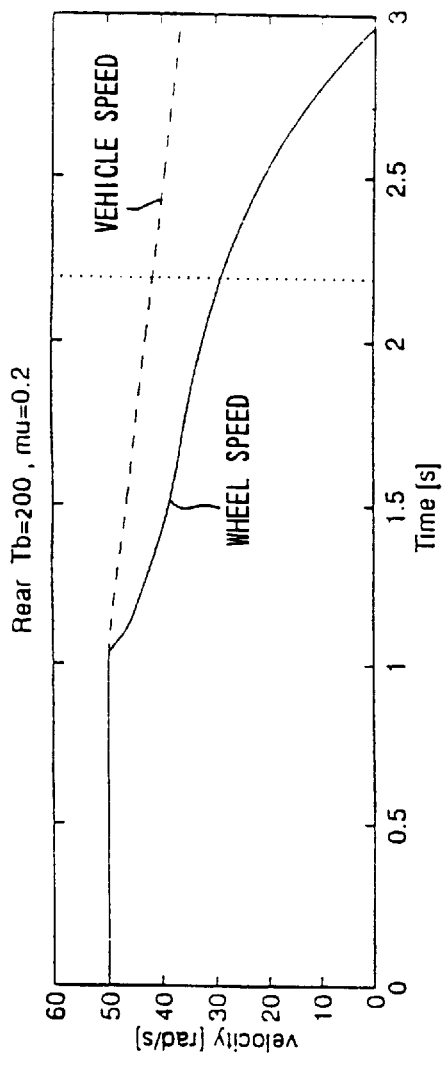
Figure 36B:
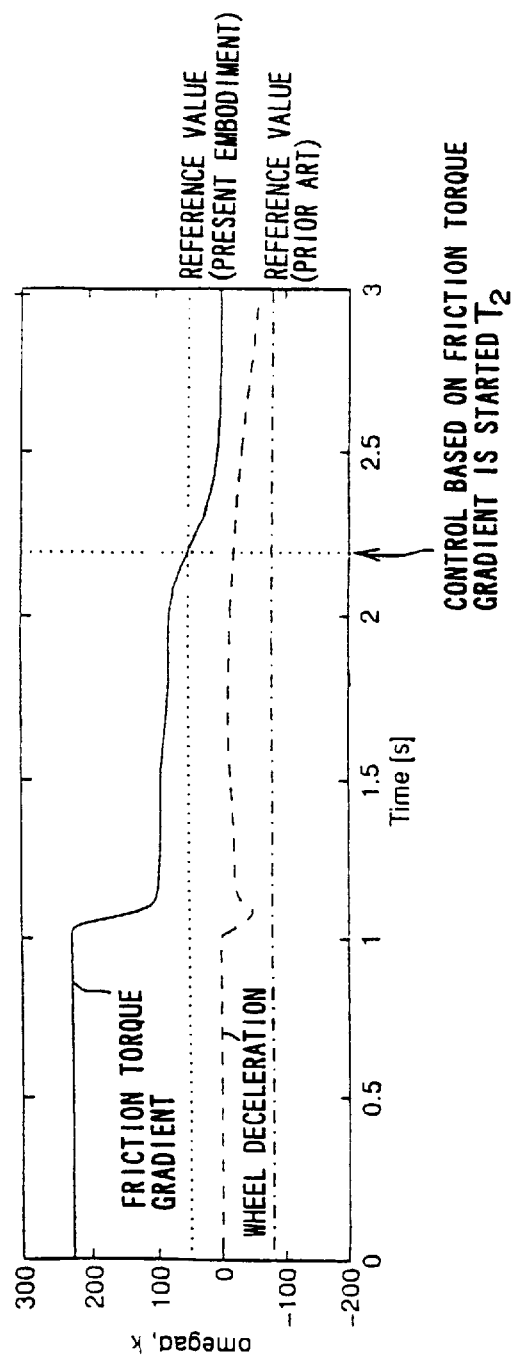

FIGS. 36A and 36B show the behavior of rear wheels when a braking torque of $T_b$=200 Nm is applied stepwise on the road of low friction coefficient $\mu$. FIG. 36A shows variations with time in the wheel speed and the vehicle speed, and FIG. 36B shows variations with time in the friction torque gradient and the wheel deceleration.

As shown in FIG. 36A, the difference between the wheel speed and the vehicle speed gradually increases after a lapse of 1 sec, and this difference (i.e., the slip speed) abruptly increases from the vicinity of 2.2 sec. That is, after time 2.2 sec, the wheel shifts to the region of slip speed in which it may be locked. The friction torque gradient drops to a value smaller than the reference value (50) at time $T_2$ at which the wheel shifts to the region of slip speed, but the wheel deceleration speed does not decrease to a value smaller than the reference value. It is seen that under the conditions shown in FIGS. 36A and 36B, the start of control is correctly determined in the present embodiment before the wheel becomes locked, but the starting point for control is not correctly determined by the conventional method.

Figure 37A:
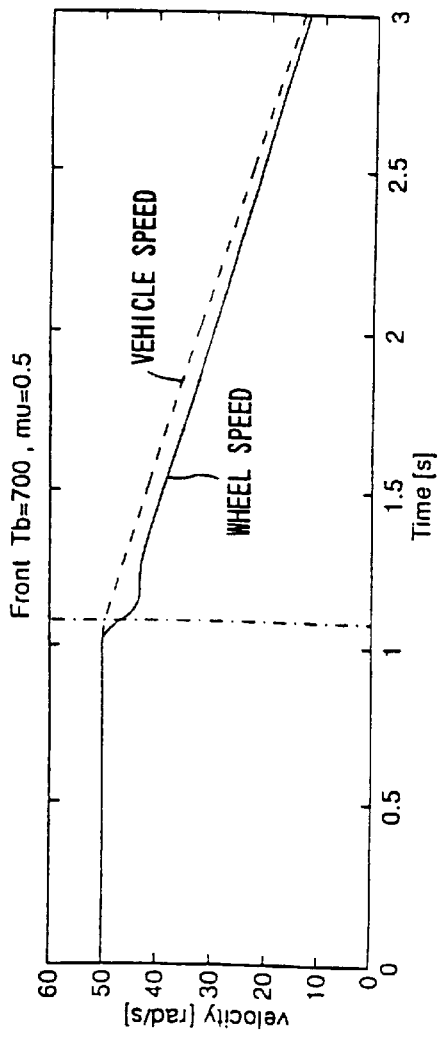
Figure 37B:
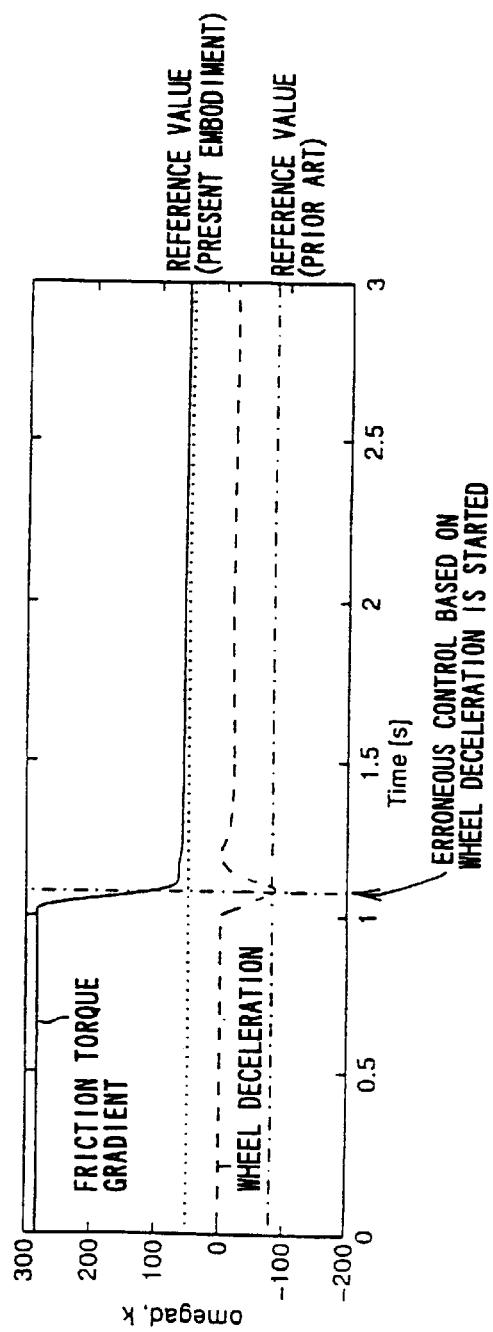
FIG. 37B shows variations with time in the friction torque gradient and the wheel deceleration.

FIGS. 37A and 37B show the behavior of front wheels when a braking torque of $T_b$=700 Nm is applied stepwise on the road of intermediate friction coefficient $\mu$. FIG. 37A shows variations with time in the wheel speed and the vehicle speed, and FIG. 37B shows variations with time in the friction torque gradient and the wheel deceleration.

As shown in FIG. 37A, there arises a difference between the wheel speed and the vehicle speed immediately after a lapse of 1 sec. After this, this difference (i.e., the slip speed) decreases. That is, there is no risk of wheel locking under these conditions.

As shown in FIG. 37B, the friction torque gradient still remains greater than the reference value (50) at the point in time when there arises a difference between the wheel speed and the vehicle speed. However, the wheel deceleration becomes smaller than the reference value at the point in time when there arises a difference between the wheel speed and the vehicle speed immediately after a lapse of 1 sec. That is, wheel locking does not occur under the conditions shown in FIGS. 37A and 37B. However, although it is correctly determined that there is no risk of wheel locking in the present embodiment, the determination as to the starting point for control has already been made by the conventional method.

The results of these experiments show that the starting point for control can be correctly and stably determined in the present embodiment regardless of the state of the road surface having a friction coefficient $\mu$ or the degree of braking action when compared with the conventional determination based on wheel deceleration. It goes without saying that the determination method of the present embodiment yields the same superior effects as those produced when applied to ordinary ABS control even when it is applied to TRC or ABS control which excites the braking force in a very small amount.

Third Aspect of the Invention

In reference to the accompanying drawings, an embodiment of an anti-lock brake controller in accordance with a third aspect of the present invention will be described in detail hereunder.

Figure 38:
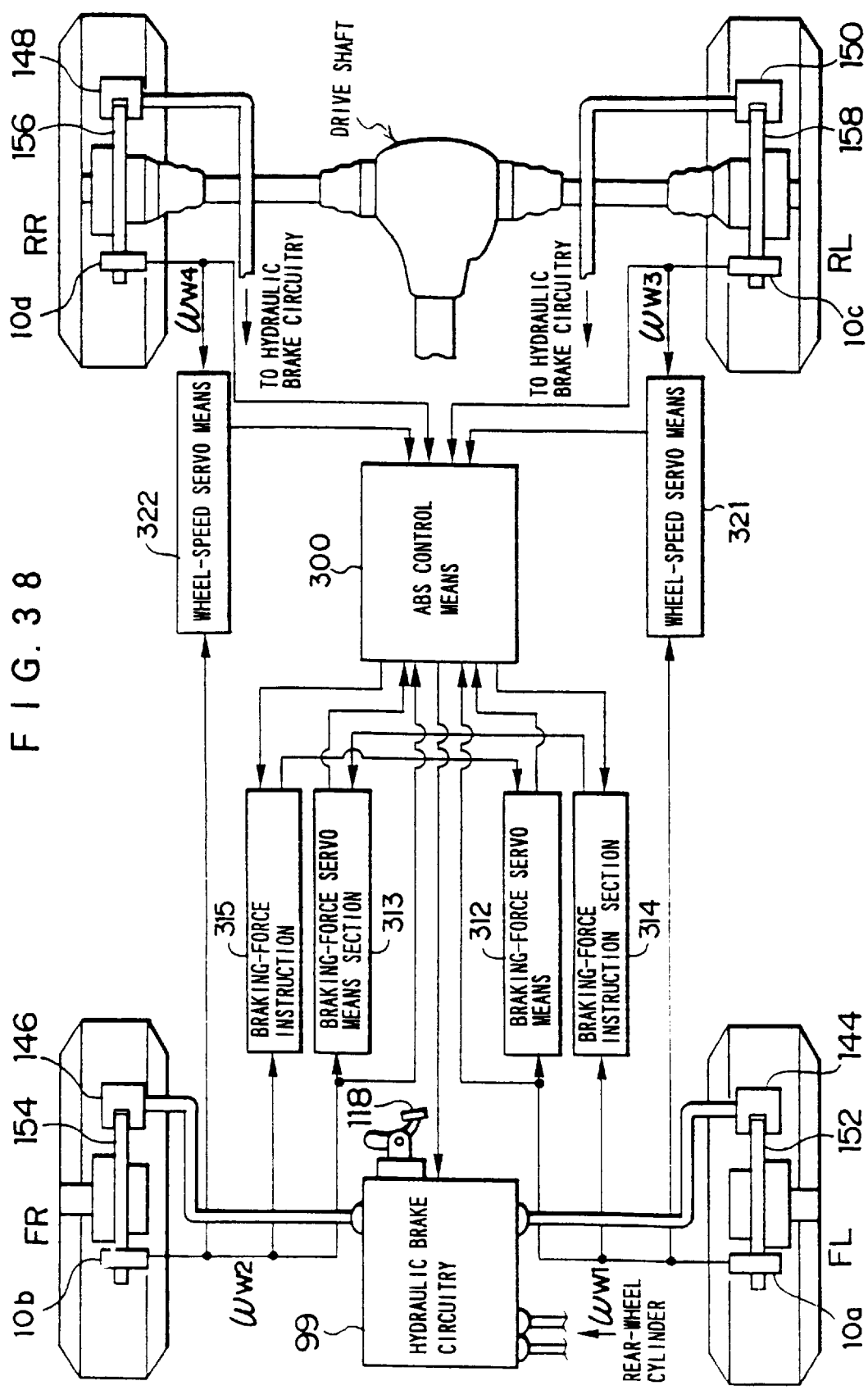
FIG. 38 is a schematic representation of the vehicle equipped with an ABS of an embodiment in accordance with a third aspect of the invention.

FIG. 38 schematically shows a vehicle equipped with an anti-lock brake controller in accordance with the third aspect of the present invention. As shown in FIG. 38, the vehicle of the embodiment is comprised of hydraulic brake circuitry 99 equipped with a brake pedal 118, and wheel-speed sensors 10a, 10b, 10c, 10d respectively fitted to the front-left wheel (FL), the front-right wheel (FR), the rear-left wheel (RL), the rear-right wheel (RR) for sensing the rotational speed (i.e., the wheel speed) of the wheels. Brake fluid lines connected to the hydraulic brake circuitry 99 are each connected to wheel cylinders 144, 146, 156, 158 which apply brake pressure to respective brake disks 152, 154, 156, 158.

The wheel-speed sensors 10a to 10d detect a physical quantity (such as pulse signals) corresponding to the wheel speed or the vehicle speed based on the rotational position of the wheel sensed by a position sensor such as a pulse encoder or a pulse generator. So-called instantaneous-speed observer method may be employed in place of the above-described conventional method. In the instantaneous-speed observer method, the value of the position sensor is read at certain time intervals, and the wheel speed is obtained by the difference between a currently-read value and a value read immediately before the current value.

As described in detail in the publication ("Instantaneous-speed Observer with High-order Disturbance Compensation Capability," Imano and Hori, Institute of Electrical Engineers, Proceedings D, Vol. 6, pg. 112, 1994), an observer (i.e., a status monitoring device) is formed on the basis of the dynamic model of a rotary body. Instantaneous speed is estimated from the duration of an interval between pulses through use of a position sensor. By means of this instantaneous-speed observer, instantaneous speed is measured even when no pulse is received from the position sensor. In the conventional method, a rotational position which is inherently a continuous quantity is detected in the form of discrete values specified by the resolving power of the position sensor, thereby resulting in time lag in the detected speed or quantize noise. The foregoing instantaneous-speed observer can prevent these problems.

The ABS of the present embodiment is further comprised of ABS control means 300 which primarily effects anti-lock brake control by controlling the hydraulic brake circuitry 99; a front-left-(FL)-wheel braking-force instruction section 314 and a front-right-(FR)-wheel braking-force instruction section 315 which estimate braking forces to be applied to the FR and FL wheels and output values corresponding to the thus-estimated braking forces in the form of instruction signals; a front-left-(FL)-wheel braking-force servo section 312 and a front-right-(FR)-wheel braking-force servo instruction section 313 which output control signals in order to cause the braking force to be applied to one front wheel to follow the braking force instructed by the braking-force instruction section of the other front wheel; and a rear-left-(RL) wheel-speed servo section 321 and a rear-right-(RR) wheel-speed servo instruction section 322 which output control signals in order to cause the wheel speeds of the RL and RR wheels to follow the respective wheel speeds of the FL and FR wheels.

Figure 40:
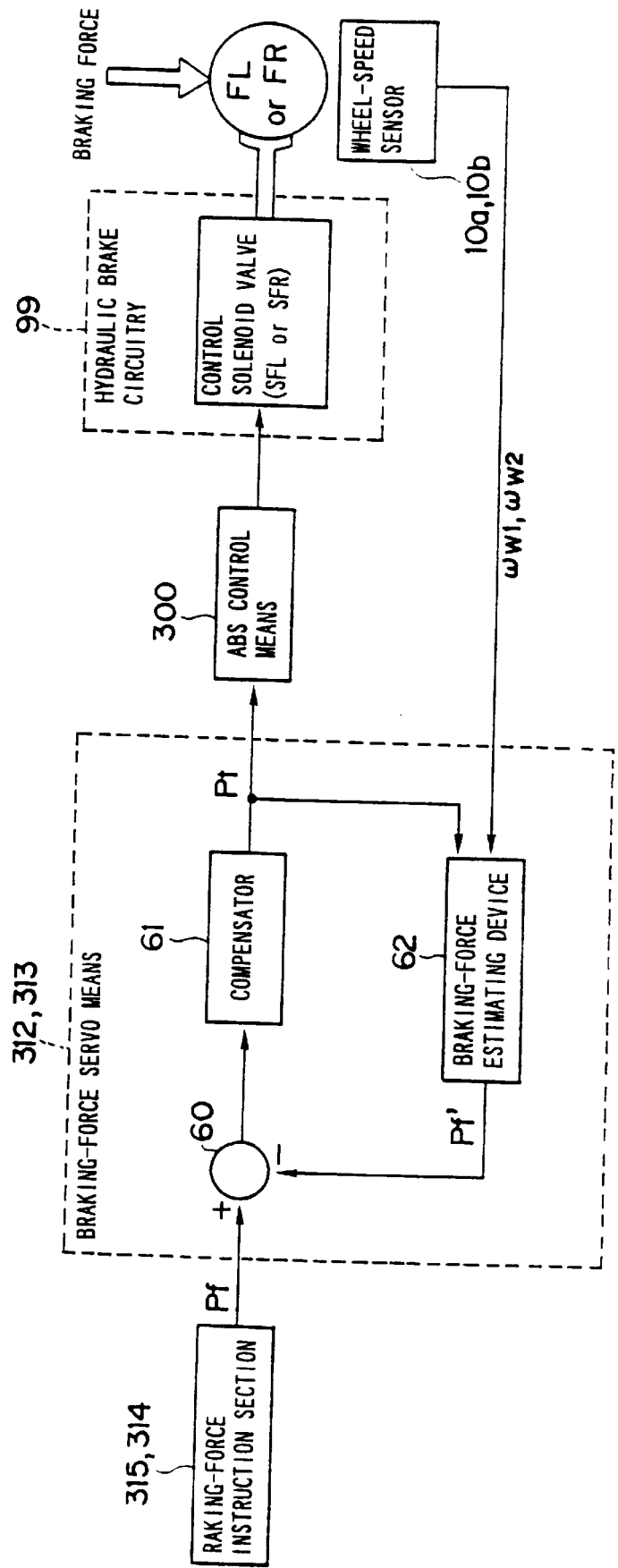
FIG. 40 is a block diagram showing the configuration of braking-force servo means according to the embodiment of the third aspect of the invention.

As shown in FIG. 40, braking-force servo means 312 and 313 are each comprised of a difference calculator 60 which calculates the difference between two input signals, a compensator 61 which calculates a torque instruction signal $P_t$ ($P_{t1}$, $P_{t2}$, where $_{t1}$ denotes the front left wheel, and $_{t2}$ denotes the front right wheel) to be output to the ABS control means 300 so as to reduce the calculated difference to zero, and a braking-force estimating device 62 for estimating a braking force $P_f'$ ($P_{f1}'$ and $P_{f2}'$) which acts on the front wheel (i.e., the front left wheel or the front right wheel) as a reaction from the road surface.

Braking-force instruction sections 315 and 314 are connected to the input terminals of the difference calculators 60 of the braking-force servo means 312 and 313 of the front wheels in such a way that the braking-force servo means of one front wheel is connected to the braking-force instruction section of the other front wheel. Further, output terminals of the braking-force estimating devices 62 are also connected to the input terminals of the different calculation sections 60. More specifically, each difference calculation section 60 calculates the difference $P_f - P_f'$ (i.e., $P_{f2} - P_{f1}'$, $P_{f1} - P_{f2}'$) between the braking force $P_f$ ($Pf_2$, $Pf_1$) estimated by the braking-force instruction sections 315, 314 of the opposite front wheels and the braking force estimated by the braking-force estimating device 62.

The output terminal of the compensator 61 is connected to ABS control means 300 and the braking-force estimating device 62. The input terminal of the braking-force estimating device 62 is connected to either the wheel-speed sensor 10a of the FL wheel or the wheel-speed sensor 10b of the FR wheel. More specifically, the braking-force estimating device 62 estimates the braking force acting on each front wheel from the torque value $P_t$ acting on each front wheel and the wheel speed $\omega_w$ of each front wheel in accordance with a dynamic model expressed by Eq. 55.

With the configuration in FIG. 40, the braking-force servo means 312 and 313 of the respective front wheels can carry out feed-back control (i.e., follow-up braking force control) so that the difference in braking force between one front wheel and the other front wheel becomes zero.

Figure 41:
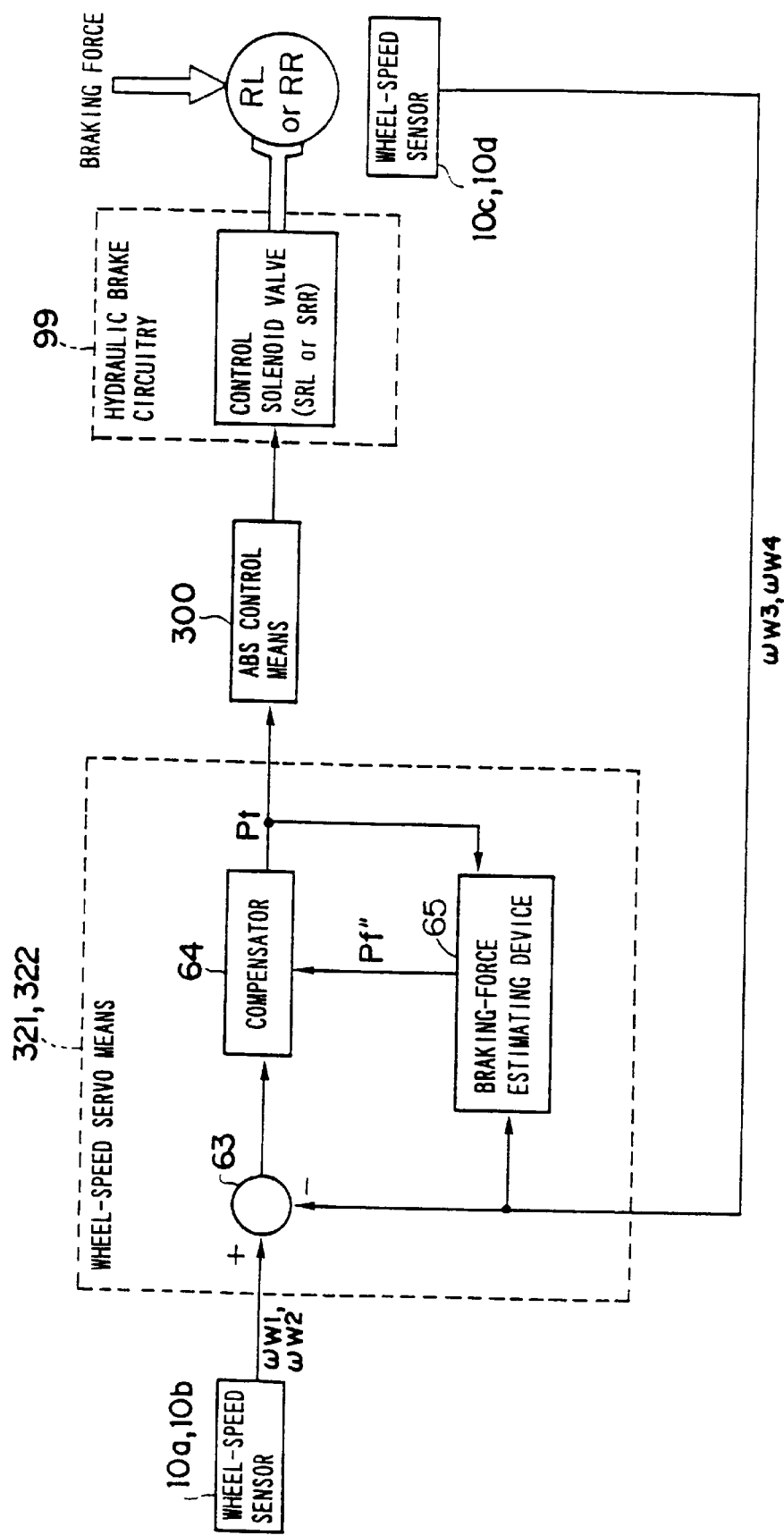
FIG. 41 is a block diagram showing the configuration of wheel-speed servo means according to the embodiment of the third aspect of the invention.

As shown in FIG. 41, wheel-speed servo means 321 and 322 are each comprised of a difference calculator 63 which calculates the difference between two input signals, a compensator 64 which calculates a torque instruction signal $P_t$ ($P_{t3}$, $P_{t4}$, where $_{t3}$ denotes the rear left wheel, and $_{t4}$ denotes the rear right wheel) to be output to the ABS control means 10 so as to reduce the calculated difference to zero, and a braking-force estimating device 65 for estimating a braking force $P_f''$ ($P_{f3}''$ and $P_{f4}''$) which acts on the rear wheel (i.e., the rear left wheel or the rear right wheel) as a reaction from the road surface.

Input terminals of the difference calculation sections 63 of the wheel-speed turbo means 321, 322 are connected to the rear wheel-sensor 10c, 10d of each rear wheel and the front wheel-sensor 10a, 10b of the corresponding front wheel on the same side. More specifically, the difference calculation sections 63 of the wheel-speed servo means 321 and 322 respectively calculate the difference ($\omega_{w1} - \omega_{w3}$) between the wheel speed $\omega_{w1}$ of the front left wheel and the wheel speed $\omega_{w3}$ of the rear left wheel and the difference ($\omega_{w2} - \omega_{w4}$) between the wheel speed $\omega_{w2}$ of the front right wheel and the wheel speed $\omega_{w4}$ of the rear right wheel.

The output terminal of the compensator 64 is connected to the ABS control means 300 and the braking-force estimating device 65. The output terminal of the braking force estimating device 65 is connected to the compensator 64. This braking-force estimating device 65 estimates the braking force acting on each rear wheel from the torque value $P_t$ acting on each rear wheel and the input instantaneous wheel speed $\omega_w$ of each rear wheel in accordance with a dynamic model of the wheel. The thus-estimated braking force is then input to the compensator 64. In accordance with the braking force estimated by the braking force estimating device 65, the compensator 64 calculates a torque instruction value which reduces the difference in wheel speed between the rear wheels to zero.

With the configuration in FIG. 41, the wheel-speed servo means 321 and 322 of the respective rear wheels can carry out feed-back control (i.e., follow-up braking force control) so that the difference in braking force between one front wheel and the corresponding rear wheel becomes zero.

In a case where the estimating means for estimating the braking forces (e.g., the braking-force estimating device and the braking-force instruction section) to be used in the ABS shown in FIGS. 39 to 41 estimate the braking force in accordance with discrete pulse signals reflecting the wheel speed, it is desirable to use means, such as the above-described instantaneous speed observer, for estimating instantaneous braking forces even during the time period over which there is not an input of pulse signals, through use of a dynamic model of a wheel. As a result, the deterioration of the control performance arising from quantize errors is prevented.

In reference to FIG. 39, the detailed configuration of the ABS control means 300 will be described.

As shown in FIG. 39, the ABS control means 300 is comprised of braking-force instruction sections 346 and 351 which convert the torque instruction signals $P_{t1}$ and $P_{t2}$ received from the braking-force servo means 312 and 313 into instruction signals to be sent to the control solenoid valves 134 and 132 which control the braking forces of the respective wheels. More specifically, the torque instruction signal sent from the braking-force servo means is converted into a pressure-increase- or pressure-reduction-time instruction signal used when the control solenoid valves to be described later are connected to a high-pressure or low-pressure source. The braking-force instruction sections 346 and 351 of the FL-wheel and the FR-wheel are connected to instruction changeover sections 349 and 354, respectively.

The ABS control means 300 also comprises braking-force instruction sections 355 and 356 which convert the torque instruction signals $P_{t3}$ and $P_{t4}$ received from the wheel-speed servo means 321 and 322 of the front wheels into instruction signals to be sent to the control solenoid valves 142 and 140 which control the braking forces to be applied to the rear wheels on the same side as those of the corresponding front wheels. That is, the torque instruction signal sent from the braking-force servo means is converted into a pressure-increase- or pressure-reduction-time instruction signal used when the control solenoid valves to be described later are connected to a high-pressure or low-pressure source.

This ABS control means 300 also comprises micro-excitation instruction sections 348 and 353. When the conditions to be satisfied to commence ABS control (i.e., ABS start conditions) are established, the micro-excitation instruction sections 348 and 353 send, to the control solenoid valves 134 and 132 of the front left and right wheels, micro-excitation instructions $P_{v1}$ and $P_{v2}$ regarding very small excitation at the resonance frequency $f_1$ of the vibration system composed of the road surface and the wheel. The ABS control means 300 is further provided with an FL-wheel amplitude detecting section 345 and an FR-wheel amplitude detecting section 350 for detecting amplitude values $\omega_{d1}$ and $\omega_{d2}$ of the very small excitation components of the resonance frequency $f_1$ included in the wheel speed caused by the very small excitation of the braking forces; and a FL-wheel braking-force-reduction instruction section 347 and a FR-wheel braking-force-reduction 352 for outputting braking-force reduction instructions $P_{r1}$ and $P_{r2}$ in order to reduce the braking forces when the micro-gains based on the amplitude values $\omega_{d1}$ and $\omega_{d2}$ become smaller than a predetermined value.

The amplitude detecting sections 345 and 350 having the elements and functions as shown in FIG. 14. The amplitude detecting sections 345 and 350 detect only the components of the resonance frequency $f_1$ of the wheel speed when the tire is gripping and convert the thus-detected components into DC signals to be output. Consequently, the $\omega_{d1}$ and $\omega_{d2}$ detected by the amplitude detecting sections 345 and 350 are amplitude values of the resonance frequency $f_1$ of the speeds of the front and right wheels.

The braking-force reduction instruction sections 347 and 352 are each comprised of: e.g., the computation section 269 which calculates the micro-gain $g_d$ ($g_{d1}$, $g_{d2}$), i.e., the ratio of the value $\omega_d$ ($\omega_{d1}$, $\omega_{d2}$) detected by the amplitude detecting sections 345 and 350 to the micro-braking-force-excitation amplitude instruction $P_v$ ($P_{v1}$, $P_{v2}$), as does the braking-force reduction instruction computation section 250 shown in FIG. 29; the PI controller 270 for calculating a reduced braking force by proportional-integral control through use of a difference, $g_d - g_s$, between the micro-gain $g_d$ and a reference value $g_s$, a proportional gain $G_{pr1}$, and an integral gain $G_{Ir1}$; and the positive-value-eliminating section 272 which adopts only negative values by eliminating positive values in order to prevent the braking force from being applied to such an extent as to exceed the braking force $P_d$ given by the driver and outputs the negative values in the form of a braking-force reduction instruction signal $P_r$ ($P_{r1}$, $P_{r2}$). The braking-force reduction instruction sections 347 and 352 may be formed as circuitry which increases or decreases the braking force so as to follow the peak friction coefficient $\mu$. With the foregoing circuit configuration, the instruction signal $P_r$ may include a braking-force increase instruction.

As shown in FIG. 39, the braking-force reduction instruction sections 47 and 52 are connected to the instruction changeover sections 349 and 354, respectively. An instruction signal $P_{b1}$ which is the sum of the braking-force reduction instruction $P_{r1}$ and the micro-excitation instruction $P_{v1}$, and an instruction signal $P_{b2}$ which is the sum of the braking-force reduction instruction $P_{r1}$ and the micro-excitation instruction $P_{v2}$ are input to the respective control solenoid valves 134 and 132 via the instruction changeover sections 349 and 354.

If the micro-gain $g_d$ is greater than the reference value $g_s$; namely, if the value $\omega_d$ detected when the braking force is excited by the micro-braking-force-excitation amplitude instruction signal $P_v$ is greater than a reference value $g_s P_v$ (where $\omega_d$ is a rotational speed and its unit is [rad/s], $P_v$ is pressure or torque and its unit is [Pa] or [Nm]), the braking-force reduction instruction sections 347 and 352 maintain a mean braking force $P_m$ by assuming that the tire is gripping. To the contrary, if the micro-gain $g_d$ is smaller than the reference value $g_s$; i.e., if the value $\omega_d$ detected when the braking force is excited by the micro-braking-force-excitation amplitude instruction signal $P_v$ is smaller than the reference value $g_s P_v$, it means that the friction coefficient $\mu$ has moved to the position immediately before the peak value, so the mean braking force $P_m$ is reduced (ABS control using very small excitation). The ABS may be arranged so as to effect stable braking action with the minimum braking distance by increasing the braking force so as to approach to the peak friction coefficient $\mu$ regardless of the driver's depressing force if the braking force has become distant from the peak friction coefficient $\mu$.

The instruction changeover sections 349 and 354 in FIG. 39 output either the instruction signals from the braking-force instruction sections 346 and 351 or addition-instruction signals $P_{b1}$ and $P_{b2}$ to the control solenoid valves 134 and 132. More specifically, in the ABS control mode, the front left and front right wheels are switched to either control in which the braking force of one front wheel follows the braking force of the other front wheel by the braking-force servo means 312 and 313 or the previously-described ABS control in which the braking force is excited in a very small amount. Here, it is prohibited that both front wheels are simultaneously brought into the braking-force follow-up control mode.

Each of the constituent elements of the ABS control means 300 is connected to a main control section 11 which controls and manages the overall ABS system. This main control section 11 is connected to a changeover solenoid valve of the hydraulic brake circuitry 99. In accordance with the ABS starting conditions, the main control section 11 switches the hydraulic brake circuitry 99 between the ABS mode or the non-ABS mode. Though not shown in the drawing, the main control section 11 is also connected to the wheel-speed sensors 10a, 10b, 10c, 10d and is capable of sensing the wheel deceleration or slip rate of each wheel in accordance with an input wheel speed.

The braking-force reduction instructions $P_{r1}$ and $P_{r2}$ of the braking-force reduction instruction sections 347 and 352 are input to the braking-force instruction sections 314 and 315. The braking-force instruction sections 314 and 315 sense the braking torque acting on the respective wheels in accordance with the received braking-force reduction instruction signals. In accordance with the dynamic model of the wheel (Eq. 55), the braking-force instruction sections 314 and 315 estimate the braking forces of the respective front wheels from the detected braking torque and the wheel speed. The thus-estimated braking forces are output to the front wheels in the form of instruction signals in such a way that the estimated braking force of one front wheel is sent to the other front wheel in the form of an instruction signal.

FIG. 9 shows an example of the configuration of the hydraulic brake circuitry 99.

With this configuration, the valves SFL, SFR, SRL, SRR regulate the ratio of the release time of the pressure-increase valve to the release time of the pressure-reduction valve in accordance with the instruction signals from the ABS control means 300. As a result, the braking force applied to each wheel cylinder can be controlled. To retain the braking force, each of the solenoid valves is controlled so as to close both the pressure-increase valve and the pressure-reduction valve. If the switching between the pressure-increase, pressure-reduction, and pressure-retaining operations is carried out at the same frequency as the resonance frequency $f_1$, the braking force can be excited in a very small amount.

With reference to a flowchart in FIG. 42, the processing of the ABS in accordance with the third aspect of the invention will be described.

Figure 42:
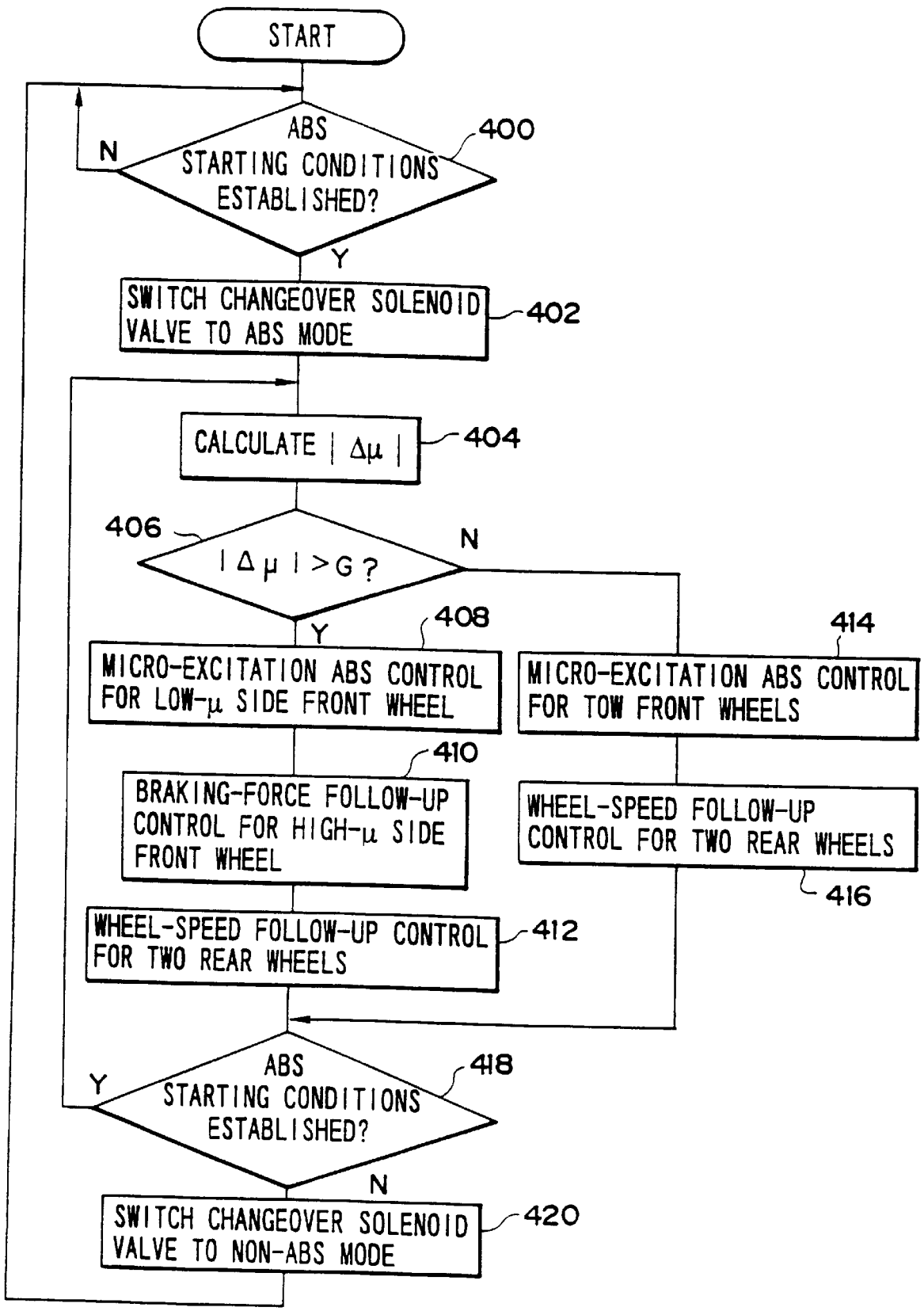
FIG. 42 is a flowchart showing the flow of the principal processing of the ABS of the embodiment of the third aspect of the invention.

First, as shown in the flowchart in FIG. 42, it is determined whether or not the ABS starting conditions are established (step 400). If the brake pedal 118 is depressed, and if the wheel deceleration is smaller than a predetermined negative value (−a), it is determined that the ABS starting conditions are established.

If the ABS starting conditions are established (YES in step 400), the changeover solenoid valves are switched to the ABS mode (step 402). In short, the ports of the valves SA1 and SA2 connected to the master-pressure line are closed, whereby the ports of the same connected to the valves SFL and SFR are opened. Further, the port of the valve SA3 connected to the master-pressure line 166 is opened, and whereas the port of the same connected to the booster line 168 is opened.

Figure 12:
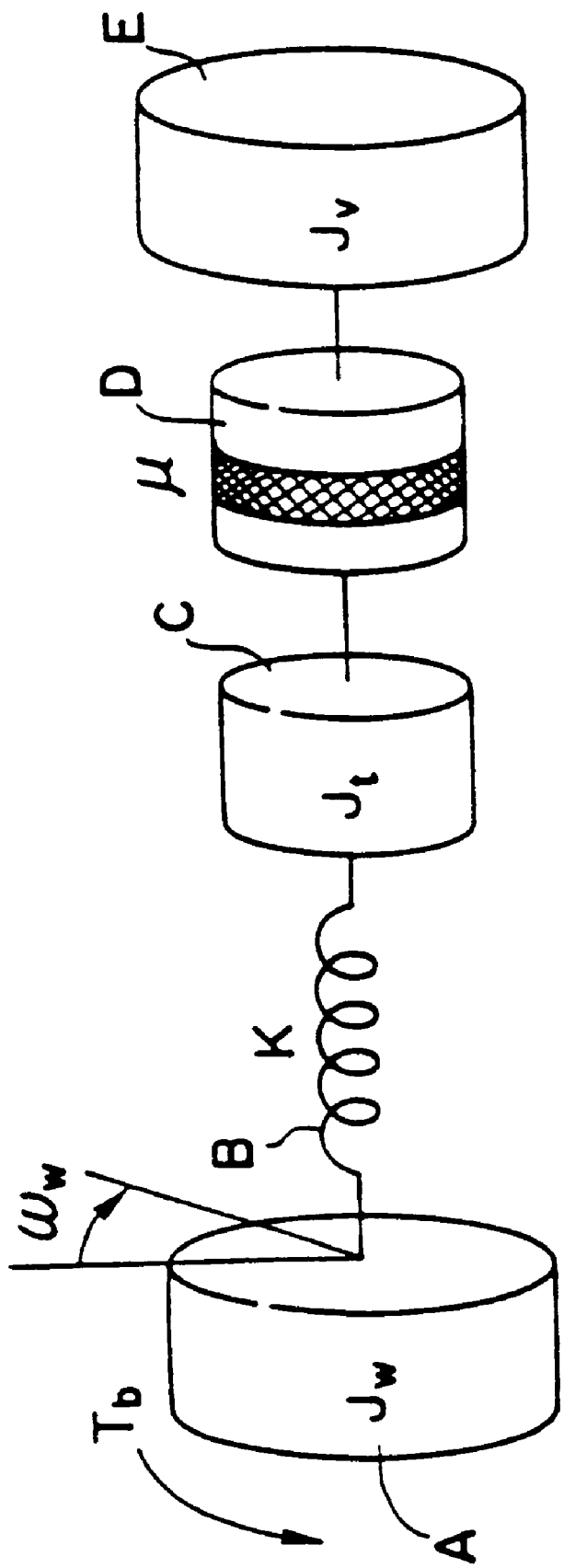
FIG. 12 is a diagram showing an equivalent model of a vibration system consisting of the wheel, the vehicle body and the road surface.
Figure 13:
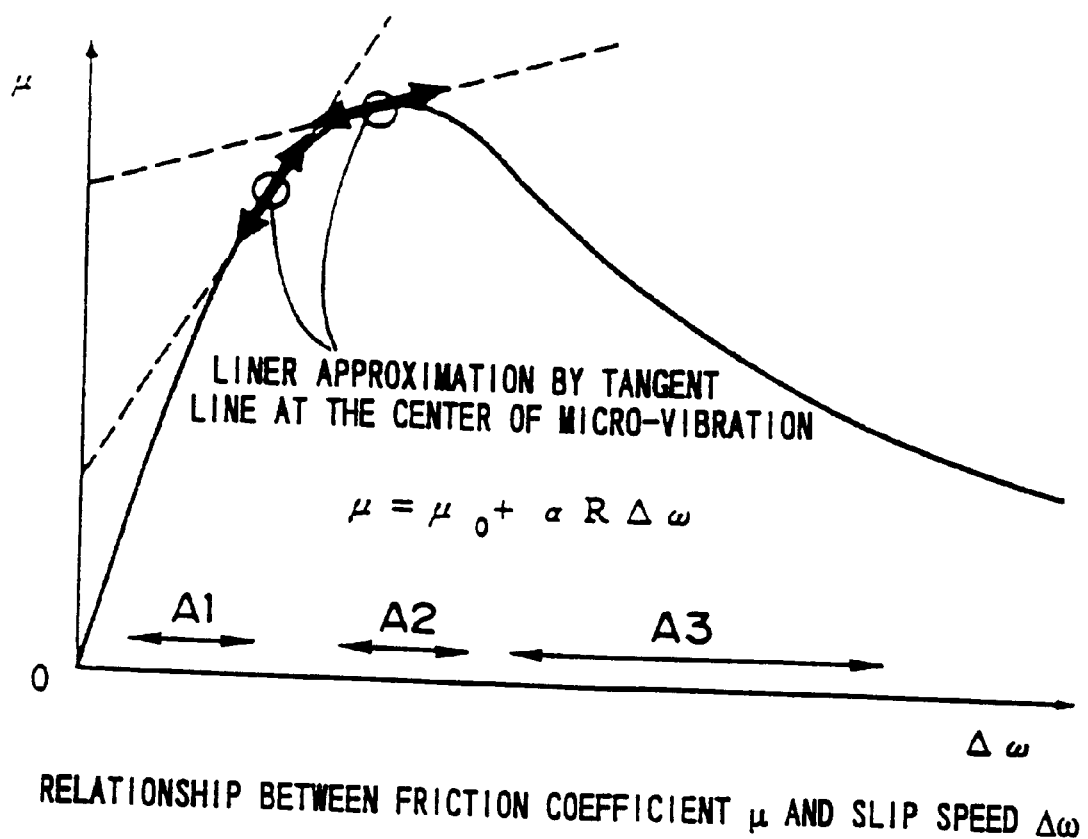
FIG. 13 is a graph showing the characteristics of variations in the friction coefficient $\mu$ with respect to the slip speed, in which the equivalence between micro-gains and the friction torque gradient is explained by the fact that variations in the friction coefficient $\mu$ in the vicinity of the center of minute vibration can be linearly approximated.

It is determined whether or not there is a difference between the friction coefficient $\mu$ of the left-side road surface portion and the friction coefficient $\mu$ of the right-side road surface portion in the direction in which the wheel rotates (step 404). In the present embodiment, the difference in friction coefficient $\mu$ between the left-side road surface portion and the right-side road surface portion is represented as $|\Delta\mu|(|\mu_1-\mu_2|;|$ $|$ denotes the absolute value). To obtain the friction coefficient $\mu$ of each of the right-side road surface portion and the left-side road surface portion, the value of the friction coefficient $\mu$ corresponding to the calculated slip rate on the basis of the relationship between the slip rate and the value of the friction coefficient $\mu$ shown in FIG. 12. Alternatively, the difference between the left-side road surface portion and the right-side road surface portion may be obtained with regard to the physical quantity associated with the value of the friction coefficient $\mu$ (such as the wheel deceleration, the slip rate, or the slip speed).

Subsequently, it is determined whether or not the difference in friction coefficient $\mu$ between the left-side road surface portion and the right-side road surface portion; i.e., $|\Delta\mu|$, or the difference between the physical quantities associated with the friction coefficient $\mu$, is greater than the reference value G (G>0) (step 406). The reference value G is previously obtained as the reference value for $|\Delta\mu|$ which would be determined to afford differing motion characteristics at the right and left road portions. In a case where the physical quantities associated with the friction coefficient $\mu$ are used, the reference value G will be determined for each of the physical quantities.

Figure 43:
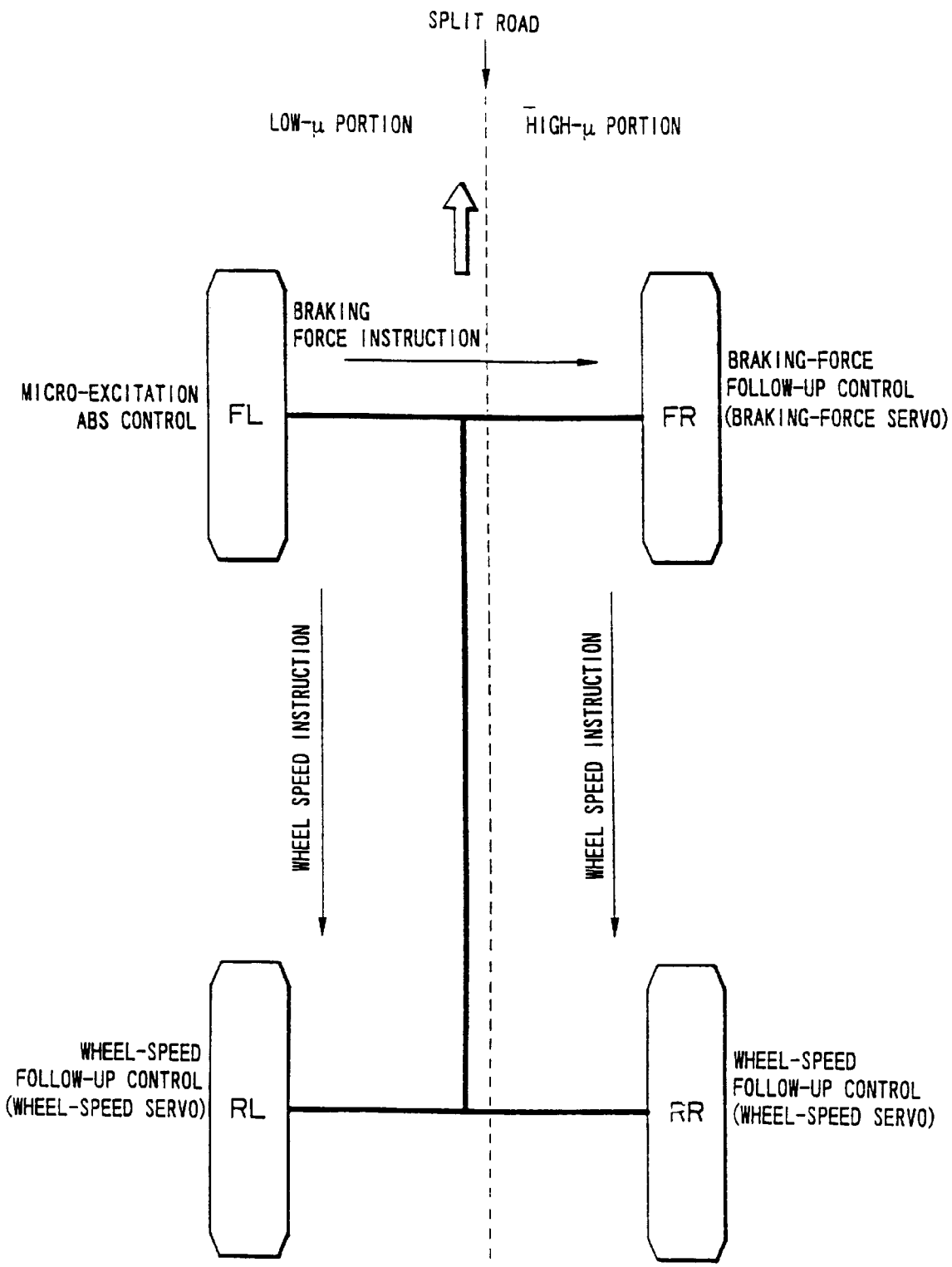
FIG. 43 is a schematic representation of the vehicle which travels on a split road under control of the ABS of the embodiment of the third aspect of the invention.
Figure 44:
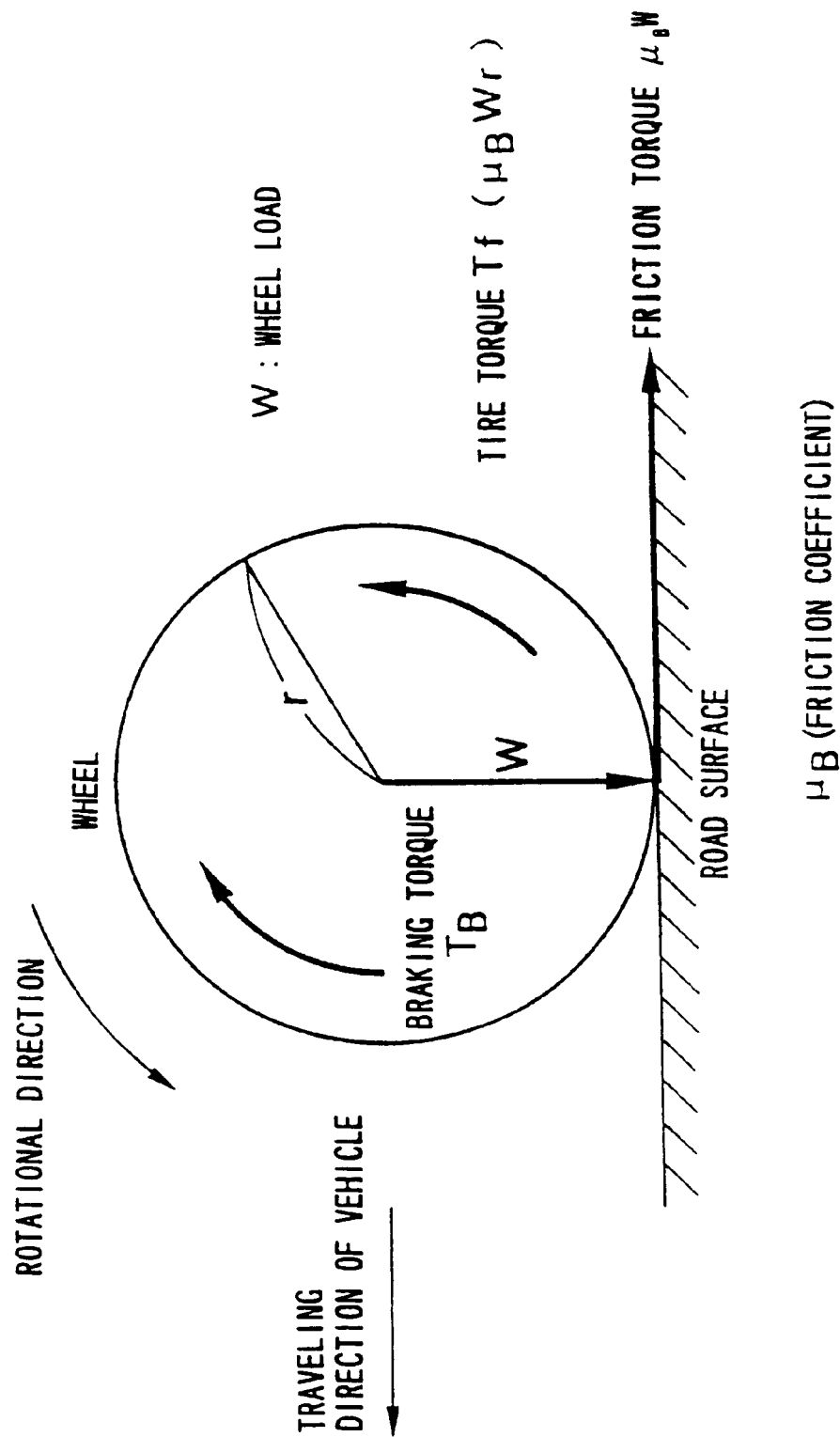
FIG. 44 is a schematic representation showing the dynamic model of the wheel.

If $|\Delta\mu|$ is greater than the reference value G (YES in step 406), ABS control is effected by exciting the braking force to be applied to the front wheel on the road having the low friction coefficient $\mu$ (i.e., a low-$\mu$ road) (step 408). For example, as shown in FIG. 43, in the case of a split road consisting of a left-side road portion having a low friction coefficient $\mu$ and a right-side road portion having a high friction coefficient $\mu$ (i.e., $\mu_1<\mu_2$), ABS control is effected by exciting the braking force to be applied to the left front wheel in a very small amount. At this time, the micro-excitation instruction section 348 in FIG. 39 outputs a micro-excitation instruction signal, and the instruction changeover section 349 in FIG. 39 switches the line to a line over which the instruction $P_{b1}$ is transmitted to the valve SFL. When the front left wheel shifts to a locked state, the value $\omega_d$ detected by the amplitude detecting section 345 is reduced. As a result, the braking-force reduction instruction section 347 outputs the braking-force reduction instruction signal, whereby the braking force is reduced, and the left front wheel is prevented from becoming locked.

As described above, the front wheel on the road surface having a low friction coefficient $\mu$ is excited in a very small amount by ABS control, and the braking force acting on the front wheel on the road surface having a high friction coefficient $\mu$ is controlled so as to follow the braking force acting on the front wheel on the road surface having a low friction coefficient $\mu$ (step 410). In the example shown in FIG. 43, the braking force acting on the right front wheel is controlled so as to follow the braking force acting on the left front wheel. At this time, the instruction changeover section 354 in FIG. 39 switches the torque instruction signal from the braking-force servo means 313 so as to be output to the valve SFR, whereby the braking-force instruction section 314 estimates the braking force acting on the left front wheel. The thus-estimated braking force is transmitted to the braking-force servo means 313 of the front right wheel in the form of a braking-force instruction. The braking-force servo means 313 of the front right wheel performs feed-back control so that the difference between the braking force acting on the left front wheel and the braking-force instruction received from the front right wheel becomes zero.

In this way, the braking force acting on the wheel on the road having a high friction coefficient $\mu$ is controlled so as to follow the braking force acting on the wheel on the road having a low friction coefficient $\mu$, the wheels can be reliably prevented from becoming locked without the micro-excitation ABS control. Further, even when the vehicle travels on the split road which affords differing coefficients of friction $\mu$ at the left-side and right-side road portions, the braking forces acting on the front wheels agree with each other, enabling prevention of vehicle instability.

Then, the wheel speeds of the rear wheels are controlled so as to follow the wheel speeds of the front wheels (step 412). In this case, the wheel speeds sensed by the wheel-speed sensors 10*a* and 10*b* of the front wheels are transmitted to the wheel-speed servo means 321 and 322 as the wheel-speed instructions. The wheel-speed servo means 321 and 322 perform feed-back control so as to reduce to zero the difference between the speeds of the rear wheels sensed by the rear wheel-speed sensors 10*c* and 10*d* and the wheel-speed instructions from the front wheels.

As described above, the speed of the left rear wheel agrees with the speed of the left front wheel, whereas the speed of the right rear wheel agrees with the speed of the right front wheel. Therefore, the front and rear wheels on the same side are controlled so as to have the same slip rate, whereby the front wheels and the rear wheels can be prevented from becoming locked. In this case, the rear wheels are not excited at all. Therefore, in a case where the rear wheels are drive wheels, interference is prevented which would otherwise be caused by transmission of very small excitation components between the rear wheels through a drive shaft.

In contrast, if $|\Delta\mu|$ i.e., the difference in friction coefficient $\mu$ between the left-side road portion and the right-side road portion, or the physical quantity associated with the friction coefficient $\mu$ obtained in step 404 is smaller than the reference value G (NO in step 406), ABS control is effected by exciting in a very small amount the braking forces acting on the front wheels (step 414). As in the case of step 412, the speeds of the rear wheels aare controlled so as to follow the speeds of the front wheels (step 416). If there is no difference in the friction coefficient $\mu$ between the left-side and right-side road portions, both of the front wheels are excited in a very small amount, and the braking force acting on one front wheel is not controlled so as to follow the braking force acting on the other front wheel. Even in this case, the wheels can be prevented from becoming locked, and interference between the right and left rear wheels can be prevented.

During the course of th e above-described control of each wheel, it is determined whether or not ABS starting conditions are established (step 418). If the conditions are established (YES in step 418), the processing then returns to step 404, and the similar processing is repeated. In contrast, if the ABS starting conditions are not established (NO in step 418), the changeover solenoid valves are switched to the non-ABS mode so that braking action can be effected under the ordinary master pressure. The processing then returns to step 400, and the ABS controller remains in a standby state until the ABS staring conditions are established.

It is also possible to employ the slip rate of the rear wheel to the front wheel as the reference value for wheel-speed follow-up control in place of the wheel speed as it is used in the present embodiment (i.e., slip-rate follow-up control). However, this method suffers the following problems in comparison with the wheel-speed follow-up control of the present embodiment.

① Calculation of the slip rate requires computation time and memory.
② The accuracy of computation becomes deteriorated as the speed of the wheel becomes slow, and hence the control performance becomes deteriorated at a low speed.

More specifically, the slip rate SP of the wheel speed VR of the rear wheel to the wheel speed VF of the front wheel is given by $$SP=(VR-VF)/VF=(VR/VF-1)$$

The wheel speed is usually calculated with a finite word length. For this reason, the result of computation of the wheel speed includes quantize errors, as well as observation errors due to the resolving power of the wheel-speed sensor. Given that the errors of the speeds of the front wheels are grouped together as $\Delta VF$ and the errors of the speeds of the rear wheels are grouped together as $\Delta VR$, the actual slip rate SP is given by $$SP = \frac{VR + \Delta VR}{VF + \Delta VF} - 1.$$

Assuming that $\Delta VF$ is sufficiently smaller than VF, the slip rate can be approximated as $$SP = \frac{VR + \Delta VR}{VF} \cdot \left(1 - \frac{\Delta VF}{VF}\right) - 1$$
$$= \frac{VR + \Delta VR}{VF} - \frac{\Delta VF(VR + \Delta VR)}{VF \cdot VF} - 1.$$

Accordingly, the result of computation of the slip rate includes errors as defined by $$\Delta SP = \frac{\Delta VR}{VF} - \frac{\Delta VF(VR + \Delta VR)}{VF \cdot VF}$$

From this equation, as the wheel speed becomes slow, the denominator of $\Delta SP$ becomes smaller, eventually resulting in an increase in $\Delta SP$. More specifically, the accuracy of computation of the slip rate at a low speed can be deteriorated.

In contrast, if the wheel speed is directly controlled as is in the wheel-speed follow-up control of the present embodiment, the foregoing problems associated with the slip-rate follow-up control can be prevented, enabling superior ABS control at a low speed.

Although the ABS of the present embodiment in accordance with the third aspect of the invention has been described above, the present invention is not limited to this illustrative embodiment. For example, the micro-excitation ABS control described in the embodiment is not limited to the example of control described above. The present invention can be applied to all the other types of ABS control in which the braking force is controlled so as to follow the peak friction coefficient $\mu$ by detecting variations in the oscillation characteristics of the speed of the wheel excited in a very small amount.

In the above-described embodiment, ABS control is effected by oscillating at least one of the two front wheels in a very small amount, and the rear wheels are controlled so that the speed of the rear wheels follow the speed of the front wheels. However, ABS control may be effected by exciting the rear wheels in a very small amount, and the front wheels are controlled so that the speed of the front wheels follows the speed of the rear wheels.

The method of determining the friction coefficient $\mu$ of each of the left-side and right-side road portions performed in step 404 in FIG. 42 is not limited to the foregoing example. It is also possible to excite the left and right wheels in a very small amount at a predetermined cycle and to calculate the difference in the friction coefficient $\mu$, or the difference in the physical quantities associated with the friction coefficient $\mu$, between the right-side and left-side portions, based on the difference between the right and left wheels in terms of resonant characteristic of the wheel speed.

The braking-force follow-up control and the wheel-speed follow-up control of the present embodiment can be individually executed. More specifically, if the difference in the friction coefficient $\mu$ between the left-side portion and right-side portion exceeds the reference value, ABS control may be effected by exciting in a very small amount the two wheels on the road portion having a low friction coefficient $\mu$, and the other pair of two wheels may be subjected to the braking-force follow-up control. Further, ABS control may be effected by exciting either the reference two wheels of the front or rear wheels, and the other two wheels may be subjected to the wheel-speed follow-up control.

Fourth Aspect of the Invention

Embodiments of the wheel-behavior-quantity servo control system in accordance with the fourth aspect of the present invention will be described in detail with reference to the accompanying drawings. This wheel-behavior-quantity servo control system is applied to vehicles and is arranged as a servo controller which can cause the friction torque to follow the maximum value by controlling the quantity of behavior of the vehicle so as to follow a target value.

[First Embodiment of the Fourth Aspect]

Figure 45:
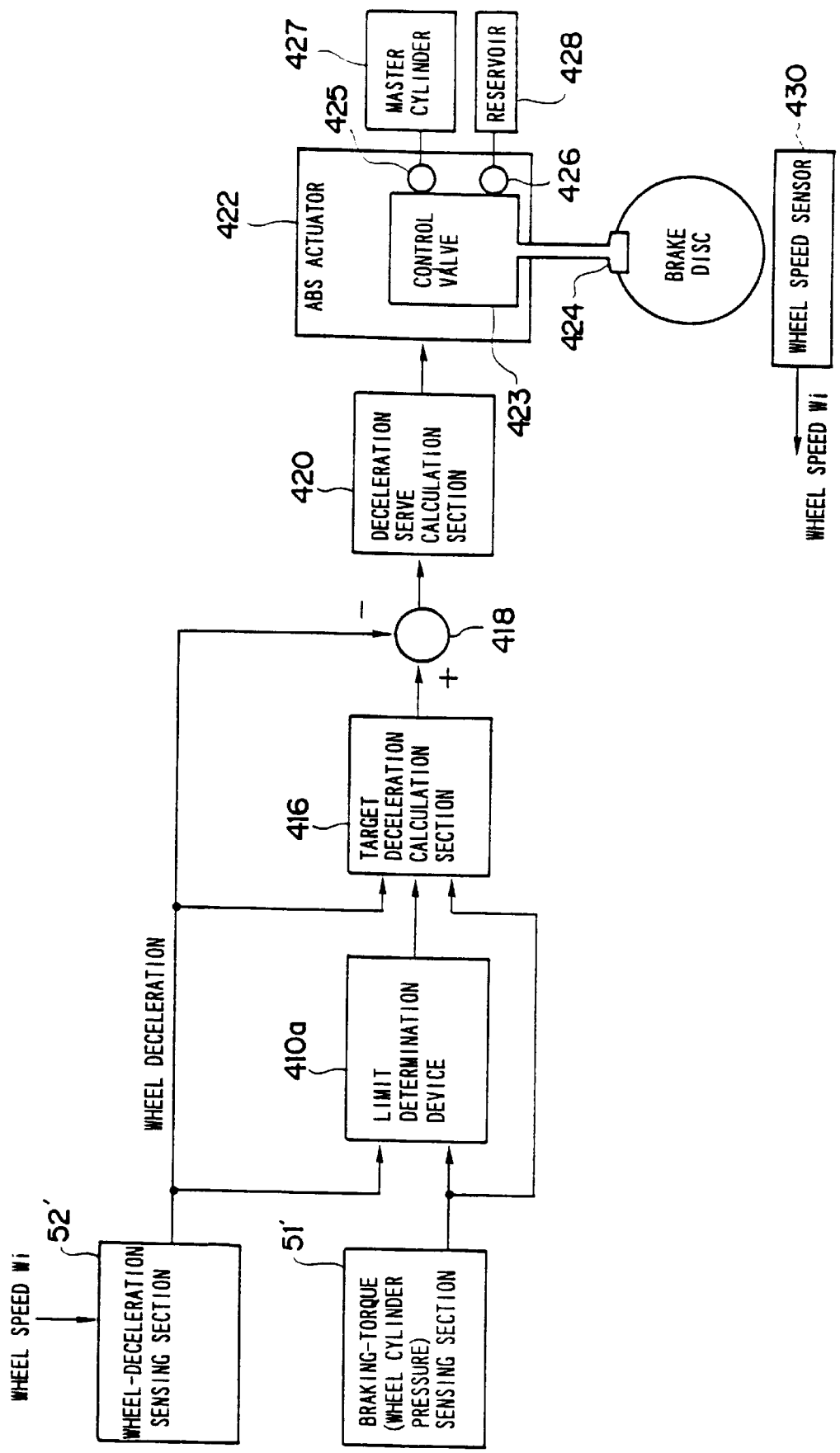
FIG. 45 is a block diagram showing the configuration of a wheel deceleration servo controller of a first embodiment in accordance with a fourth aspect of the present invention.

FIG. 45 is a block diagram showing the configuration of a wheel deceleration servo controller to which the wheel-behavior-quantity servo controller of the present invention is applied.

As shown in the drawing, the wheel deceleration servo controller of the first embodiment is comprised of a deceleration sensing section 52' for sensing the wheel deceleration from the speed of a wheel (hereinafter referred to as a wheel speed), a braking torque sensing section 51' for sensing the braking torque acting on the wheel, a limit determination device 410a for determining the limit of the characteristics of the friction torque between the wheel and the road surface in accordance with the thus-sensed wheel deceleration and the braking torque, a target deceleration calculation section 416 which sets an ordinary target value (i.e., target deceleration) of the wheel deceleration and changes the target deceleration used for causing the friction torque to follow the maximum value when the limit point is determined, a difference calculation device 418 which calculates a difference by subtracting detected wheel deceleration from the calculated target deceleration, a deceleration servo calculation section 420 for calculating the operation amount (i.e., the amount of ABS control operation) used for reducing the thus-calculated difference to zero, and an ABS actuator 422 for actuating the control valve 423 in order to attain the amount of ABS control operation calculated by the deceleration servo calculation section 420. These elements are controlled at given intervals by an unillustrated control section every control step.

Of these elements, a control valve 423 of each wheel which constitutes the ABS actuator 422 is connected to a master cylinder 427 via a pressure-increase valve 425, as well as to a reservoir 428 which serves as a low-pressure source via a pressure-reduction valve 426. A wheel cylinder 424 of each wheel is connected to the control valve 423 for applying the brake pressure received via the control valve to the disc brake of each wheel. The ABS actuator 422 opens or closes the pressure-increase valve 425 and the pressure-reduction valve 426 in accordance with the amount of ABS operation.

When the control valve 423 is controlled so as to open only the pressure-increase valve 425, the oil pressure (i.e., the pressure in the wheel cylinder) in the wheel cylinder 424 is increased to the same level as the oil pressure in a master cylinder 427 (i.e., the pressure in the master cylinder) which is proportional to the pressure corresponding to the depression of the pedal given by the driver. Conversely, if the control valve 423 is controlled so as to open only the pressure-reduction valve 426, the pressure in the wheel cylinder decreases to the same level as the pressure in the reservoir 428 under approximately atmospheric pressure (i.e., pressure in a reservoir). If the control valve 423 is controlled so as to close both valves 425 and 426, the pressure in the wheel cylinder is maintained.

The mean braking force (corresponding to the pressure in the wheel cylinder) to be applied to the brake disc by the wheel cylinder 424 is determined by the ratio between pressure-increase time during which high oil pressure is supplied from the master cylinder 427, pressure-reduction time during which low pressure oil is supplied from the reservoir 428, and retaining time during which supplied oil pressure is retained; by the pressure in the master cylinder sensed by the pressure sensor; and by the value of the pressure in the reservoir 428.

Accordingly, the ABS actuator 422 can produce braking torque (i.e., the pressure in the wheel cylinder) corresponding to the operation amount of the ABS by controlling the pressure-increase time or pressure-reduction time of the control valve 423 in accordance with the pressure in the master cylinder.

The wheel deceleration sensing section 52' can be implemented as a filter for deriving the wheel deceleration $y_i$ of the i-th wheel (i=1, 2, 3, 4 . . . ) by subjecting to the formula the wheel speed signal $\omega_i$ of the i-th wheel sensed by the wheel-speed sensor 430 attached to each wheel. However, this has already been described in the first aspect of the present invention, and hence its explanation will be omitted.

The braking torque sensing section 51' senses the pressure in the wheel cylinder of each wheel and calculates and outputs braking torque of each wheel by multiplying the sensed wheel cylinder pressure by a given constant.

The deceleration servo calculation section 420 can be implemented as so-called PI controller for calculating and outputting the amount of ABS operation which reduces the difference between the calculated target deceleration and the sensed wheel deceleration to zero; namely, the amount of ABS operation for each wheel in order to cause the wheel deceleration to follow the target deceleration.

The operation of the wheel deceleration servo controller of the first embodiment of the fourth aspect of the invention will be described.

Figure 50:
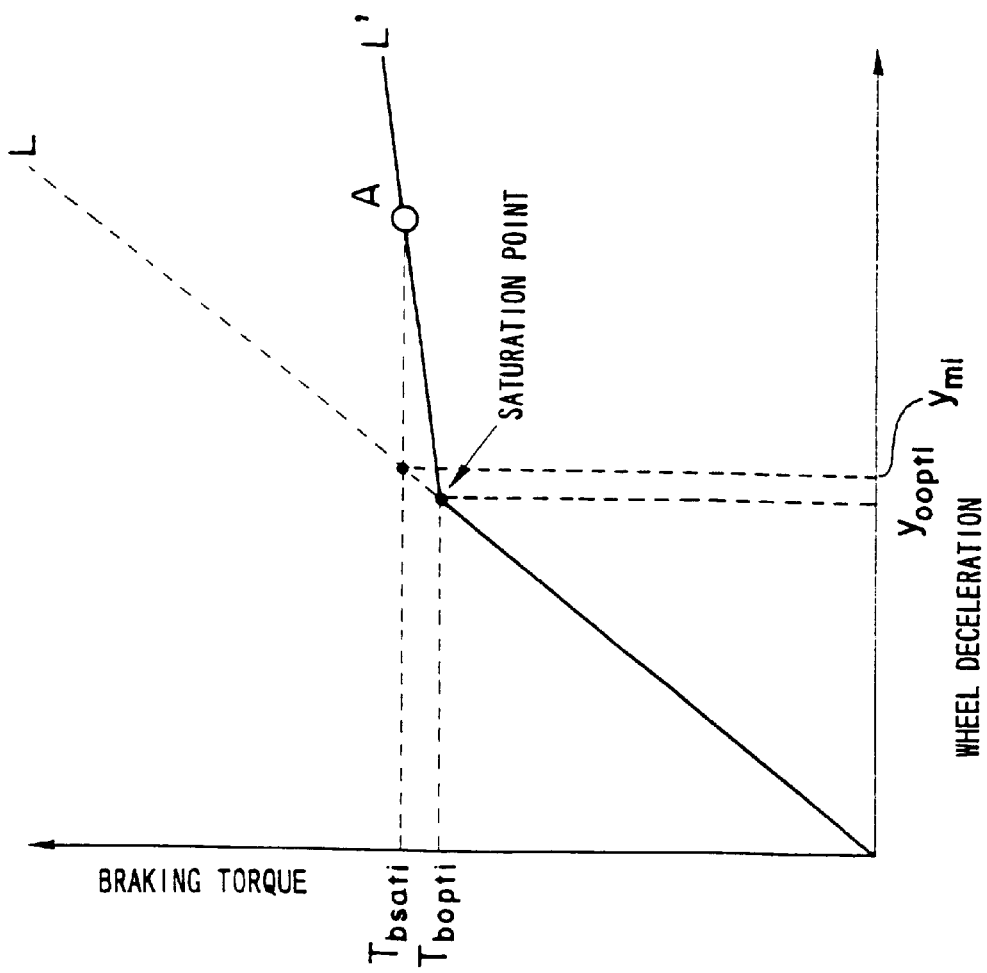
FIG. 50 is a graph showing the relationship between the wheel deceleration and the braking torque in a case where wheel deceleration servo control is implemented.

Assuming that a vehicle equipped with the wheel deceleration servo controller of the embodiment travels over the road surface having the characteristics of friction torque as shown in FIG. 50.

When it is determined that the wheel deceleration sensed by the wheel deceleration sensing section 52' exceeds the reference value (e.g., 40 rad/s$^2$), the limit determination device 410a determines whether or not the following Formula holds for each wheel.

$$y > y_0 \tag{63}$$

where "y" denotes the wheel deceleration at this point in time which was sensed by the wheel deceleration sensing section 52', and $y_0$ represents wheel deceleration obtained by substitution of the braking torque $T_{b0}$ sensed by the braking torque sensing section 51' into Equation (58) which is obtained by assuming that the slip speed is constant in the state of equilibrium while the wheel deceleration is approaching the target value.

In the case where Eq. (63) holds; namely, where Eq. (58) does not hold, the characteristics of the friction torque are beyond the saturation in FIG. 50, and hence the characteristics of the braking torque are determined to reach the limit. In contrast, in the case where Eq. (63) does not hold; namely, where Eq. (58) holds, the characteristics of the friction torque are determined to not to reach the limit (not beyond the saturation point in FIG. 50). The result of determination of the limit made for each wheel is output to the target deceleration calculation section 416.

Figure 49A:
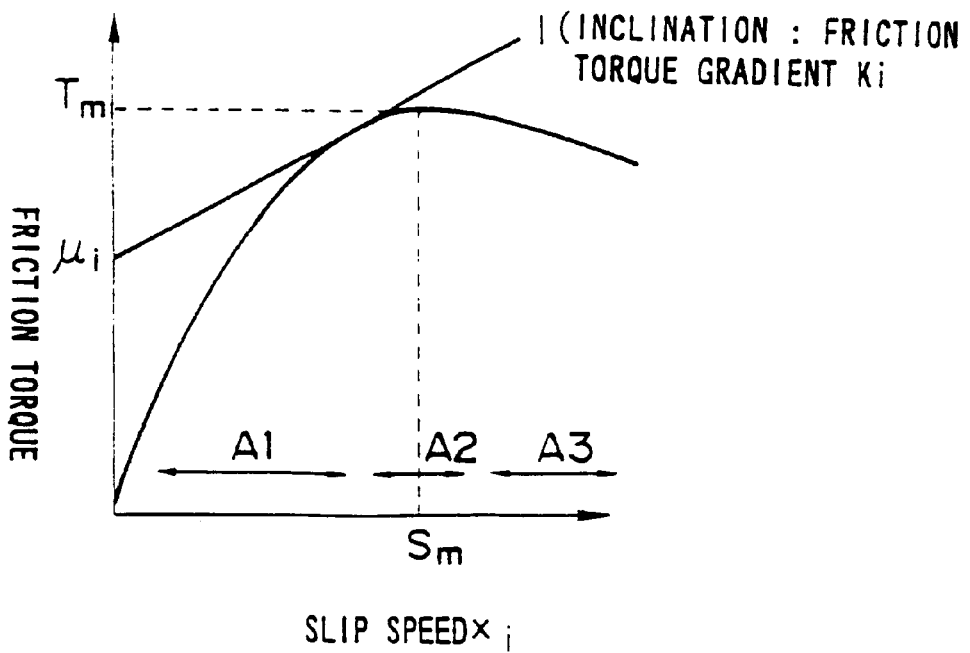
Figure 49B:
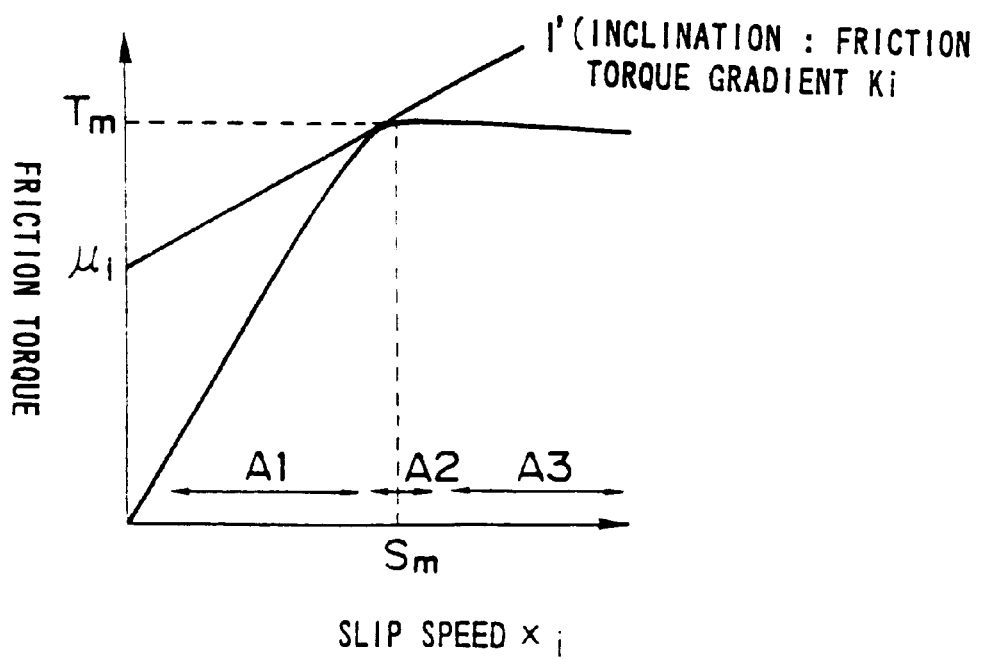

Variations in the characteristics of the friction torque before and after the saturation point in FIG. 50 also hold even in the case of the characteristics of friction torque shown in FIGS. 49A and 49B. Consequently, the limit of the characteristics of the braking torque can be determined with a high degree of accuracy by Eq. (63) regardless of the state of the road surface.

With regard to the wheels whose friction torque characteristics have been determined to become unsaturated by the limit determination device 410a, the target deceleration calculation section 416 calculates ordinary target deceleration corresponding to the pressure in the master cylinder which in turn corresponds to the operation amount of the driver (i.e., the amount of depression of the brake pedal). The result of such calculation is output as the target deceleration. For example, this target deceleration can be handled as wheel deceleration substantially proportional to the pressure in the master cylinder.

The deceleration servo calculation section 420 calculates the braking torque which reduces the difference between the sensed wheel deceleration and the target deceleration to zero. The ABS actuator 422 controls the pressure-increase time or the pressure-reduction time of the control valve 423 in such a way as to effect the braking torque. As a result of this target follow-up control, the deceleration is controlled so as to change in response to the pressure in the master cylinder which is equal to the amount of the driver's operation, enabling deceleration control responsive to the driver's action.

In contrast, if the limit determination device 410a determines that the characteristics of friction torque of at least one wheel (hereinafter referred to as the i-th wheel) are saturated, the target deceleration calculation section 416 calculates target deceleration to be set in the following manner.

Assuming that $T_{bsati}$ represents the friction torque of the i-th wheel actually detected at the point in time when it is determined that the characteristics of the friction torque reach the limit, and $y_{sati}$ represents the sensed deceleration of the i-th wheel, the characteristics of the braking torque at this point in time are represented by a point A in FIG. 50. It is seen that the deceleration $y_{sati}$ at the point A is greater than the wheel deceleration $y_{mi}$ (a dotted portion of the line L) obtained by substitution of the braking torque $T_{bsati}$ into Eq. (58), and therefore Eq. (63) holds.

The target deceleration calculation section 416 calculates the friction torque $F_{sati}$ of the i-th wheel at the point A as follows through use of Eq. (60).

$$F_{sati} = -J \cdot y_{sati} + T_{bsati} \tag{64}$$

The target deceleration $y_{0opti}$ of the i-th wheel in order to maintain the slip speed in the state of equlibrium ($d_{xi}/d_t=0$) with the calculated friction torque $F_{sati}$ is set as follows through use of Eq. (12)

$$y_{0opti} = \frac{1}{J}(A - I)F_{sati} \tag{65}$$

At this time, the braking torque $T_{bopti}$ of the i-th wheel is expressed by the following Formula.

$$T_{bopti} = A \cdot F_{sati} \tag{66}$$

For example, when setting the target deceleration $y_{0opti}$, the target deceleration calculation section 416 may be arranged so as to reduce the target deceleration at given intervals every control step until the braking torque agrees with $Tb_{opti}$ by subtracting a value corresponding to the difference between the sensed braking torque $T_{bsati}$ and $T_{bopti}$ obtained by Eq. (66) from the ordinary target deceleration corresponding to the pressure in the master cylinder at the present time. As a result, the target deceleration $y_{0opti}$ is finally set, whereby the deceleration of the i-th wheel follows the $y_{0opti}$. For the wheels that have been determined not to exceed the saturation point, the deceleration of the wheels follow ordinary target deceleration.

Although the point A in FIG. 50 is slightly beyond the saturation point, the friction torque is maintained substantially constant even when the torque is slightly beyond the saturation point (the point in the region A2 in FIGS. 49A and 49B) as shown in the characteristics of the braking torque in FIGS. 49A and 49B. Therefore, the friction torque $F_{sati}$ at the point A represented by Eq. (64) can be deemed as substantially the maximum value of the friction torque. As shown in FIG. 50, the deceleration at the saturation point can be deemed as $y_{0opti}$ defined by Eq. (65) and the braking torque at the saturation point can be deemed as $T_{bopit}$ defined by Eq. (66), whereby the friction torque of the i-th wheel can follow the maximum value.

In this embodiment, the limit of the characteristics of the friction torque can be correctly determined with a high degree of accuracy regardless of the state of the road surface, and the friction torque is controlled so as to follow the maximum value if the characteristics of the friction torque are determined to exceed the limit. Therefore, stable control can be effected even on the road surface in which the characteristics of the friction torque significantly change at the saturation point, which makes it possible to ensure prevention of wheel locking.

[Second Embodiment of the Fourth Aspect]

In reference to FIG. 46, the configuration of the wheel-behavior-quantity servo controller according to a second embodiment in accordance with the fourth aspect of the invention will be described. The elements which are the same as those in the first embodiment will be assigned the same reference numeral.

Figure 46:
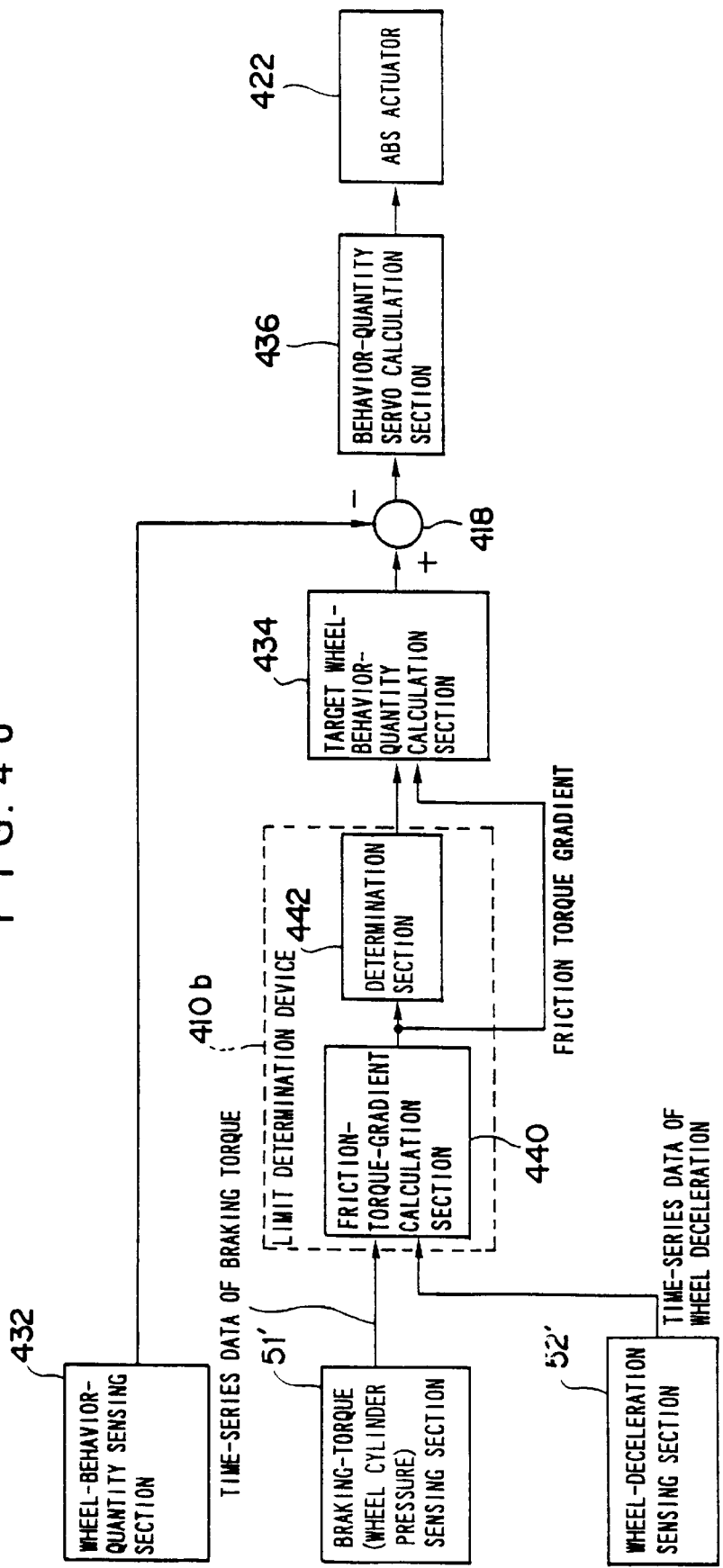
FIG. 46 is a block diagram showing the configuration of a wheel-behavior-quantity servo controller of a second embodiment in accordance with the fourth aspect of the invention.

As shown in FIG. 46, the wheel-behavior-quantity servo controller of the second embodiment is comprised of a wheel-behavior-quantity sensing section 432 for sensing the quantity of behavior of each wheel; a braking torque-gradient calculation section 440 which estimates and calculates the braking torque gradient in accordance with the time-series data concerning the braking torque sensed by the braking torque sensing section 51' and the time-series data concerning the wheel deceleration sensed by the deceleration sensing section 52'; a determination section 442 which determines the limit point of the characteristics of the friction torque in accordance with the friction torque gradient; a target behavior-quantity calculation section 434 which calculates an ordinary target value regarding the quantity of vehicle behavior (i.e., the target quantity of behavior), and which calculates a target behavior-quantity for causing the calculated friction torque gradient to follow the target value when the determination section 442 determines the limit point; a behavior-quantity servo calculation section 436 which calculates the amount of ABS operation to reduce to zero the difference between the calculated target behavior-quantity and the sensed wheel-behavior-quantity; and an ABS actuator 422 for actuating control valves (23 in FIG. 45) so as to effect the amount of ABS operation calculated by the behavior-quantity servo calculation section 436. These elements are controlled at given intervals every control step.

In addition to the deceleration used in the first embodiment, the wheel-behavior-quantity sensing section 432 can employ, e.g., a slip rate and a slip speed as the quantity of behavior of the wheel. The slip rate and the slip speed are calculated in the following manner.

$$k_i = \frac{\omega_v - \omega_i}{\omega_v} \tag{67}$$

$$\Delta \omega_i = \omega_v - \omega i \tag{68}$$

where
 $k_i$: slip rate of the i-th wheel;
 $\Delta \omega_i$: slip speed of the i-th wheel;
 $\omega_v$: vehicle speed (corresponding to an angular velocity); and
 $\omega_i$: speed of the i-th wheel.

The limit determination device 410b is made up of the friction torque-gradient computation section 440 and the determination section 442. In a case where the wheel-behavior-quantity sensing section 432 detects the wheel deceleration as the quantity of wheel behavior, the wheel-behavior-quantity sensing section 432 and the wheel deceleration sensing section 52' are assembled into one unit.

The operation of the second embodiment of the fourth aspect of the invention will be described.

The friction torque-gradient calculation section 440 of the second embodiment applies to Eq. (17) the time-series data $T_b[j]$ concerning the braking torque sampled at predetermined sampling intervals $\tau$ and the time-series data $y[j]$ (j=1, 2, 3, . . . ) concerning the deceleration similarly sampled at predetermined sampling intervals $\tau$. The gradient $k_i$ of friction torque of the i-th wheel is estimated and calculated by applying the on-line system identification method to each item of the data obtained from Eq. (17). The thus-calculated data are output to the determination section 442 .

The determination section 442 determines the limit of the characteristics of the friction torque by the comparison between the estimated gradient $k_i$ of friction torque of the i-th wheel and the preset reference friction torque gradient (e.g., 100 Nms/m). For example, if the gradient $k_i$ of friction torque is greater than the reference friction torque gradient, the determination section 442 determines that the characteristics of the friction torque do not reach the limit. In contrast, if the gradient $k_i$ of friction torque is smaller than the reference friction torque gradient, the determination section 442 determines that the characteristics of the friction torque reach the limit.

As shown in FIG. 49B, in the case of the road surface in which the friction torque gradient significantly changes when the characteristics of the friction torque exceed the limit point, the gradient $k_i$ of friction torque becomes suddenly smaller than the reference friction torque gradient in the vicinity of the limit point. Therefore, the limit point can be determined with a high degree of accuracy. Further, as shown in FIG. 49A, in the case of the road surface having the ordinary characteristics of the friction torque, the gradient $k_i$ of friction torque becomes small in the vicinity of the limit point. Therefore, the limit point can be determined with a high degree of accuracy.

If the characteristics of friction torque of the i-th wheel are determined to reach the limit, the target behavior-quantity calculation section 434 calculates a target quantity of behavior of the wheel-behavior-quantity regarding the i-th wheel which causes the estimated gradient $k_i$ of friction torque of the i-th wheel to follow a target value (zero if the friction torque follows the maximum value). Particularly, if the friction torque gradient becomes negative, it is necessary to return the friction torque gradient to the positive region immediately. To this end, the set target deceleration is subtracted at every control step from the current value by a comparatively large value corresponding to the difference between the friction torque gradient and the reference friction torque gradient in every control step. When the friction torque gradient is in the positive region, target deceleration for causing the friction torque gradient to match the reference value is calculated for control safety by, e.g, PI control.

The behavior-quantity servo calculation section 436 calculates the amount of ABS operation for reducing to zero the difference between the calculated target amount of behavior and the detected amount of behavior of the wheel. The ABS actuator 422 actuates the control valves so as to effect the calculated amount of ABS operation, whereby the friction torque is controlled so as to follow the peak value.

In contrast, if the characteristics of friction torque are determined not to reach the limit, the target behavior-quantity calculation section 434 calculates an ordinary target quantity of behavior corresponding to the pressure in the master cylinder which is the quantity of the driver's operation. As a result, the friction torque is controlled so as to follow the target value responsive to the driver's action.

In this embodiment, the limit of the characteristics of the friction torque can be correctly determined with a high degree of accuracy regardless of the state of the road surface, and the friction torque is controlled so as to follow the maximum value if the characteristics of the friction torque are determined to exceed the limit. Therefore, stable control can be effected even on the road surface in which the characteristics of the friction torque significantly change at the saturation point, which makes it possible to ensure prevention of wheel locking.

[Third Embodiment of the Fourth Aspect]

In reference to FIG. 47, the configuration of the wheel-behavior-quantity servo controller according to a third embodiment in accordance with the fourth aspect of the invention will be described. The elements which are the same as those in the first and second embodiments will be assigned the same reference numeral.

Figure 47:
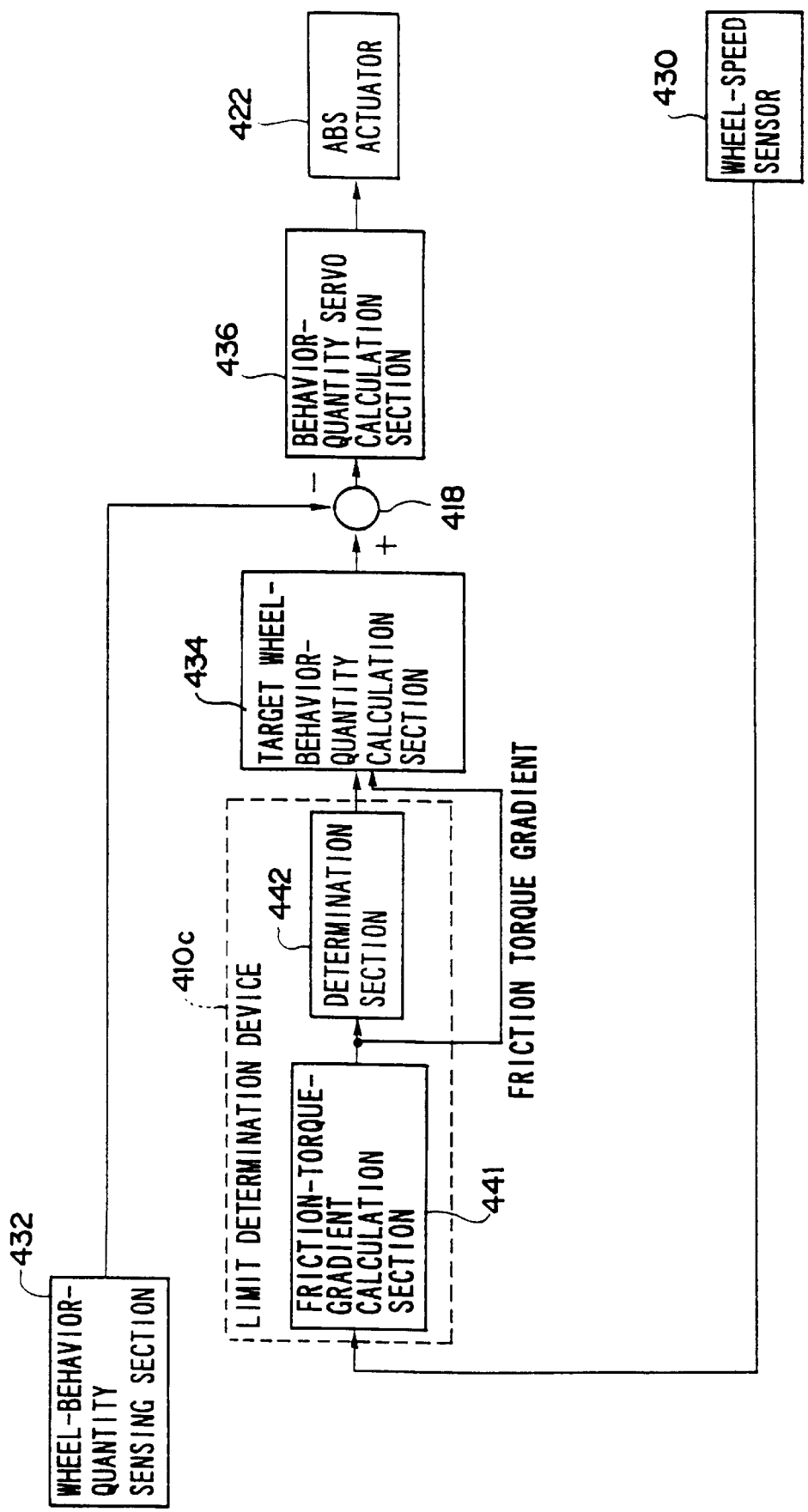
FIG. 47 is a block diagram showing the configuration of a wheel-behavior-quantity servo controller of a third embodiment in accordance with the fourth aspect of the invention.

As shown in FIG. 47, in the wheel-behavior-quantity servo controller, a wheel-speed sensor 430 of each wheel is connected to a friction torque-gradient calculation section 441 of the limit determination means 410c. This friction torque-gradient calculation section 441 estimates the friction torque gradient in accordance with the time-series data concerning the speed of each wheel sensed at predetermined sampling intervals τ by the wheel-speed sensor 430. The determination section 442 is connected to the friction torque-gradient calculation section 441 and determines the limit of the characteristics of friction torque in accordance with the estimated friction torque gradient. In other respects, the wheel-behavior-quantity servo controller is the same as that in the second embodiment.

The operation of the wheel-behavior-quantity servo controller of the third embodiment of the fourth aspect of the invention will be described.

The friction torque-gradient calculation section 441 of the third embodiment estimates and calculates the time-series data concerning the gradient $k_i$ of the friction torque of the i-th wheel by repeatedly executing operations defined in step 1 and 2 of Equations (9) to (11) through use of the time-series data $\omega_i[j]$ (j=0, 1, 2, . . . ) concerning the wheel speed sensed at sampling intervals τ.

The determination section 442 determines the limit of the characteristics of the friction torque by the comparison between the estimated gradient $k_i$ of friction torque of the i-th wheel and the preset reference friction torque gradient (e.g., 100 Nms/m). The processing subsequent to this step is the same as that in the second embodiment, and hence its explanation will be omitted.

Even in this embodiment, the friction torque gradient is estimated, and the limit of the characteristics of the friction torque are determined with a high degree of accuracy in accordance with the friction torque gradient. Therefore, the same effects as those yielded in the second embodiment will be obtained in this embodiment.

[Fourth Embodiment of the Fourth Aspect]

In reference to FIG. 48, the configuration of the wheel-behavior-quantity servo controller according to a fourth embodiment in accordance with the fourth aspect of the invention will be described. The elements which are the same as those in the first through third embodiments will be assigned the same reference numeral.

Figure 48:
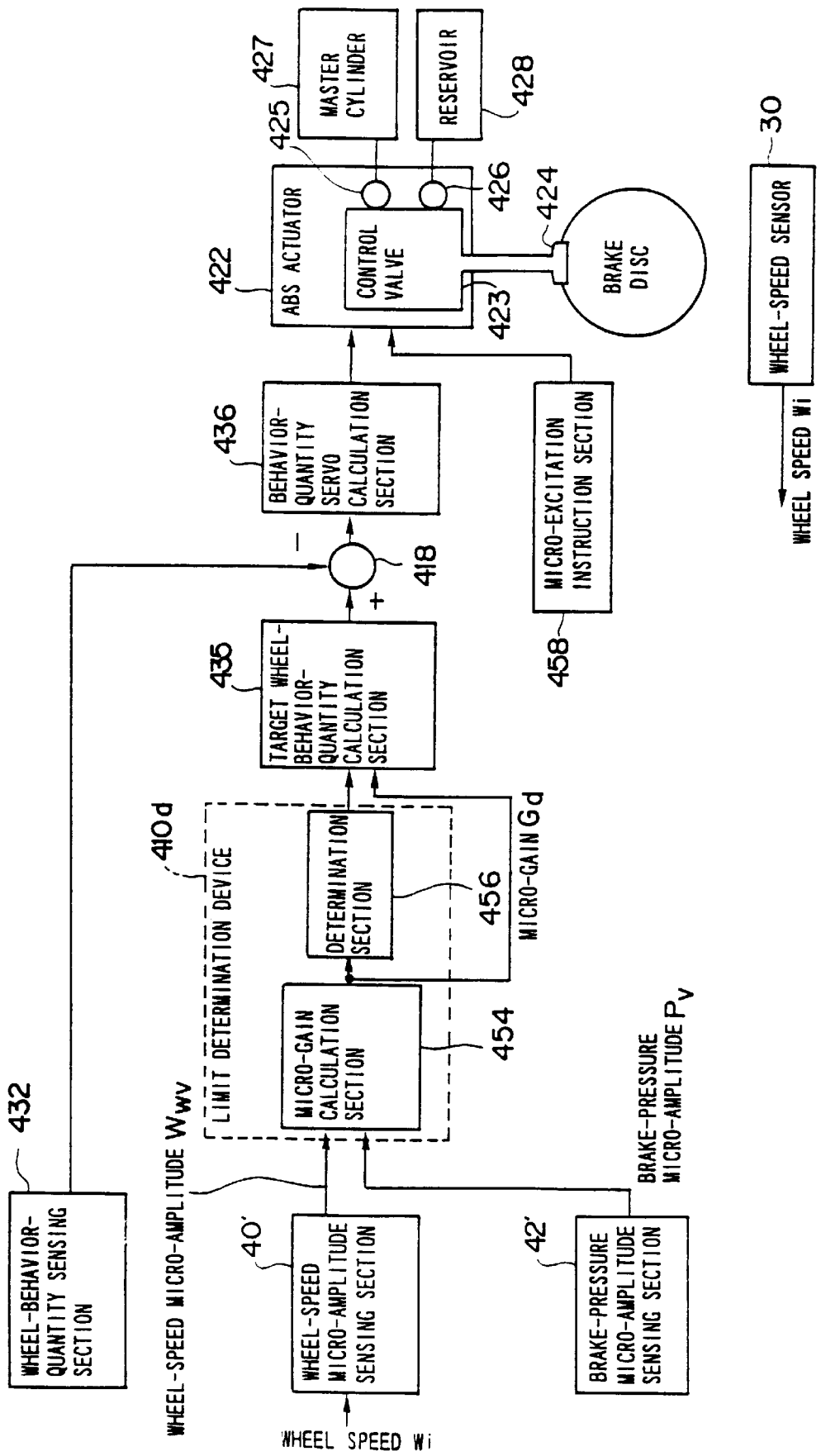
FIG. 48 is a block diagram showing the configuration of a wheel-behavior-quantity servo controller of a fourth embodiment in accordance with the fourth aspect of the invention.

As shown in FIG. 48, the ABS actuator 422 of the wheel-behavior-quantity servo controller according to the fourth embodiment is connected to a micro-excitation instruction section 458 for sending the micro-braking-force-excitation instruction. When the brake pedal is depressed, and when the wheel deceleration exceeds the certain reference value, this micro-excitation instruction section 458 sends an instruction to the ABS actuator 422, so that very small amount of amplification $P_v$ is imparted to the mean braking force (i.e., the pressure in the wheel cylinder) at the resonance frequency $\omega^\infty$ (see Eq. 30) of the vibration system consisting of the vehicle body, wheel, and the road surface.

The braking force can be excited in a very small amount by increasing or decreasing the pressure with periodicity corresponding to the resonance frequency simultaneously with the control for increasing/reducing the pressure in the control valve 23 in order to produce the mean braking force. More specifically, as shown in FIG. 15, the switching between a pressure-increase mode and a pressure-reduction mode is carried out every T/2 which is half the cycle of the minute excitation (e.g., 24 ms). From the instant of switching of the mode, a pressure-increase instruction signal is output to the valve for a period of pressure-increase time $t_i$, and a pressure-reduction instruction signal is output to the valve during the period of pressure-reduction time $t_r$. During the period of the remaining time, a hold instruction signal is output. The mean braking force is determined by ratio of the pressure-increase time $t_i$ to the pressure-reduction time $t_r$ corresponding to the pressure in the master cylinder. Very small vibration is applied to the mean braking force by switching between the pressure-increase mode and the pressure-reduction mode at every one-half cycle T/2 corresponding to the resonance frequency.

The wheel-behavior-quantity servo controller of the fourth embodiment is provided with a wheel-speed micro-amplitude sensing section 50 for sensing the amplitude $\omega_{wv}$ of very small vibration of the wheel resulting from the very small resonance of the braking force, and a braking-pressure micro-amplification sensing section 52 for sensing the very small amplitude $P_v$ in the braking pressure.

With regard to the micro-amplitude $P_v$ of the wheel minute-excitation amplitude section 50 and the braking force, please refer to the third embodiment (shown in FIG. 4) in accordance with the first aspect of the invention.

The limit determination device 410d is comprised of a micro-gain calculation section 454 which calculates a micro-gain $G_d$ from a sensed wheel-speed micro-amplitude $\omega_{wv}$ and a brake pressure micro-amplitude $P_v$; and a determination section 456 which determines the limit of the characteristics of friction torque by comparing the calculated micro-gain $G_d$ and the reference gain $G_s$. Of these elements, the micro-gain calculation section 454 can be formed as a divider for performing operations by Eq. (32).

The target-behavior-quantity calculation section 435 of the third embodiment calculates a target value (a target quantity of behavior) of the quantity of behavior of the wheel for causing the micro-gain $G_d$ to follow a target value.

The operation of the target-behavior-quantity servo controller of the fourth embodiment of the fourth aspect of the invention will be described.

When the micro-gain $G_d$ is calculated by the micro-gain calculation section 454, the determination section 456 determines the limit of the characteristics of the friction torque by the comparison between the micro-gain $G_d$ and the reference gain $G_s$. For example, if the micro-gain $G_d$ is greater than the reference gain $G_s$, it is determined that the characteristics of the friction torque do not reach the limit. In contrast, if the micro-gain $G_d$ becomes smaller than the reference gain $G_s$, it is determined that the characteristics of the friction torque reach the limit.

As shown in FIG. 49B, in the case of the road surface in which the friction torque gradient significantly changes when the characteristics of the friction torque exceed the limit point, the micro-gain $G_d$ becomes suddenly smaller than the reference friction torque gradient in the vicinity of the limit point. Therefore, the limit point can be determined with a high degree of accuracy. Further, as shown in FIG. 49A, in the case of the road surface having the ordinary characteristics of the friction torque, the micro-gain $G_d$ becomes small in the vicinity of the limit point. Therefore, the limit point can be determined with a high degree of accuracy.

If the characteristics of friction torque of the i-th wheel are determined to reach the limit, the target behavior-quantity calculation section 434 calculates a target quantity of behavior of the wheel-behavior-quantity regarding the i-th wheel which causes the micro-gain $G_d$ of the i-th wheel to follow a target value (zero if the friction torque follows the maximum value). For example, the set target deceleration is subtracted from the current value by a comparatively large value corresponding to the difference between the micro-gain $G_d$ and the reference gain $G_s$ in every control step.

The behavior-quantity servo calculation section 436 calculates the amount of ABS operation for reducing to zero the difference between the calculated target amount of behavior and the detected amount of behavior of the wheel. The ABS actuator 422 actuates the control valves so as to effect the calculated amount of ABS operation, whereby the friction torque is controlled so as to follow the peak value.

In contrast, if the characteristics of friction torque are determined not to reach the limit, the target behavior-quantity calculation section 434 calculates an ordinary target quantity of behavior corresponding to the pressure in the master cylinder which is the quantity of the driver's operation. As a result, the friction torque is controlled so as to follow the target value responsive to the driver's action.

In this embodiment, the limit of the characteristics of the friction torque can be correctly determined with a high degree of accuracy regardless of the state of the road surface, and the friction torque is controlled so as to follow the maximum value if the characteristics of the friction torque are determined to exceed the limit. Therefore, stable control can be effected even on the road surface in which the characteristics of the friction torque significantly change at the saturation point, which makes it possible to ensure prevention of wheel locking.

Particularly, the micro-gain $G_d$ which drastically reduces in the region of limit of the friction torque characteristics is used in the fourth embodiment, the limit of the characteristics of the friction torque can be determined with a considerably high degree of accuracy.

Although the embodiments of the present invention have been described, the present invention is not limited to these embodiments. Various modifications of the embodiments can be contrived without departing from the principle of the invention.

For example, in the first embodiment, the saturation point employed Eq. (63) may be determined by use of the following relationship:

$$T_b < T_{b0}. \qquad (69)$$

where $T_b$ is braking torque obtained at the point in time by the braking torque sensing section 14 in FIG. 1, and $T_{b0}$ represents braking torque obtained by substitution of the wheel deceleration $y_0$ sensed by the wheel deceleration section 12 into Equation (9) which is obtained by assuming that the slip speed is constant in the state of equilibrium while the wheel deceleration is approaching the target value.

Although the means for exciting the brake pressure in a very small amount is implemented by regulating the time required to increase or decrease the pressure in the control valve in the fourth embodiment, the present invention is not limited to this example. Braking force may be directly imparted to the brake disc through use of a piezoelectric actuator which causes expansion and contraction corresponding to a very-small-excitation instruction signal.

Experimental Examples of the Fourth Aspect:

Explanation will be given of experimental examples in which the wheel-deceleration servo controller according to the first and second embodiments of the fourth aspect of the invention are operated under specific conditions.

FIRST EXAMPLE

With reference to FIGS. 51A to 51C, an explanation will be given of the result of simulation in which the wheel deceleration servo controller of the first embodiment controls the wheel deceleration so that it follows target wheel deceleration when harsh brakes are applied on a road having a low friction coefficient $\mu$.

FIG. 51A shows variations with time in the wheel speed (indicated by a solid line) and the vehicle speed (indicated by a broken line). As shown in the drawing, the wheel speed remains different from the vehicle speed after time is at which application of brakes is commenced. However, with the exception of the immediately after the commencement of braking action, the difference (i.e., the slip speed) between the wheel speed and the vehicle speed is maintained constant until the wheel speed becomes zero. It is seen that there is a state of equilibrium in which the slip speed is constant; namely, the wheel deceleration agrees with the target deceleration in an approaching manner.

FIG. 51B shows variations with time in the sensed wheel deceleration (indicated by a solid line) and the target wheel deceleration (indicated by a broken line). As shown in the drawing, it is admitted that there is a slight difference between the wheel deceleration and the target deceleration during the period of time from 1 s to 1.4 s after the brake starting time (1 s). However, the difference is negligible, and there is also a tendency for the wheel deceleration to follow the target deceleration. Therefore, it may be safely said that the wheel deceleration substantially matches the target deceleration. After time 1.4 s, it is seen that the wheel deceleration substantially agrees with the target deceleration, and target follow-up control properly works in response to the application of harsh brakes.

FIG. 51C shows variations with time in the sensed braking torque $T_b$ (indicated by a solid line) and braking torque $T_{b0}$ (indicated by a broken line) calculated by Eq. (58) through use of the sensed wheel deceleration. As shown in the drawing, $T_b$ becomes smaller than $T_{b0}$ during the period of time over which about 1.6 s has elapsed from the brake starting time (1 s). This means that Eq. (63) (or Eq. 69) holds. The limit determination device 410a in FIG. 45 determines that the characteristics of friction torque are saturated during the period of this time. The target deceleration calculation section 16 reduces $T_{b0}$ at every control step until $T_b$ substantially matches $T_{b0}$. The target deceleration $y_0$ is calculated from $T_{b0}$ by Eq. (58).

As has been described with reference to FIG. 51B, the wheel deceleration substantially matches the target deceleration even during the period of time over which the characteristics of braking torque are saturated. Hence, it is understood that the characteristics of friction torque do not exceed the limit, and target follow-up control properly functions. As shown in FIG. 51C, $T_b$ substantially matches $T_{b0}$ after time 1.6 s. It means that braking force is properly controlled so as to follow the peak friction coefficient $\mu$ at the saturation point shown in FIG. 50 without wheel locking.

With reference to FIGS. 52A to 52C, an explanation will be given of the result of simulation in which the wheel deceleration servo controller of the first embodiment controls the wheel deceleration so that it follows target wheel deceleration when harsh brakes are applied on a road having a high friction coefficient $\mu$.

As shown in FIGS. 52A to 52C, it is understood that the target follow-up control properly works even on the road of high friction coefficient $\mu$ as does on the road of low friction coefficient $\mu$ shown in FIGS. 51A to 51C. Since the road has a high friction coefficient $\mu$, the period of time over which the wheel comes to stop is short. Further, as shown in FIG. 52C, the period of time (1 s to 1.5 s) over which the characteristics of braking torque are determined to become saturated is also shorter than that shown in FIGS. 51A to 51C.

The results of the foregoing simulation show that the wheel deceleration servo controller of the first embodiment of the present invention is capable of permitting pursue of a stable target value without wheel locking regardless of whether the road has a high or low friction coefficient $\mu$.

SECOND EXAMPLE

Figures 53A, 53B, 53C:
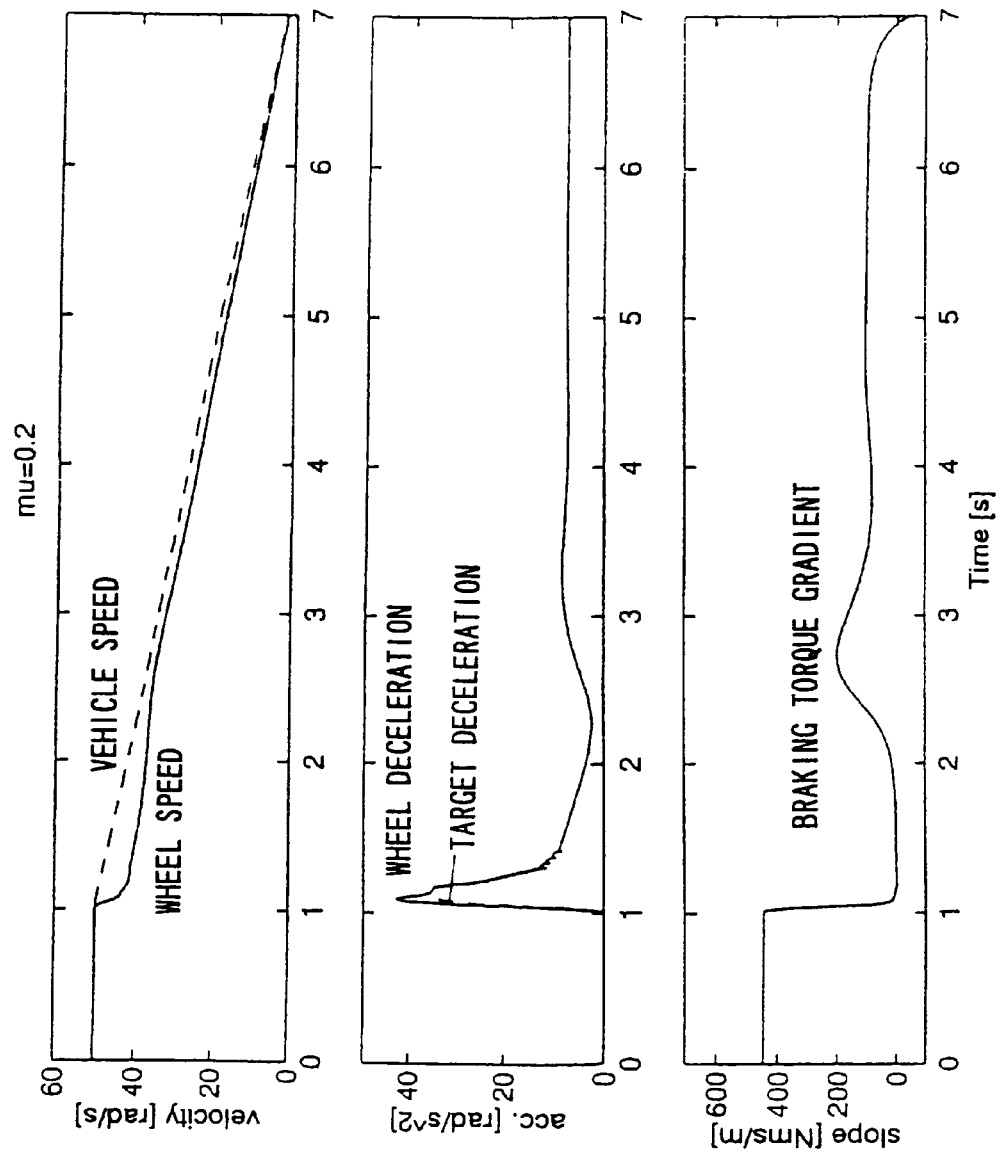
FIGS. 53A to 53C are graphs showing the results of the simulation of the wheel deceleration servo controller of the second embodiment in accordance with the fourth aspect of the invention in which harsh braking on a low-$\mu$ road is simulated.

With reference to FIGS. 53A to 53C, an explanation will be given of the result of simulation in which the wheel deceleration servo controller of the second embodiment controls the wheel deceleration so that it follows target wheel deceleration when harsh brakes are applied on a road having a low friction coefficient $\mu$.

FIG. 53A shows variations with time in the wheel speed (indicated by a solid line) and the vehicle speed (indicated by a broken line). As shown in the drawing, the wheel speed remains different from the vehicle speed after time is at which application of brakes is commenced. However, with the exception of the immediately after the commencement of braking action, the difference (i.e., the slip speed) between the wheel speed and the vehicle speed is maintained at a slight difference until the vehicle comes to stop. This means that no wheel locking has occurred.

FIG. 53B shows variations with time in the sensed wheel deceleration (indicated by a solid line) and the target wheel deceleration (indicated by a broken line). As shown in the drawing, it is admitted that there is a slight difference between the wheel deceleration and the target deceleration during the period of time from 1 s to 1.2 s after the brake starting time (1 s). However, the difference is negligible, and there is also a tendency for the wheel deceleration to pursue the target deceleration. Therefore, it may be safely said that the wheel deceleration substantially matches the target deceleration. After time 1.2 s, it is seen that the wheel deceleration substantially agrees with the target deceleration, and target follow-up control properly works in response to the application of harsh brakes.

FIG. 53C shows variations with time in the calculated and estimated friction torque gradient. As shown in the drawing, the friction torque gradient has a sharp drop after time 1 s at which the friction action is commenced. A value less than a given value is maintained until the vehicle comes to stop. In short, it is shown that a small value in the vicinity of the peak friction coefficient $\mu$ is maintained, and target-pursuing control properly works without wheel locking.

Figure 54A:
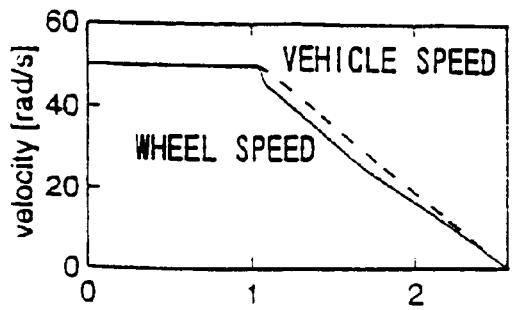
FIGS. 54A to 54C are graphs showing the results of the simulation of the wheel deceleration servo controller of the second embodiment in accordance with the fourth aspect of the invention in which harsh braking on a high-$\mu$ road is simulated.
Figure 54B:
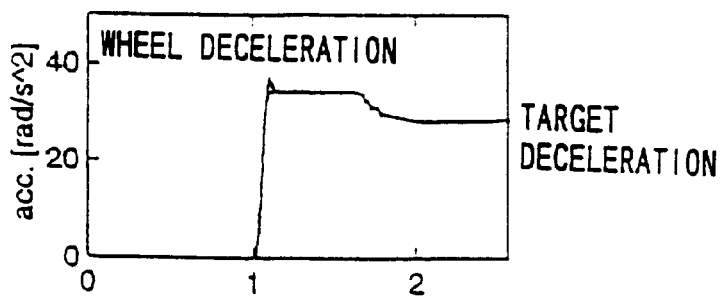
Figure 54C:
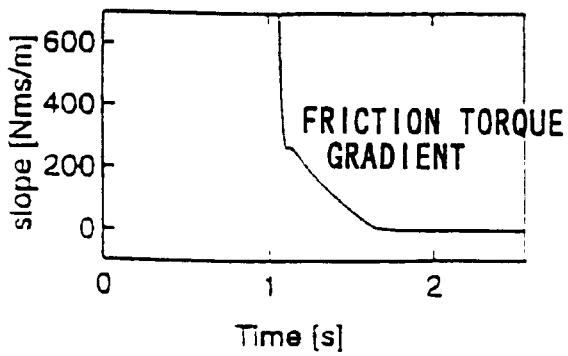

With reference to FIGS. 54A to 54C, an explanation will be given of the result of simulation in which the wheel deceleration servo controller of the second embodiment controls the wheel deceleration so that it follows target wheel deceleration when harsh brakes are applied on a road having a high friction coefficient $\mu$.

As shown in FIGS. 54A to 54C, it is understood that the target follow-up control properly works even on the road of high friction coefficient $\mu$ as does on the road of low friction coefficient $\mu$ shown in FIGS. 53A to 53C.

The results of the foregoing simulation show that the wheel deceleration servo controller of the second embodiment of the present invention is capable of permitting pursue of a stable target value without wheel locking regardless of the state of road surface.

As has been described above, in accordance with the first aspect of the present invention, the locked state of the wheel is detected by estimating the friction torque gradient from time-series data concerning the wheel speed, and by controlling a braking force in accordance with the friction torque gradient rather than by the comparison between the wheel speed and the vehicle speed or the comparison between slip rates. As a result, stable and comfortable anti-lock brake control can be effected with a high degree of accuracy regardless of the state of the road surface.

Also, in accordance with the first aspect of the present invention, a small number of matrix elements are employed as parameters to be identified, such as a physical quantity representing both the time history of the physical quantity related to the wheel speed and the time history of the physical quantity related to the change of variation in the wheel speed. Therefore, the accuracy of calculation is improved, and computation time is reduced. Since the present invention requires detection of only the wheel speed, the anti-lock brake system can be simplified.

Moreover, in accordance with the first aspect of the present invention, the locked state of the wheel is detected by estimating the friction torque gradient from time-series data concerning the wheel speed, and by controlling a braking force in accordance with the friction torque gradient rather than by the comparison between the wheel speed and the vehicle speed or the comparison between slip rates. As a result, stable and comfortable anti-lock brake control can be effected with a high degree of accuracy regardless of the state of the road surface.

Further, in accordance with the first aspect of the present invention, the state of motion approximated by a gradient model is transformed into the relationship between the friction torque gradient which is a parameter to be identified, the physical quantity associated with the change in the friction torque, and the physical quantity concerning the change in the slip speed, and this relationship is subjected to the on-line system identification method. As a result, the friction torque gradient is estimated, and the number of parameters to be identified can be reduced to one. Consequently, significant improvements in the accuracy of computation and considerable reduction in computation time are achieved.

Moreover, in accordance with the first aspect of the invention (as disclosed in claim 7), the state of motion of each wheel and the state of motion of the vehicle are used together with the first and second models. In a first model, a nonlinear variation in the friction torque of each wheel with respect to disturbance in the slip speed of each wheel in the vicinity of the equilibrium point is represented as a linear variation which changes within a first range. In a second model, a nonlinear variation in the gradient of the friction torque of each wheel with respect to disturbance in the slip speed of each wheel in the vicinity of the equilibrium point is represented as a linear variation which changes within a second range. The above-described amount of application of the braking force to each wheel is determined such that the first and second ranges fall within a predetermined allowable range and that the gradient of friction torque determined by the second model which is designed in such a way that the second range falls within the predetermined allowable range matches the gradient of friction torque estimated by the torque-gradient estimating means. The braking force acting on each wheel is controlled in accordance with the thus-obtained amount of application of the braking force. As a result, elaborate anti-lock brake control can be effected in consideration of interference between the four wheels.

In the present invention, in accordance with micro-gains which reflect variations in the vibration characteristics of the wheel resonance system, the friction torque gradient equivalent to the micro-gains is estimated. Therefore, an estimated value with a considerably high degree of accuracy is obtained.

In the second aspect of the invention, the starting point for control is determined in accordance with the friction torque gradient which correctly and stably reflect the state of motion of the wheel. Consequently, the starting point for control can be determined stably and correctly without the need of the friction coefficient $\mu$ of the road surface on which the vehicle travels or the speed of braking action.

In the third aspect of the present invention, either the front two wheels or the rear two wheels are excited in a very small amount and are subjected to anti-lock brake control. Further, since the wheel speeds of the remaining two wheels are controlled so as to match the wheel speeds of the anti-lock-controlled two wheels, the number of wheels to be excited in a very small amount is reduced to two, which in turn contributes to a reduction in the number of micro-exciting means. Further, stable and correct brake control of all the wheels becomes feasible irrespective of the state of road surface. Further, if the anti-lock brake controller is constructed so as not to excite two drive wheel in a very small amount, the interference between the right-side and left-side drive wheel due to the transmission of very small amounts of vibration over the drive shaft can be prevented. As a result, interference between the right and left drive wheel can be prevented.

According to this aspect of the present invention, the speed of the two reference wheels is directly used so as to control the speed of the other two wheels through follow-up control. In comparison with the case where the follow-up control is effected using a slip rate calculated from the wheel speed, computation time and memory required for calculation can be omitted. Further, the deterioration of control performance due to computation errors can be prevented.

According to the third aspect of the present invention (as claimed in claim 10), if it is determined that the difference in friction coefficient between the left-side and right-side road portions exceeds the reference value, the braking force acting on the wheel on the road surface having a low friction coefficient is excited in a very small amount so that the friction coefficient can become the peak value. The braking force acting on the other wheel is controlled so as to match with the braking force of the excited wheel, enabling correct and stable braking action. Even in the case of a split road affording differing coefficients of friction from left to right, the same amount of braking force acts on the wheels on both sides, enabling stable vehicle running.

In this third aspect of the present invention, if it is determined that the difference in friction coefficient between the left-side and right-side road portions exceeds the reference value, only the braking force acting on one of the two reference wheels on the road surface of low friction coefficient is excited in a very small amount so that the friction coefficient can become substantially the peak value. The braking force acting on the other wheel of the two reference wheels is controlled so as to match the braking force acting on the excited wheel. Further, the speed of the two wheels other than the reference wheels is controlled so as to match the speed of the two reference wheels. Therefore, correct and stable braking control becomes feasible, and the number of wheels to be excited in a very small amount can be reduced to the minimum required number. Further, even in the case of the split road affording differing coefficients of friction from left to right, instable vehicle running and interference between the right and left drive wheel can be eliminated.

Further, in the fourth aspect of the invention, the friction torque gradient with respect to a slip speed or the physical quantity associated with this friction torque gradient via the motion of the wheel, is calculated as the quantity of limit determination. In accordance with the result of limit determination of the friction torque characteristics based on the quantity of limit determination, there is calculated a target value of the quantity of wheel behavior to be controlled such that the characteristics of the friction torque does not exceed the limit. Therefore, in comparison with the case where the target value is pursued by feeding back merely one physical quantity, target follow-up control can be more properly carried out regardless of whether or not the road surface causes drastic variations in the friction torque gradient.

What is claimed is:

1. An anti-lock brake controller comprising:
   wheel-speed sensing means which senses a wheel speed at given sampling intervals;
   torque-gradient estimating means which estimates a gradient of friction torque with respect to a slip speed in accordance with time-series data concerning the wheel speed detected by said wheel-speed sensing means, the friction torque being received by a wheel from a road surface; and
   control means which controls braking forces acting on wheels in such a way that the gradient of friction torque estimated by said torque-gradient estimating means falls within a predetermined range including a reference value.

2. An anti-lock brake controller according to claim 1, wherein said torque-gradient estimating means comprises:
   first computation means which calculates a physical quantity related to a variation in the wheel speed and a physical quantity related to a change of the variation in the wheel speed in accordance with the time-series data concerning the wheel speed; and
   second computation means which calculates a physical quantity representing both a time history of the physical quantity related to the variation in the wheel speed and a time history of the physical quantity related to the change of the variation in the wheel speed, in accordance with the physical quantity related to the variation in the wheel speed and the physical quantity related to the change of the variation in the wheel speed calculated by said first computation means, and which estimates the gradient of friction torque in accordance with the thus-calculated physical quantity.

3. An anti-lock brake controller according to claim 2, wherein said second computation means approximates a state of motion of the wheel obtained when the friction torque and the braking forces are exerted on the wheel, using a gradient model in which the friction torque changes linearly in accordance with the gradient of friction torque with respect to the slip speed;
   previously converts the thus-approximated state of motion into a relationship between the gradient of friction torque with respect to the slip speed, which is a parameter to be identified, the physical quantity which is related to the variation in the wheel speed and the physical quantity which is related to the change of the variation in the wheel speed; and
   estimates the gradient of friction torque with respect to the slip speed by applying an on-line system identification method to data obtained by sequentially applying to the relationship the time-series data concerning the wheel speed.

4. An anti-lock brake controller according to claim 3, wherein said first computation means calculates the physical quantity related to the variation in the wheel speed according to the Equation:

$$\phi_i[k] = \begin{bmatrix} \tau\{\omega_i[k-1] - \omega_i[k-2]\}/J \\ 1 \end{bmatrix}$$

where $\omega_i[k]$ represents time-series data concerning the speed of an i-th wheel detected at a sampling point in time k (k=1, 2, ...), $\tau$ represents a sampling interval, and J is an inertia of the wheel; and
calculates the physical quantity related to the change of the variation in the wheel speed according to the Equation:

$$y[k] = -\omega_i[k] + 2\omega_i[k-1] - \omega_i[k-2],$$ and said second computation means estimates the physical quantity $\theta_i$ representing the time history of the physical quantity related to the variation in the wheel speed and the time history of the physical quantity related to the change of the variation in the wheel speed in accordance with the recurrence formula:

$$\hat{\theta}_i[k] = \hat{\theta}_i[k-1] + L_i[k]\left(y_i[k] - \phi_i[k]^T \cdot \hat{\theta}_i[k-1]\right)$$

$$L_i[k] = \frac{P_i[k-1]\phi_i[k]}{\lambda + \phi_i[k]^T P_i[k-1]\phi_i[k]}$$

$$P_i[k] = \frac{1}{\lambda}\left[P_i[k-1] - \frac{P_i[k-1]\phi_i[k]\phi_i[k]^T P_i[k-1]}{\lambda + \phi_i[k]^T P_i[k-1]\phi_i[k]}\right]$$

where $\lambda$ is a forgetting factor, and "$T$" is a transposition of a matrix; and
obtains a first element of the matrix of an estimated value $\hat{\theta}_i$ as the gradient of friction torque with respect to the slip speed.

5. An anti-lock brake controller according to claim 1, wherein said control means uses:
   a state of motion of each wheel obtained when the friction torque and an amount of application of a braking force which acts on the wheel in the vicinity of an equilibrium point are exerted on each wheel;
   a state of motion of the vehicle obtained when the friction torque developed in each wheel is exerted on the overall vehicle;
   a first model in which a nonlinear variation in the friction torque of each wheel with respect to disturbance in the slip speed of each wheel in the vicinity of the equilibrium point is represented as a linear variation which changes within a first range with respect to disturbance in the slip speed of each wheel; and
   a second model in which a nonlinear variation in the gradient of the friction torque of each wheel with respect to disturbance in the slip speed of each wheel in the vicinity of the equilibrium point is represented as a linear variation which changes within a second range with respect to the disturbance in the slip speed of each wheel,
   thereby calculating an amount of application of the braking force to each wheel such that the first and second ranges fall within a predetermined allowable range and that the gradient of friction torque determined by the second model which is designed in such a way that the second range falls within the predetermined allowable range matches the gradient of friction torque estimated by the torque-gradient estimating means; and
   controlling the braking force acting on each wheel in accordance with the thus-obtained amount of application of the braking force.

6. An anti-lock brake controller comprising:
   wheel-deceleration sensing means for sensing a wheel deceleration;
   braking torque sensing means for sensing a braking torque;

torque-gradient estimating means which estimates a gradient of friction torque with respect to a slip speed in accordance with time-series data concerning the wheel deceleration detected at given sampling intervals, and time-series data concerning the braking torque detected at given sampling intervals or a physical quantity related to the braking torque; and control means which controls braking forces acting on the wheels in such a way that the gradient of friction torque estimated by said torque-gradient estimating means falls within a predetermined range including a reference value, wherein said torque-gradient estimating means approximates a state of motion of the wheel obtained when the friction torque and the braking torque are exerted on the wheel, using a gradient model in which the friction torque changes linearly in accordance with the gradient of friction torque with respect to the slip speed, previously converts the thus-approximated state of motion into a relationship between the gradient of friction torque with respect to the slip speed, which is a parameter to be identified, a physical quantity which is related to a variation in the friction torque and a physical quantity which is related to a variation in the slip speed, which are both represented by the braking torque and the wheel deceleration; and estimates the gradient of friction torque with respect to the slip speed by applying an on-line system identification method to data obtained by sequentially applying to the relationship the time-series data concerning detected wheel deceleration and the time-series data concerning the braking torque or the physical quantity related to the braking torque.

7. An anti-lock brake controller according to claim 6, wherein said toque-gradient estimating means estimates the gradient of friction torque of each wheel in a manner such that provided that "$y_i[j]$" represents time-series data concerning the wheel deceleration of an i-th wheel at a sampling point in time "j," "$T_{bi}[j]$" represents time-series data concerning braking torque, "$\tau$" represents the given sampling interval, "J" represents an inertia of the wheel, "$R_c$" represents a radius of the wheel, "M" represents a mass of the vehicle, "$T_b[j]$" represents a vector which includes as components the time-series data concerning the braking torque of each wheel, "y[j]" represents a vector which includes as components the time-series data concerning the deceleration of each wheel, "I" represents a unit matrix, and "A" represents a matrix which includes $\{(J/MR_c^2)+1\}$ as diagonal elements and $J/MR_c^2$ as nondiagonal elements, the physical quantity "f" concerning the variation in the friction torque and the physical quantity ø concerning the variation in the slip speed are expressed by the Formulae:

$$f = -J(y[j+1] - y[j]) + T_b[j+1] - T_b[j]$$

$$\phi = \tau \cdot A \cdot y[j] + \frac{\tau}{J}(I - A)T_b[j];$$

provided that "K" is a matrix which includes as components the gradient of friction torque of each wheel which is a parameter to be identified, the approximated state of motion is previously converted into the Equation:

$$K\phi = f;$$

data are obtained by sequentially applying to the previous Equation the time-series data $y_i[j]$ (j=1, 2, 3, . . . )
concerning the wheel deceleration and the time-series data $T_{bi}[j]$ (j=1, 2, 3, . . . ) concerning the braking torque; and an on-line system identification method is then applied to the thus-obtained data, whereby the gradient of friction torque of each wheel is estimated.

8. A control start determination method comprising:

a wheel speed sensing step for sensing the speed of a wheel at predetermined sampling intervals;

a torque-gradient estimating step for estimating a friction torque gradient with respect to a slip speed based on time-series data regarding the wheel speed sensed in the wheel speed sensing step, the friction torque being received by a wheel from a road surface; and a determination step for determining a starting point for the control to bring the wheel into a predetermined state of motion in accordance with the friction torque gradient estimated in the torque-gradient estimating step.

9. A control start determination method according to claim 8, wherein said torque-gradient estimating step comprises:

first computation step which calculates a physical quantity related to a variation in the wheel speed and a physical quantity related to a change of the variation in the wheel speed in accordance with the time-series data concerning the wheel speed; and second computation step which calculates a physical quantity representing both a time history of the physical quantity related to the wheel speed and a time history of the physical quantity related to the change of the variation in the wheel speed, in accordance with the physical quantity related to the variation in the wheel speed and the physical quantity related to the change of the variation in the wheel speed calculated by said first computation means, and which estimates the gradient of friction torque in accordance with the thus-calculated physical quantity.

10. A control start determination method according to claim 9, wherein said first computation step calculates the physical quantity related to the variation in the wheel speed according to the Equation:

$$\phi_i[k] = \begin{bmatrix} \tau\{\omega_i[k-1] - \omega_i[k-2]\}/J \\ 1 \end{bmatrix}$$

where $\omega_i[k]$ represents time-series data concerning the speed of an i-th wheel detected at a sampling point in time k (k=1, 2, . . . ), $\tau$ represents a sampling interval, and J is an inertia of the wheel; and calculates the physical quantity related to the change of the variation in the wheel speed according to the Equation:

$$y_i[k] = -\omega_i[k] + 2\omega_i[k-1] - \omega_i[k-2];$$ and said second computation step estimates the physical quantity $\theta_i$ representing the time history of the physical quantity related to the variation in the wheel speed and the time history of the physical quantity related to the change of the variation in the wheel speed in accordance with the recurrence formula:

$$\hat{\theta}_i[k] = \hat{\theta}_i[k-1] + L_i[k]\left(y_i[k] - \phi_i[k]^T \cdot \hat{\theta}_i[k-1]\right)$$

-continued $$L_i[k] = \frac{P_i[k-1]\phi_i[k]}{\lambda + \phi_i[k]^T P_i[k-1]\phi_i[k]}$$

$$P_i[k] = \frac{1}{\lambda}\left[P_i[k-1] - \frac{P_i[k-1]\phi_i[k]\phi_i[k]^T P_i[k-1]}{\lambda + \phi_i[k]^T P_i[k-1]\phi_i[k]}\right]$$

where $\lambda$ is a forgetting factor, and "$T$" is a transposition of a matrix; and obtains a first element of the matrix of an estimated value $\hat{\theta}_i$ as the gradient of friction torque with respect to the slip speed.

11. A wheel-behavior-quantity servo controller comprising:

wheel-behavior-quantity detecting means for detecting a quantity of behavior of a wheel which is a physical quantity associated with a motion of the wheel;

limit determination means which calculates, as a quantity of limit determination, a friction torque gradient indicating a gradient of friction torque with respect to a slip speed or a physical quantity associated with the friction torque gradient via the wheel motion, and which determines the limit of the characteristics of the friction torque between the wheel and the road surface in accordance with the quantity of limit determination;

target-behavior-quantity calculation means which calculates a target value of the quantity of wheel behavior used for controlling the quantity of limit determination to within the limit of friction torque characteristics in accordance with the result of limit determination of said limit determination means; and servo control means which controls the motion of the wheel so as to cause the quantity of wheel behavior detected by said wheel-behavior-quantity detecting means to follow the target value of the quantity of wheel behavior calculated by the target-behavior-quantity calculation means.

12. A wheel-behavior-quantity servo controller according to claim 11, further comprising braking torque sensing means for sensing a braking torque, wherein said wheel-behavior-quantity detecting means calculates a wheel deceleration as the quantity of behavior of a wheel; and in accordance with the detected braking torque and the detected wheel deceleration, said limit determination means calculates, as a quantity of limit determination, either wheel deceleration or braking torque which will be obtained on the assumption that the slip speed is constant in the state of equilibrium of motion of the wheel, and in accordance with the comparison between the quantity of limit determination and the actually detected wheel deceleration, or the comparison between the quantity of limit determination and the actually detected braking torque, said limit determination means determines the limit of the characteristics of friction torque between the wheel and the road surface.

13. A wheel-behavior-quantity servo controller according to claim 11, wherein said limit determination means calculates, as a quantity of limit determination, a braking torque gradient based on time-series data of braking torque and time-series data of wheel deceleration and determines the limit of the characteristics of friction torque based on the quantity of limit determination.

14. A wheel-behavior-quantity servo controller according to claim 11, wherein said limit determination means calculates, as a quantity of limit determination, a friction torque gradient based on time-series data of wheel speed and determines the limit of the characteristics of friction torque based on the quantity of limit determination.

15. A wheel-behavior-quantity servo controller according to claim 11, further comprising micro-exciting means for exciting a brake pressure in a very small amount at a resonance frequency of a vibration system made up of a vehicle body, wheels, and road surface, wherein said limit determination means calculates, as a quantity of limit determination, a micro-gain which is a ratio between a very small amplitude of brake pressure obtained when the brake pressure is excited in a very small amount by said micro-exciting means and a very small amplitude of the resonance frequency component of wheel speed, and determines the limit of the characteristics of friction torque based on the quantity of limit determination.

16. A torque gradient estimating apparatus compising:

wheel-speed sensing means which senses a wheel speed at given sampling intervals;

torque-gradient estimating means which estimates a gradient of friction torque or driving torque with respect to a slip speed in accordance with time-series data concerning the wheel speed detected by said wheel-speed sensing means, the friction torque being received by a wheel from a road surface; and output means which outputs the estimated gradient of friction torque or driving torque.

* * * * *

UNITED STATES PATENT AND TRADEMARK OFFICE
CERTIFICATE OF CORRECTION

PATENT NO.   : 6,122,585
DATED        : September 19, 2000
INVENTOR(S)  : Eiichi Ono, et al.

It is certified that error appears in the above-identified patent and that said Letters Patent is hereby corrected as shown below:

<u>Title page,</u>
Item [56], under "U.S. PATENT DOCUMENTS" insert
-- 5,570,935   11/1996   Monzaki        303/155
   5,015,041   5/1991    Kuwana et al.  701/71
   5,747,682   5/1998    Hirano         701/71 --.

Signed and Sealed this

Thirtieth Day of October, 2001

Attest:

NICHOLAS P. GODICI
*Acting Director of the United States Patent and Trademark Office*

*Attesting Officer*